US011435964B2

(12) United States Patent
Ishifune et al.

(10) Patent No.: US 11,435,964 B2
(45) Date of Patent: Sep. 6, 2022

(54) INFORMATION PROCESSING METHOD, INFORMATION PROCESSING PROGRAM, INFORMATION PROCESSING APPARATUS, AND IMAGE FORMING APPARATUS

(71) Applicant: CANON KABUSHIKI KAISHA, Tokyo (JP)

(72) Inventors: Taro Ishifune, Shizuoka (JP); Yuki Sugiyama, Shizuoka (JP); Shingo Harada, Shizuoka (JP); Yuya Konno, Shizuoka (JP); Lisa Kitadai, Tokyo (JP); Kazumasa Nohsho, Kanagawa (JP); Ryo Takaba, Kanagawa (JP); Hayato Watanabe, Nagano (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/200,662

(22) Filed: Mar. 12, 2021

(65) Prior Publication Data

US 2021/0286572 A1 Sep. 16, 2021

(30) Foreign Application Priority Data

Mar. 16, 2020 (JP) ............................ JP2020-045742
Mar. 26, 2020 (JP) ............................ JP2020-056557
May 19, 2020 (JP) ............................ JP2020-087708
Jun. 10, 2020 (JP) ............................ JP2020-101025
Jul. 17, 2020 (JP) ............................ JP2020-123116

(51) Int. Cl.
*G06F 3/12* (2006.01)

(52) U.S. Cl.
CPC ............ *G06F 3/1242* (2013.01); *G06F 3/126* (2013.01); *G06F 3/1208* (2013.01); *G06F 3/1232* (2013.01)

(58) Field of Classification Search
None
See application file for complete search history.

(56) References Cited

U.S. PATENT DOCUMENTS

2003/0112462 A1* 6/2003 Ochiai .................. G06K 15/02 358/1.15
2006/0159480 A1* 7/2006 Mima .................. G03G 15/00 399/82
2019/0112140 A1* 4/2019 Harano .................. G06K 15/16

FOREIGN PATENT DOCUMENTS

JP 2000238959 A 9/2000
JP 2006008270 A 1/2006

(Continued)

*Primary Examiner* — Frantz Bataille
(74) *Attorney, Agent, or Firm* — Canon U.S.A., Inc. I.P. Division

(57) ABSTRACT

An information processing method performs steps for an information processing apparatus to communicate with an image forming apparatus having first and second sheet output sections. The second sheet output section can be switched between a close position to serve to guide a sheet to the first sheet output section, and an open position not to guide the sheet to the first sheet output section but to stack the sheet. The method inputs a type of sheet, acquires information indicating whether the second sheet output section is in an open or closed state, and transmits image information to the image forming apparatus. When the sheet type recommends the sheet be output to the second sheet output section and the second sheet output section is in the closed state, a message is output to prompt to switch the second sheet output section into the open position before the image information is transmitted.

27 Claims, 84 Drawing Sheets

(56) References Cited

FOREIGN PATENT DOCUMENTS

| | | | |
|---|---|---|---|
| JP | 2006168887 | A | 6/2006 |
| JP | 2010042611 | A | 2/2010 |
| JP | 2010149443 | A | 7/2010 |
| JP | 2015110455 | A | 6/2015 |

* cited by examiner

FIG. 5A

| SELECT PAPER TYPE | |
|---|---|
| 1 | PLAIN PAPER (OTHER THAN FU OUTPUT RECOMMENDED PAPER) |
| 2 | THICK PAPER, ENVELOPE, LABEL PAPER... (FU OUTPUT RECOMMENDED PAPER) |

FIG. 5B

| PRINTING OPERATION (DOUBLE-SIDED PRINTING/SINGLE-SIDED PRINTING) | |
|---|---|
| 1 | SINGLE-SIDED PRINTING |
| 2 | DOUBLE-SIDED PRINTING |

FIG. 5C

| SHEET OUTPUT SECTION (FD OUTPUT/FU OUTPUT) | |
|---|---|
| 1 | FD OUTPUT (OUTPUT TO FD TRAY 115) |
| 2 | FU OUTPUT (OUTPUT TO FU TRAY 116) |

FIG. 6A

| MESSAGE CONTENT | DESIGNATE PAPER TYPE | | | |
|---|---|---|---|---|
| | 2: FU OUTPUT RECOMMENDED PAPER | | 1: OTHER THAN FU OUTPUT RECOMMENDED PAPER | |
| 2: DOUBLE-SIDED PRINTING | open | close | open | close |
| | (1) | (2) | (3) | – |
| 1: SINGLE-SIDED PRINTING | open | close | open | close |
| | – | (4) | – | – |

FIG. 6B

| MESSAGE CONTENT | |
|---|---|
| (1) | "THIS PAPER TYPE IS NOT RECOMMENDED FOR DOUBLE-SIDED PRINTING. SINGLE-SIDED PRINTING IS SET." |
| (2) | "THIS PAPER TYPE IS NOT RECOMMENDED FOR DOUBLE-SIDED PRINTING. SINGLE-SIDED PRINTING IS SET." "OPEN FU TRAY 116" |
| (3) | "CLOSE FU TRAY 116" |
| (4) | "OPEN FU TRAY 116" |

FIG. 13A

| MESSAGE CONTENT | DESIGNATE PAPER TYPE | |
|---|---|---|
| | 2: FU OUTPUT RECOMMENDED PAPER | 1: OTHER THAN FU OUTPUT RECOMMENDED PAPER |
| 2: DOUBLE-SIDED PRINTING | [1] | [4] |
| 1: SINGLE-SIDED PRINTING | 1: FD OUTPUT [4] | |
| | 2: FU OUTPUT [3] | |
| WHEN DOUBLE-SIDED PRINTING IS SWITCHED TO SINGLE-SIDED PRINTING | 1: FD OUTPUT [6] | |
| | 2: FU OUTPUT [5] | |

FIG. 13B

| | MESSAGE CONTENT |
|---|---|
| [1] | "THIS PAPER TYPE IS NOT RECOMMENDED FOR DOUBLE-SIDED PRINTING. SINGLE-SIDED PRINTING IS SET." |
| [2] | "THIS PAPER TYPE IS FU OUTPUT RECOMMENDED PAPER. SELECT SHEET OUTPUT DESTINATION." |
| [3] | "OPEN FU TRAY 116." |
| [4] | "CLOSE FU TRAY 116." |
| [5] | "THIS PAPER TYPE IS NOT RECOMMENDED FOR DOUBLE-SIDED PRINTING. SINGLE-SIDED PRINTING IS SET." "OPEN FU TRAY 116." |
| [6] | "THIS PAPER TYPE IS NOT RECOMMENDED FOR DOUBLE-SIDED PRINTING. SINGLE-SIDED PRINTING IS SET." "CLOSE FU TRAY 116." |

FIG. 14E

THIS PAYER TYPE IS NOT RECOMMENDED FOR DOUBLE-SIDED PRINTING.
OPEN FU TRAY 116 ×

NOTE: THIS PAPER TYPE IS NOT RECOMMENDED FOR DOUBLE-SIDED PRINTING.
WHEN PRINTING, SINGLE-SIDED PRINTING IS USED.

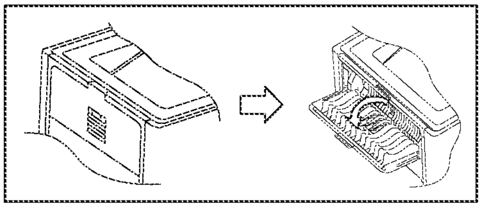

FOLLOW INSTRUCTIONS BELOW TO PRINT ON SELECTED PAPER.
· OPEN FU TRAY 116 OF MAIN BODY.

☐ HIDE THIS MESSAGE NEXT TIME

THIS PAYER TYPE IS NOT RECOMMENDED FOR DOUBLE-SIDED PRINTING.
CLOSE FU TRAY 116 ×

NOTE: THIS PAPER TYPE IS NOT RECOMMENDED FOR DOUBLE-SIDED PRINTING.
WHEN PRINTING, SINGLE-SIDED PRINTING IS USED.

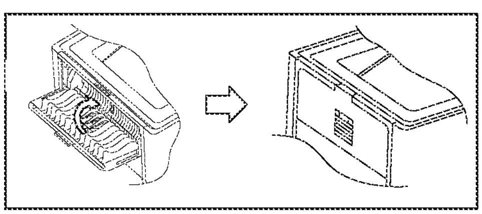

FOLLOW INSTRUCTIONS BELOW TO PRINT ON SELECTED PAPER.
· CLOSE FU TRAY 116 OF MAIN BODY.

☐ HIDE THIS MESSAGE NEXT TIME

FOLLOW INSTRUCTIONS BELOW. ×

TURN UPSIDE DOWN SHEETS OUTPUT TO FU TRAY 116 SUCH THAT SURFACE HAVING IMAGE FACES DOWNWARD.
STACK SHEETS ONTO MP TRAY 140 SUCH THAT LEADING EDGES OF SHEETS OUTPUT TO FU TRAY 116 ARE INSERTED TO MP TRAY 140 IN STATE WHERE SURFACE HAVING NO IMAGE FACES UPWARD.

☐ HIDE THIS MESSAGE NEXT TIME

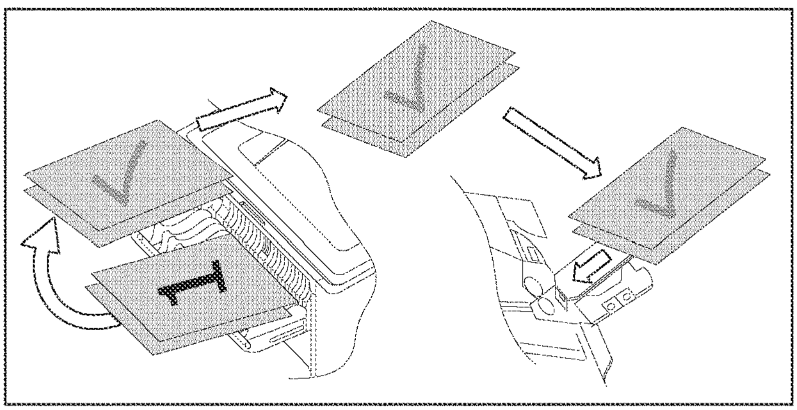

FIG. 30F

CLOSE FU TRAY 116 ×

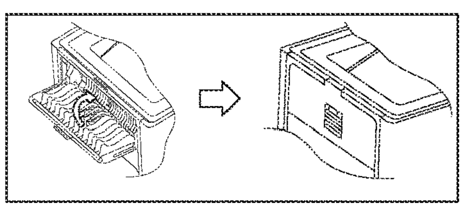

FOLLOW INSTRUCTIONS BELOW.
· CLOSE FU TRAY 116 OF MAIN BODY.

☐ HIDE THIS MESSAGE NEXT TIME

OK

FOLLOW INSTRUCTIONS BELOW. ×

STACK SHEET ONTO MP TRAY 140.

☐ HIDE THIS MESSAGE NEXT TIME

OK

FOLLOW INSTRUCTIONS BELOW. ×

STACK SHEET ONTO MP TRAY 140.

☐ HIDE THIS MESSAGE NEXT TIME

OK

FOLLOW INSTRUCTIONS BELOW. ×

SWITCH FU TRAY 116 INTO OPEN STATE, AND SWITCH SHEET FEEDING UNIT FROM SHEET FEEDING CASSETTE 100 TO MP TRAY 140.

☐ HIDE THIS MESSAGE NEXT TIME

OK

INFORMATION PROCESSING METHOD, INFORMATION PROCESSING PROGRAM, INFORMATION PROCESSING APPARATUS, AND IMAGE FORMING APPARATUS

BACKGROUND

Field

The present disclosure relates to an information processing method for an information processing apparatus capable of communicating with an image forming apparatus, an information processing program, an information processing apparatus, and an image forming apparatus.

Description of the Related Art

Japanese Patent Laid-Open No. 2015-110455 describes a configuration including a plurality of sheet output trays in an image forming apparatus, such as a laser beam printer, that forms an image.

For example, in the case where an image is formed on the upper surface of a sheet, there is a sheet output tray that is a sheet output section to which, when a sheet on which an image has been formed moves along a conveying path, the sheet turned upside down is output such that the surface having the image faces downward. Where the surface having an image is referred to as face, the sheet output tray is referred to as face-down (hereinafter, also referred to as FD) tray because a sheet is output so as to face downward. On the other hand, for example, in the case where an image is formed on the upper surface of a sheet, there is a sheet output tray that is a sheet output section to which, when a sheet on which the image has been formed moves along a conveying path, the sheet not turned upside down is output such that the surface having the image faces upward. The sheet output tray is referred to as face-up (hereinafter, also referred to as FU) tray because a sheet is output so as to face upward.

The FU tray can be arranged to be openable. In this configuration, when the FU tray is closed, the FU tray serves as a guiding portion of the conveying path to the FD tray; whereas, when the FU tray is open, the FU tray serves as not a guiding portion of the conveying path to the FD tray but a sheet output tray capable of carrying sheets.

A user is able to select one of the sheet output sections according to usage. When the sheet output section selected by the user does not accord with an open/closed state of the FU tray, the open/closed state of the FU tray is informed to the user.

However, an image forming apparatus does not necessarily allow designation of a sheet output section. When a sheet output section is not allowed to be designated, providing information as described in Japanese Patent Laid-Open No. 2015-110455 cannot be performed. In such a situation, it is desired to inform a message to prompt to switch the open/closed state of the FU tray.

SUMMARY

According to an aspect of the present disclosure, an information processing method for an information processing apparatus, wherein the information processing apparatus is to communicate with an image forming apparatus having an image forming unit arranged to form an image on a sheet, and having first and second sheet output sections, each configured to receive output of the sheet having the image formed on the sheet, wherein, when conveyed along a first sheet output conveying path, the sheet is output to the first sheet output section so that the image faces downward and, when conveyed along a second sheet output conveying path, the sheet is output to the second sheet output section so that the image faces upward, and wherein the second sheet output section is capable of being switched between a close position to serve as a guiding portion arranged to guide the sheet to the first sheet output section, and an open position to serve as a sheet output section arranged not to guide the sheet to the first sheet output section but to be capable of stacking the sheet, includes inputting a type of sheet, acquiring information indicating whether the second sheet output section is in an open state or in a closed state, transmitting image information to the image forming apparatus, and outputting a message, wherein, when the input type of sheet is a sheet recommended to be output to the second sheet output section and the acquired information indicates that the second sheet output section is in the closed state, outputting includes outputting a message to prompt to switch the second sheet output section into the open position before the image information is transmitted to the image forming apparatus.

Further features of the present disclosure will become apparent from the following description of exemplary embodiments with reference to the attached drawings.

BRIEF DESCRIPTION OF THE DRAWINGS

FIG. 5A is a table for paper type selection in the first embodiment.

FIG. 5B is a table for printing operation (double-sided printing or single-sided printing) in the first embodiment.

FIG. 5C is a table for a sheet output section (FD output or FU output) in the first embodiment.

FIG. 6A to FIG. 6F are views illustrating messages in the first embodiment.

FIG. 13A and FIG. 13B are views illustrating messages in fifth and sixth embodiments.

FIG. 14A to FIG. 14F are views illustrating messages in the fifth and sixth embodiments.

FIG. 30A, and FIG. 30D to FIG. 30F, are views illustrating messages in the thirteenth embodiment.

DESCRIPTION OF THE EMBODIMENTS

First Embodiment

Hereinafter, an embodiment of the present disclosure will be described with reference to the attached drawings. The following embodiment does not limit the disclosures described in the appended claims, and not all the combinations of characteristics described in the embodiment are indispensable for the solution of the present disclosure.

Image Forming Process

Figure 1:
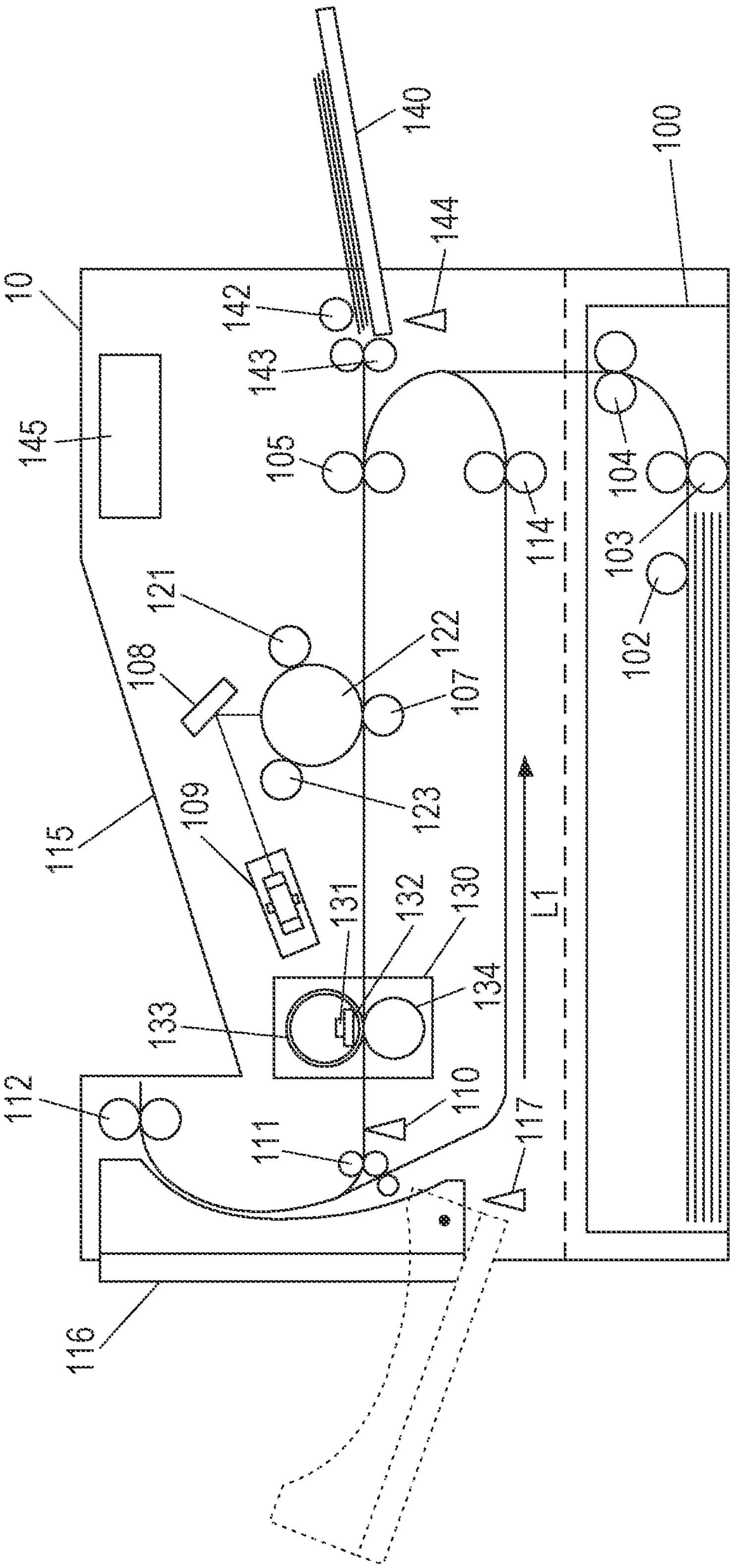
FIG. 1 is a schematic cross-sectional view of an image forming apparatus in a first embodiment.

FIG. 1 is a schematic configuration diagram of an image forming apparatus 10 of the present embodiment.

Initially, an image forming unit that performs an image forming process will be described. In FIG. 1, a photosensitive drum 122 is made up of an organic photoreceptor or an amorphous silicon photoreceptor and is driven to rotate at a predetermined circumferential velocity (process speed) in a clockwise direction. The peripheral surface of the photosensitive drum 122 is electrically charged uniformly with a predetermined polarity and potential by a charging roller 123. When a laser beam output from an optical device 109 is reflected by a laser reflecting mirror 108 and irradiated to the peripheral surface of the electrically charged photosensitive drum 122, exposure is performed. An electrostatic latent image is formed through the exposure.

The outline of image processing for forming an electrostatic latent image will be described with reference to FIG. 3A and FIG. 3B. Initially, a printer controller 213 modulates (on/off conversion) image information input from a host computer 200 to an image signal. The printer controller 213 transmits the image signal to an engine controller 301. The optical device 109 emits a laser beam in accordance with the image signal. The image information here is referred to as first image information hereinafter, and the image signal is referred to as second image information. The first image information and the second image information have been described as different ones; however, the first image information and the second image information may be the same.

An electrostatic latent image formed on the photosensitive drum 122 in correspondence with an intended image in this way is developed by a developing machine 121 as a toner image when toner electrically charged with the same polarity as the electric charge generated by the charging roller 123 adheres to the electrostatic latent image. Forming an electrostatic latent image is started when the leading edge of a sheet is detected by a registration sensor 106.

As described above, components concerned with a series of image forming process of forming an image on a sheet are referred to as image forming unit. Components concerned with feeding of a sheet to the image forming unit are referred to as sheet feeding unit. Next, the sheet feeding unit will be described. One of sheets stacked in a sheet feeding cassette 100 is picked up by a sheet feeding roller 102 and fed to a pair of conveying rollers 104 one by one by a pair of separation rollers 103. At this time, the presence or absence of sheets in the sheet feeding cassette 100 is detected by a sheet detecting sensor 101. The sheet fed to the pair of conveying rollers 104 is conveyed to a pair of conveying rollers 105. At this time, one of sheets stacked in the sheet feeding cassette 100 is fed through a sheet feed conveying path along which a sheet is conveyed to the pair of conveying rollers 105 such that an upper surface in a stacked state faces downward. The sheet feed conveying path at this time is also referred to as first sheet feed conveying path. The sheet feeding cassette 100 is also referred to as first sheet feeding section.

A toner image developed on the photosensitive drum 122 is transferred to the sheet. At this time, a transfer roller 107 supplies electric charge with reverse polarity to toner from the rear surface of the sheet to transfer the toner image from the photosensitive drum 122 to the sheet. The sheet to which the toner image is transferred in this way is separated from the photosensitive drum 122 and conveyed to a fixing device 130. The fixing device 130 is made up of a heater 132, a thermistor 131 that detects the temperature of the heater 132, a fixing roller 133, and a pressure roller 134. The fixing device 130 fixes the toner image on the sheet by means of heat generated by the heater 132 and pressure applied by a fixing nip made up of the fixing roller 133 and the pressure roller 134.

Subsequently, the case where a sheet is fed from a multi-purpose tray (MP tray) 140 for feeding a sheet manually as another sheet feeding section will be described. The MP tray 140 is an opening/closing member capable of being switched between an open position and a close position. When the MP tray 140 is in the close position, the MP tray 140 serves as a sheet feeding port for feeding a sheet. When the MP tray 140 is in the close position, the MP tray 140 does not serve as a sheet feeding port for feeding a sheet. When sheets are fed from the MP tray 140, the MP tray 140 is switched into the open position, and sheets are stacked. The MP tray 140 is also referred to as second sheet feeding section. When sheets are fed from the MP tray 140, the MP tray 140 is brought into the open state, and sheets are stacked. An MP sheet feeding roller 142 conveys sheets stacked on the MP tray 140 to a pair of MP separation rollers 143. The pair of MP separation rollers 143 separates one of the conveyed sheets and conveys the separated sheet to the pair of conveying rollers 105. The sheet fed to the pair of conveying rollers 105 is conveyed to the photosensitive drum 122. After the sheet is conveyed to the photosensitive drum 122, a toner image is formed and fixed onto the sheet as in the case of a sheet fed from the sheet feeding cassette 100 and is then output to an FU tray 116 or an FD tray 115. At this time, a sheet stacked on the MP tray 140 is fed along a sheet feed conveying path along which the sheet is conveyed to the pair of conveying rollers 105 such that the upper surface of the sheet in a stacked state faces upward. The sheet feed conveying path at this time is also referred to as second sheet feed conveying path. The MP tray 140 at this time is also referred to as second sheet feeding section.

In the present embodiment, the case where the MP tray 140 is manually opened or closed is described. Alternatively, the MP tray 140 may be automatically opened or closed. In this case, the MP tray 140 is automatically opened or closed by a driving source like an MP tray open/close motor 331 and an MP tray open/close motor input circuit 319 shown in FIG. 3B.

Figure 2A:
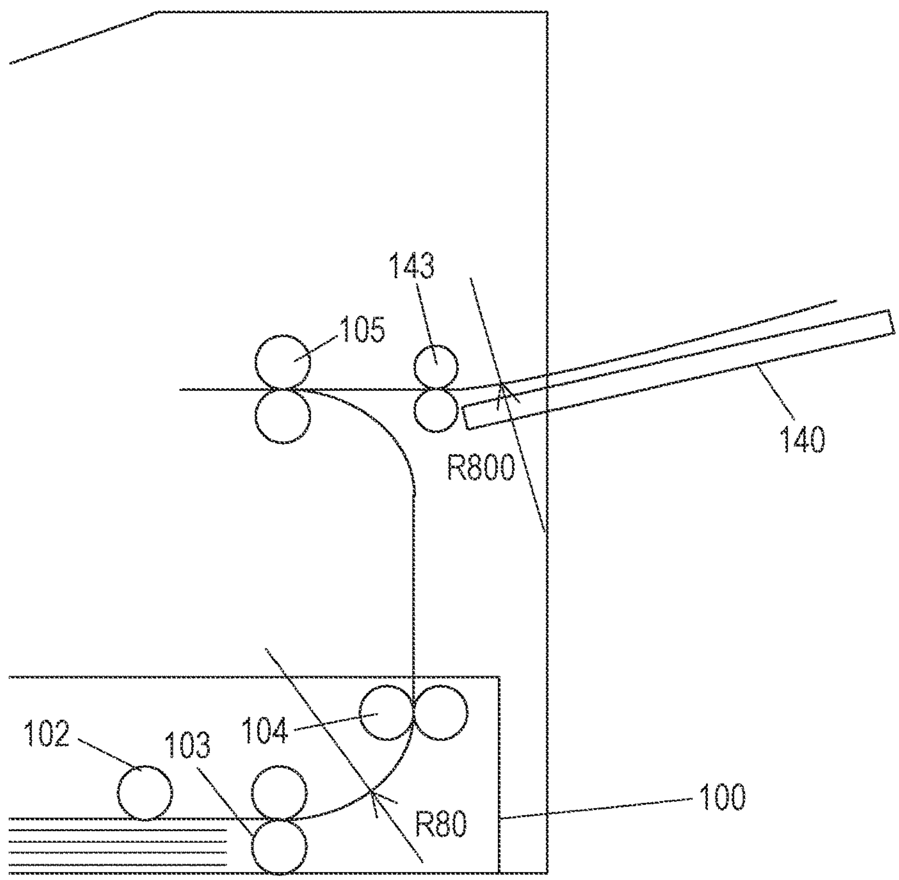
FIG. 2A is a diagram showing an example of a radius of curvature of a conveying path from a sheet feeding cassette and an example of a radius of curvature of a conveying path from an MP tray.

The first sheet feed conveying path and the second sheet feed conveying path have different radii of curvature. The radius of curvature of each of the sheet feed conveying paths will be described by using the schematic cross-sectional view of the image forming apparatus of FIG. 2A and examples of specific numeric values. FIG. 2A shows that the MP tray 140 is in the open state. When a sheet is fed from the sheet feeding cassette 100, a sheet is conveyed along a conveying path that passes through the pair of separation rollers 103 and then passes through the pair of conveying rollers 104. The radius of curvature of the conveying path is, for example, R80 (80 mm). On the other hand, when a sheet is fed from the MP tray 140, a sheet is conveyed along a conveying path that passes through the pair of MP separation rollers 143 and then passes through the pair of conveying rollers 105. The radius of curvature of the conveying path is, for example, R800 (800 mm). Here, the conveying path from the sheet feeding cassette 100 and the conveying path from the MP tray 140 are compared with each other by using examples of numeric values of the radii of curvature. It is assumed that a minimum value of the radius of curvature of the conveying path in the case where a sheet is fed from the sheet feeding cassette 100 is less than a minimum value of the radius of curvature of the conveying path in the case where a sheet is fed from the MP tray 140.

For this reason, when, for example, a sheet of stiff paper, such as thick paper and envelope, is fed from the sheet feeding cassette 100, a sheet passes along the conveying path with a small radius of curvature, so the conveyance resistance is large and, as a result, a conveyance malfunction or a paper jam may occur. Accordingly, when such a sheet is fed from the MP tray 140, the sheet is not conveyed along the conveying path with a small radius of curvature, so a conveyance malfunction or a paper jam is reduced.

Subsequently, sheet output sections will be described. The image forming apparatus 10 includes the FD tray 115 to which a sheet is output face down (hereinafter, also referred to as FD output) and the FU tray 116 to which a sheet is output face up (hereinafter, also referred to as FU output). The sheet output conveying paths to the respective sheet output trays are different.

The sheet output conveying path to the FD tray 115 is a conveying path along which a sheet is conveyed from a set of FU rollers 111, passes through a pair of FD rollers 112 and is then stacked on the FD tray 115. The sheet output conveying path to the FD tray 115 is also referred to as first sheet output conveying path. When a sheet having an image on its upper surface is conveyed along the first sheet output conveying path, the sheet is FD output to the FD tray 115 such that the image surface faces downward (face down) (FD).

The FU tray 116 is an opening/closing member capable of being switched between an open position and a close position. When the FU tray 116 is in the close position, the FU tray 116 serves as a guiding portion that guides a sheet to the FD tray 115. When the FU tray 116 is in the open position, the FU tray 116 serves as not a guiding portion that guides a sheet to the FD tray 115 but a sheet output tray capable of carrying sheets.

The sheet output conveying path to the FU tray 116 is a conveying path along which a sheet is conveyed from the set of FU rollers 111 and is stacked on the FU tray 116. The sheet output conveying path to the FU tray 116 is also referred to as second sheet output conveying path. When a sheet having an image on its upper surface is conveyed along the second sheet output conveying path, the sheet is FU output to the FU tray 116 such that the image surface faces upward (face up) (FU).

An FU tray open/close sensor 117 is an open/close signal output unit that outputs a first signal in the closed state of the FU tray 116 and that outputs a second signal in the open state. A CPU 302 detects the open/closed state in accordance with the first signal or second signal output from the FU tray open/close sensor 117. In other words, the FU tray open/close sensor 117 functions as a detection unit that detects whether the FU tray 116 is in the open state or in the closed state. The detailed function will be described later.

In the present embodiment, the FU tray 116 is not necessarily an opening/closing member capable of being switched between the open position and the close position. For example, a member, such as a flapper, may be used to control whether to FD output a sheet to the FD tray 115 or FU output a sheet to the FU tray 116.

Figure 2B:
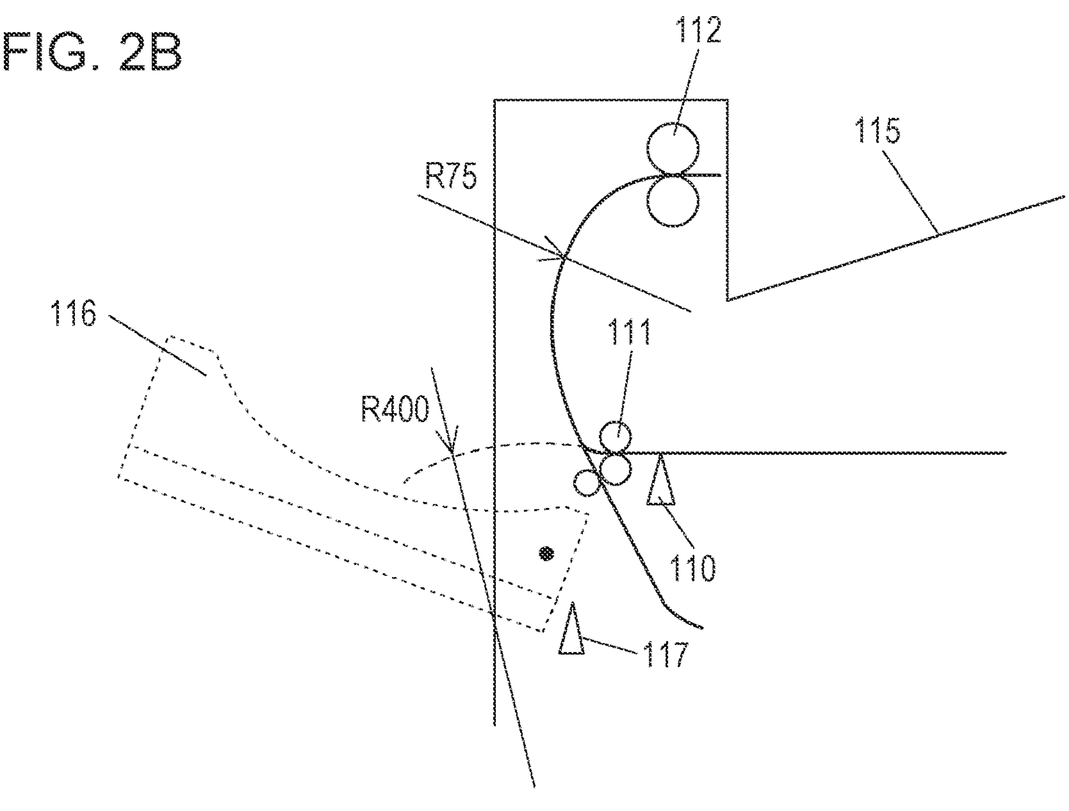
FIG. 2B is a diagram showing an example of a radius of curvature of a conveying path to an FU tray and an example of a radius of curvature of a conveying path to an FD tray.

The first sheet output conveying path and the second sheet output conveying path have different radii of curvature. The radius of curvature of each of the sheet output conveying paths will be described by using the schematic cross-sectional view of the image forming apparatus of FIG. 2B and examples of specific numeric values. In FIG. 2B, the open state of the FU tray 116 is represented by the dashed line. When the FU tray 116 is in the closed state, a sheet is conveyed along a conveying path along which, as represented by the continuous line in FIG. 2B, the sheet passes through the set of FU rollers 111 and then passes through the pair of FD rollers 112, and is then output to the FD tray 115. The radius of curvature of the conveying path is, for example, R75 (75 mm). On the other hand, when the FU tray 116 is in the open state, a sheet passes through the set of FU rollers 111, then conveyed along a conveying path represented by the dashed line in FIG. 2B, and output to the FU tray 116. The radius of curvature of the conveying path is, for example, R400 (400 mm). Here, the conveying path to the FD tray 115 and the conveying path to the FU tray 116 are compared with each other by using examples of numeric values of the radii of curvature. It is assumed that a minimum value of the radius of curvature of the sheet conveying path formed in the case where the FU tray 116 is in the closed state is less than a minimum value of the radius of curvature of the sheet conveying path formed in the case where the FU tray 116 is in the open state.

For this reason, when, for example, a sheet of stiff paper, such as thick paper and envelope, is FD output, a sheet passes along the conveying path with a small radius of curvature in a state where heat received from the heater 132 remains in the sheet, so the sheet may be curled. In addition, when the radius of curvature of a conveying path is small, the conveyance resistance is large and, as a result, a conveyance malfunction or a paper jam may occur. Accordingly, when the FU tray 116 is in the open state, a sheet is not conveyed along the conveying path with a small radius of curvature, so the curling of a sheet is reduced.

Referring back to FIG. 1, an after-fixing paper presence sensor 110 is provided before the set of FU rollers 111. When double-sided printing is performed, after a lapse of a predetermined time from when the trailing edge of a fixed sheet passes through the after-fixing paper presence sensor 110, the rotational direction of the pair of FD rollers 112 is reversed, and the sheet is conveyed to a double-sided printing conveying path L1 by the pair of FD rollers 112. The sheet conveyed to the double-sided printing conveying path L1 is fed again by a pair of double-sided printing conveying rollers 114 and conveyed to the pair of conveying rollers 105 again. A toner image is transferred to the back surface of the sheet conveyed again to the pair of conveying rollers 105 and fixed, and then the sheet is output to the FD tray 115.

In this way, when double-sided printing is performed, a sheet passes along the conveying path with a small radius of curvature in a state where heat received from the heater 132 remains in the sheet as in the case of FD output. For this reason, when, for example, a sheet of stiff paper, such as thick paper and envelope, is used for double-sided printing, a sheet may be curled. Therefore, for example, a sheet of stiff paper, such as thick paper and envelope, is not recommended for double-sided printing. If the FU tray 116 is in the open state in the case of double-sided printing, the conveying path from the set of FU rollers 111 to the pair of FD rollers 112 disappears, with the result that double-sided printing cannot be performed.

In the present embodiment, the case where the FU tray 116 is manually opened or closed is described. Alternatively, the FU tray 116 may be automatically opened or closed. In this case, the FU tray 116 is automatically opened or closed by a driving source like an FU tray open/close motor 330 and an FU tray open/close motor input circuit 320 shown in FIG. 3B. Automatic open/close will be described later.

Configuration of Printer Control System

Figure 3A:
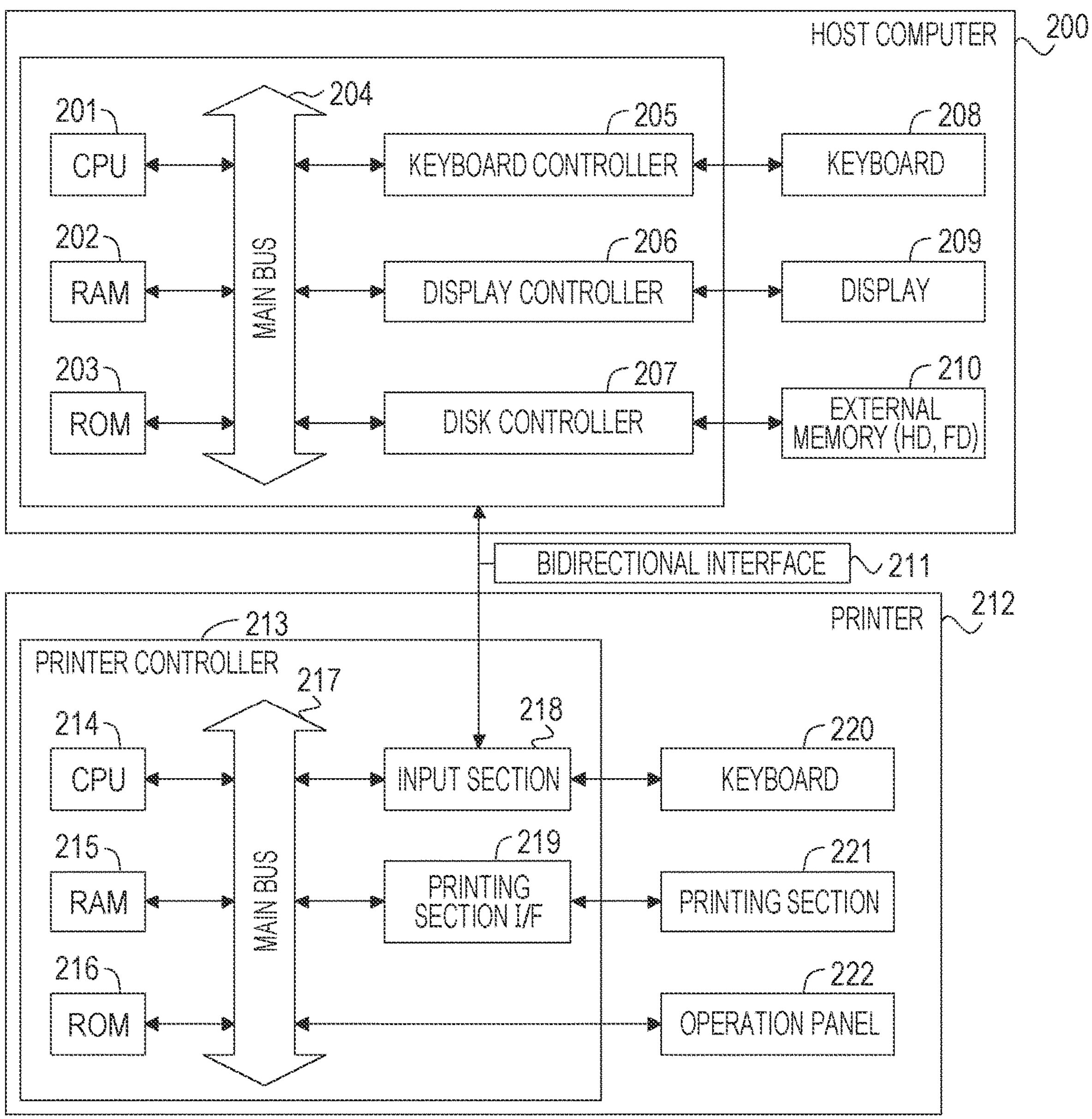
FIG. 3A is a control block diagram of a whole printer control system in the first embodiment.

FIG. 3A is a block diagram that illustrates the configuration of a whole printer control system of the present embodiment. As long as the functions of the present embodiment are implemented, the present embodiment is applicable to a stand-alone device or a system made up of a plurality of devices or a system connected via a network, such as a LAN and a WAN, to execute processes.

In FIG. 3A, the host computer 200 includes a CPU 201. The CPU 201 processes documents mixedly containing graphics, images, characters, tables (including spreadsheets or the like), and the like in accordance with a document processing program or the like stored in a program ROM of a ROM 203 or an external memory 210. In the present embodiment, the CPU 201 processes image information by using an application 401, a graphics engine 402, and a printer driver 403 as shown in, for example, FIG. 4A. The detailed process will be described later.

The CPU 201 generally controls devices connected to a main bus 204. The program ROM of the ROM 203 or the external memory 210 stores an operating system program (hereinafter, OS) or the like that is a control program for the CPU 201. A font ROM of the ROM 203 or the external memory 210 stores font data or the like to be used in the document processing. A data ROM of the ROM 203 or the external memory 210 stores various data to be used in the document processing. A RAM 202 functions as a main memory, a work area, and the like for the CPU 201.

A key controller 205 controls key input from a keyboard 208 or a pointing device (not shown). A display controller 206 controls display on a display 209. A user performs an operation, such as selecting a printing operation, with the keyboard 208 or the pointing device (not shown) as an input unit. Thus, the user inputs a desired printing operation to the host computer 200.

A disk controller 207 controls access to the external memory 210. The external memory 210 is a hard disk drive (HD), a flexible disk (FD), or the like. The external memory 210 stores a boot program, various applications, font data, user files, edit files, a printer control command generation program (hereinafter, printer driver), and the like.

The CPU 201, for example, executes a process of rasterizing an outline font onto a display information RAM set on the RAM 202. The rasterizing process enables WYSIWYG (What You See Is What You Get) on the display 209. WYSIWYG is such that the CPU 201 displays a final finished image on the display 209 to allow a user to edit the final finished image while checking the final finished image. The CPU 201 also executes various data processing by opening various windows registered in accordance with commands issued from a user with a mouse cursor or the like (not shown) on the display 209. When a user performs printing, the user opens a window for print settings and sets a print processing method for the printer driver, including a setup of a printer and selecting a print mode. Image information generated through such a process is output from the host computer 200 to a printer 212.

The printer 212 is the image forming apparatus 10 shown in FIG. 1. The printer 212 forms an image on a sheet by using the image information input from the host computer 200 in accordance with the above-described electrophotographic process. The printer controller 213 is controlled by the CPU 214. The CPU 214 outputs an image signal that is second image information to a printing section (printer engine) 221, connected to the main bus 204, in accordance with a control program or the like stored in a program ROM of a ROM 216. The program ROM of the ROM 216 stores the control program or the like for the CPU 214. A font ROM of the ROM 216 stores font data or the like to be used in generating the output information. A data ROM of the ROM 216 stores information or the like to be used on the host computer 200.

The CPU 214 is capable of communicating information with the host computer 200 by using a bidirectional interface (interface) 211 via an input section 218 and provides information or the like in the printer 212 to the host computer 200. At this time, the input section 218 functions as a reception unit that receives information including, for example, first image information or the like from the host computer 200.

A RAM 215 functions as a main memory, a work area, and the like for the CPU 214 and is configured such that a memory capacity can be increased by using an optional RAM (not shown) connected to an expansion port (not shown). The RAM 215 is used as an output information expansion area, an environmental data storage area, an NVRAM, or the like. Switches, LED indicators, and the like for operation are arranged on an operation panel 222.

An external memory (not shown) may be connected to the printer 212 in the present embodiment as an option. The external memory (not shown) stores font data, an emulation program, form data, and the like. In addition to internal fonts, an optional card or a plurality of external memories (not shown) storing a program that interprets printer control languages of different language systems may be connected to the printer 212 in the present embodiment.

Figure 3B:
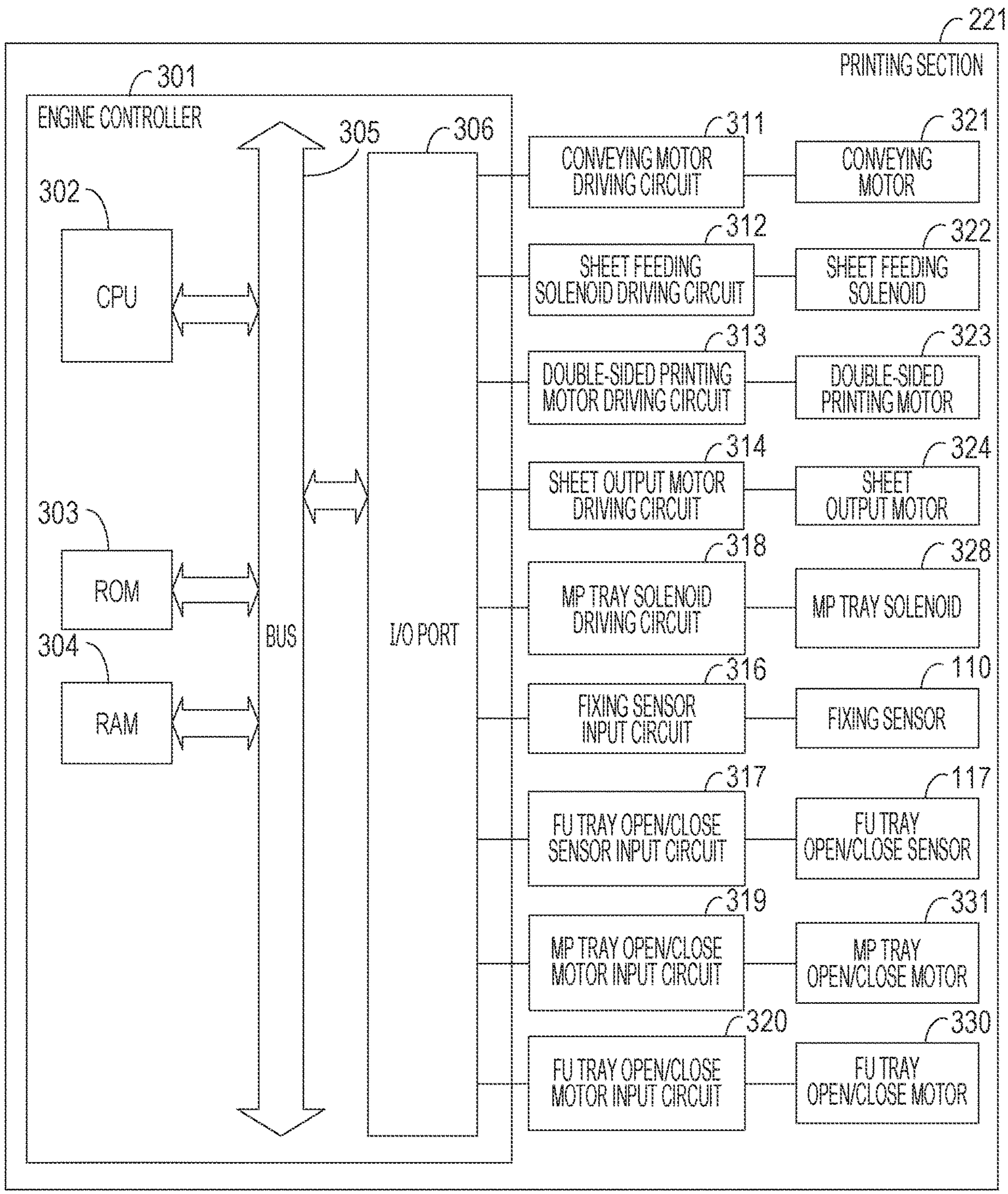
FIG. 3B is a control block diagram of hardware concerned with sheet conveyance control in the first embodiment.

FIG. 3B is a block diagram showing the configuration of hardware concerned with sheet conveyance control as a software function implemented by the printing section 221 of the present embodiment. The printing section 221 is controlled by the CPU 302. The CPU 302 controls the printing section 221 in accordance with a computer program stored in a ROM 303 and a RAM 304 that function as a storage section. Alternatively, the CPU 302 and an MPU (not shown) may include a plurality of processors, such as multi-cores, and may control the printing section 221 with the plurality of processors.

A storage section in the engine controller 301 is made up of one or more memories such as the ROM 303 and the RAM 304 and stores various pieces of information including a computer program for performing various operations (described later), communication parameters for wireless communication, and the like. The storage section in the present embodiment may be a memory, such as the ROM 303 and the RAM 304. The storage section in the present embodiment may be, for example, a storage medium, such as a flexible disk, a hard disk drive, an optical disk, a magneto-optical disk, a CD-ROM, a CD-R, a magnetic tape, a nonvolatile memory card, and a DVD.

The CPU 302 communicates with the ROM 303, the RAM 304, and an I/O port 306 via a communication bus 305. The CPU 302 executes a program stored in the ROM 303, acquires a calculated result during execution, and saves the calculated result in the RAM 304. The CPU 302 also controls the printing section 221 in accordance with a program stored in the ROM 303.

The drive of a conveying motor 321 is controlled via a conveying motor driving circuit 311 and the I/O port 306. The conveying motor 321 drives the photosensitive drum 122, the pair of conveying rollers 105, and the pair of double-sided printing conveying rollers 114 for rotation. The conveying motor 321 is also a driving source for the sheet feeding roller 102 and the pair of separation rollers 103. The conveying motor 321 drives the sheet feeding roller 102 and the pair of separation rollers 103 when a sheet feeding solenoid 322 turns on. The conveying motor 321 is also a driving source for the MP sheet feeding roller 142 and the pair of MP separation rollers 143. The conveying motor 321 drives the MP sheet feeding roller 142 and the pair of MP separation rollers 143 when an MP tray solenoid 328 turns on. The sheet feeding solenoid 322 is switched between an on state and an off state via a sheet feeding solenoid driving circuit 312 and the I/O port 306.

A double-sided printing motor 323 is driven via a double-sided printing motor driving circuit 313 and the I/O port 306 and drives the pair of FD rollers 112 for rotation. The drive of a sheet output motor 324 is controlled via a sheet output motor driving circuit 314 and the I/O port 306. The sheet output motor 324 drives the fixing roller 133 and pressure roller 134 of the fixing device 130 and the set of FU rollers 111 for rotation. The MP tray solenoid 328 is switched between an on state and an off state via an MP tray solenoid driving circuit 318 and the I/O port 306.

A paper presence detection result detected by the after-fixing paper presence sensor 110 is transmitted to the CPU 302 via a fixing sensor input circuit 316 and the I/O port 306. The open/closed state of the FU tray 116, detected by the FU tray open/close sensor 117, is transmitted to the CPU 302 via an FU tray open/close sensor input circuit 317 and the I/O port 306.

The drive of an FU tray open/close motor 330 is controlled via an FU tray open/close motor input circuit 320 and the I/O port 306. The FU tray open/close motor 330 drives the FU tray 116 for opening or closing. Similarly, the drive of an MP tray open/close motor 331 is controlled via an MP tray open/close motor input circuit 319 and the I/O port 306. The MP tray open/close motor 331 drives the MP tray 140 for opening or closing.

With the components described with reference to FIG. 3A and FIG. 3B, the host computer 200 transmits information on image formation to the printer 212 in accordance with an instruction from the CPU 201. Information on image formation, transmitted from the host computer 200 to the printer 212, includes a type of sheet on which an image is formed (hereinafter, referred to as paper type) and a selected status of double-sided printing or single-sided printing. The printer 212 performs an image forming process in accordance with the information on image formation, received from the host computer 200. The printer 212 that performs such an image forming process and the host computer 200 may be collectively referred to as image forming system.

At this time, the host computer 200 is, for example, an information processing apparatus, such as a PC and a smartphone, and is capable of communicating with the printer 212.

Block Chart Showing Printing Process

Figure 4A:
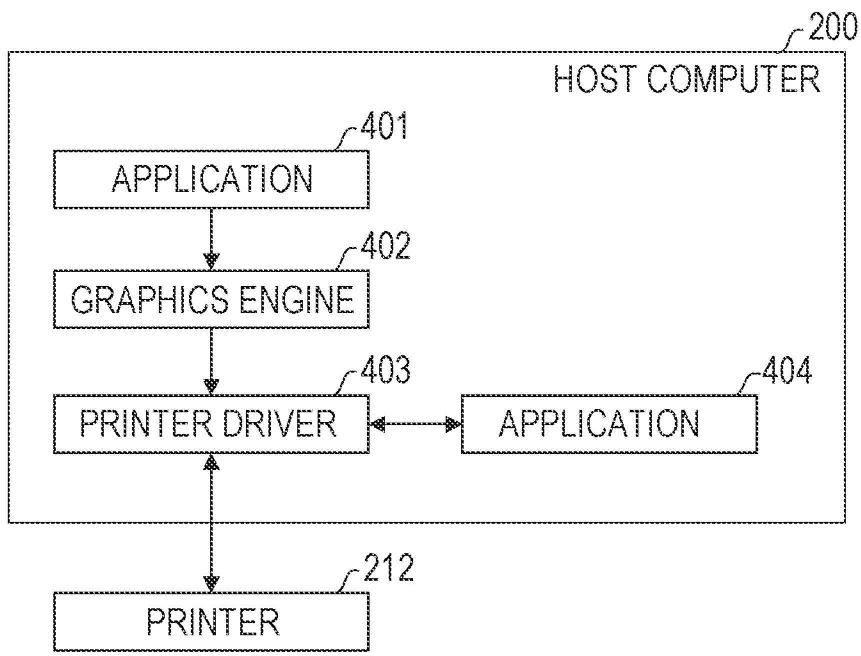
FIG. 4A is a configuration diagram of a printing process.

FIG. 4A is a block chart showing a printing process in the host computer 200 to which a printing apparatus, such as a printer, is directly connected or connected via a network. The printing process that is executed by the CPU 201 on the host computer 200 to which the printer 212 of the present embodiment is connected will be described with reference to FIG. 4A.

The application 401, the graphics engine 402, the printer driver 403, and the application 404 are present as files saved in the external memory 210. These files are program modules that are loaded onto the RAM 202 by the OS or a module that uses those modules and executed by the CPU 201. The application 401 and the printer driver 403 can be added to an FD or a CD-ROM (not shown) that is the external memory 210 or an HD that is an external memory (not shown) of the printer 212 via a network (not shown).

For example, the application 401 saved in the external memory 210 is loaded onto the RAM 202 by the OS and is executed by the CPU 201. When the CPU 201 performs a printing process by using the application 401, the CPU 201 executes the graphics engine 402, which is executable when loaded onto the RAM 202 by the OS, to output (draw) the above-described first image information. When the CPU 201 outputs (draws) the first image information by using the graphics engine 402, the OS loads the printer driver 403 prepared for each printer from the external memory 210 onto the RAM 202 and makes the printer driver 403 executable.

Subsequently, the case where the CPU 201 sets the output of the application 401 to the printer driver 403 will be described. The CPU 201 outputs a graphic device interface (GDI) function output from the application 401 to the graphics engine 402. The CPU 201 converts the GDI function to a device driver interface (DDI) function by using the graphics engine 402 and then outputs the DDI function to the printer driver 403. The CPU 201 converts the DDI function output from the graphics engine 402 to, for example, a page description language (PDL) by using the printer driver 403. A PDL is a control command that can be recognized by the printer controller 213 of the printer 212.

The CPU 201 executes the application 404 loaded onto the RAM 202 by the OS to output a printer control command converted by the printer driver 403 to the input section 218 of the printer controller 213 as first image information. At this time, the first image information is converted to, for example, an image signal or the like before being output from the printer controller 213 to the printing section 221. The image signal is second image information used to draw an electrostatic latent image by turning on or off laser.

Figure 4B:
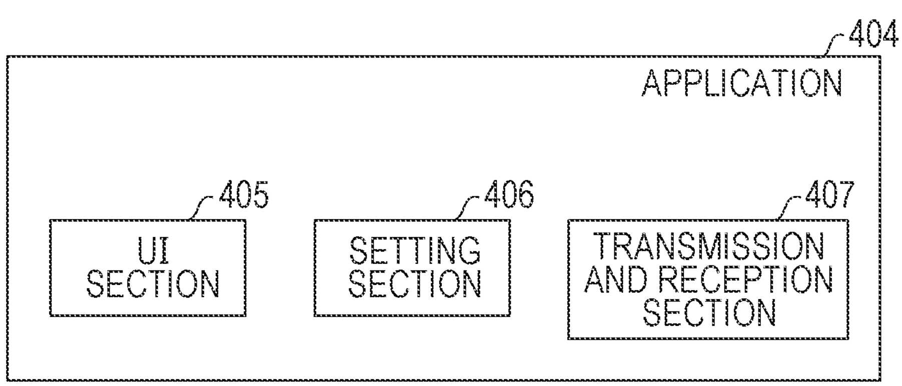
FIG. 4B is a block diagram showing the functions of an application in the first embodiment.

FIG. 4B is a block diagram showing functions in the case where a program of the application 404 is loaded onto the RAM 202 by the OS and is executed by the CPU 201. The application 404 mainly functions as a UI section 405, a setting section 406, and a transmission and reception section 407.

When the application 404 functions as the UI section 405, the UI section 405 functions as an output unit. When the UI section 405 functions as the output unit, the UI section 405 displays on the display 209 information used for a user to complete input of information on image formation. At this time, when, for example, a user inputs information on image formation by a combination (described later), the UI section 405 displays an alarm (hereinafter, also referred to as message) set by the setting section 406 on the display 209. The message displayed at this time may be, for example, any one of the message contents shown in FIG. 6B, displayed on the display 209 as shown in FIG. 6C to FIG. 6F. These messages are not necessarily displayed on the display 209. Alternatively, the message contents shown in FIG. 6B may be informed to a user by voice by means of, for example, a reading function. Alternatively, for example, the message contents shown in FIG. 6B may be informed to a user by light emitting patterns of an LED lamp.

When the application 404 functions as the setting section 406, the application 404 sets a flag when, for example, a user inputs information on image formation by a combination (described later). The UI section 405 displays a message on the display 209 in accordance with the flag. The combination is specifically a combination of information about a paper type input by a user, a selected status of double-sided printing or single-sided printing, and a selected status of sheet output section.

When the application 404 functions as the transmission and reception section 407, the application 404 communicates information between the host computer 200 and the printer controller 213. The transmission and reception section 407 functions as a transmission unit in this communication and transmits information on image formation (also referred to as print job) to the printer controller 213. A transmission step of a print job is executed, for example, after a user completes advanced settings for printing operation and closes the advanced settings screen for printing operation. A print job is transmitted from the host computer 200 to the printer controller 213 in a second transmission step, and the input section 218 that is a reception unit receives the print job.

Sheet of Stiff Paper, Such as Thick Paper and Envelope, and FD Output/FU Output and Double-Sided Printing In the image forming apparatus 10 in the present embodiment, the radius of curvature of the conveying path from the set of FU rollers 111, located just downstream of the fixing device 130, to the FD tray 115 is small. For this reason, when, for example, a sheet of stiff paper, such as thick paper and envelope, is output from the FD tray 115 or subjected to double-sided printing, the sheet passes along the conveying path with a small radius of curvature before heat remaining in the sheet cools down, so the sheet tends to be curled. For the above reason, for example, a sheet of stiff paper, such as thick paper and envelope, is desirably FU output to the FU tray 116 along the conveying path with a large radius of curvature rather than being FD output to the FD tray 115 along the conveying path with a small radius of curvature. For example, a sheet of stiff paper, such as thick paper and envelope, is desirably not conveyed along the conveying path with a small radius of curvature for double-sided printing.

Accordingly, in the present embodiment, the curling of a sheet as described above is reduced. For this purpose, the UI section 405 informs a message to a user according to paper type information included in information on image formation, input by the user, and a selected status of double-sided printing or single-sided printing.

In the present embodiment, paper having a basis weight of greater than or equal to 200 g/$m^2$ is described as thick paper. If thick paper is subjected to double-sided printing or output to the FD tray 115 along the conveying path with a small radius of curvature, a sheet may be highly likely to be curled for the above-described reason. On the other hand, when paper having a basis weight of less than 200 g/$m^2$ (hereinafter, referred to as plain paper), even when a sheet is subjected to double-sided printing or output to the FD tray 115 along the conveying path with a small radius of curvature, the sheet is less likely to be curled.

For the above reason, in the present embodiment, for example, a sheet of stiff paper, such as thick paper and envelope, is defined as FU output recommended paper recommended to be output to the FU tray 116. At the time of selecting a paper type as shown in FIG. 5A, FU output recommended paper is defined as a paper type of 2, and plain paper that may be output to not only the FU tray 116 but also the FD tray 115 (other than FU output recommended paper) is defined as a paper type of 1. Examples of the FU output recommended paper include thick paper, envelope, label paper, glossy paper, and gloss paper. In the present embodiment, as shown in FIG. 5B, for selecting double-sided printing or single-sided printing in a print job, single-sided printing is defined as a printing operation of 1, and double-sided printing is defined as a printing operation of 2. Furthermore, in the present embodiment, as shown in FIG. 5C, for selecting the sheet output section in a print job, FD output (a sheet is output to the FD tray 115) is defined as a sheet output section of 1, and FU output (a sheet is output to the FU tray 116) is defined as a sheet output section of 2.

Combination of Print Job and Open/Closed State of FU Tray 116, and Message Content Displayed Hereinafter, paper type information, a selected status of double-sided printing or single-sided printing, and an open/closed state of the FU tray 116, acquired by the transmission and reception section 407, and a message content displayed on the display 209 of the host computer 200 will be described with reference to FIG. 6A to FIG. 6F. Detailed processes at the time when the setting section 406 actually selects and sets a message will be described later.

When a user designates FU output recommended paper, double-sided printing is not performed because of the above-described reason, so, even when the user designates double-sided printing, single-sided printing is automatically set. In the case of this designated combination, the UI section 405 displays, for example, the message "THIS PAPER TYPE IS NOT RECOMMENDED FOR DOUBLE-SIDED PRINTING. WHEN PRINTING, SINGLE-SIDED PRINTING IS USED." as shown in (1) of FIG. 6B and FIG. 6C on the display 209. At this time, a content to be displayed as a message is not limited thereto. For example, the message "SINGLE-SIDED PRINTING IS SET." or the like may be displayed. A message displayed at this time is displayed when the setting section 406 sets 1 for a double-sided printing prohibition flag. For this reason, hereinafter, this message is referred to as double-sided printing prohibition message.

Figure 6C:
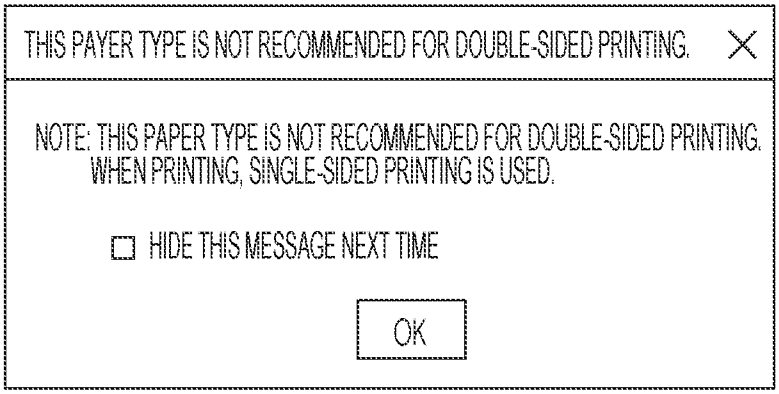
Figure 6D:
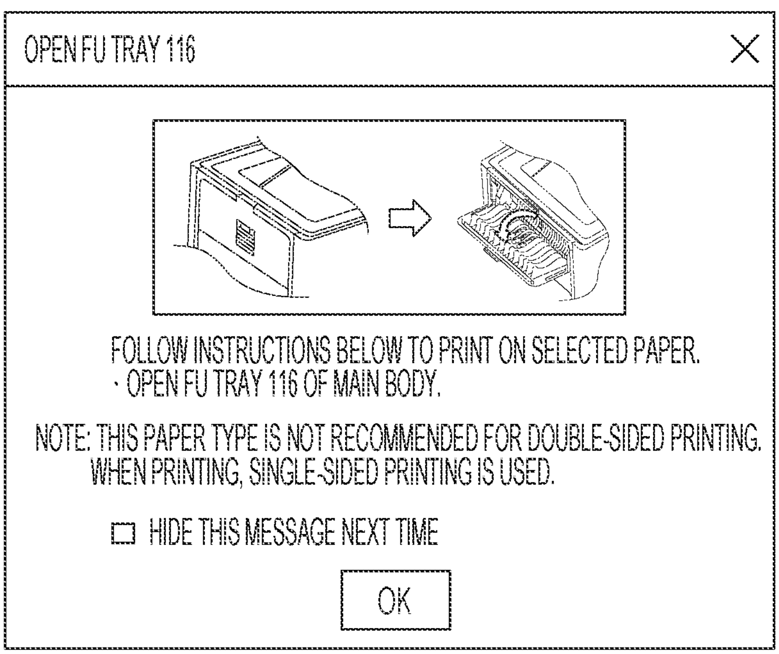

When the FU tray 116 is closed with the same designated combination, the message "OPEN FU TRAY 116." is displayed on the display 209 in addition to the double-sided printing prohibition message, as shown in (2) of FIG. 6B and FIG. 6D. At this time, a content to be displayed as a message is not limited thereto. Depending on a user, it is conceivable that the user does not know that, for example, a paper type, such as thick paper and envelope, is FU output recommended paper or the user does not know that the FU tray 116 is an opening/closing member. Accordingly, for example, the message "THIS PAPER TYPE IS FU OUTPUT RECOMMENDED PAPER. OPEN FU TRAY." may be displayed or a picture illustrating "OPEN FU TRAY 116" may be shown. The message "FU TRAY 116 IS CLOSED." informing a user of the open/closed state of the FU tray 116 itself may be displayed. A message displayed at this time is displayed when the setting section 406 sets 1 for an FU tray 116 open flag. For this reason, hereinafter, this message is referred to as FU tray 116 open message.

Figure 6E:
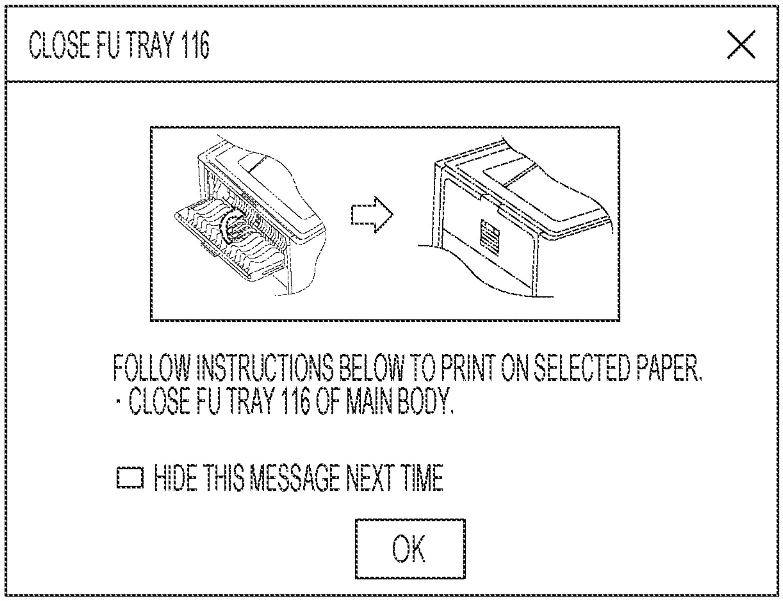
Figure 6F:
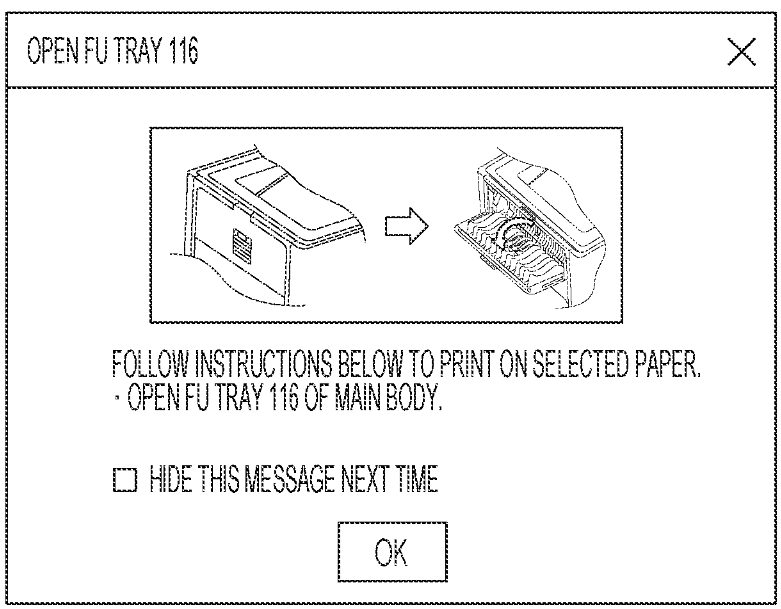

When a user designates FU output recommended paper and single-sided printing, a sheet is desirably output to the FU tray 116 along the conveying path with a large radius of curvature rather than being output to the FD tray 115 along the conveying path with a small radius of curvature for the above-described reason. At this time, when the FU tray 116 is open, no messages is displayed. On the other hand, when the FU tray 116 is closed, the message "OPEN FU TRAY 116." as shown in (4) of FIG. 6B and FIG. 6F is displayed on the display 209. This message is similar to the content of the above-described FU tray 116 open message, so the description is omitted.

Subsequently, the case where a user designates a paper type other than FU output recommended paper and double-sided printing will be described. At this time, when the FU tray 116 is open, the double-sided printing conveying path disappears, so double-sided printing cannot be performed. Accordingly, when the FU tray 116 is open, the message "CLOSE FU TRAY 116." as shown in (3) of FIG. 6B and FIG. 6E is displayed on the display 209. At this time, a content to be displayed as a message is not limited thereto. For example, the message "FU TRAY 116 IS OPEN." or the like may be displayed. A message displayed at this time is displayed when the setting section 406 sets 1 for an FU tray 116 close flag. For this reason, hereinafter, this message is referred to as FU tray 116 close message.

As described above, the setting section 406 selects and sets a message according to a combination of paper type information, a selected status of double-sided printing or single-sided printing, and an open/closed state of the FU tray 116, acquired by the transmission and reception section 407. When the UI section 405 displays a set message on the display 209, an operation performed by the printer 212 to perform a printing operation desired by a user can be informed to the user.

Figure 7A:
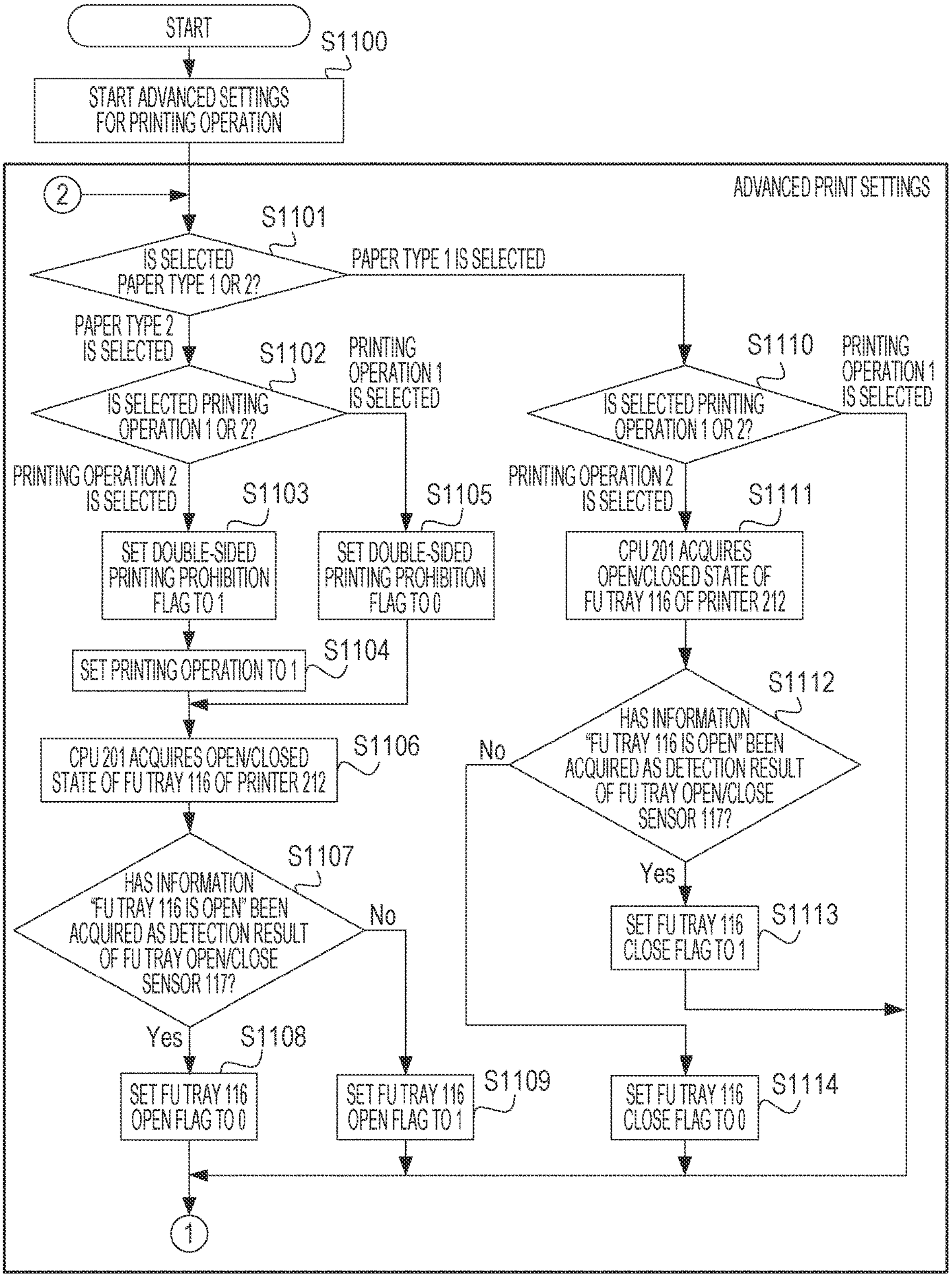
FIG. 7A and FIG. 7B are flowcharts of a process in the first embodiment.
Figure 7B:
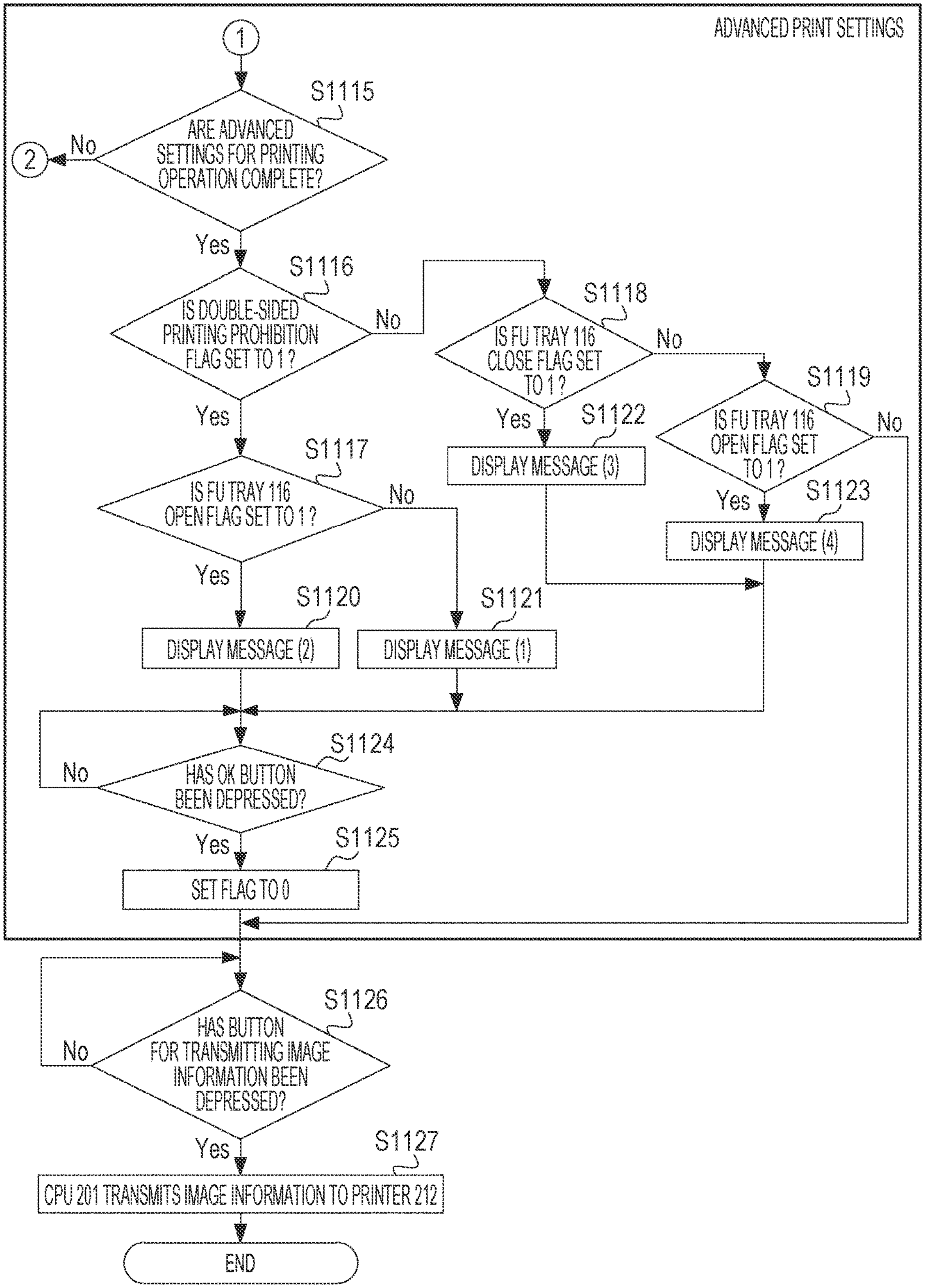

Informing Message according to Combination of Information on Image Formation, Designated by User Hereinafter, a process that the CPU 201 informs a message to a user according to a combination of information on image formation, designated by the user, by using the application 404 will be described with reference to the flowcharts shown in FIG. 7A and FIG. 7B.

Initially, when the host computer 200 receives a command to start advanced settings for printing operation from a user, the process proceeds to S1100. In S1100, when the UI section 405 causes the display 209 to display the advanced settings screen for printing operation, the advanced settings for printing operation start, and the process proceeds to S1101. The advanced settings screen for printing operation is, for example, the screen shown in FIG. 9A and contains tabs for basic settings, extended settings, automatic settings, and the like. When the basic settings tab is selected, settings including, for example, paper size, print orientation, the number of copies, paper type, resolution, double-sided printing or booklet printing or single-sided printing, paper source, and the like are available. On this advanced settings screen for printing operation, when a user completes advanced settings for printing operation and depresses OK button, the advanced settings screen for printing operation closes. In the present embodiment, a combination of a setting of paper type and a setting of double-sided printing or single-sided printing in the basic settings tab is used. When a user does not select double-sided printing or single-sided printing, a printing operation of 1 (single-sided printing) is selected as a default setting.

In S1101, when the UI section 405 has acquired information that a paper type of 1 (paper type other than FU output recommended paper) is selected by the user in selecting a paper type on the advanced settings screen for printing operation, the process proceeds to S1110. In S1110, when the UI section 405 has acquired information that a printing operation of 1 (single-sided printing) is selected in selecting double-sided printing or single-sided printing on the advanced settings screen for printing operation, the process proceeds to S1115. In S1115, the next step depends on whether the UI section 405 has acquired information resulting from the fact that the user has completed the input of printing operation on the advanced settings screen for printing operation and depressed OK button.

In S1110, when the UI section 405 has acquired information that a printing operation of 2 (double-sided printing) is selected by the user in selecting double-sided printing or single-sided printing on the advanced settings screen for printing operation, the process proceeds to S1111. In S1111, the transmission and reception section 407 acquires the open/closed state of the FU tray 116 of the printer 212. In S1112, when the transmission and reception section 407 has not acquired a detection result that "the FU tray 116 is open" as a detection result of the FU tray open/close sensor 117 of the printer 212 (when the FU tray 116 is closed) (No), the process proceeds to S1114. In S1114, the setting section 406 sets 0 for the FU tray 116 close flag for displaying the message prompting to close the FU tray 116 for double-sided printing, and the process proceeds to S1115. In S1115, the UI section 405 waits until the UI section 405 receives information resulting from the fact that the user has completed advanced settings for printing operation on the advanced settings screen for printing operation and depressed OK button. In S1112, when the transmission and reception section 407 has acquired a detection result that "the FU tray 116 is open" as a detection result of the FU tray open/close sensor 117 of the printer 212 (Yes), the process proceeds to S1113. In S1113, the setting section 406 sets 1 for the FU tray 116 close flag for displaying the message prompting to close the FU tray 116 for double-sided printing, and the process proceeds to S1115.

In S1101, when the UI section 405 has acquired information that a paper type of 2 (FU output recommended paper) is selected by the user in selecting a paper type on the advanced settings screen for printing operation, the process proceeds to S1102. In S1102, when the UI section 405 has acquired information that a printing operation of 1 (single-sided printing) is selected by the user in selecting double-sided printing or single-sided printing on the advanced settings screen for printing operation, the process proceeds to S1105. In S1105, the setting section 406 sets 0 for the double-sided printing prohibition flag for displaying that double-sided printing is prohibited, and the process proceeds to S1106.

In S1106, the transmission and reception section 407 acquires the open/closed state of the FU tray 116 of the printer 212. In S1107, when the transmission and reception section 407 has acquired a detection result that "the FU tray 116 is open" as a detection result of the FU tray open/close sensor 117 of the printer 212 (Yes), the process proceeds to S1108. In S1108, the setting section 406 sets 0 for the FU tray 116 open flag for displaying the message prompting to open the FU tray 116, and the process proceeds to S1115. In S1107, when the transmission and reception section 407 has not acquired a detection result that "the FU tray 116 is open" as a detection result of the FU tray open/close sensor 117 of the printer 212 (when the FU tray 116 is closed) (No), the process proceeds to S1109. In S1109, the setting section 406 sets 1 for the FU tray 116 open flag for displaying the message prompting to open the FU tray 116, and the process proceeds to S1115.

In S1102, when the UI section 405 has acquired information that a printing operation of 2 (double-sided printing) is selected by the user in selecting double-sided printing or single-sided printing on the advanced settings screen for printing operation, the process proceeds to S1103. In S1103, the setting section 406 sets 1 for the double-sided printing prohibition flag for displaying that double-sided printing is prohibited, and the process proceeds to S1104. In S1104, the setting section 406 changes the printing operation to a printing operation of 1 (single-sided printing), and the process proceeds to S1106. S1106 to S1115 have been described above, so the description is omitted.

In S1115, the next step depends on whether the UI section 405 has acquired information resulting from the fact that the user has completed the input of printing operation on the advanced settings screen for printing operation and depressed OK button. When the UI section 405 has not acquired information that the user has completed the input of printing operation and depressed OK button (No), the advanced settings screen for printing operation remains displayed, and the steps of S1101 to S1114 are repeated. Thus, the user is able to continue advanced settings for printing operation.

When the UI section 405 has acquired information that the user has completed the input of printing operation and depressed OK button (Yes), the process proceeds to the next step. In the next step, a process according to whether various flags are set by the setting section 406 on the advanced settings screen for printing operation is performed through S1116 to S1119.

When the setting section 406 sets 1 for the double-sided printing prohibition flag (S1116) and sets 1 for the FU tray 116 open flag (S1117) on the advanced settings screen for printing operation, the UI section 405 displays the message (2) in S1120. The message (2) is, for example, the message shown in (2) of FIG. 6B or in FIG. 6D and shows the contents of two messages, that is, the above-described double-sided printing prohibition message and the FU tray 116 open message.

When the setting section 406 sets 1 for the double-sided printing prohibition flag (S1116) and does not set 1 for the FU tray 116 open flag (S1117) on the advanced settings screen for printing operation, the UI section 405 displays the message (1) in S1121. The message (1) is, for example, the message shown in (1) of FIG. 6B or in FIG. 6C and shows the content of the above-described double-sided printing prohibition message.

When the setting section 406 does not set 1 for the double-sided printing prohibition flag (S1116) and sets 1 for the FU tray 116 close flag (S1118) on the advanced settings screen for printing operation, the UI section 405 displays the message (3) in S1122. The message (3) is, for example, the message shown in (3) of FIG. 6B or in FIG. 6E and shows the content of the above-described FU tray 116 close message.

When the setting section 406 does not set 1 for the double-sided printing prohibition flag (S1116) or set 1 for the FU tray 116 close flag (S1118), and sets 1 for the FU tray 116 open flag (S1119) on the advanced settings screen for printing operation, the UI section 405 displays the message (4) in S1123. The message (4) is, for example, the message shown in (4) of FIG. 6B or in FIG. 6F.

Figure 9A:
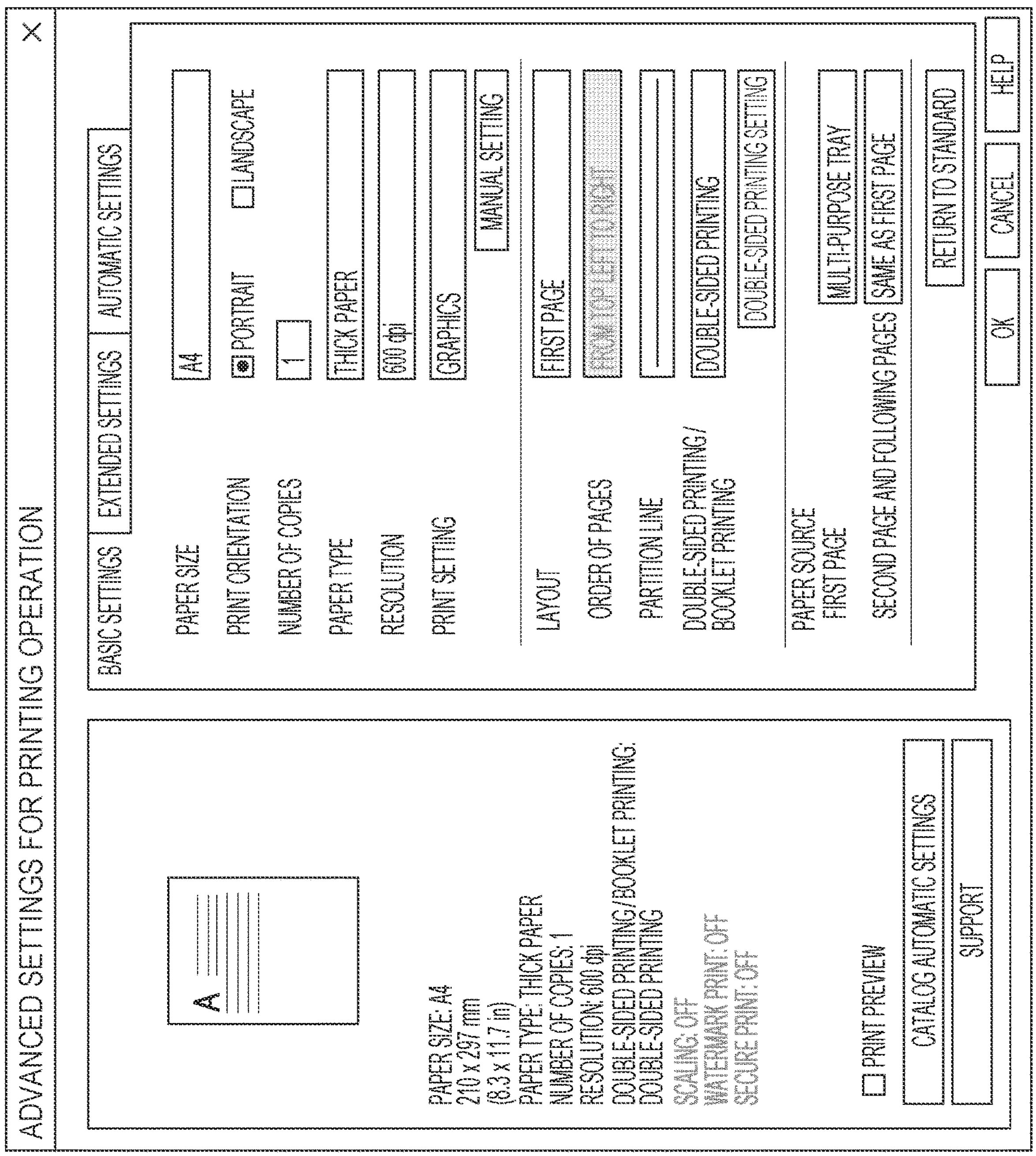
FIG. 9A is an advanced settings screen for printing operation.

In S1120 to S1123, the UI section 405 displays any one of the above-described various messages on the display 209 such that, for example, the advanced settings screen for printing operation, shown in FIG. 9A, is partially covered. Various messages displayed at this time each contain OK button as shown in, for example, FIG. 6C to FIG. 6F.

In S1124, the UI section 405 continues displaying any one of the various messages on the display 209 until the UI section 405 acquires information that OK button has been depressed by the user. In S1124, when the UI section 405 has acquired information that OK button has been depressed by the user (Yes), the setting section 406 sets 0 for the flag in S1125. The setting section 406 may set 0 for the flag not only when the UI section 405 has acquired information that OK button has been depressed by the user but also when a certain period of time has elapsed from when any one of the various messages is displayed. When the setting section 406 sets 0 for the flag, the UI section 405 clears the any one of the various messages, displayed on the display 209. At this time, the UI section 405 clears the any one of the various messages and, at the same time, clears, for example, the advanced settings screen for printing operation, shown in FIG. 9A, and the process proceeds to S1126.

When the setting section 406 does not set 1 for the double-sided printing prohibition flag (S1116), does not set 1 for the FU tray 116 close flag (S1118), and does not set 1 for the FU tray 116 open flag (S1119) on the advanced settings screen for printing operation, the process proceeds to S1126. At this time, the UI section 405 does not show any message on the display 209.

In S1126, the next step depends on whether the UI section 405 has acquired information that a button to be depressed to perform printing has been depressed by the user. The process does not proceed to the next step until the UI section 405 acquires information that the button to be depressed to perform printing has been depressed by the user. When the UI section 405 has acquired information that the button to be depressed to perform printing has been depressed by the user (Yes), the process proceeds to S1127. In S1127, the transmission and reception section 407 transmits image information to the printer controller 213. For various messages from S1120 to S1123, the UI section 405 displays any one of the various message on the display 209 before the transmission and reception section 407 transmits first image information to the printer controller 213.

In the present embodiment, it is assumed that, according to messages displayed by the UI section 405 in S1120 to S1123, the user goes to the printer 212 and performs operation in accordance with instructions of the messages. When, for example, the UI section 405 displays the FU tray 116 open message in S1123, it is assumed that the user manually opens the FU tray 116. In the present embodiment, when a user executes a printing operation for a specified print job, operation needed is informed to the user. Therefore, even when the user does not manually open the FU tray 116, but when the UI section 405 acquires in S1124 information that OK button has been depressed by the user, the process proceeds to the next step, and finally a printing operation can be executed. In this way, in the present embodiment, whether the FU tray 116 is opened or closed depends on user convenience.

Here, a possible situation in the case where, although the FU tray 116 open message is displayed in S1123, the user does not bring the FU tray 116 into the open state and depresses OK button will be described.

Depending on a user, even when, for example, FU output recommended paper is designated by the user, the curling of a sheet resulting from double-sided printing or outputting a sheet to the FD tray 115 may be allowed. When a user installs the image forming apparatus 10 such that the side at which the FU tray 116 is disposed is close to a wall, the user is difficult to open or close the FU tray 116. In this case, rather than the user puts the hand into the clearance between the image forming apparatus 10 and the wall to open the FU tray 116, the curling of a sheet may be allowed. In this case, even when the UI section 405 displays the FU tray 116 open message, a user may depress OK button without any operation on the printer 212. In this case, since the FU tray 116 is left closed, space saving is achieved.

In the present embodiment, after the UI section 405 has acquired information resulting from the fact that the user has completed the input of printing operation on the advanced settings screen for printing operation and depressed OK button, any one of various messages is displayed. However, such a process that S1115 is placed between S1126 and S1125 and the process returns to S1100 when S1124 is negative is applicable. With this process, each time a user changes settings of printing operation on the advanced settings screen for printing operation, the setting section 406 is able to set an applicable message, and the UI section 405 is able to display the message on the display 209.

In the present embodiment, when the UI section 405 acquires information resulting from the fact that a user has made input for printing operation on the advanced settings screen for printing operation, the CPU 201 acquires the open/closed state of the FU tray 116. Alternatively, such a process that S1115 is placed between S1100 and S1101 and the process returns to S1100 when S1115 is negative and the process returns to S1100 when S1124 is negative is applicable. With this process, the UI section 405 acquires information resulting from the fact that a user has completed input for printing operation and depressed OK button on the advanced settings screen for printing operation, and then the CPU 201 acquires the open/closed state or the FU tray 116. After the CPU 201 acquires the open/closed state of the FU tray 116, the setting section 406 is able to set an applicable message, and the UI section 405 is able to display the message on the display 209.

Figure 9B:
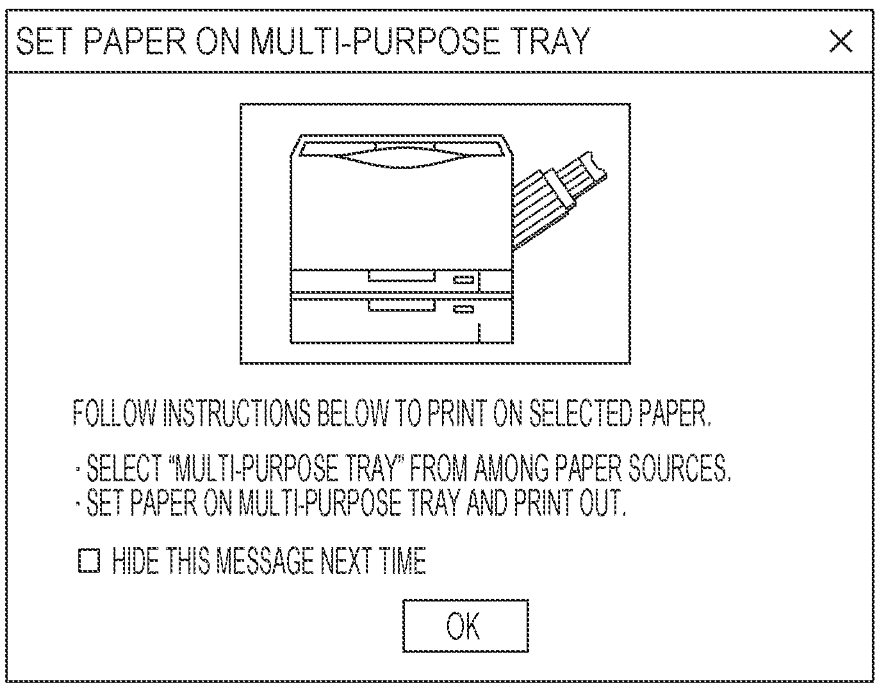
FIG. 9B is a message window that appears when FU output recommended paper is selected.

When the UI section 405 has acquired information that a paper type of 2 is selected by a user in selecting a paper type on the advanced settings screen for printing operation in the present embodiment, the UI section 405 displays, for example, the message shown in FIG. 9B on the display 209. The UI section 405, for example, changes the paper source to the MP tray 140 and displays a message prompting to manually feed a sheet. When the UI section 405 acquires information that OK button contained in the message has been depressed by a user, the UI section 405 clears the message. When the message is cleared, the user is able to continue advanced settings for printing operation, including, for example, double-sided printing or single-sided printing and the like.

Summary of First Embodiment

As described above, in the present embodiment, the UI section 405 displays a message on the display 209 according to a combination of paper type information, a selected status of double-sided printing or single-sided printing, and an open/closed state of the FU tray 116, acquired by the transmission and reception section 407. Thus, a message is provided only when user's operation is needed according to the open/closed state of the FU tray 116, so usability improves. A user performs necessary operation to the printer 212 according to a combination of a print job, so it is possible to reduce the curling of FU output recommended paper or an inability to perform double-sided printing.

Second Embodiment

In the first embodiment, whether a user opens or closes the FU tray 116 in accordance with a message displayed by the UI section 405 depends on user convenience. In addition, the case where the process proceeds to the next step when a user depresses OK button in a message has been described. In the present embodiment, the case where the process does not proceed to the next step until the CPU 201 detects the open/close operation of the FU tray 116 according to a message displayed by the UI section 405 will be described. Thus, it is possible to reduce the curling of FU output recommended paper or an inability to perform double-sided printing.

Figure 8A:
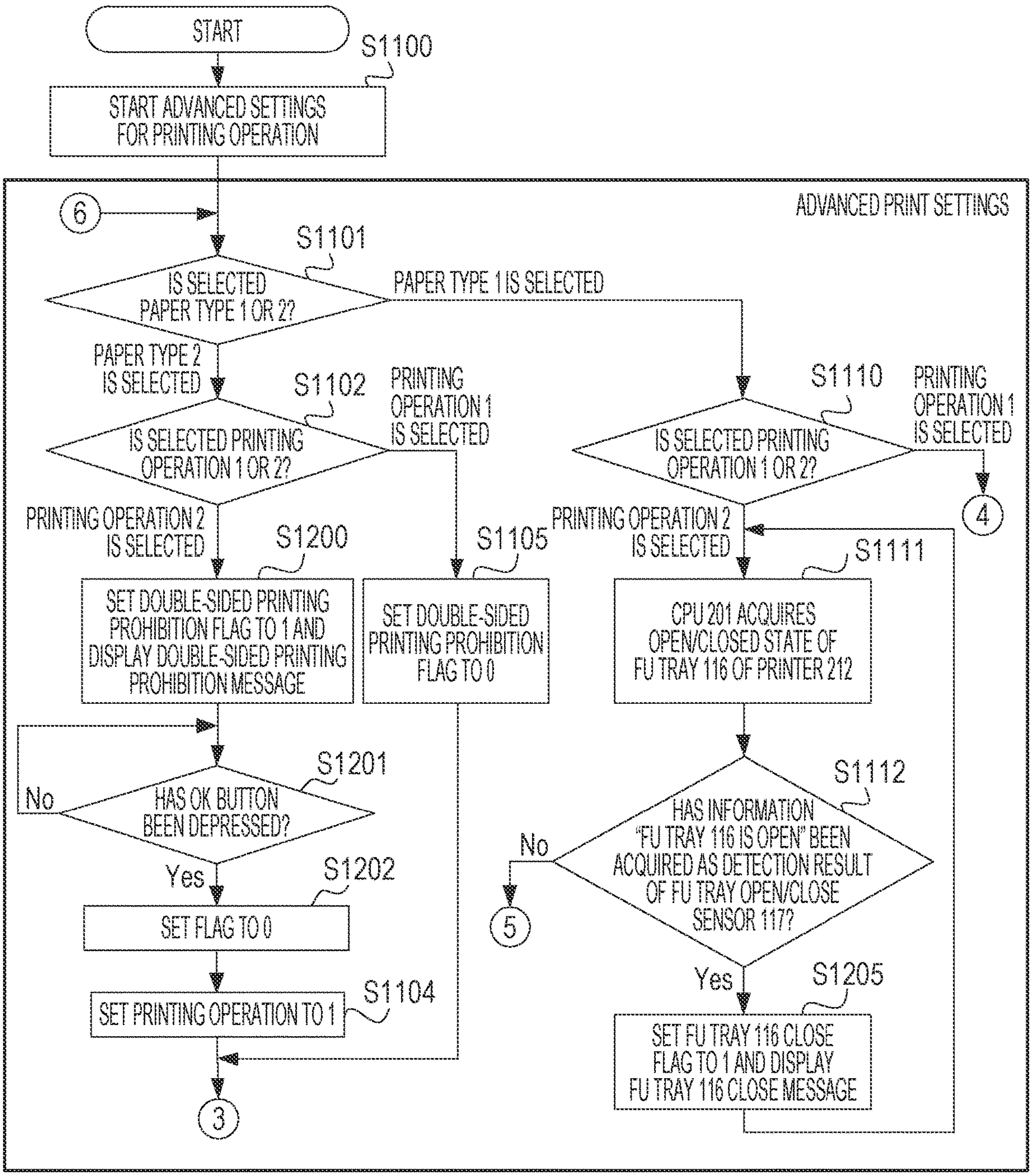
FIG. 8A and FIG. 8B are flowcharts of a process in a second embodiment.
Figure 8B:
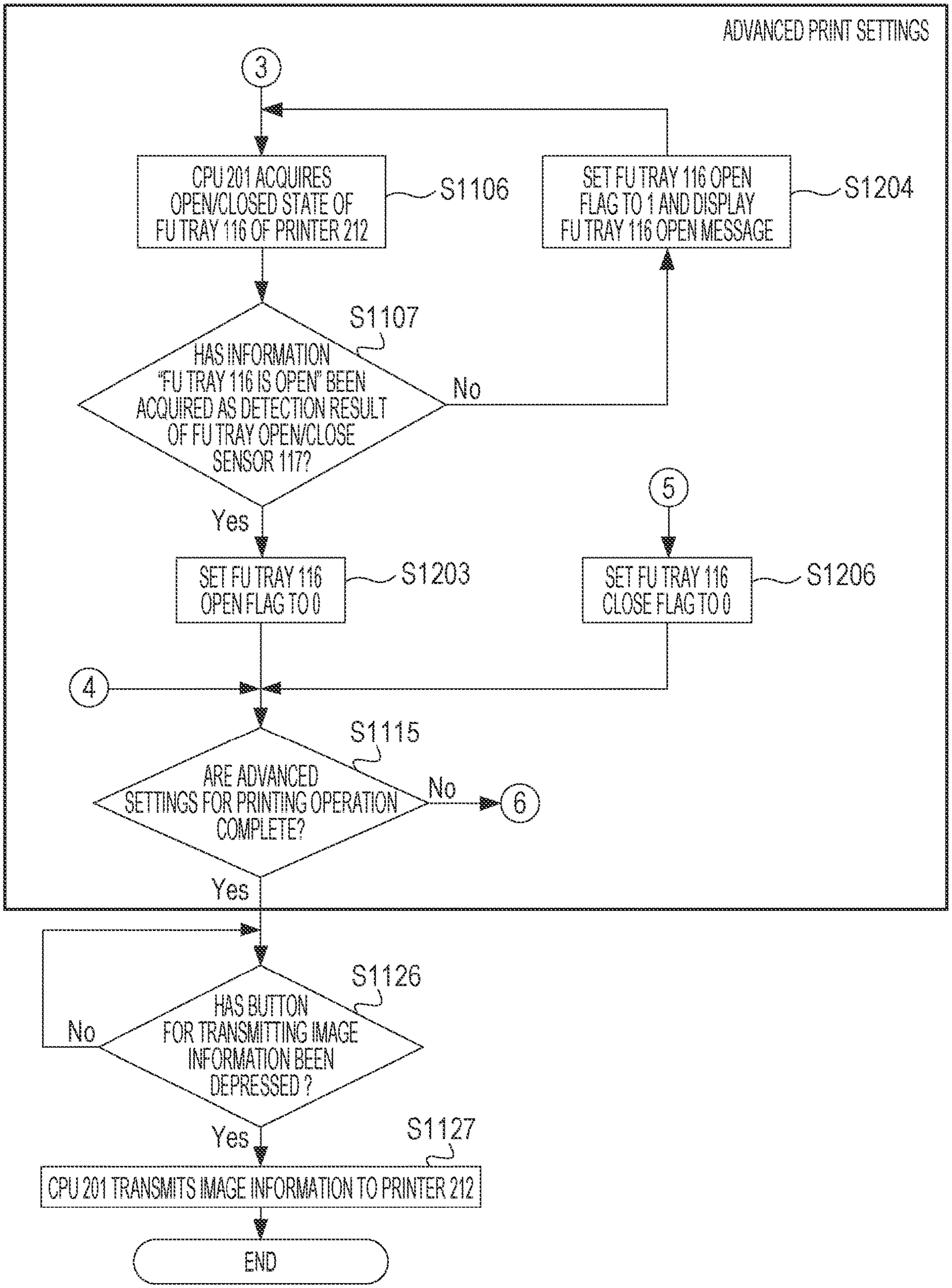

Hereinafter, a process that the CPU 201 informs a message to a user according to a combination of information on image formation, input by the user, by using the application 404 will be described with reference to the flowcharts shown in FIG. 8A and FIG. 8B. Like step numbers are assigned to the same components as those of the above-described embodiment, and the description thereof is omitted. The image forming process and the hardware configuration are also the same as those of the first embodiment, so the description thereof is omitted. In the present embodiment, each time a user changes a designated printing operation on the advanced settings screen for printing operation, the setting section 406 sets an applicable message, and the UI section 405 displays the message on the display 209.

Initially, when the host computer 200 receives a command to start advanced settings for printing operation from a user, the process proceeds to S1100. In S1100, when the UI section 405 causes the display 209 to display the advanced settings screen for printing operation, the advanced settings for printing operation start, and the process proceeds to S1101.

In S1101, when the UI section 405 has acquired information that a paper type of 1 (paper type other than FU output recommended paper) is selected by the user in selecting a paper type on the advanced settings screen for printing operation, the process proceeds to S1110. In S1110, when a printing operation of 1 (single-sided printing) is selected in selecting double-sided printing or single-sided printing on the advanced settings screen for printing operation, the process proceeds to S1115. In S1115, the next step depends on whether the UI section 405 has acquired information resulting from the fact that the user has completed the input of printing operation on the advanced settings screen for printing operation and depressed OK button.

In S1110, when the UI section 405 has acquired information that a printing operation of 2 (double-sided printing) is selected by the user in selecting double-sided printing or single-sided printing on the advanced settings screen for printing operation, the process proceeds to S1111. In S1111, the transmission and reception section 407 acquires the open/closed state of the FU tray 116 of the printer 212. In S1112, when the transmission and reception section 407 has not acquired a detection result that "the FU tray 116 is open" as a detection result of the FU tray open/close sensor 117 of the printer 212 (when the FU tray 116 is closed) (No), the process proceeds to S1206. In S1206, the setting section 406 sets 0 for the FU tray 116 close flag for displaying the message prompting to close the FU tray 116 for double-sided printing, and the process proceeds to S1115. In S1115, the UI section 405 waits until the UI section 405 receives information resulting from the fact that the user has completed advanced settings for printing operation on the advanced settings screen for printing operation and depressed OK button. In S1112, when the transmission and reception section 407 has acquired a detection result that "the FU tray 116 is open" as a detection result of the FU tray open/close sensor 117 of the printer 212 (Yes), the process proceeds to S1205.

In S1205, the setting section 406 sets 1 for the FU tray 116 close flag for displaying the message prompting to close the FU tray 116 for double-sided printing, the UI section 405 displays the FU tray 116 close message on the display 209, and the process returns to S1111. In S1111, the transmission and reception section 407 acquires the open/closed state of the FU tray 116 of the printer 212. At this time, S1111, S1112, and S1205 are repeated until the transmission and reception section 407 acquires a detection result that "the FU tray 116 is closed" as a detection result of the FU tray open/close sensor 117 of the printer 212 in S1112 (until S1112 is negative).

The UI section 405 may also clear the FU tray 116 close message when the UI section 405 has acquired information that OK button has been depressed by the user or when a certain period of time has elapsed from when the FU tray 116 close message is displayed. At this time, the setting section 406 does not clear the FU tray 116 close flag. For this reason, even when the UI section 405 clears a message, OK button on the advanced settings screen for printing operation or a button to be depressed by a user to perform printing may be not enabled. A similar configuration may be applied for the FU tray 116 open message in the description below in the present embodiment.

In S1101, when the UI section 405 has acquired information that a paper type of 2 (FU output recommended paper) is selected by the user in selecting a paper type on the advanced settings screen for printing operation, the process proceeds to S1102. In S1102, when the UI section 405 has acquired information that a printing operation of 1 (single-sided printing) is selected by the user in selecting double-sided printing or single-sided printing on the advanced settings screen for printing operation, the process proceeds to S1105. In S1105, the setting section 406 sets 0 for the double-sided printing prohibition flag for displaying that double-sided printing is prohibited, and the process proceeds to S1106. In S1106, the transmission and reception section 407 acquires the open/closed state of the FU tray 116 of the printer 212. In S1107, when the transmission and reception section 407 has acquired a detection result that "the FU tray 116 is open" as a detection result of the FU tray open/close sensor 117 of the printer 212 (Yes), the process proceeds to S1203. In S1203, the setting section 406 sets 0 for the FU tray 116 open flag for displaying the message prompting to open the FU tray 116, and the process proceeds to S1115. In S1107, when the transmission and reception section 407 has not acquired a detection result that "the FU tray 116 is open" as a detection result of the FU tray open/close sensor 117 of the printer 212 (when the FU tray 116 is closed) (No), the process proceeds to S1204. In S1204, the setting section 406 sets 1 for the FU tray 116 open flag for displaying the message prompting to open the FU tray 116, the UI section 405 displays the FU tray 116 open message on the display 209, and the process returns to S1106. In S1106, the transmission and reception section 407 acquires the open/closed state of the FU tray 116 of the printer 212. At this time, the process does not proceed to S1115 until the transmission and reception section 407 acquires a detection result that "the FU tray 116 is open" as a detection result of the FU tray open/close sensor 117 of the printer 212 in S1107 (until S1107 is affirmative).

In S1102, when the UI section 405 has acquired information that a printing operation of 2 (double-sided printing) is selected by the user in selecting double-sided printing or single-sided printing on the advanced settings screen for printing operation, the process proceeds to S1200. In S1200, the setting section 406 sets 1 for the double-sided printing prohibition flag for displaying that double-sided printing is prohibited, the UI section 405 displays the double-sided printing prohibition message on the display 209, and the process proceeds to S1201. Until the setting section 406 acquires information that OK button in the double-sided printing prohibition message has been depressed by the user in S1201 (while S1201 is negative), the UI section 405 continues displaying the double-sided printing prohibition message on the display 209 in S1200. In S1201, when the setting section 406 has acquired information that OK button in the double-sided printing prohibition message has been depressed by the user (Yes), the process proceeds to S1202. In S1202, the setting section 406 sets 0 for the double-sided printing prohibition flag, and the process proceeds to S1104. In S1104, the setting section 406 changes the printing operation to single-sided printing, and the process proceeds to S1106. S1106 to S1115 have been described above, so the description is omitted.

In S1115, the next step depends on whether the UI section 405 has acquired information resulting from the fact that the user has completed the input of printing operation on the advanced settings screen for printing operation and depressed OK button. In S1115, when the UI section 405 has not acquired information that the user has completed the input of printing operation and depressed OK button (No), the process returns to S1101, and the advanced settings screen for printing operation remains displayed. Thus, the user is able to continue advanced settings for printing operation.

In S1115, when the UI section 405 has acquired information that the user has completed the input of printing operation and depressed OK button (Yes), the process proceeds to S1126. In S1126, the UI section 405 closes, for example, the advanced settings screen for printing operation, shown in FIG. 9A, and the process proceeds to S1127.

In S1126, the next step depends on whether the UI section 405 has acquired information that the button to be depressed to perform printing has been depressed by the user. In S1126, the process does not proceed to the next step until the UI section 405 acquires information that the button to be depressed to perform printing has been depressed by the user. In S1126, when the UI section 405 has acquired information that the button to be depressed to perform printing has been depressed by the user (Yes), the process proceeds to S1127. In S1127, the transmission and reception section 407 transmits image information to the printer controller 213.

In the present embodiment, it is assumed that, according to messages displayed by the UI section 405, the user goes to the printer 212 and performs operation in accordance with instructions of the messages. When, for example, the UI section 405 displays the FU tray 116 open message in S1204, it is assumed that the user manually opens the FU tray 116. In the present embodiment, opening or closing of the FU tray 116 may be automatically controlled.

When opening or closing of the FU tray 116 is automatically controlled, the FU tray 116 is automatically opened at point (A) between S1204 and S1106, and the FU tray 116 is automatically closed at point (B) between S1205 and S1111.

Here, the drive of the FU tray 116 when the FU tray 116 is automatically opened or closed will be described. The image forming apparatus 10 includes a driving section at a hinge-side part (not shown) that is used when the FU tray 116 is opened or closed. The driving section includes the FU tray open/close motor 330 that is a driving source capable of rotating in forward and reverse directions. A reduction gear train (not shown) that is a drive transmission unit transmits the drive of the FU tray open/close motor 330 to a hinge opening/closing shaft (not shown) and a hinge lift shaft (not shown) to open or close the FU tray 116.

Summary of Second Embodiment

As described above, in the present embodiment, the UI section 405 displays a message on the display 209 according to a combination of paper type information, a selected status of double-sided printing or single-sided printing, and an open/closed state of the FU tray 116, acquired by the transmission and reception section 407. The case where the process does not proceed to the next step until the CPU 201 detects the open/close operation of the FU tray 116 as a result of the fact that a user performs a necessary operation on the printer 212 in response to a message displayed by the UI section 405 has been described. Thus, it is possible to reduce the curling of FU output recommended paper or an inability to perform double-sided printing. When opening or closing of the FU tray 116 is automatically controlled, a user does not need to go to the printer 212 and manually operate the FU tray 116. Therefore, even when the distance between the installation location of the host computer 200 and the installation location of the printer 212 is long, it is possible to reduce the curling of FU output recommended paper or an inability to perform double-sided printing.

Third Embodiment

In the first and second embodiments, the CPU 201 uses the application 404 to inform a message only when user's operation is needed according to a combination of a print job designated by the user and an open/closed state of the FU tray 116. In addition, the case where a user is able to perform both input of a print job and checking of a message on the host computer 200 has been described. In the present embodiment, the case where, in the printer controller 213, the CPU 214 displays any one of various messages as described above on a main body display 145 according to information on a print job, received from the host computer 200, will be described. The CPU 214 is capable of communicating information with the host computer 200 by using the bidirectional interface (interface) 211 via the input section 218 and provides information or the like in the printer 212 to the host computer 200. Therefore, a message to be displayed on the main body display 145 may also be displayed on the display 209.

Even when the image forming apparatus 10 does not include the main body display 145, a user is able to check a message on the display 209 of a PC, smartphone, or the like that is the host computer 200. Alternatively, the image forming apparatus 10 may be equipped with a device that provides a voice, and may inform, for example, the message content shown in FIG. 6B by voice. Alternatively, the image forming apparatus 10 may be equipped with an LED lamp, and may inform, for example, the message content shown in FIG. 6B by a pattern of lighting or blinking of the lamp, a change in color, and the like.

Figure 10:
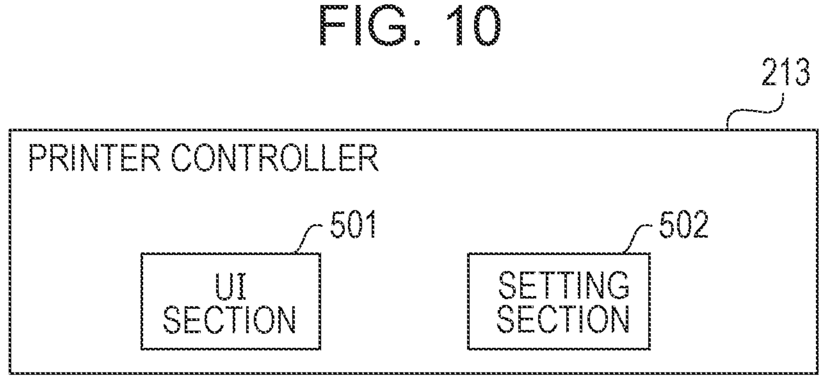
FIG. 10 is a block diagram showing the functions of a printer controller in a third embodiment.

FIG. 10 is a block diagram showing functions in the case where the CPU 214 loads the control program stored in the program ROM of the ROM 216 or the external memory (not shown) onto the RAM 215 and executes the control program. The printer controller 213 mainly functions as a UI section 501 and a setting section 502. The functions of the UI section 501 and setting section 502 at this time are the same as the functions of the UI section 405 and setting section 406. In the present embodiment, the CPU 302 may execute a process to be executed by the CPU 214. At this time, the CPU 302 loads the control program stored in the program ROM of the ROM 303 or the external memory (not shown) onto the RAM 304 and executes the control program.

Figure 11A:
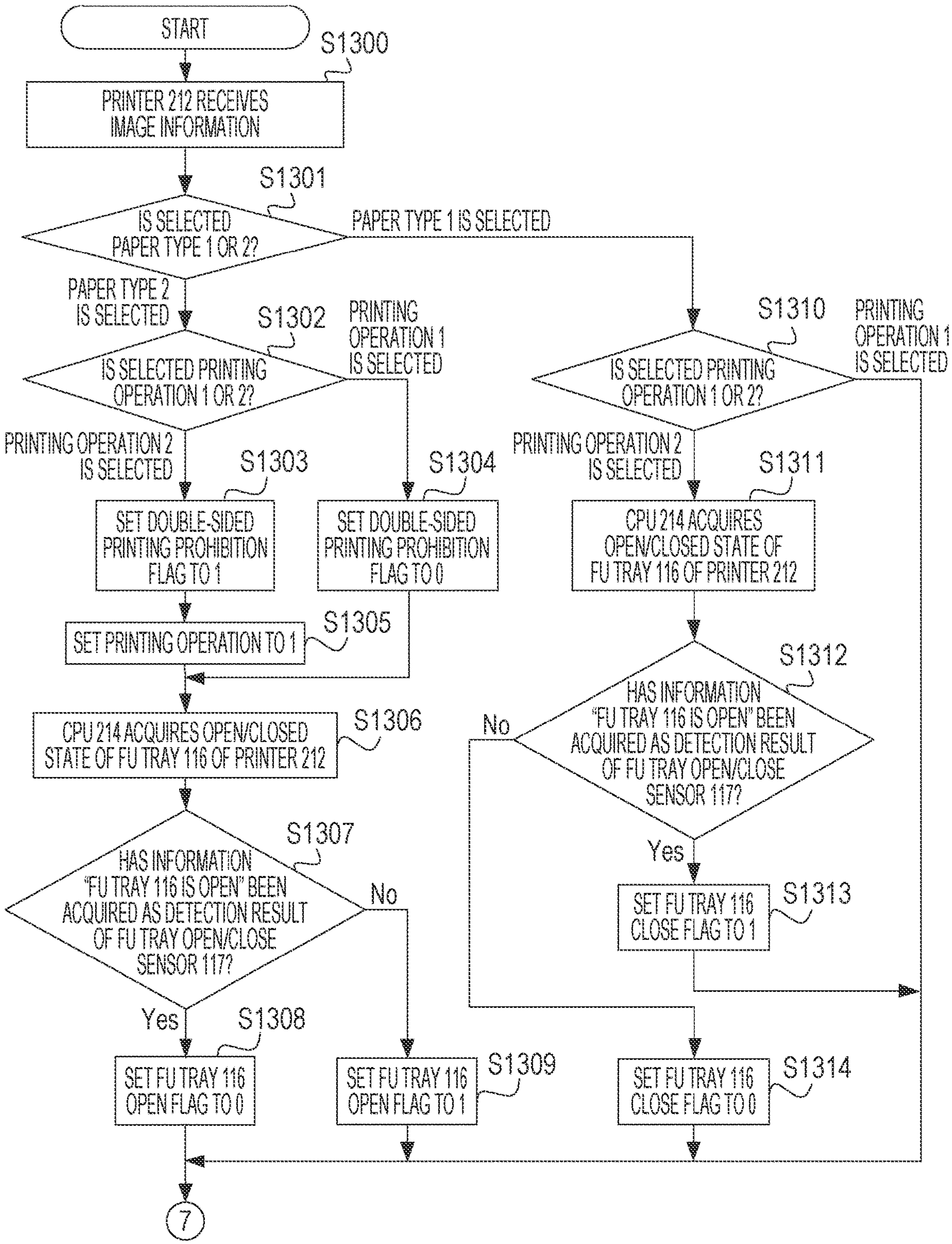
FIG. 11A and FIG. 11B are flowcharts of a process in the third embodiment.
Figure 11B:
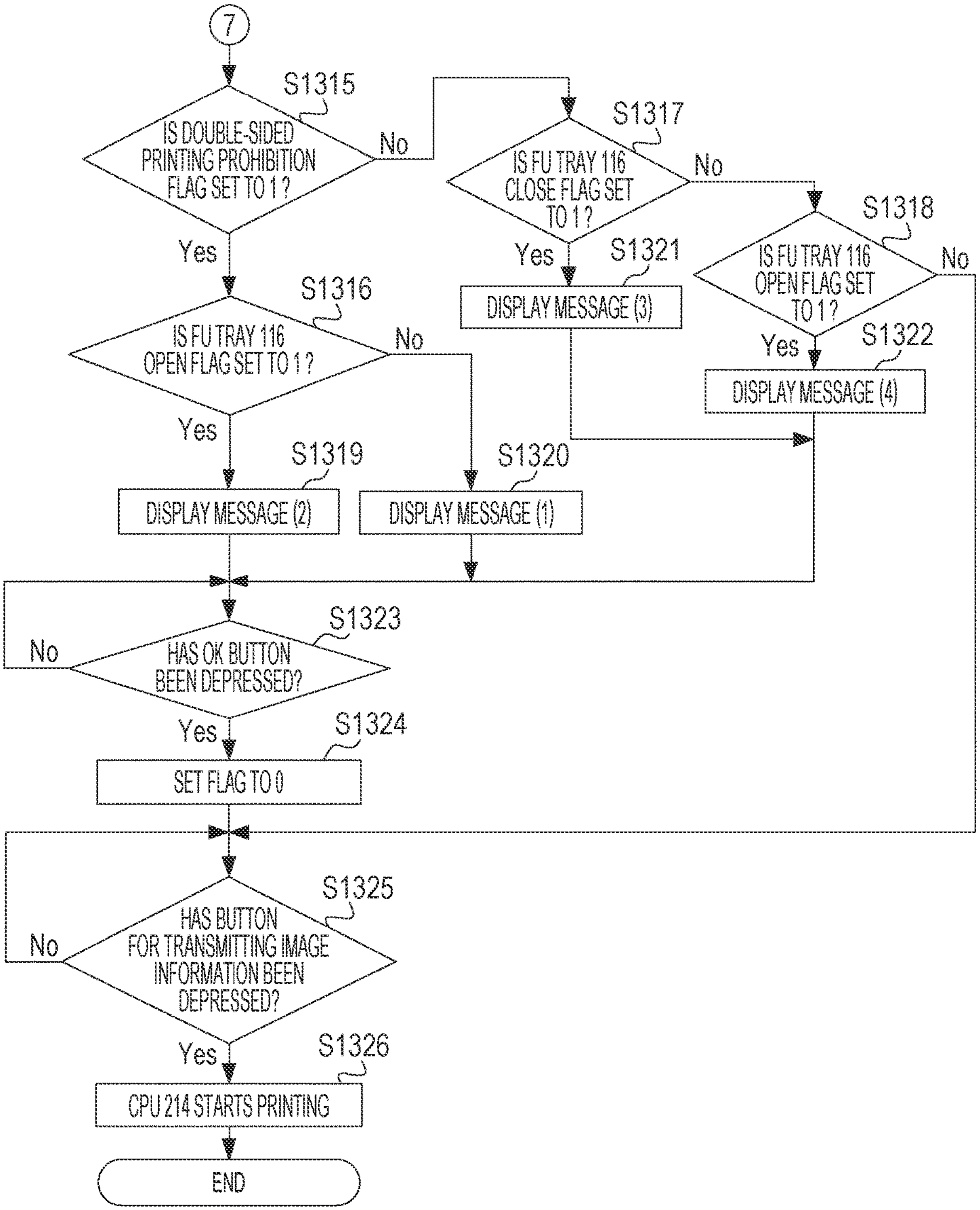

Hereinafter, a process that the CPU 214 executes at the time of informing a message to a user according to a combination of a print job, received from the host computer 200, will be described with reference to the flowcharts shown in FIG. 11A and FIG. 11B. Like step numbers are assigned to the same steps as those of the above-described embodiments, and the description thereof is omitted. The image forming process and the hardware configuration are also the same as those of the above-described embodiments, so the description thereof is omitted.

In S1300, when the printer controller 213 receives information on a print job from the host computer 200, the process proceeds to S1301. In S1301, when the UI section 501 has acquired information that a paper type of 1 (paper type other than FU output recommended paper) is selected by the user in selecting a paper type on the advanced settings screen for printing operation, the process proceeds to S1310. In S1310, when the UI section 501 has acquired information that a printing operation of 1 (single-sided printing) is selected in selecting double-sided printing or single-sided printing on the advanced settings screen for printing operation, the process proceeds to S1315 and the following steps.

In S1310, when the UI section 501 has acquired information that a printing operation of 2 (double-sided printing) is selected by the user in selecting double-sided printing or single-sided printing on the advanced settings screen for printing operation, the process proceeds to S1311. In S1311, the CPU 214 acquires the open/closed state of the FU tray 116 of the printer 212. In S1312, when the CPU 214 has not acquired a detection result that "the FU tray 116 is open" as a detection result of the FU tray open/close sensor 117 of the printer 212 (when the FU tray 116 is closed) (No), the process proceeds to S1314. In S1314, the setting section 502 sets 0 for the FU tray 116 close flag for displaying the message prompting to close the FU tray 116 for double-sided printing, and the process proceeds to S1315 and the following steps. In S1312, when the CPU 214 has acquired a detection result that "the FU tray 116 is open" as a detection result of the FU tray open/close sensor 117 of the printer 212 (Yes), the process proceeds to S1313. In S1313, the setting section 502 sets 1 for the FU tray 116 close flag for displaying the message prompting to close the FU tray 116 for double-sided printing, and the process proceeds to S1315 and the following steps.

In S1301, when the UI section 501 has acquired information that a paper type of 2 (FU output recommended paper) is selected by the user in selecting a paper type on the advanced settings screen for printing operation, the process proceeds to S1302. In S1302, when the UI section 501 has acquired information that a printing operation of 1 (single-sided printing) is selected by the user in selecting double-sided printing or single-sided printing on the advanced settings screen for printing operation, the process proceeds to S1304. In S1304, the setting section 502 sets 0 for the double-sided printing prohibition flag for displaying that double-sided printing is prohibited, and the process proceeds to S1306.

In S1306, the CPU 214 acquires the open/closed state of the FU tray 116 of the printer 212. In S1307, when the CPU 214 has acquired a detection result that "the FU tray 116 is open" as a detection result of the FU tray open/close sensor 117 of the printer 212 (Yes), the process proceeds to S1308. In S1308, the setting section 502 sets 0 for the FU tray 116 open flag for displaying the message prompting to open the FU tray 116, and the process proceeds to S1315 and the following steps. In S1307, when the CPU 214 has not acquired a detection result that "the FU tray 116 is open" as a detection result of the FU tray open/close sensor 117 of the printer 212 (when the FU tray 116 is closed) (No), the process proceeds to S1309. In S1309, the setting section 502 sets 1 for the FU tray 116 open flag for displaying the message prompting to open the FU tray 116, and the process proceeds to S1315.

In S1302, when the UI section 501 has acquired information that a printing operation of 2 (double-sided printing) is selected by the user in selecting double-sided printing or single-sided printing on the advanced settings screen for printing operation, the process proceeds to S1303. In S1303, the setting section 502 sets 1 for the double-sided printing prohibition flag for displaying that double-sided printing is prohibited, and the process proceeds to S1305. In S1305, the setting section 502 changes the printing operation to a printing operation of 1 (single-sided printing), and the process proceeds to S1306. S1306 to S1309 have been described above, so the description is omitted.

In S1315 and the following steps, the next step depends on whether the setting section 502 sets a flag.

When the setting section 502 sets 1 for the double-sided printing prohibition flag (S1315) and sets 1 for the FU tray 116 open flag (S1316) on the advanced settings screen for printing operation, the UI section 501 displays the message (2) in S1319. The message (2) is, for example, the message shown in (2) of FIG. 6B or in FIG. 6D and shows the contents of two messages, that is, the above-described double-sided printing prohibition message and the FU tray 116 open message.

When the setting section 502 sets 1 for the double-sided printing prohibition flag (S1315) and does not set 1 for the FU tray 116 open flag (S1316) on the advanced settings screen for printing operation, the UI section 501 displays the message (1) in S1320. The message (1) is, for example, the message shown in (1) of FIG. 6B or in FIG. 6C and shows the content of the above-described double-sided printing prohibition message.

When the setting section 502 does not set 1 for the double-sided printing prohibition flag (S1315) and sets 1 for the FU tray 116 close flag (S1317) on the advanced settings screen for printing operation, the UI section 501 displays the message (3) in S1321. The message (3) is, for example, the message shown in (3) of FIG. 6B or in FIG. 6E and shows the content of the above-described FU tray 116 close message.

When the setting section 502 does not set 1 for the double-sided printing prohibition flag (S1315) or set 1 for the FU tray 116 close flag (S1317), and sets 1 for the FU tray 116 open flag (S1318) on the advanced settings screen for printing operation, the UI section 501 displays the message (4) in S1322. The message (4) is, for example, the message shown in (4) of FIG. 6B or in FIG. 6F.

In S1319 to S1321, the UI section 501 displays any one of the above-described various messages on the main body display 145 or the display 209 or both Various messages displayed at this time each contain OK button as shown in, for example, FIG. 6C to FIG. 6F.

In S1323, the UI section 501 continues displaying any one of the various messages on at least one of the main body display 145 and the display 209 until the UI section 501 acquires information that OK button has been depressed by the user. In S1323, when the UI section 501 has acquired information that OK button has been depressed by the user (Yes), the setting section 502 sets 0 for the flag in S1324. The setting section 502 may set 0 for the flag not only when the UI section 501 has acquired information that OK button has been depressed by the user but also when a certain period of time has elapsed from when any one of the various messages is displayed. When the setting section 502 sets 0 for the flag, the UI section 501 clears the any one of the various messages, displayed on the at least one of the main body display 145 and the display 209, and the process proceeds to S1325.

When the setting section 502 does not set 1 for the double-sided printing prohibition flag (S1315) or set 1 for the FU tray 116 close flag (S1317) or set 1 for the FU tray 116 open flag (S1318) on the advanced settings screen for printing operation, the process proceeds to S1325. At this time, the UI section 501 does not show any message on at least one of the main body display 145 and the display 209.

In S1325, the next step depends on whether the UI section 501 has acquired information that a button to be depressed to perform printing has been depressed by the user. The process does not proceed to the next step until the UI section 501 acquires information that the button to be depressed to perform printing has been depressed by the user. When the UI section 501 has acquired information that the button to be depressed to perform printing has been depressed by the user (Yes), the process proceeds to S1326. In S1326, the CPU 214 starts printing.

In the present embodiment, it is assumed that, according to messages displayed by the UI section 501 in S1319 to S1321, the user goes to the printer 212 and performs operation in accordance with instructions of the messages. When, for example, the UI section 501 displays the FU tray 116 open message in S1320, it is assumed that the user manually opens the FU tray 116. In the present embodiment, when a user executes a printing operation for a specified print job, operation needed is informed to the user. Therefore, even when the user does not manually open the FU tray 116, but when the UI section 501 acquires in S1323 information that OK button has been depressed by the user, the process proceeds to S1326 via S1324 and S1325, and the CPU 214 starts printing. In this way, in the present embodiment, whether the FU tray 116 is opened or closed depends on user convenience.

Here, a possible situation in the case where, although the FU tray 116 open message is displayed in S1320, the user does not bring the FU tray 116 into the open state and depresses OK button will be described.

Depending on a user, even when, for example, FU output recommended paper is designated by the user, the curling of a sheet resulting from double-sided printing or outputting a sheet to the FD tray 115 may be allowed. When a user installs the image forming apparatus 10 such that the side at which the FU tray 116 is disposed is close to a wall, the user is difficult to open or close the FU tray 116. In this case, rather than the user puts the hand into the clearance between the image forming apparatus 10 and the wall to open the FU tray 116, the curling of a sheet may be allowed. In this case, even when the UI section 501 displays the FU tray 116 open message, a user may depress OK button without any operation on the printer 212. In this case, since the FU tray 116 is left closed, space saving is achieved.

Summary of Third Embodiment

As described above, in the present embodiment, the CPU 214 controls the printer 212 according to a combination of paper type information received from the host computer 200, a selected status of double-sided printing or single-sided printing, and an open/closed state of the FU tray 116, acquired by the CPU 214. The case where the CPU 214 shows any one of various messages as described above on at least one of the main body display 145 and the display 209 has been described. Thus, a message is provided only when user's operation is needed according to the open/closed state of the FU tray 116, so usability improves. A user performs necessary operation to the printer 212 according to a combination of a print job, so it is possible to reduce the curling of FU output recommended paper or an inability to perform double-sided printing.

Fourth Embodiment

In the third embodiment, the case where whether a user opens or closes the FU tray 116 in accordance with a message displayed by the UI section 501 depends on user convenience and the process proceeds to the next step when the user depresses OK button has been described. In the present embodiment, the case where the process does not proceed to the next step until the CPU 214 detects the open/close operation of the FU tray 116 according to a message displayed by the UI section 501 will be described. Thus, it is possible to reduce the curling of FU output recommended paper or an inability to perform double-sided printing.

Figure 12A:
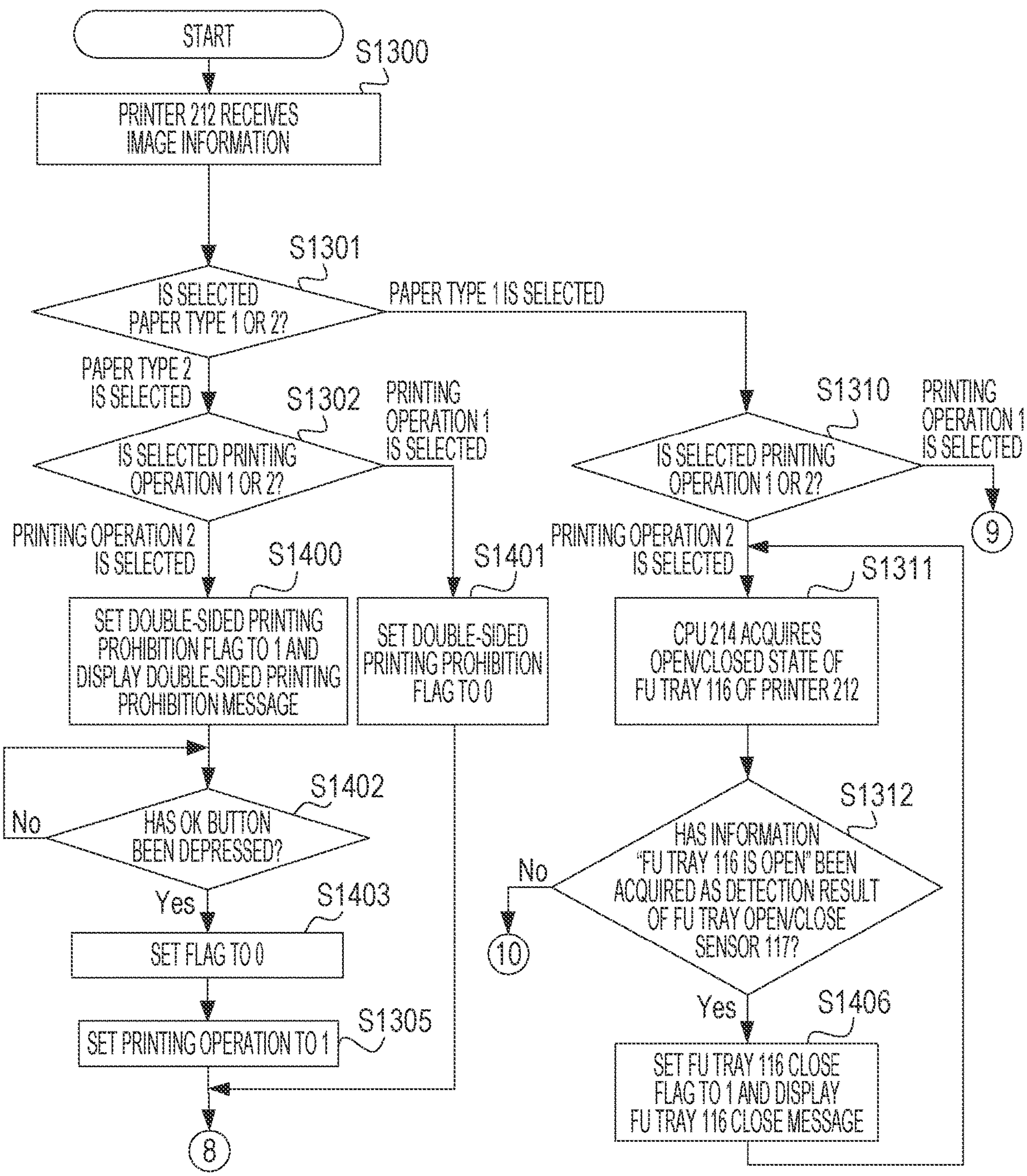
FIG. 12A and FIG. 12B are flowcharts of a process in a fourth embodiment.
Figure 12B:
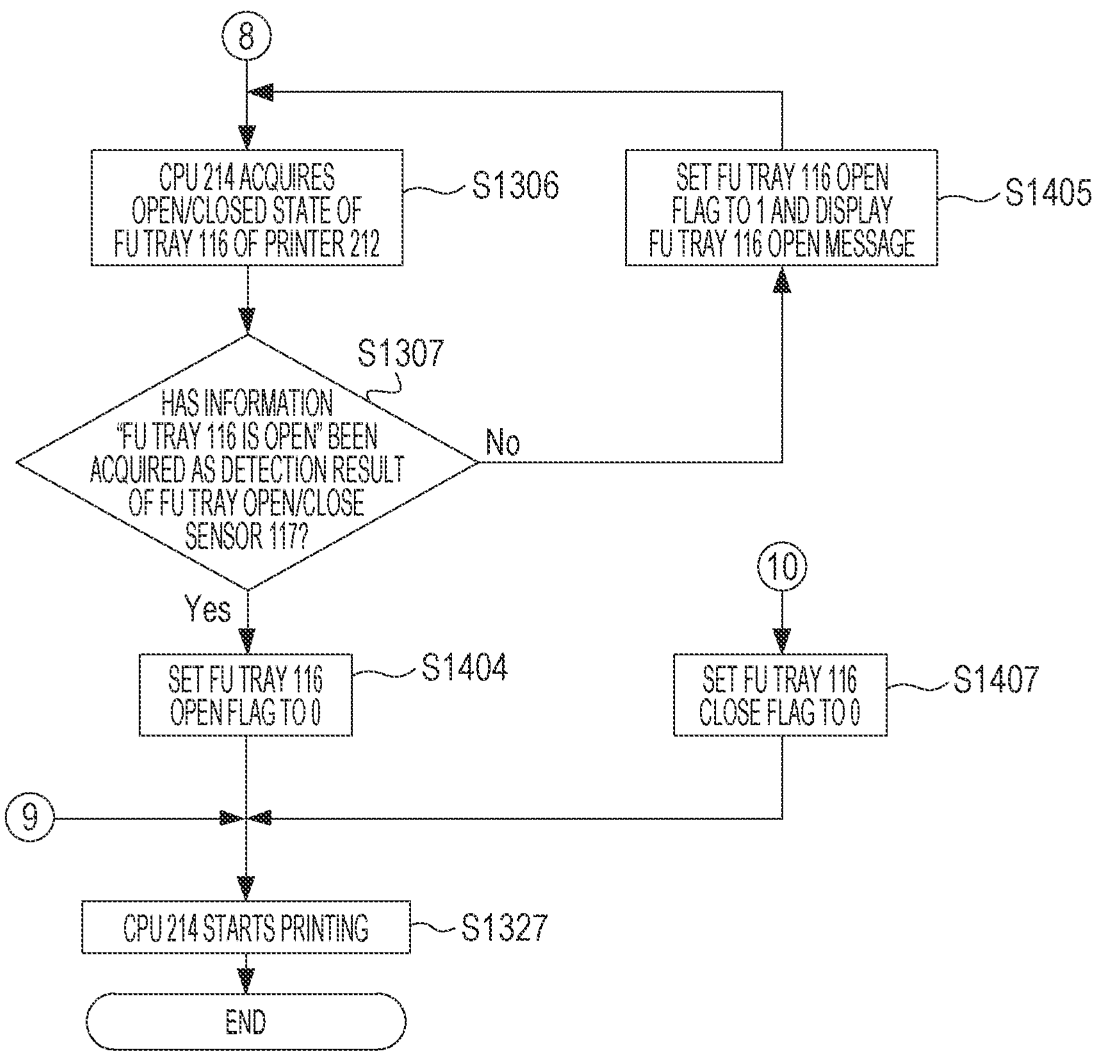

In the printer controller 213, the CPU 214 controls the printer 212 in accordance with information on a print job, received from the host computer 200. Hereinafter, a process that the CPU 214 executes at the time of displaying any one of various message as described above on at least one of the main body display 145 and the display 209 will be described with reference to the flowcharts shown in FIG. 12A and FIG. 12B. Like step numbers are assigned to the same steps as those of the above-described embodiments, and the description thereof is omitted. The image forming process and the hardware configuration are also the same as those of the first embodiment, so the description thereof is omitted. In the present embodiment, the CPU 302 may execute a process to be executed by the CPU 214.

In S1300, when the printer controller 213 receives information on a print job from the host computer 200, the process proceeds to S1301. In S1301, when the UI section 501 has acquired information that a paper type of 1 (paper type other than FU output recommended paper) is selected by the user in selecting a paper type on the advanced settings screen for printing operation, the process proceeds to S1310. In S1310, when a printing operation of 1 (single-sided printing) is selected in selecting double-sided printing or single-sided printing on the advanced settings screen for printing operation, the process proceeds to S1327. In S1327, the CPU 214 starts printing.

In S1310, when the UI section 501 has acquired information that a printing operation of 2 (double-sided printing) is selected by the user in selecting double-sided printing or single-sided printing on the advanced settings screen for printing operation, the process proceeds to S1311. In S1311, the CPU 214 acquires the open/closed state of the FU tray 116 of the printer 212. In S1312, when the CPU 214 has not acquired a detection result that "the FU tray 116 is open" as a detection result of the FU tray open/close sensor 117 of the printer 212 (when the FU tray 116 is closed) (No), the process proceeds to S1407. In S1407, the setting section 502 sets 0 for the FU tray 116 close flag for displaying the message prompting to close the FU tray 116 for double-sided printing, and the process proceeds to S1327. In S1327, the CPU 214 starts printing. In S1312, when the CPU 214 has acquired a detection result that "the FU tray 116 is open" as a detection result of the FU tray open/close sensor 117 of the printer 212 (Yes), the process proceeds to S1406.

In S1406, the setting section 502 sets 1 for the FU tray 116 close flag for displaying the message prompting to close the FU tray 116 for double-sided printing. Then, the UI section 501 shows the FU tray 116 close message on at least one of the main body display 145 and the display 209, and the process returns to S1311. In S1311, the CPU 214 acquires the open/closed state of the FU tray 116 of the printer 212. At this time, S1311, S1312, and S1406 are repeated until the CPU 214 acquires a detection result that "the FU tray 116 is closed" as a detection result of the FU tray open/close sensor 117 of the printer 212 in S1312 (until S1312 is negative).

The UI section 501 may also clear the FU tray 116 close message when the UI section 501 has acquired information that OK button has been depressed by the user or when a certain period of time has elapsed from when the FU tray 116 close message is displayed. At this time, the setting section 502 does not clear the FU tray 116 close flag. For this reason, even when the UI section 501 clears a message, OK button on the advanced settings screen for printing operation or the button to be depressed by a user to execute printing may be not enabled. A similar configuration may be applied for the FU tray 116 open message in the description below in the present embodiment.

In S1301, when the UI section 501 has acquired information that a paper type of 2 (FU output recommended paper) is selected by the user in selecting a paper type on the advanced settings screen for printing operation, the process proceeds to S1302. In S1302, when the UI section 501 has acquired information that a printing operation of 1 (single-sided printing) is selected by the user in selecting double-sided printing or single-sided printing on the advanced settings screen for printing operation, the process proceeds to S1401. In S1401, the setting section 502 sets 0 for the double-sided printing prohibition flag for displaying that double-sided printing is prohibited, and the process proceeds to S1306. In S1306, the CPU 214 acquires the open/closed state of the FU tray 116 of the printer 212. In S1307, when the CPU 214 has acquired a detection result that "the FU tray 116 is open" as a detection result of the FU tray open/close sensor 117 of the printer 212 (Yes), the process proceeds to S1404. In S1404, the setting section 502 sets 0 for the FU tray 116 open flag for displaying the message prompting to open the FU tray 116, and the process proceeds to S1327. In S1307, when the CPU 214 has not acquired a detection result that "the FU tray 116 is open" as a detection result of the FU tray open/close sensor 117 of the printer 212 (when the FU tray 116 is closed) (No), the process proceeds to S1405. In S1405, the setting section 502 sets 1 for the FU tray 116 open flag for displaying the message prompting to open the FU tray 116. Then, the UI section 501 shows the FU tray 116 open message on at least one of the main body display 145 and the display 209, and the process returns to S1306. In S1306, the CPU 214 acquires the open/closed state of the FU tray 116 of the printer 212. At this time, the process does not proceed to S1327 until the CPU 214 acquires a detection result that "the FU tray 116 is open" as a detection result of the FU tray open/close sensor 117 of the printer 212 in S1307 (until S1307 is affirmative).

In S1302, when the UI section 501 has acquired information that a printing operation of 2 (double-sided printing) is selected by the user in selecting double-sided printing or single-sided printing on the advanced settings screen for printing operation, the process proceeds to S1400. In S1400, the setting section 502 sets 1 for the double-sided printing prohibition flag for displaying that double-sided printing is prohibited, the UI section 501 displays the double-sided printing prohibition message on at least one of the main body display 145 and the display 209, and the process proceeds to S1402. Until the setting section 502 acquires information that OK button in the double-sided printing prohibition message has been depressed by the user in S1402 (while S1402 is negative), the UI section 501 continues displaying the double-sided printing prohibition message on the at least one of the main body display 145 and the display 209 in S1400. In S1402, when the setting section 502 has acquired information that OK button in the double-sided printing prohibition message has been depressed by the user (Yes), the process proceeds to S1403. In S1403, the setting section 502 sets 0 for the double-sided printing prohibition flag, and the process proceeds to S1305. In S1305, the setting section 502 changes the printing operation to single-sided printing, and the process proceeds to S1306. S1306 to S1327 have been described above, so the description is omitted.

In the present embodiment, it is assumed that, according to messages displayed by the UI section 501, the user goes to the printer 212 and performs operation in accordance with instructions of the messages. When, for example, the UI section 501 displays the FU tray 116 open message in S1405, it is assumed that the user manually opens the FU tray 116. In the present embodiment, opening or closing of the FU tray 116 may be automatically controlled.

When opening or closing of the FU tray 116 is automatically controlled, the FU tray 116 is automatically opened at point (C) between S1405 and S1306, and the FU tray 116 is automatically closed at point (D) between S1406 and S1311.

Summary of Fourth Embodiment

As described above, in the present embodiment, the CPU 214 controls the printer 212 according to a combination of paper type information received from the host computer 200, a selected status of double-sided printing or single-sided printing, and an open/closed state of the FU tray 116, acquired by the CPU 214. The case where the CPU 214 shows any one of various messages as described above on at least one of the main body display 145 and the display 209 has been described. Thus, a message is provided only when user's operation is needed according to the open/closed state of the FU tray 116, so usability improves. A user performs necessary operation to the printer 212 according to a combination of a print job, so it is possible to reduce the curling of FU output recommended paper or an inability to perform double-sided printing. When opening or closing of the FU tray 116 is automatically controlled, a user does not need to go to the printer 212 and manually operate the FU tray 116. Therefore, even when the distance between the installation location of the host computer 200 and the installation location of the printer 212 is long, it is possible to execute a printing operation according to user's intention.

Fifth Embodiment

An image forming apparatus does not always allow input of a sheet output section. When a sheet output section is not allowed to be input, information as described in Japanese Patent Laid-Open No. 2015-110455 cannot be performed. Even when the sheet output section cannot be input, it is desirable that a sheet be output to the sheet output section to which a user intends to output the sheet. A recommended sheet output section is informed according to a type of sheet input, and a message prompting to select an intended sheet output section is informed.

Combination of Paper Type Information and Selected Status of Double-Sided Printing or Single-Sided Printing, and Message Content Displayed Hereinafter, paper type information, a selected status of double-sided printing or single-sided printing, a selected status of sheet output section, and a message content displayed on the display 209 of the host computer 200 will be described with reference to FIG. 13A and FIG. 13B. Detailed processes at the time when the setting section 406 actually selects and sets a message will be described later.

Figure 14A:
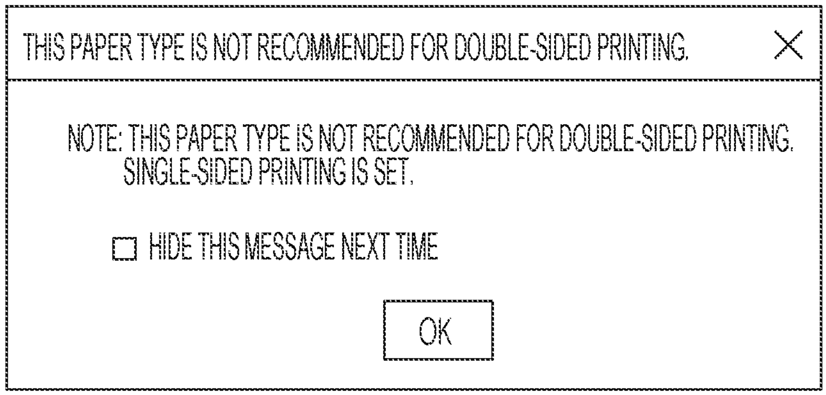

When a user selects FU output recommended paper, double-sided printing is not performed because of the above-described reason, so, even when the user selects double-sided printing, single-sided printing is automatically set. In the case of this selected combination, the UI section 405 displays, for example, the message "THIS PAPER TYPE IS NOT RECOMMENDED FOR DOUBLE-SIDED PRINTING. WHEN PRINTING, SINGLE-SIDED PRINTING IS SET." as shown in [1] of FIG. 13B and in FIG. 14A on the display 209. At this time, a content to be displayed as a message is not limited thereto. For example, the message "SINGLE-SIDED PRINTING IS SET." or the like may be displayed. A message displayed at this time is displayed when the setting section 406 sets 1 for a double-sided printing prohibition flag. For this reason, hereinafter, this message is referred to as double-sided printing prohibition message.

When a user selects FU output recommended paper and single-sided printing, a sheet may be curled if the sheet is output to the FD tray 115 along the conveying path with a small radius of curvature. For this reason, FU output recommended paper is desirably output to the FU tray 116 along the conveying path with a large radius of curvature. Depending on a user, it is conceivable that the user does not know that, for example, a paper type, such as thick paper and envelope, is FU output recommended paper or the user does not know that the FU tray 116 is an opening/closing member. Accordingly, for example, the message "THIS PAPER TYPE IS FU OUTPUT RECOMMENDED PAPER.", or the like may be informed.

Depending on a user, even when FU output recommended paper is selected by the user, the curling of a sheet resulting from outputting paper to the FD tray 115 may be allowed. When a user installs the image forming apparatus 10 such that the side at which the FU tray 116 is disposed is close to a wall, the user is difficult to open or close the FU tray 116. In this case, the user may allow the curling of a sheet and may not put the hand into the clearance between the image forming apparatus 10 and the wall to open the FU tray 116. In this way, whether to output a sheet to the FD tray 115 or output a sheet to the FU tray 116 depends on user convenience.

Figure 14B:
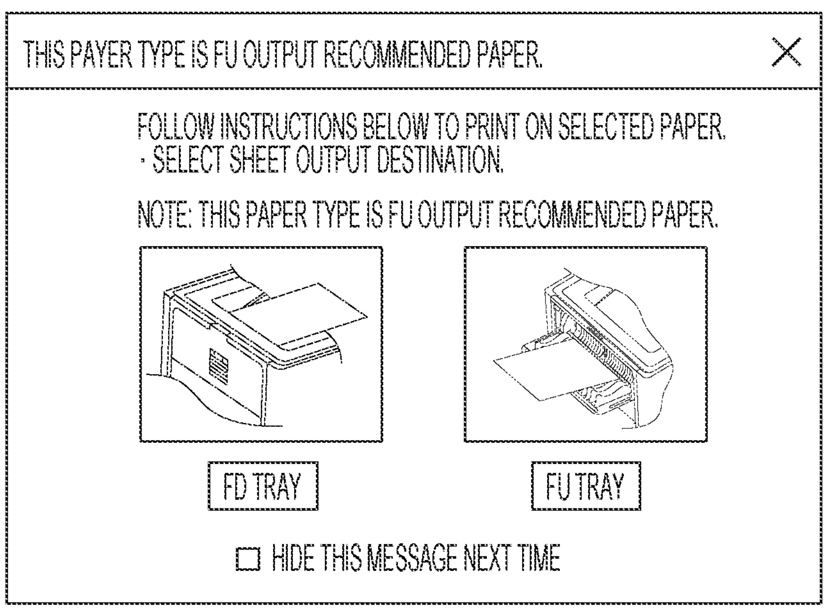

Accordingly, as shown in, for example, [2] of FIG. 13B and in FIG. 14B, information that the paper type selected by a user is FU output recommended paper is provided. Alternatively, a message inquiring about whether a user desires to output a sheet to the FD tray 115 or output a sheet to the FU tray 116 may be provided to the user. A message displayed at this time is displayed when the setting section 406 sets 1 for a sheet output section select flag. For this reason, hereinafter, this message is referred to as sheet output section select message.

Figure 14C:
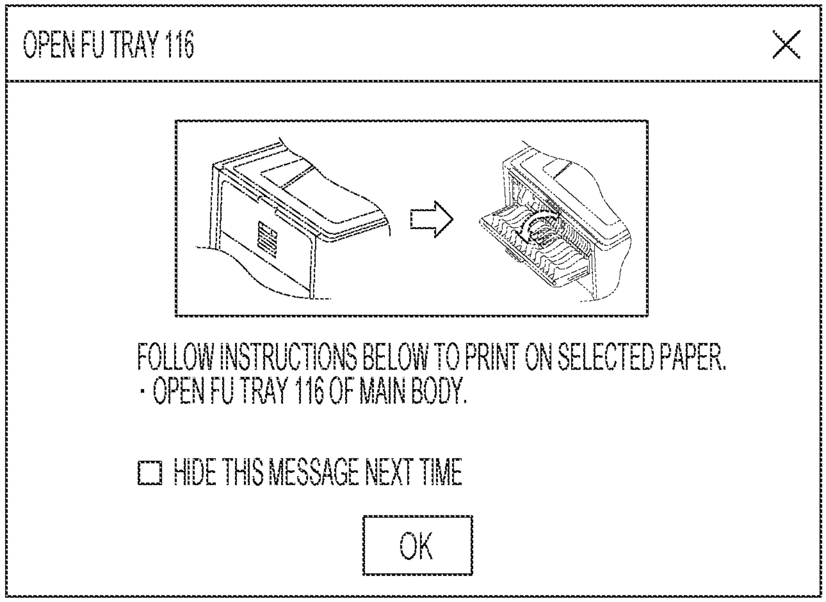

When the user selects outputting a sheet to the FU tray 116 in response to the sheet output section select message, the message "OPEN FU TRAY 116." as shown in, for example, [3] of FIG. 13B and in FIG. 14C may be displayed. Alternatively, a picture that makes the user recognize that "open the FU tray 116" may be displayed. A message displayed at this time is displayed when the setting section 406 sets 1 for an FU tray 116 open flag. For this reason, hereinafter, this message is referred to as FU tray 116 open message.

Figure 14D:
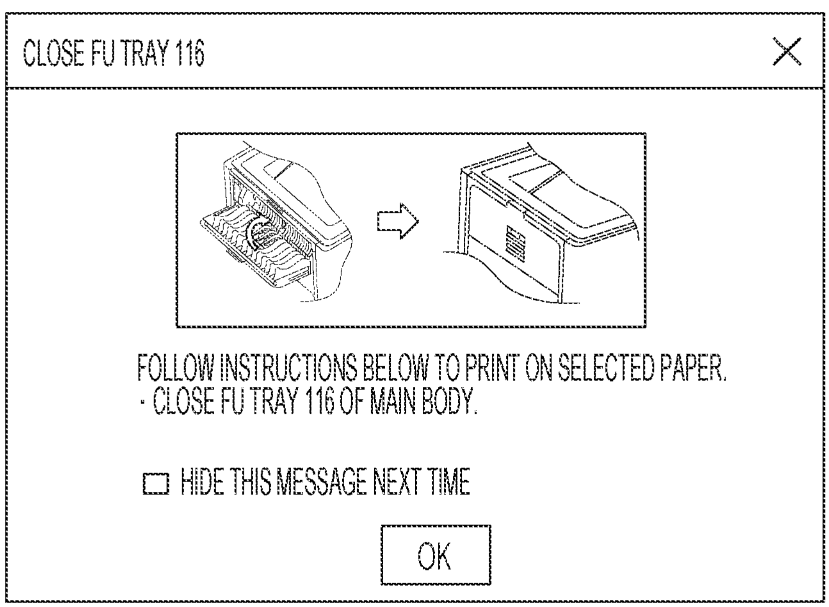

When the user selects outputting a sheet to the FD tray 115 in response to the sheet output section select message, the message "CLOSE FU TRAY 116." as shown in, for example, [4] of FIG. 13B and in FIG. 14D may be displayed. Alternatively, a picture that makes the user recognize that "close the FU tray 116" may be displayed. A message displayed at this time is displayed when the setting section 406 sets 1 for an FU tray 116 close flag. For this reason, hereinafter, this message is referred to as FU tray 116 close message.

Subsequently, the case where a user selects a paper type other than FU output recommended paper and double-sided printing will be described. When the FU tray 116 is open, the double-sided printing conveying path disappears, so double-sided printing cannot be performed. When the user selects double-sided printing, the message "CLOSE FU TRAY 116." as shown in, for example, [4] of FIG. 13B and in FIG. 14D may be displayed on the display 209 as described for the FU tray 116 close message. At this time, a content to be displayed as a message is not limited thereto. For example, the message "FU TRAY 116 IS OPEN." or the like may be displayed. A message displayed at this time is displayed when the setting section 406 sets 1 for an FU tray 116 close flag. For this reason, hereinafter, this message is referred to as FU tray 116 close message.

The sheet output section select message described above may be referred to as first message, and a step in which a first output unit outputs the first message may be referred to as first output step. The FU tray 116 open message and the FU tray 116 close message may be referred to as second messages, and a step in which a second output unit outputs the second messages may be referred to as second output step. Furthermore, the double-sided printing prohibition message may be referred to as third message, and a step in which a third output unit outputs the third message may be referred to as third output step. The UI section 405 may have the functions of the first output unit, second output unit, and third output unit, or different units may respectively have the functions of the first output unit, second output unit, and third output unit.

As described above, the setting section 406 selects and sets a message according to a combination of paper type information, a selected status of double-sided printing or single-sided printing, and a selected status of sheet output section. When the UI section 405 displays a set message on the display 209, an operation performed by the printer 212 to perform a printing operation desired by a user can be informed to the user.

Figure 15A:
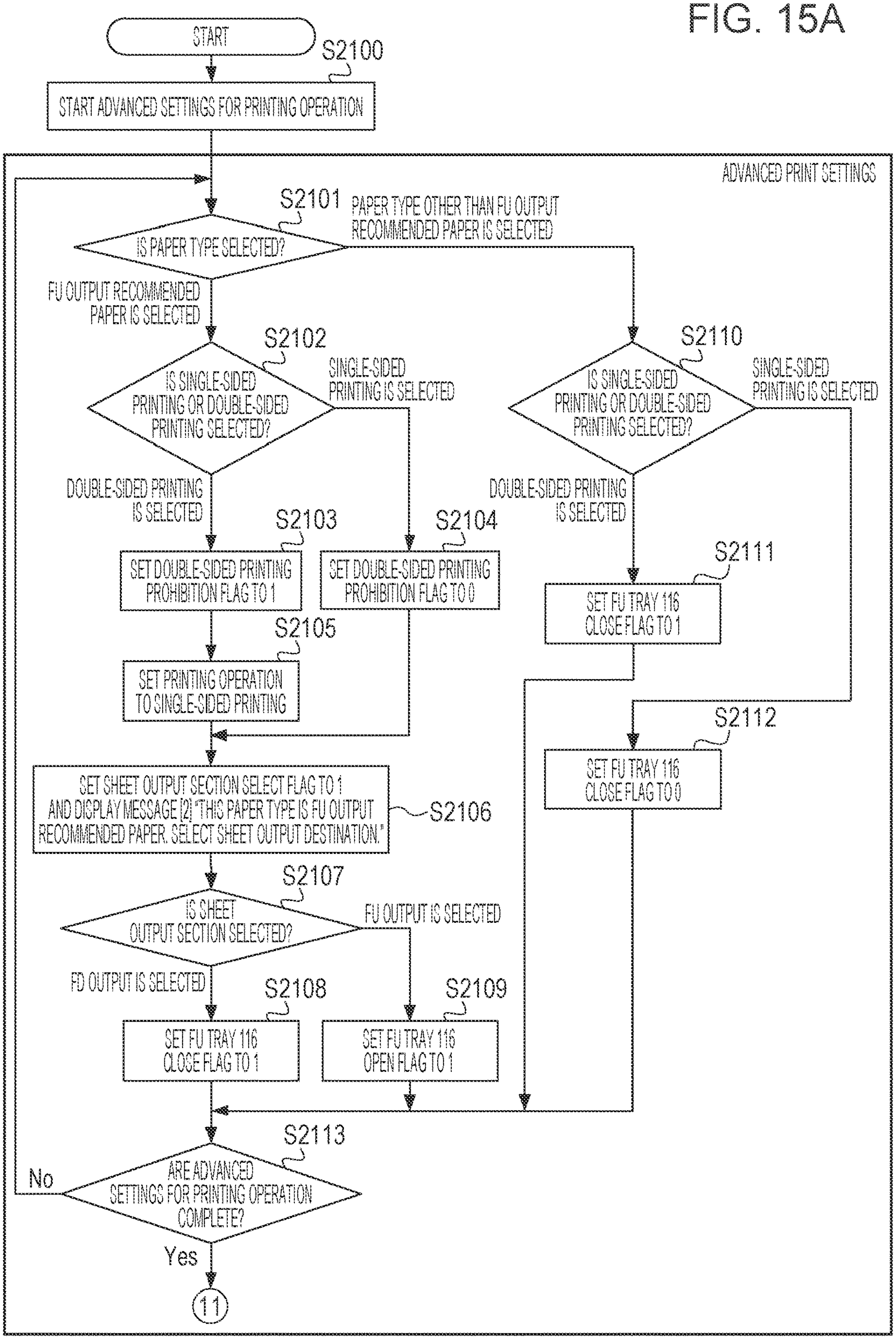
FIG. 15A is a flowchart of a process in the fifth embodiment.
Figure 15B:
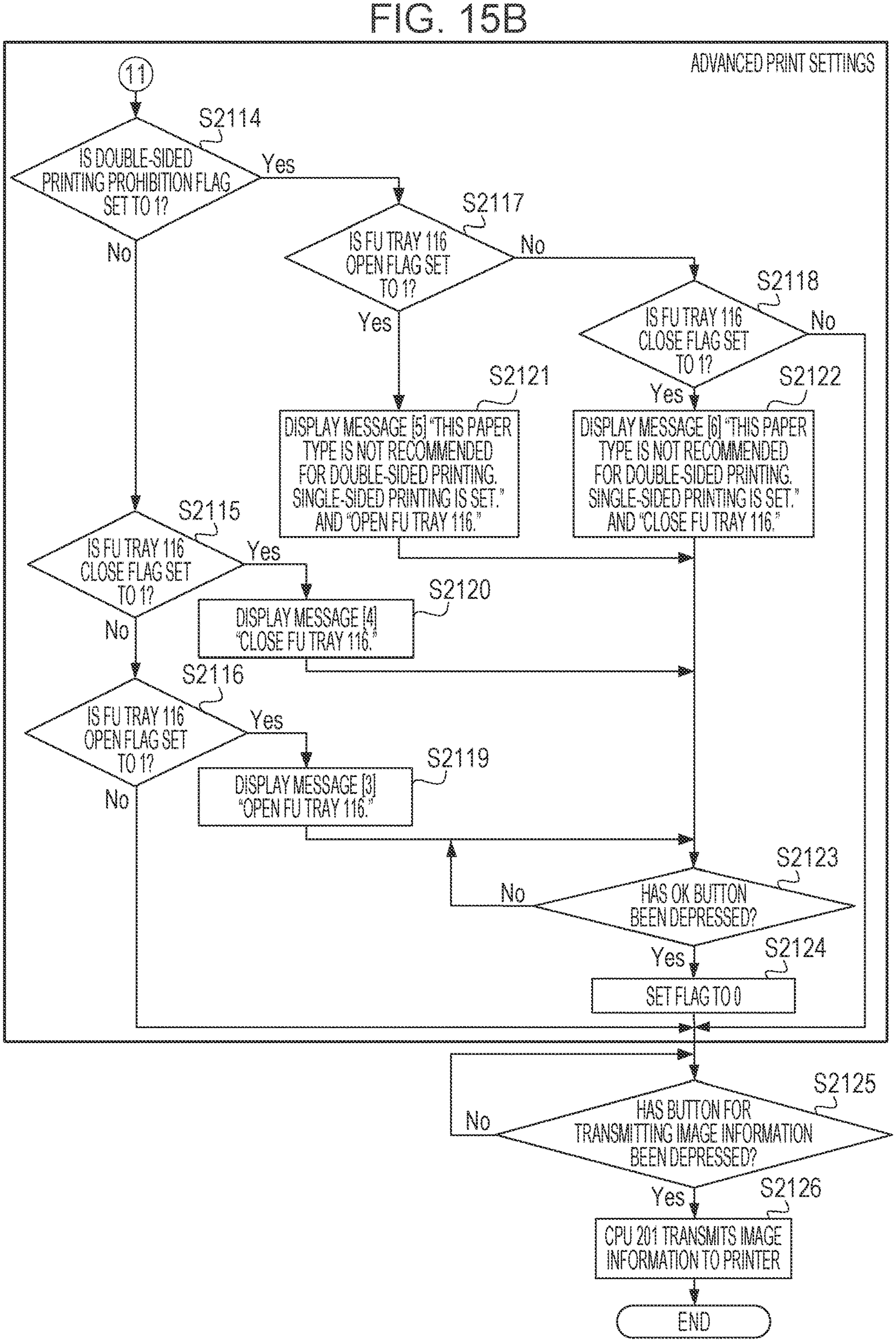
FIG. 15B is a flowchart of the process in the fifth embodiment.

Informing Message According to Combination of Information on Image Formation, Selected by User Hereinafter, a process that the CPU 201 informs a message to a user according to a combination of information on image formation, selected by the user, by using the application 404 will be described with reference to the flowchart shown in FIG. 15A and FIG. 15B.

Initially, when the host computer 200 receives a command to start advanced settings for printing operation from a user, the process proceeds to S2100. In S2100, when the UI section 405 causes the display 209 to display the advanced settings screen for printing operation, the advanced settings for printing operation start, and the process proceeds to S2101. The advanced settings screen for printing operation is, for example, the screen shown in FIG. 9A and contains tabs for basic settings, extended settings, automatic settings, and the like. When the basic settings tab is selected, for example, settings including paper size, print orientation, the number of copies, paper type, resolution, double-sided printing or booklet printing or single-sided printing, paper source, and the like are available. On this advanced settings screen for printing operation, when a user completes advanced settings for printing operation and depresses OK button, the advanced settings screen for printing operation closes. In the present embodiment, a combination of a setting of paper type and a setting of double-sided printing or single-sided printing in the basic settings tab is used. When a user does not select double-sided printing or single-sided printing, single-sided printing is selected as a default setting.

In S2101, when the UI section 405 has acquired information that a paper type other than FU output recommended paper is selected by the user in selecting a paper type, the process proceeds to S2110. In S2110, when the UI section 405 has acquired information that single-sided printing is selected in selecting double-sided printing or single-sided printing, the process proceeds to S2112. In S2112, the setting section 406 sets 0 for the FU tray 116 close flag for double-sided printing, and the process proceeds to S2113. In S2113, the next step depends on whether the UI section 405 has acquired information resulting from the fact that the user has completed the input of printing operation on the advanced settings screen for printing operation and depressed OK button.

In S2110, when the UI section 405 has acquired information that double-sided printing is selected by the user in selecting double-sided printing or single-sided printing, the process proceeds to S2111. In S2111, the setting section 406 sets 1 for the FU tray 116 close flag for double-sided printing, and the process proceeds to S2113.

In S2101, when the UI section 405 has acquired information that FU output recommended paper is selected by the user in selecting a paper type, the process proceeds to S2102. In S2102, when the UI section 405 has acquired information that single-sided printing is selected by the user in selecting double-sided printing or single-sided printing, the process proceeds to S2104. In S2104, the setting section 406 sets 0 for the double-sided printing prohibition flag for displaying that double-sided printing is prohibited, and the process proceeds to S2106.

In S2102, when the UI section 405 has acquired information that double-sided printing is selected by the user in selecting double-sided printing or single-sided printing, the process proceeds to S2103. In S2103, the setting section 406 sets 1 for the double-sided printing prohibition flag, and the process proceeds to S2105. In S2105, the setting section 406 changes the printing operation to single-sided printing, and the process proceeds to S2106.

In S2106, this is the case where the user subjects FU output recommended paper to single-sided printing, and whether to output a sheet to the FD tray 115 or output a sheet to the FU tray 116 depends on user convenience.

Accordingly, the setting section 406 sets 1 for the sheet output section select flag. The UI section 405 informs that the paper type selected by the user is FU output recommended paper. Alternatively, the UI section 405 displays the sheet output section select message on the display 209 as the first message inquiring about whether a user desires to output a sheet to the FD tray 115 or output a sheet to the FU tray 116, and the process proceeds to S2107.

In S2107, when the UI section 405 has acquired information that FD output is selected by the user in selecting a sheet output section, the process proceeds to S2108. In S2108, the setting section 406 sets 1 for the FU tray 116 close flag for FD output of a sheet, and the process proceeds to S2113.

In S2107, when the UI section 405 has acquired information that FU output is selected by the user in selecting a sheet output section, the process proceeds to S2109. In S2109, the setting section 406 sets 1 for the FU tray 116 open flag for FU output of a sheet, and the process proceeds to S2113.

In S2113, the next step depends on whether the UI section 405 has acquired information resulting from the fact that the user has completed the input of printing operation on the advanced settings screen for printing operation and depressed OK button. When the UI section 405 has not acquired information that the user has completed the input of printing operation and depressed OK button (No), the advanced settings screen for printing operation remains displayed, and the steps of S2101 to S2112 are repeated. Thus, the user is able to continue advanced settings for printing operation. When the process returns from S2113 to S2101, the setting section 406 sets 0 for the flag that has been set to 1 until S2113, and then the process returns to S2101.

When the UI section 405 has acquired information that the user has completed the input of printing operation and depressed OK button (Yes), the process proceeds to the next step. In the next step, a process according to whether various flags are set by the setting section 406 on the advanced settings screen for printing operation is performed through S2114 to S2118.

When the setting section 406 determines in S2114, S2115, and S2116 that no flag is set to 1 on the advanced settings screen for printing operation, no message is displayed. Then, for example, the advanced settings screen for printing operation, shown in FIG. 9A, is cleared, and the process proceeds to S2125.

When the setting section 406 determines in S2114 and S2115 that no flag is set to 1 and determines in S2116 that the flag is set to 1 on the advanced settings screen for printing operation, the UI section 405 displays the message [3] in S2119. The message [3] is, for example, the message shown in [3] of FIG. 13B or in FIG. 14C, and the content of the above-described FU tray 116 open message is displayed.

When the setting section 406 determines in S2114 that the flag is not set to 1 and determines in S2115 that the flag is set to 1 on the advanced settings screen for printing operation, the UI section 405 displays the message [4] in S2120. The message [4] is, for example, the message shown in [4] of FIG. 13B or in FIG. 14D, and the content of the above-described FU tray 116 close message is displayed.

When the setting section 406 determines in S2114 and 52117 that the flag is set to 1 on the advanced settings screen for printing operation, the UI section 405 displays the message [5] in S2121. The message [5] is, for example, the message shown in [5] of FIG. 13B or in FIG. 14E, and the contents of two messages, that is, the above-described double-sided printing prohibition message and the FU tray 116 open message, are displayed.

When the setting section 406 determines in S2114, 52117, and S2118 that the flag is set to 1 on the advanced settings screen for printing operation, the UI section 405 displays the message [6] in S2122. The message [6] is, for example, the message shown in [6] of FIG. 13B or in FIG. 14F, and the contents of two messages, that is, the above-described double-sided printing prohibition message and the FU tray 116 close message, are displayed.

When the setting section 406 determines in S2114 and 52117 that the flag is set to 1 and determines in S2118 that the flag is not set to 1 on the advanced settings screen for printing operation, no message is displayed. Then, for example, the advanced settings screen for printing operation, shown in FIG. 9A, is cleared, and the process proceeds to S2125.

In S2119 to S2122, the UI section 405 displays any one of the above-described various messages on the display 209 such that, for example, the advanced settings screen for printing operation, shown in FIG. 9A, is partially covered. Various messages displayed at this time contain OK button as shown in, for example, FIG. 14A to FIG. 14F.

In S2123, the UI section 405 continues displaying any one of the various messages on the display 209 until the UI section 405 acquires information that OK button has been depressed by the user. In S2123, when the UI section 405 has acquired information that OK button has been depressed by the user (Yes), the setting section 406 sets 0 for the flag in S2124. The setting section 406 may set 0 for the flag not only when the UI section 405 has acquired information that OK button has been depressed by the user but also when a certain period of time has elapsed from when any one of the various messages is displayed. When the setting section 406 sets 0 for the flag, the UI section 405 clears the any one of the various messages, displayed on the display 209. At this time, the UI section 405 clears the any one of the various messages and, at the same time, clears, for example, the advanced settings screen for printing operation, shown in FIG. 9A, and the process proceeds to S2125.

In S2125, the next step depends on whether the UI section 405 has acquired information that a button to be depressed to perform printing has been depressed by the user. The process does not proceed to the next step until the UI section 405 acquires information that the button to be depressed to perform printing has been depressed by the user. When the UI section 405 has acquired information that the button to be depressed to perform printing has been depressed by the user (Yes), the process proceeds to S2126. In S2126, the transmission and reception section 407 transmits image information to the printer controller 213. For various messages from S2119 to S2122, the UI section 405 displays any one of the various messages on the display 209 before the transmission and reception section 407 transmits first image information to the printer controller 213.

In the present embodiment, it is assumed that, according to messages displayed by the UI section 405 in S2119 to S2122, the user goes to the printer 212 and performs operation in accordance with instructions of the messages. When, for example, the UI section 405 displays the FU tray 116 open message in S2119, it is assumed that the user manually opens the FU tray 116. In the present embodiment, when a user executes a printing operation for an input print job, operation needed is informed to the user. Therefore, even when the user does not manually open the FU tray 116, but when the UI section 405 acquires in S2125 information that OK button has been depressed by the user, the process proceeds to the next step, and finally a printing operation can be executed. In this way, in the present embodiment, whether the FU tray 116 is opened or closed depends on user convenience.

In the present embodiment, after the UI section 405 has acquired information resulting from the fact that the user has completed the input of printing operation on the advanced settings screen for printing operation and depressed OK button, any one of various messages is displayed. Alternatively, such a process that S2113 is placed between S2124 and S2125 and the process returns to S2101 when S2113 is negative and the process returns to S2100 when S2125 is negative is applicable. With this process, each time a user changes settings of printing operation on the advanced settings screen for printing operation, the setting section 406 is able to set an applicable message, and the UI section 405 is able to display the message on the display 209.

When the UI section 405 has acquired information that FU output recommended paper is selected by a user in selecting a paper type in the present embodiment, the UI section 405 displays, for example, the message shown in FIG. 9B on the display 209. The UI section 405, for example, changes the paper source to the MP tray 140 and displays a message prompting to manually feed a sheet. When the UI section 405 acquires information that OK button contained in the message has been depressed by a user, the UI section 405 clears the message. When the message is cleared, the user is able to continue advanced settings for printing operation, including, for example, double-sided printing or single-sided printing, and the like.

In the present embodiment, it is assumed that, according to messages displayed by the UI section 405, the user goes to the printer 212 and performs operation in accordance with instructions of the messages. When, for example, the UI section 405 displays the FU tray 116 open message in S2119, it is assumed that the user manually opens the FU tray 116. In the present embodiment, opening or closing of the FU tray 116 may be automatically controlled.

When opening or closing of the FU tray 116 is automatically controlled, the FU tray 116 automatically opens in the period from when the UI section 405 acquires information that the user has depressed OK button in response to the message of S2119 or S2121, to S2125. The FU tray 116 automatically closes in the period from when the UI section 405 acquires information that the user has depressed OK button in response to the message of S2120 or S2122, to S2125. At this time, the button to be depressed by the user to perform printing cannot be depressed until automatic opening or closing of the FU tray 116 completes.

Here, the drive of the FU tray 116 when the FU tray 116 is automatically opened or closed will be described. The image forming apparatus 10 includes a driving section at a hinge-side part (not shown) that is used when the FU tray 116 is opened or closed. The driving section includes the FU tray open/close motor 330 that is a driving source capable of rotating in forward and reverse directions. A reduction gear train (not shown) that is a drive transmission unit transmits the drive of the FU tray open/close motor 330 to a hinge opening/closing shaft (not shown) and a hinge lift shaft (not shown) to open or close the FU tray 116.

Summary of Fifth Embodiment

As described above, in the present embodiment, the UI section 405 displays on the display 209 a message for selecting a sheet output tray to which a user intends to output a sheet according to a combination of paper type information, a selected status of double-sided printing or single-sided printing, and a selected status of sheet output section. Then, the UI section 405 displays a message prompting to perform operation needed for the FU tray 116. Thus, when the user selects FU output recommended paper, it is possible to perform printing according to user's intention, so usability improves. A user performs necessary operation to the printer 212 according to a combination of a print job, so it is possible to reduce the curling of FU output recommended paper or an inability to perform double-sided printing.

Sixth Embodiment

In the fifth embodiment, the case where whether a user opens or closes the FU tray 116 in accordance with a message displayed by the UI section 405 depends on user convenience and the process proceeds to the next step when the user depresses OK button has been described. In the fifth embodiment, the case where either of the case where a detection result of the FU tray open/close sensor 117 is used and the case where a detection result of the FU tray open/close sensor 117 is not used is applicable has been described. In the present embodiment, the case where the process does not proceed to the next step until the open/close operation of the FU tray 116 in response to a message displayed by the UI section 405 is detected by using a detection result of the FU tray open/close sensor 117 will be described. Thus, it is possible to reduce a curl remaining in FU output recommended paper or an inability to perform double-sided printing.

Hereinafter, control at the time when the CPU 201 uses the application 404 to acquire a detection result of the FU tray open/close sensor 117 will be described with reference to the block diagram of FIG. 4B again.

When the application 404 functions as the setting section 406, the application 404 selects and sets a message to be displayed on the display 209 according to a combination as will be described later. The combination is specifically a combination of a paper type selected by a user and a selected status of double-sided printing or single-sided printing. A message to be displayed at this time is continuously displayed on the display 209 until an appropriate open/closed state is detected in accordance with a detection result of the FU tray open/close sensor 117 (hereinafter, also referred to as an open/closed state of the FU tray 116).

When the application 404 functions as the transmission and reception section 407, the application 404 communicates between the host computer 200 and the printer controller 213. With this communication, the transmission and reception section 407 functions as an acquisition unit that acquires a detection result of the FU tray open/close sensor 117. An acquisition step in which the transmission and reception section 407 acquires a detection result of the FU tray open/close sensor 117 includes a first transmission step of transmitting information for requesting a detection result and a reception step of receiving the detection result. Transmission of a print job is performed in a second transmission step different from the first transmission step. The second transmission step is executed, for example, after a user completes advanced settings for printing operation and closes the advanced settings screen for printing operation.

In the present embodiment, after the FU tray 116 open message or the FU tray 116 close message is displayed on the display 209, the open/closed state of the FU tray 116 is acquired. A message displayed in the case where the setting section 406 sets the FU tray 116 open flag or the FU tray 116 close flag again will be described.

When, for example, the FU tray 116 open message shown in [3] of FIG. 13B and in FIG. 14E is displayed, the message "FU TRAY 116 IS CLOSED." informing a user of the open/closed state of the FU tray 116 itself may be displayed. When, for example, the FU tray 116 close message shown in [4] of FIG. 13B and in FIG. 14F is displayed, the message "FU TRAY 116 IS OPEN." informing a user of the open/closed state of the FU tray 116 itself may be displayed.

Figure 16A:
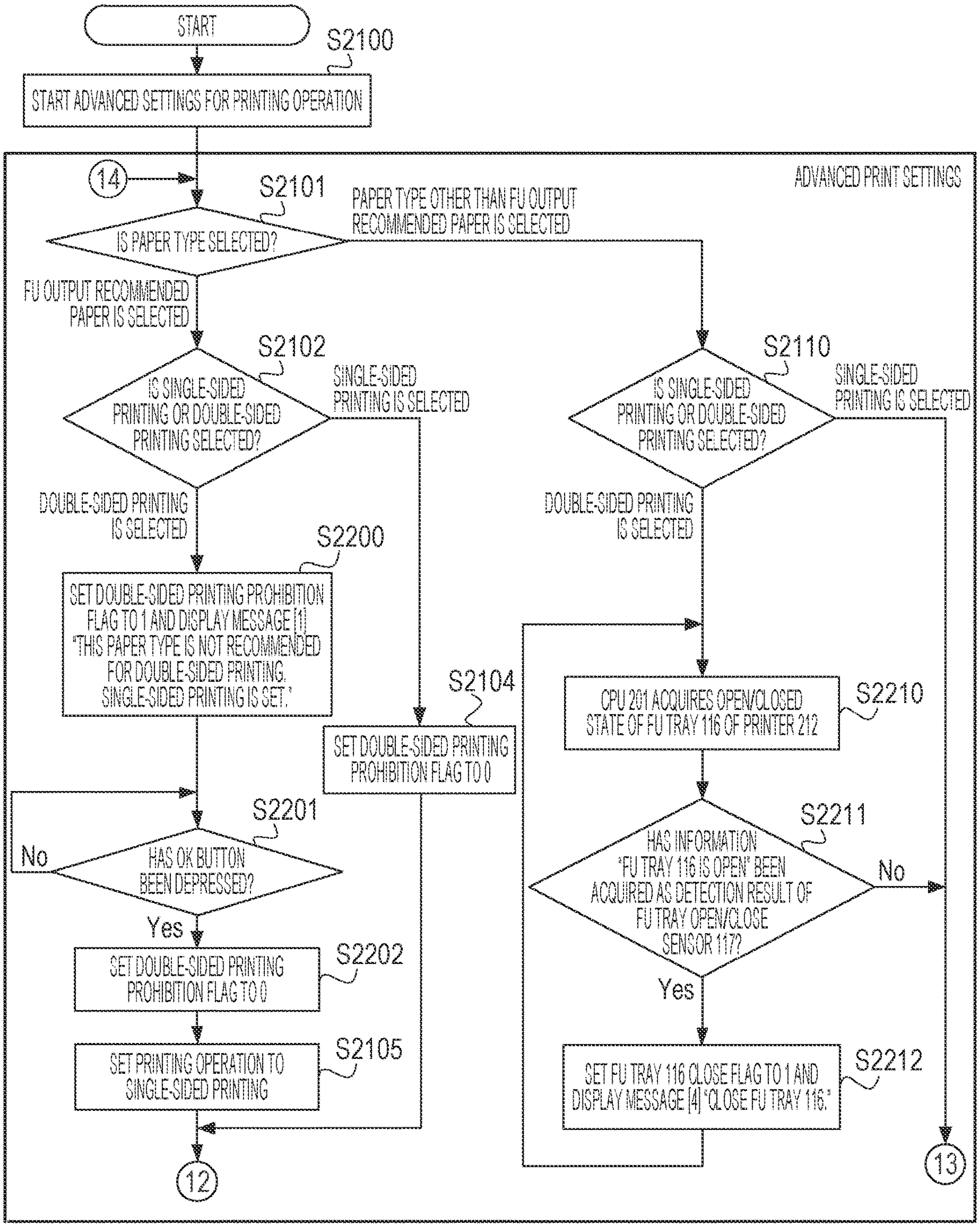
FIG. 16A is a flowchart of a process in the sixth embodiment.
Figure 16B:
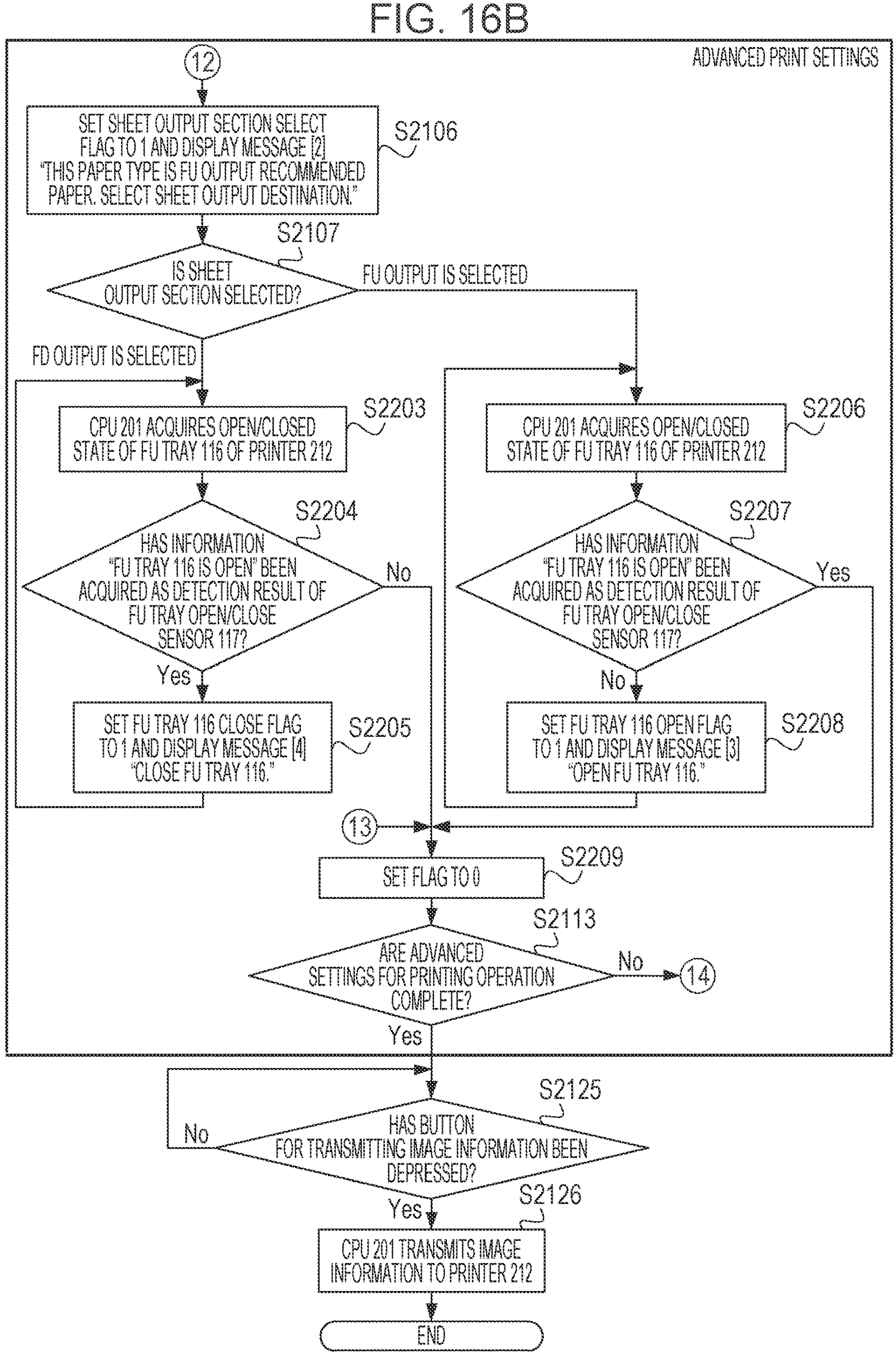
FIG. 16B is a flowchart of the process in the sixth embodiment.

Hereinafter, a process that the CPU 201 informs a message to a user according to a combination of information on image formation, selected by a user, by using the application 404 will be described with reference to the flowchart shown in FIG. 16A and FIG. 16B. Like step numbers are assigned to the same steps as those of the above-described embodiments, and the description thereof is omitted. The image forming process and the hardware configuration are also the same as those of the fifth embodiment, so the description thereof is omitted. In the present embodiment, each time a user changes a selected printing operation on the advanced settings screen for printing operation, the setting section 406 sets an applicable message, and the UI section 405 displays the message on the display 209.

Initially, when the host computer 200 receives a command to start advanced settings for printing operation from a user, the process proceeds to S2100. In S2100, when the UI section 405 causes the display 209 to display the advanced settings screen for printing operation, the advanced settings for printing operation start, and the process proceeds to S2101.

In S2101, when the UI section 405 has acquired information that a paper type other than FU output recommended paper is selected by the user in selecting a paper type, the process proceeds to S2110. In S2110, when the UI section 405 has acquired information that single-sided printing is selected in selecting double-sided printing or single-sided printing, the process proceeds to S2209. In S2209, the setting section 406 sets 0 for the FU tray 116 close flag for double-sided printing, and the process proceeds to S2113. In S2113, the next step depends on whether the UI section 405 has acquired information resulting from the fact that the user has completed the input of printing operation on the advanced settings screen for printing operation and depressed OK button.

In S2110, when the UI section 405 has acquired information that double-sided printing is selected by the user in selecting double-sided printing or single-sided printing, the process proceeds to S2210. In S2210, the transmission and reception section 407 acquires the open/closed state of the FU tray 116 of the printer 212. In S2211, when the transmission and reception section 407 has acquired a detection result that “the FU tray 116 is open” as a detection result of the FU tray open/close sensor 117 of the printer 212 (Yes), the process proceeds to S2212. In S2212, the setting section 406 sets 1 for the FU tray 116 close flag for double-sided printing, the UI section 405 displays the FU tray 116 close message on the display 209, and the process returns to S2210. S2210, S2211, and S2212 are repeated until the transmission and reception section 407 acquires a detection result that “the FU tray 116 is closed” as a detection result of the FU tray open/close sensor 117 of the printer 212 in S2211 (until S2211 is negative).

In S2211, when the transmission and reception section 407 has not acquired a detection result that “the FU tray 116 is open” as a detection result of the FU tray open/close sensor 117 of the printer 212 (when the FU tray 116 is closed) (No), the process proceeds to S2209. In S2209, the setting section 406 sets 0 for the FU tray 116 close flag for double-sided printing, and the process proceeds to S2113.

The UI section 405 may also clear the FU tray 116 close message when the UI section 405 has acquired information that OK button has been depressed by the user or when a certain period of time has elapsed from when the FU tray 116 close message is displayed. At this time, the setting section 406 does not clear the FU tray 116 close flag. For this reason, even when the UI section 405 clears a message, OK button on the advanced settings screen for printing operation or the button to be depressed by a user to execute printing may be not enabled. A similar configuration may be applied for the FU tray 116 open message in the description below in the present embodiment.

In S2101, when the UI section 405 has acquired information that FU output recommended paper is selected by the user in selecting a paper type, the process proceeds to S2102. In S2102, when the UI section 405 has acquired information that single-sided printing is selected by the user in selecting double-sided printing or single-sided printing, the process proceeds to S2104. In S2104, the setting section 406 sets 0 for the double-sided printing prohibition flag, and the process proceeds to S2106.

In S2102, when the UI section 405 has acquired information that double-sided printing is selected by the user in selecting double-sided printing or single-sided printing, the process proceeds to S2200. In S2200, the setting section 406 sets 1 for the double-sided printing prohibition flag, the UI section 405 displays the double-sided printing prohibition message on the display 209, and the process proceeds to S2201. Until the setting section 406 acquires information that OK button in the double-sided printing prohibition message has been depressed by the user in S2201 (while S2201 is negative), the UI section 405 continues displaying the double-sided printing prohibition message on the display 209 in S2200. In S2201, when the setting section 406 has acquired information that OK button in the double-sided printing prohibition message has been depressed by the user (Yes), the process proceeds to S2202. In S2202, the setting section 406 sets 0 for the double-sided printing prohibition flag, and the process proceeds to S2105. In S2105, the setting section 406 changes the printing operation to single-sided printing, and the process proceeds to S2106.

In S2106, this is the case where the user subjects FU output recommended paper to single-sided printing, and whether to output a sheet to the FD tray 115 or output a sheet to the FU tray 116 depends on user convenience.

Accordingly, the setting section 406 sets 1 for the sheet output section select flag. The UI section 405 informs that the paper type selected by the user is FU output recommended paper. Furthermore, the UI section 405 displays the sheet output section select message on the display 209 as the first message inquiring about whether a user desires to output a sheet to the FD tray 115 or output a sheet to the FU tray 116, and the process proceeds to S2107.

In S2107, when the UI section 405 has acquired information that FD output is selected by the user in selecting a sheet output section, the process proceeds to S2203. In S2203, the transmission and reception section 407 acquires the open/closed state of the FU tray 116 of the printer 212.

In S2204, when the transmission and reception section 407 has acquired a detection result that “the FU tray 116 is open” as a detection result of the FU tray open/close sensor 117 of the printer 212 (Yes), the process proceeds to S2205. In S2205, the setting section 406 sets 1 for the FU tray 116 close flag for FD output of a sheet. Then, the UI section 405 shows the FU tray 116 close message on the display 209, and the process returns to S2203. S2203, S2204, and S2205 are repeated until the transmission and reception section 407 does not acquire a detection result that “the FU tray 116 is open” as a detection result of the FU tray open/close sensor 117 of the printer 212 in S2204 (until S2204 is negative).

In S2204, when the transmission and reception section 407 has not acquired a detection result that “the FU tray 116 is open” as a detection result of the FU tray open/close sensor 117 of the printer 212 (when the FU tray 116 is closed) (No), the process proceeds to S2209. In S2209, the setting section 406 sets 0 for the FU tray 116 close flag, and the process proceeds to S2113.

In S2107, when the UI section 405 has acquired information that FU output is selected by the user in selecting a sheet output section, the process proceeds to S2206. In S2206, the transmission and reception section 407 acquires the open/closed state of the FU tray 116 of the printer 212.

In S2207, when the transmission and reception section 407 has not acquired a detection result that “the FU tray 116 is open” as a detection result of the FU tray open/close sensor 117 of the printer 212 (No), the process proceeds to S2208. In S2208, the setting section 406 sets 1 for the FU tray 116 open flag for FU output of a sheet. Then, the UI section 405 shows the FU tray 116 open message on the display 209, and the process returns to S2206. S2206, S2207, and S2208 are repeated until the transmission and reception section 407 acquires a detection result that “the FU tray 116 is open” as a detection result of the FU tray open/close sensor 117 of the printer 212 in S2207 (until S2207 is affirmative).

In S2207, when the transmission and reception section 407 has acquired a detection result that "the FU tray 116 is open" as a detection result of the FU tray open/close sensor 117 of the printer 212 (Yes), the process proceeds to S2209. In S2209, the setting section 406 sets 0 for the FU tray 116 close flag, and the process proceeds to S2113.

In S2113, the next step depends on whether the UI section 405 has acquired information resulting from the fact that the user has completed the input of printing operation on the advanced settings screen for printing operation and depressed OK button. In S2113, when the UI section 405 has not acquired information that the user has completed the input of printing operation and depressed OK button (No), the advanced settings screen for printing operation remains displayed, and the steps from S2101 are repeated. Thus, the user is able to continue advanced settings for printing operation.

In S2113, when the UI section 405 has acquired information that the user has completed the input of printing operation and depressed OK button (Yes), the process proceeds to S2125. In S2125, the next step depends on whether the UI section 405 has acquired information that a button to be depressed to perform printing has been depressed by the user. The process does not proceed to the next step until the UI section 405 acquires information that the button to be depressed to perform printing has been depressed by the user. When the UI section 405 has acquired information that the button to be depressed to perform printing has been depressed by the user (Yes), the process proceeds to S2126. In S2126, the transmission and reception section 407 transmits image information to the printer controller 213. For various messages shown in, for example, FIG. 14A to FIG. 14F, the UI section 405 displays any one of the various messages on the display 209 before the transmission and reception section 407 transmits first image information to the printer controller 213.

In the present embodiment, it is assumed that, according to messages displayed by the UI section 405, the user goes to the printer 212 and performs operation in accordance with instructions of the messages. When, for example, the UI section 405 displays the FU tray 116 open message in S2206, it is assumed that the user manually opens the FU tray 116. In the present embodiment, opening or closing of the FU tray 116 may be automatically controlled. When opening or closing of the FU tray 116 is automatically controlled, the FU tray 116 automatically closes in S2205 or S2212. The message to be displayed at this time may be not necessarily, for example, the message shown in [4] of FIG. 13B or in FIG. 14D. The message may be the message "FU TRAY 116 CLOSES". When opening or closing of the FU tray 116 is automatically controlled, the FU tray 116 automatically opens in S2208. The message to be displayed at this time may be not necessarily, for example, the message shown in [3] of FIG. 13B or in FIG. 14C. The message may be the message "FU TRAY 116 OPENS".

Summary of Sixth Embodiment

As described above, in the present embodiment, the UI section 405 displays on the display 209 a message for selecting a sheet output tray to which a user intends to output a sheet according to a combination of paper type information, a selected status of double-sided printing or single-sided printing, and a selected status of sheet output section. Then, the UI section 405 displays a message prompting to perform operation needed for the FU tray 116. The case where the process does not proceed to the next step until the open/close operation of the FU tray 116 is detected as a result of the fact that a user performs necessary operation on the printer 212 in response to a message displayed by the UI section 405 has been described. Thus, it is possible to reduce a curl remaining in FU output recommended paper or an inability to perform double-sided printing. When opening or closing of the FU tray 116 is automatically controlled, a user does not need to go to the printer 212 and manually operate the FU tray 116. Therefore, even when the distance between the installation location of the host computer 200 and the installation location of the printer 212 is long, it is possible to execute a printing operation according to user's intention.

Seventh Embodiment

In the fifth and sixth embodiments, the CPU 201 uses the application 404 to inform a message only when user's operation is needed according to a combination of a print job selected by the user and an open/closed state of the FU tray 116. In addition, the case where a user is able to perform both input of a print job and checking of a message on the host computer 200 has been described. In the present embodiment, the case where, in the printer controller 213, the CPU 214 displays any one of various messages as described above on the main body display 145 according to information on a print job, received from the host computer 200, will be described. The CPU 214 is capable of communicating information with the host computer 200 by using the bidirectional interface (interface) 211 via the input section 218 and provides information or the like in the printer 212 to the host computer 200. Therefore, a message to be displayed on the main body display 145 may also be displayed on the display 209.

Even when the image forming apparatus 10 does not include the main body display 145, a user is able to check a message on the display 209 of a PC, smartphone, or the like that is the host computer 200. Alternatively, the image forming apparatus 10 may be equipped with a device that provides a voice, and may inform, for example, the message content shown in FIG. 13B by voice. Alternatively, the image forming apparatus 10 may be equipped with an LED lamp, and may inform, for example, the message content shown in FIG. 13B by a pattern of lighting or blinking of the lamp, a change in color, and the like.

FIG. 10 is a block diagram showing functions in the case where the CPU 214 loads the control program stored in the program ROM of the ROM 216 or the external memory (not shown) onto the RAM 215 and executes the control program. The printer controller 213 mainly functions as a UI section 501 and a setting section 502. The functions of the UI section 501 and setting section 502 at this time are the same as the functions of the UI section 405 and setting section 406. In the present embodiment, the CPU 302 may execute a process to be executed by the CPU 214. At this time, the CPU 302 loads the control program stored in the program ROM of the ROM 303 or the external memory (not shown) onto the RAM 304 and executes the control program.

Figure 17A:
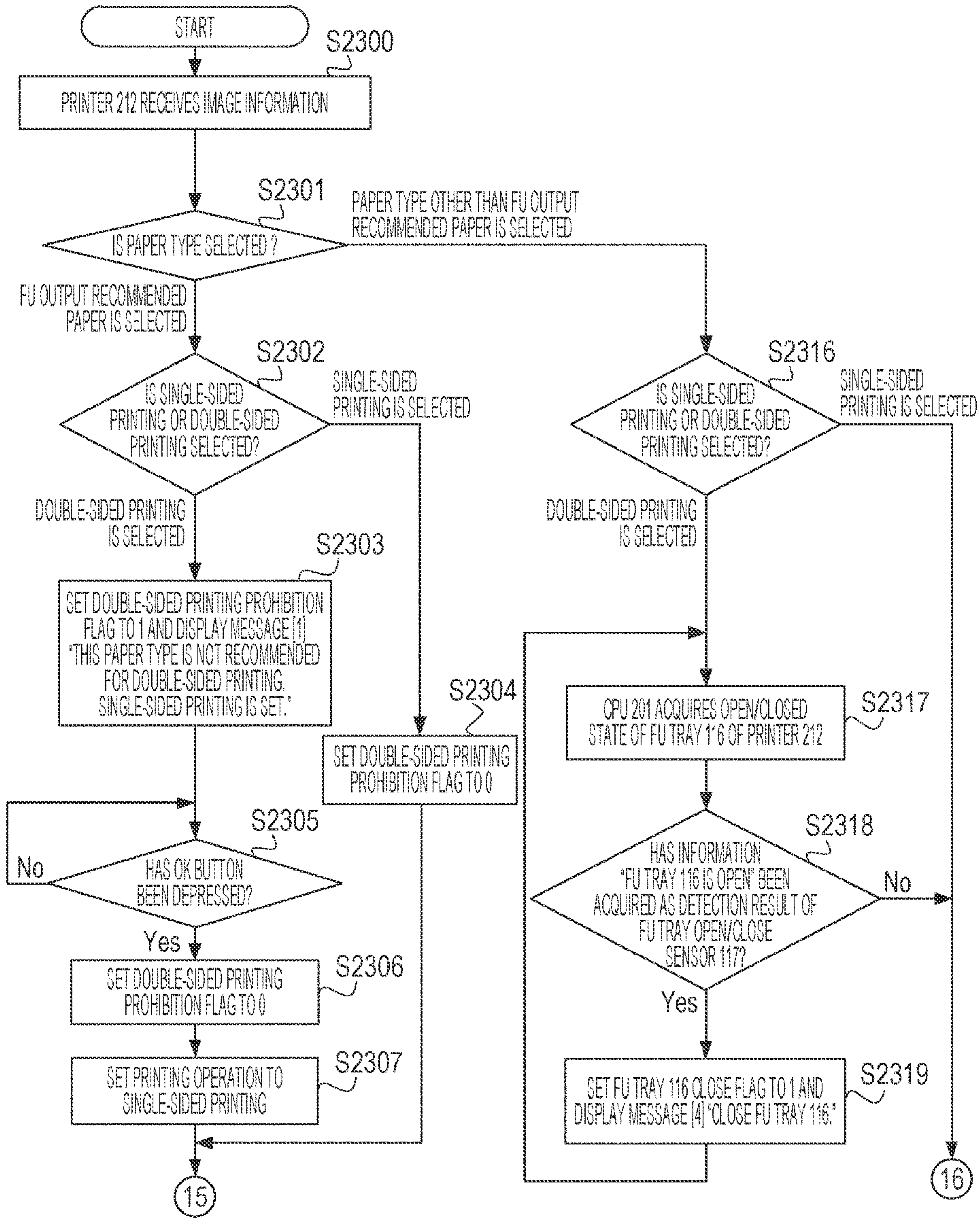
FIG. 17A is a flowchart of a process in a seventh embodiment.
Figure 17B:
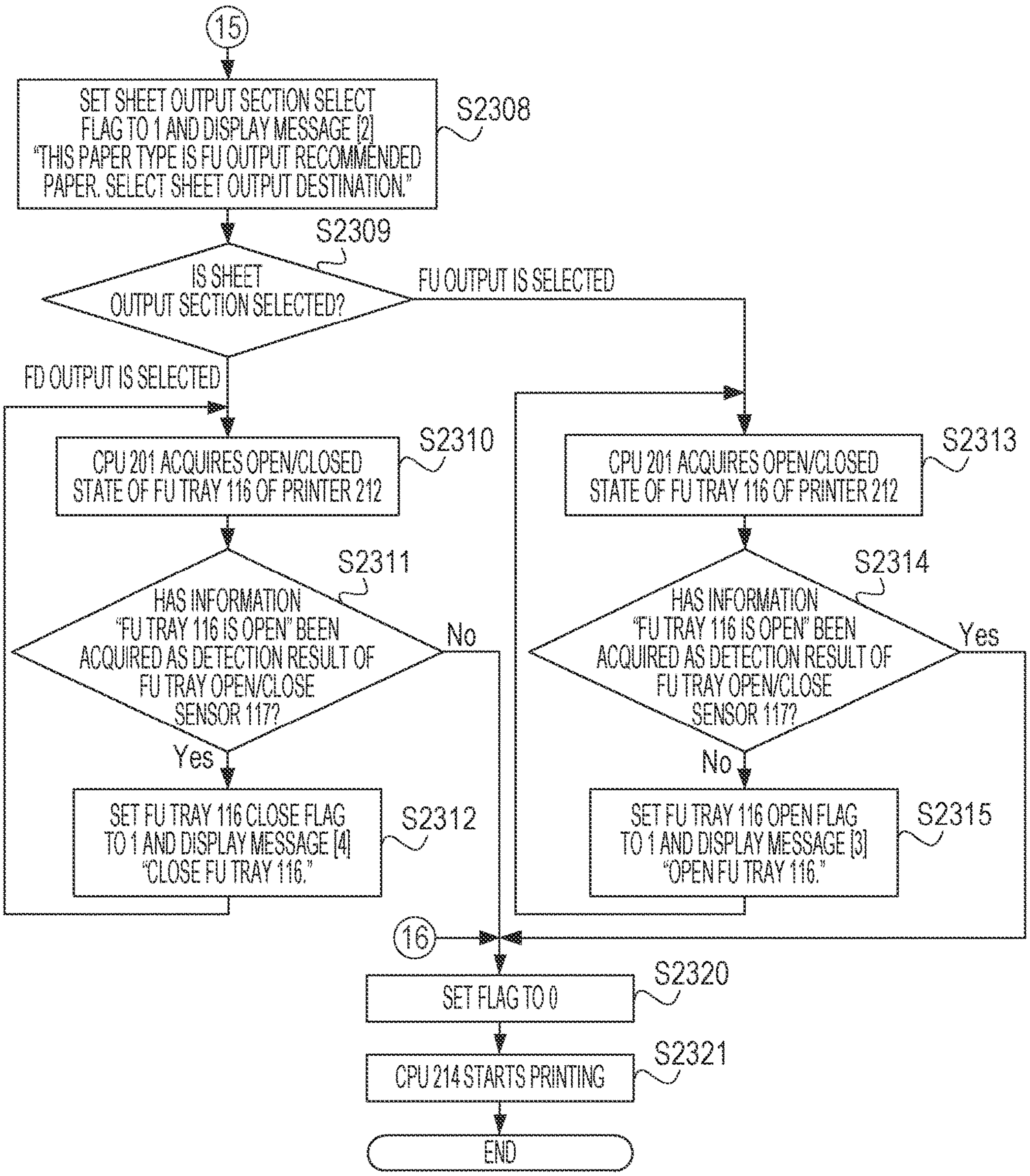
FIG. 17B is a flowchart of the process in the seventh embodiment.

Hereinafter, a process that the CPU 214 executes at the time of informing a message to a user according to a combination of a print job, received from the host computer 200, will be described with reference to the flowchart shown in FIG. 17A and FIG. 17B. Like step numbers are assigned to the same steps as those of the above-described embodiments, and the description thereof is omitted. The image forming process and the hardware configuration are also the same as those of the above-described embodiments, so the description thereof is omitted.

In S2300, when the printer controller 213 receives information on a print job from the host computer 200, the process proceeds to S2316. In S2316, when the UI section 501 has acquired information that a paper type other than FU output recommended paper is selected by the user in selecting a paper type, the process proceeds to S2320. In S2320, the setting section 502 sets 0 for the FU tray 116 close flag for double-sided printing, and the process proceeds to S2321. In S2321, the CPU 214 starts printing.

In S2316, when the UI section 501 has acquired information that double-sided printing is selected by the user in selecting double-sided printing or single-sided printing, the process proceeds to S2317. In S2317, the transmission and reception section 407 acquires the open/closed state of the FU tray 116 of the printer 212.

In S2318, when the transmission and reception section 407 has acquired a detection result that "the FU tray 116 is open" as a detection result of the FU tray open/close sensor 117 of the printer 212 (Yes), the process proceeds to S2319. In S2319, the setting section 502 sets 1 for the FU tray 116 close flag for double-sided printing. Then, the UI section 501 shows the FU tray 116 close message on at least one of the main body display 145 and the display 209, and the process returns to S2317. S2317, S2318, and S2319 are repeated until the transmission and reception section 407 acquires a detection result that "the FU tray 116 is closed" as a detection result of the FU tray open/close sensor 117 of the printer 212 in S2318 (until S2318 is negative).

In S2318, when the transmission and reception section 407 has not acquired a detection result that "the FU tray 116 is open" as a detection result of the FU tray open/close sensor 117 of the printer 212 (when the FU tray 116 is closed) (No), the process proceeds to S2320. In S2320, the setting section 502 sets 0 for the FU tray 116 close flag for double-sided printing, and the process proceeds to S2321. In S2321, the CPU 214 starts printing.

The UI section 501 may also clear the FU tray 116 close message when the UI section 501 has acquired information that OK button has been depressed by the user or when a certain period of time has elapsed from when the FU tray 116 close message is displayed. At this time, the setting section 502 does not clear the FU tray 116 close flag. For this reason, even when the UI section 501 clears a message, OK button on the advanced settings screen for printing operation or the button to be depressed by a user to execute printing may be not enabled. A similar configuration may be applied for the FU tray 116 open message in the description below in the present embodiment.

In S2301, when the UI section 501 has acquired information that FU output recommended paper is selected by the user in selecting a paper type, the process proceeds to S2302. In S2302, when the UI section 501 has acquired information that single-sided printing is selected by the user in selecting double-sided printing or single-sided printing, the process proceeds to S2304. In S2304, the setting section 502 sets 0 for the double-sided printing prohibition flag, and the process proceeds to S2308.

In S2302, when the UI section 501 has acquired information that double-sided printing is selected by the user in selecting double-sided printing or single-sided printing, the process proceeds to S2303. In S2303, the setting section 502 sets 1 for the double-sided printing prohibition flag, the UI section 501 displays the double-sided printing prohibition message on at least one of the main body display 145 and the display 209, and the process proceeds to S2305. Until the setting section 502 acquires information that OK button in the double-sided printing prohibition message has been depressed by the user in S2305 (while S2305 is negative), the process returns to S2303. In S2303, the UI section 501 continues displaying the double-sided printing prohibition message on the at least one of the main body display 145 and the display 209. In S2305, when the setting section 502 has acquired information that OK button in the double-sided printing prohibition message has been depressed by the user (Yes), the process proceeds to S2306. In S2306, the setting section 502 sets 0 for the double-sided printing prohibition flag, and the process proceeds to S2307. In S2307, the setting section 502 changes the printing operation to single-sided printing, and the process proceeds to S2308.

In S2308, this is the case where the user subjects FU output recommended paper to single-sided printing, and whether to output a sheet to the FD tray 115 or output a sheet to the FU tray 116 depends on user convenience. Accordingly, the setting section 502 sets 1 for the sheet output section select flag. The UI section 501 informs that the paper type selected by the user is FU output recommended paper. A sheet output section select message inquiring about whether a user desires to output a sheet to the FD tray 115 or output a sheet to the FU tray 116 is displayed on at least one of the main body display 145 and the display 209. Then, the process proceeds to S2309.

In S2309, when the UI section 501 has acquired information that FD output is selected by the user in selecting a sheet output section, the process proceeds to S2310. In S2310, the CPU 214 acquires the open/closed state of the FU tray 116 of the printer 212.

In S2311, when the CPU 214 has acquired a detection result that "the FU tray 116 is open" as a detection result of the FU tray open/close sensor 117 of the printer 212 (Yes), the process proceeds to S2312. In S2312, the setting section 502 sets 1 for the FU tray 116 close flag for FD output of a sheet. Then, the UI section 501 shows the FU tray 116 close message on at least one of the main body display 145 and the display 209, and the process returns to S2310. S2310, S2311, and S2312 are repeated until the CPU 214 does not acquire a detection result that "the FU tray 116 is open" as a detection result of the FU tray open/close sensor 117 of the printer 212 in S2311 (until S2311 is negative).

In S2311, when the CPU 214 has not acquired a detection result that "the FU tray 116 is open" as a detection result of the FU tray open/close sensor 117 of the printer 212 (when the FU tray 116 is closed) (No), the process proceeds to S2320. In S2320, the setting section 502 sets 0 for the FU tray 116 close flag, and the process proceeds to S2321. In S2321, the CPU 214 starts printing.

In S2309, when the UI section 501 has acquired information that FU output is selected by the user in selecting a sheet output section, the process proceeds to S2313. In S2313, the CPU 214 acquires the open/closed state of the FU tray 116 of the printer 212.

In S2314, when the CPU 214 has not acquired a detection result that "the FU tray 116 is open" as a detection result of the FU tray open/close sensor 117 of the printer 212 (No), the process proceeds to S2315. In S2315, the setting section 502 sets 1 for the FU tray 116 open flag for FU output of a sheet. Then, the UI section 501 shows the FU tray 116 open message on at least one of the main body display 145 and the display 209, and the process returns to S2313. S2313, S2314, and S2315 are repeated until the CPU 214 acquires a detection result that "the FU tray 116 is open" as a detection result of the FU tray open/close sensor 117 of the printer 212 in S2314 (until S2314 is affirmative).

In S2314, when the CPU 214 has acquired a detection result that "the FU tray 116 is open" as a detection result of the FU tray open/close sensor 117 of the printer 212 (Yes), the process proceeds to S2320. In S2320, the setting section 502 sets 0 for the FU tray 116 close flag, and the process proceeds to S2321. In S2321, the CPU 214 starts printing.

In the present embodiment, the UI section 501 displays a message prompting to perform operation needed for the FU tray 116 as the second message according to a combination of a selected status of sheet output section and an open/closed state of the FU tray 116. The FU tray open/close sensor 117 does not necessarily detect an open/closed state of the FU tray 116. In accordance with the fact that the UI section 501 has acquired in S2309 information that a sheet output section is selected by a user, the setting section 502 may set 1 for the flag for displaying the second message, and the UI section 501 may display the second message. In this case, the process proceeds to the next step when the UI section 501 has acquired information that OK button contained in the message has been depressed by the user. The setting section 502 may set 0 for the flag even when the UI section 501 has not acquired information that OK button has been depressed by the user but when a certain period of time has elapsed from when any one of various messages is displayed. When the setting section 502 sets 0 for the flag, the UI section 501 clears the any one of the various messages, displayed on the display 209, and the process proceeds to the next step.

In the present embodiment, it is assumed that, according to messages displayed by the UI section 501, the user goes to the printer 212 and performs operation in accordance with instructions of the messages. When, for example, the UI section 501 displays the FU tray 116 open message in S2206, it is assumed that the user manually opens the FU tray 116. In the present embodiment, opening or closing of the FU tray 116 may be automatically controlled. When opening or closing of the FU tray 116 is automatically controlled, the FU tray 116 automatically closes in S2312 or S2319. The message to be displayed at this time may be not necessarily, for example, the message shown in [4] of FIG. 13B or in FIG. 14D. The message may be the message "FU TRAY 116 CLOSES". When opening or closing of the FU tray 116 is automatically controlled, the FU tray 116 automatically opens in S2315. The message to be displayed at this time may be not necessarily, for example, the message shown in [3] of FIG. 13B or in FIG. 14C. The message may be the message "FU TRAY 116 OPENS".

Summary of Seventh Embodiment

As described above, in the present embodiment, the case where the CPU 214 displays a message on at least one of the main body display 145 and the display 209 according to information on a print job, received from the host computer 200, has been described. Information on a print job at this time is a combination of paper type information, a selected status of double-sided printing or single-sided printing, and a selected status of sheet output section. According to this combination, the UI section 501 displays the first message on the at least one of the main body display 145 and the display 209. The message to be displayed by the UI section 501 at this time is a message for selecting a sheet output tray to which a user intends to output a sheet. Then, the UI section 501 displays a message prompting to perform operation needed for the FU tray 116 as the second message according to a combination of a selected status of sheet output section and an open/closed state of the FU tray 116.

In the present embodiment, the case where the process does not proceed to the next step until the open/close operation of the FU tray 116 is detected as a result of the fact that a user performs necessary operation on the printer 212 in response to a message displayed by the UI section 501 has been described. Thus, it is possible to reduce a curl remaining in FU output recommended paper or an inability to perform double-sided printing. When opening or closing of the FU tray 116 is automatically controlled, a user does not need to go to the printer 212 and manually operate the FU tray 116. Therefore, even when the distance between the installation location of the host computer 200 and the installation location of the printer 212 is long, it is possible to execute a printing operation according to user's intention.

Eighth Embodiment

When printing operation that forms images on a plurality of sheets and outputs the sheets to the FD tray is performed, if the FU tray is brought into the open state before the last sheet of the plurality of sheets is output to the FD tray, a set of sheets is split into a set on the FD tray and a set on the FU tray. In addition, the stacking order of sheets output to the FD tray is reverse to the stacking order of sheets output to the FU tray. For this reason, as, for example, the number of sheets output to the FU tray increases, sorting the stacking order of sheets output to the FU tray takes time and effort when sheets output to the FU tray are brought together into a set of sheets output to the FD tray. For this reason, this may lead to a decrease in usability. Even when the FU tray is brought into the open state before the last sheet of the plurality of sheets is output to the FD tray, time and effort to sort the stacking order of sheets is reduced.

Configuration of Image Forming Apparatus

Figure 18:
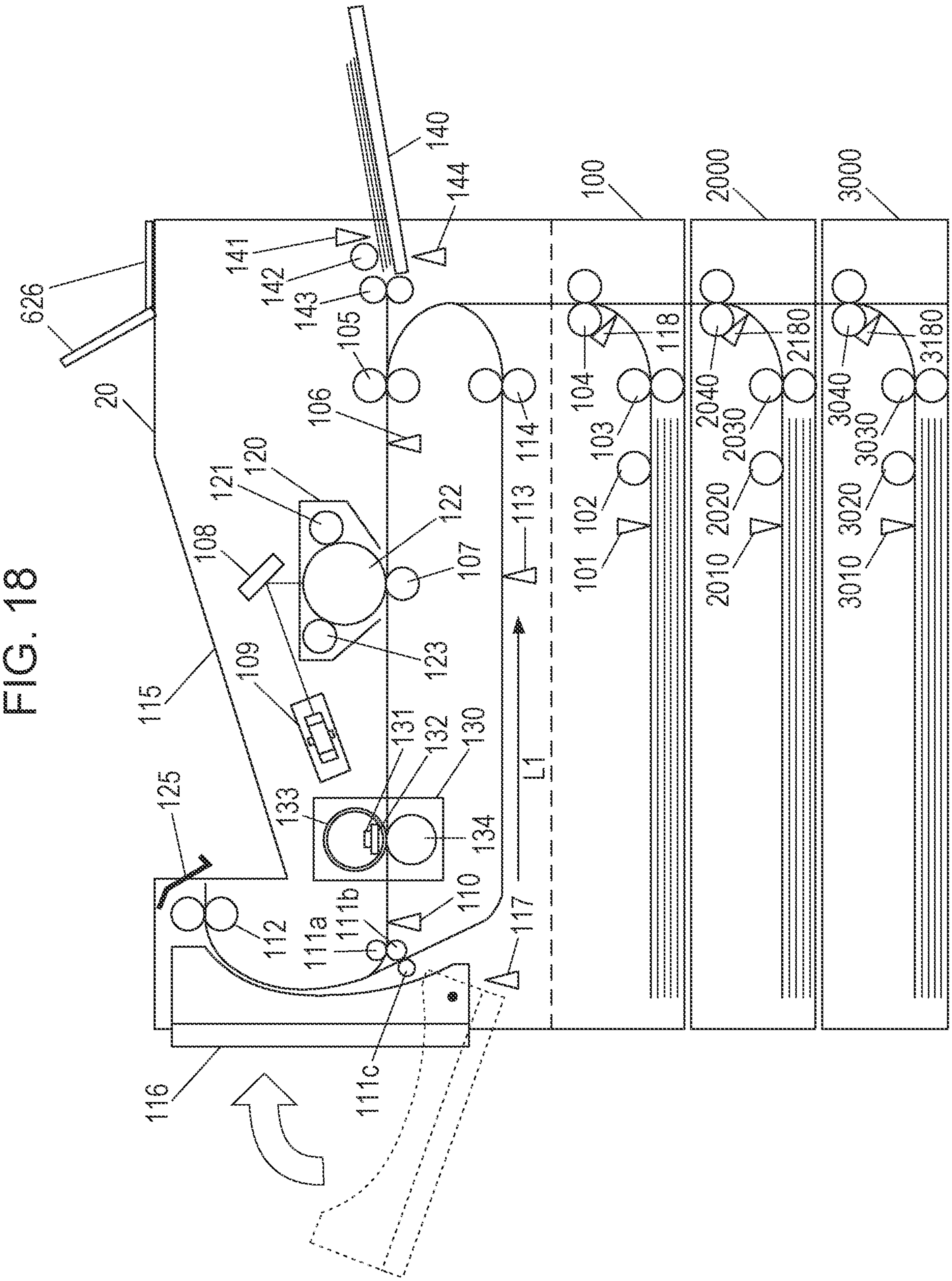
FIG. 18 is a schematic configuration diagram of an image forming apparatus.

FIG. 18 is a schematic configuration diagram of an image forming apparatus 20 of the present embodiment. Like reference numerals are assigned to the same components to those of the image forming apparatus 10 described with reference to FIG. 1, and the description thereof is omitted.

As described above, components concerned with a series of image forming process of forming an image on a sheet are referred to as image forming unit. Components concerned with feeding of a sheet to the image forming unit are referred to as sheet feeding unit. A sheet on which toner is fixed by the image forming unit is conveyed by the set of FU rollers 111 that is driven by a DC brushless motor 622 and the pair of FD rollers 112 that is driven by a stepping motor 623 and is output to the FD tray 115.

The image forming apparatus 20 includes the FD tray 115 to which a sheet is output face down (hereinafter, also referred to as FD output) and the FU tray 116 to which a sheet is output face up (hereinafter, also referred to as FU output). The sheet output conveying path to the FD tray 115 and the sheet output conveying path to the FU tray 116 are different.

The sheet output conveying path to the FD tray 115 is a conveying path along which a sheet is conveyed from the set of FU rollers 111, passes through the pair of FD rollers 112 and is then stacked on the FD tray 115. The sheet output conveying path to the FD tray 115 is also referred to as first sheet output conveying path. When a sheet having an image on its upper surface is conveyed along the first sheet output conveying path, the sheet is FD output to the FD tray 115 such that the image surface faces downward (face down) (FD). An FD tray sheet output sensor 125 is capable of recording the number of sheets output to the FD tray 115. The FD tray 115 is also referred to as first sheet output section.

The FU tray 116 is an opening/closing member capable of being switched between an open position and a close position. When the FU tray 116 is in the close position, the FU tray 116 serves as a guiding portion that guides a sheet to the FD tray 115. When the FU tray 116 is in the open position, the FU tray 116 serves as not a guiding portion that guides a sheet to the FD tray 115 but a sheet output tray capable of carrying sheets.

The sheet output conveying path to the FU tray 116 is a conveying path along which a sheet is conveyed from the set of FU rollers 111 and is stacked on the FU tray 116. The sheet output conveying path to the FU tray 116 is also referred to as second sheet output conveying path. When a sheet having an image on its upper surface is conveyed along the second sheet output conveying path, the sheet is FU output to the FU tray 116 such that the image surface faces upward (face up) (FU). The FU tray 116 is also referred to as second sheet output section.

The FU tray open/close sensor 117 is an open/close signal output unit that outputs a first signal in the closed state of the FU tray 116 and that outputs a second signal in the open state. A CPU 601 detects the open/closed state in accordance with the first signal or second signal output from the FU tray open/close sensor 117. In other words, the FU tray open/close sensor 117 functions as a detection unit that detects whether the FU tray 116 is in the open state or in the closed state. The detailed function will be described later.

When sheets are fed from the MP tray 140, the CPU 601 rotates the MP sheet feeding roller 142 by driving an MP sheet feeding solenoid 621 via an I/O port 606. The MP sheet feeding roller 142 feeds sheets stacked on the MP tray 140 to the pair of MP separation rollers 143. The pair of MP separation rollers 143 separates one of the conveyed sheets fed by the MP sheet feeding roller 142 and conveys the sheet to the pair of conveying rollers 105. The sheet fed to the pair of conveying rollers 105 is conveyed to the photosensitive drum 122. After the sheet is conveyed to the photosensitive drum 122, a toner image is formed and fixed onto the sheet as in the case of a sheet fed from the sheet feeding cassette 100 and is output to the FU tray 116 or the FD tray 115.

The presence or absence of sheets stacked on the MP tray 140 is detected by an MP paper presence sensor 141. Sheets stacked on the MP tray 140 are fed to an image forming section 120 through a sheet feed conveying path along which a sheet is conveyed to the pair of conveying rollers 105 such that the upper surface of the sheet in a stacked state faces upward. The sheet feed conveying path at the time when a sheet is fed from the MP tray 140 is also referred to as second sheet feed conveying path.

When sheets are fed from an optional sheet feeding cassette 2000 as well, an optional sheet feeding roller 2020 feeds sheets to a pair of optional separation rollers 2030. When sheets are fed from an optional sheet feeding cassette 3000 as well, an optional sheet feeding roller 3020 feeds sheets to a pair of optional separation rollers 3030. At this time, as in the case of the sheet feeding cassette 100 and the MP tray 140, the presence or absence of sheets stacked on the optional sheet feeding cassette 2000 is detected by a sheet detecting sensor 2010, and the presence or absence of sheets stacked on the optional sheet feeding cassette 3000 is detected by a sheet detecting sensor 3010. The pair of optional separation rollers 2030 separates one of the conveyed sheets and conveys the sheet to a pair of optional conveying rollers 2040. The pair of optional separation rollers 3030 separates one of the conveyed sheets and conveys the sheet to a pair of optional conveying rollers 3040. The sheet fed to the pair of optional conveying rollers 2040 is conveyed to the image forming section 120. The sheet fed to the pair of optional conveying rollers 3040 is also conveyed to the image forming section 120. An operation after a sheet is conveyed to the image forming section 120 is similar to the case where a sheet is conveyed from the sheet feeding cassette 100 or the MP tray 140.

An operation panel 626 is provided at the top of the image forming apparatus 20. The operation panel 626 is made up of a liquid crystal panel and a keypad. The liquid crystal panel provides information, such as instruction details to a user, by displaying an image and/or text. The keypad receives instructions from the user. In the present embodiment, the operation panel 626 is also referred to as message output unit that outputs information for providing a message to a user.

Configuration of Printer Control System

Figure 19A:
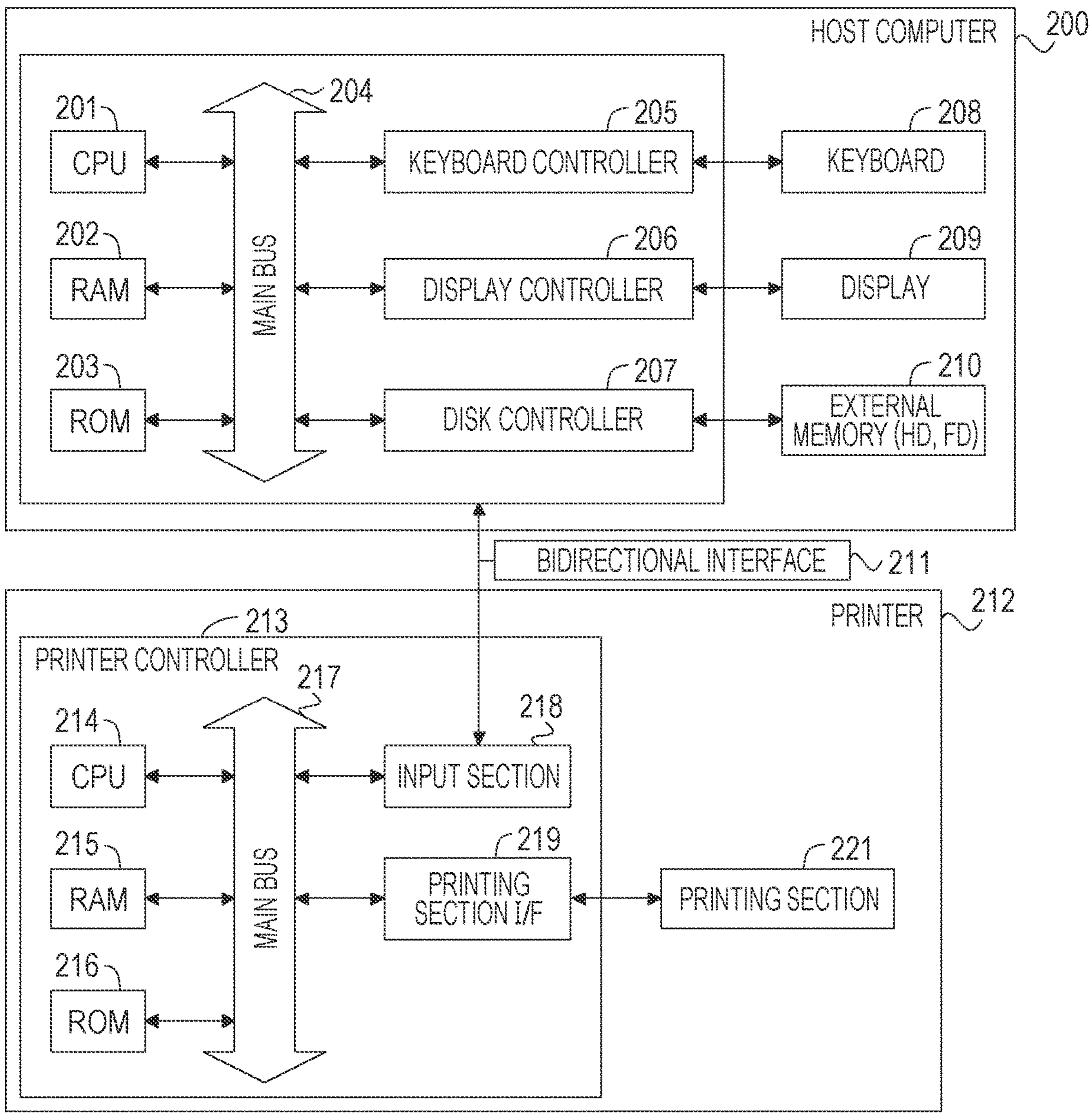
FIG. 19A is a control block diagram of a whole printer control system in an eighth embodiment.

FIG. 19A is a block diagram that illustrates the configuration of a whole printer control system of the present embodiment. Like reference numerals are assigned to the same components described with reference to FIG. 3A, and the description thereof is omitted.

Figure 19B:
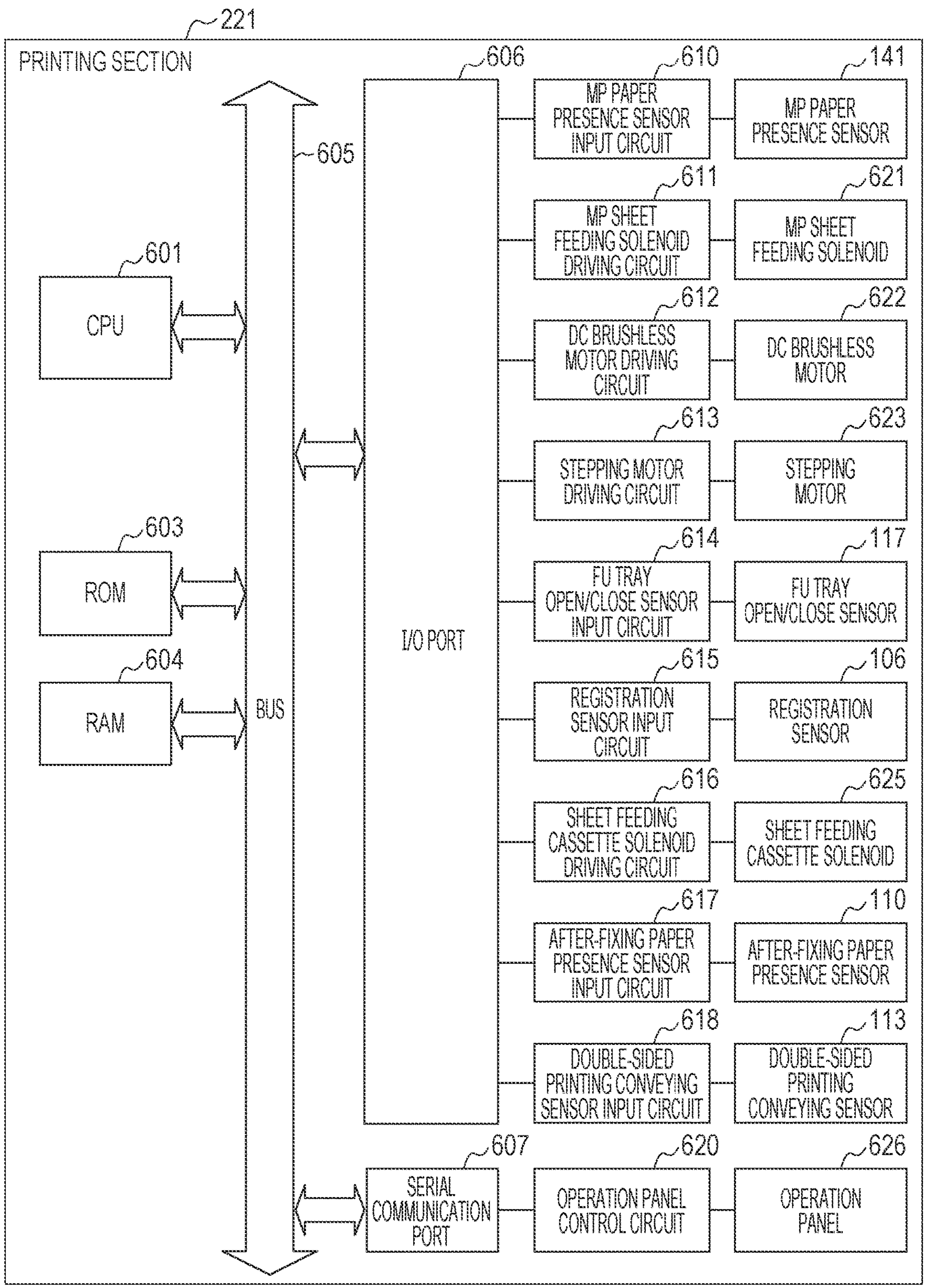
FIG. 19B is a control block diagram of hardware concerned with sheet conveyance control in the eighth embodiment.

FIG. 19B is a block diagram showing the configuration of hardware concerned with sheet conveyance control as a software function implemented by the printing section 221 of the present embodiment. Like reference numerals are assigned to the same components described with reference to FIG. 3B, and the description thereof is omitted.

The CPU 601 communicates with a ROM 603, a RAM 604, the I/O port 606, and a serial communication port 607 via a communication bus 605. The CPU 601 controls the printing section 221 by executing a computer program stored in the ROM 603 and the RAM 604. The CPU 601 executes a program stored in the ROM 603, acquires a calculated result during execution, and saves the calculated result in the RAM 604. Alternatively, the CPU 601 and an MPU (not shown) including a plurality of processors, such as multi-cores, may control the printing section 221 with the plurality of processors. Hereinafter, the CPU 601 is also referred to as control unit.

A storage section in the printing section 221 is made up of one or more memories such as the ROM 603 and the RAM 604 and stores various pieces of information including a computer program for performing various operations (described later), communication parameters for wireless communication, and the like. The storage section in the present embodiment may be a memory, such as the ROM 603 and the RAM 604. The storage section in the present embodiment may be, for example, a storage medium, such as a flexible disk, a hard disk drive, an optical disk, a magneto-optical disk, a CD-ROM, a CD-R, a magnetic tape, a nonvolatile memory card, and a DVD.

The MP paper presence sensor 141 is controlled by the CPU 601 via an MP paper presence sensor input circuit 610 and the I/O port 606.

The drive of the MP sheet feeding solenoid 621 is controlled by the CPU 601 via an MP sheet feeding solenoid driving circuit 611 and the I/O port 606. When the MP sheet feeding solenoid 621 is driven for a predetermined time, the MP sheet feeding roller 142 rotates. When the MP sheet feeding roller 142 rotates, sheets stacked on the MP tray 140 are conveyed to the pair of MP separation rollers 143.

The drive of the DC brushless motor 622 is controlled by the CPU 601 via a DC brushless motor driving circuit 612 and the I/O port 606. The DC brushless motor 622 drives the set of FU rollers 111.

The drive of the stepping motor 623 is controlled by the CPU 601 via a stepping motor driving circuit 613 and the I/O port 606. The stepping motor 623 drives the pair of FD rollers 112.

The drive of an FU tray open/close sensor 117 is controlled by the CPU 601 via an FU tray open/close sensor input circuit 614 and the I/O port 606.

The drive of a sheet feeding cassette solenoid 625 is controlled by the CPU 601 via a sheet feeding cassette solenoid driving circuit 616 and the I/O port 606. When the sheet feeding cassette solenoid 625 is driven for a predetermined time, the sheet feeding roller 102 rotates. When the sheet feeding roller 102 rotates, sheets stacked in the sheet feeding cassette 100 are conveyed to the pair of separation rollers 103.

The drive of the registration sensor 106 is controlled by the CPU 601 via a registration sensor input circuit 615 and the I/O port 606.

The operation of the after-fixing paper presence sensor 110 is controlled by the CPU 601 via an after-fixing paper presence sensor input circuit 617 and the I/O port 606.

The operation of a double-sided printing conveying sensor 113 is controlled by the CPU 601 via a double-sided printing conveying sensor input circuit 618 and the I/O port 606.

The drive of an FU tray solenoid 144 is controlled by the CPU 601 via an FU tray solenoid driving circuit 619 and the I/O port 606.

The serial communication port 607 is connected to an operation panel control circuit 620. The operation panel 626 is controlled by the CPU 601 via the operation panel control circuit 620. The CPU 601 acquires information input by a user with the liquid crystal panel or keypad of the operation panel 626 by controlling the serial communication port 607.

Method with which FU Tray Open/Close Sensor 117 Detects Open/Closed State of FU Tray 116

Figure 20A:
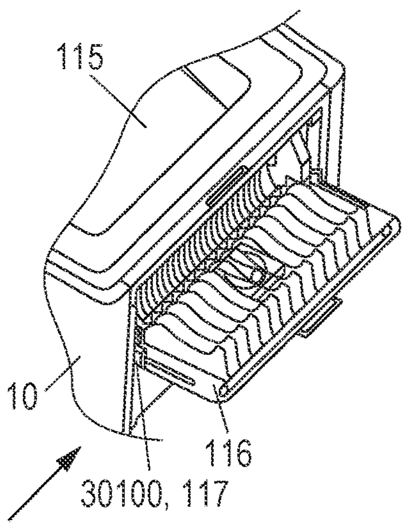
FIG. 20A to FIG. 20C are views illustrating an FU tray open/close sensor.
Figure 20B:
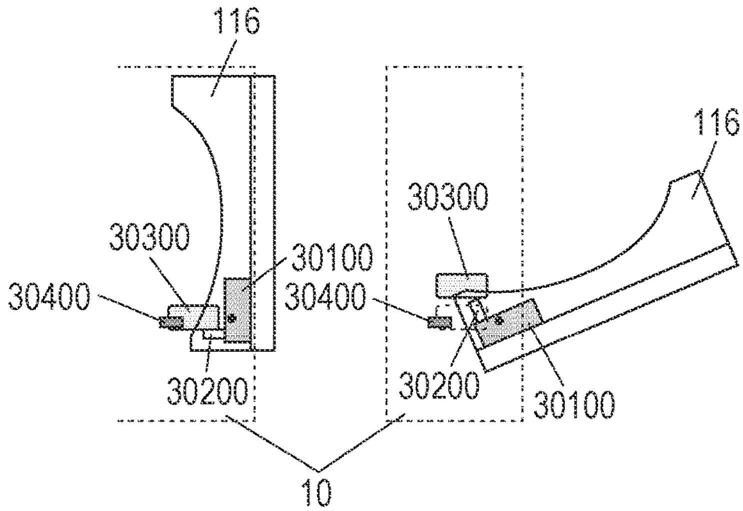
Figure 20C:
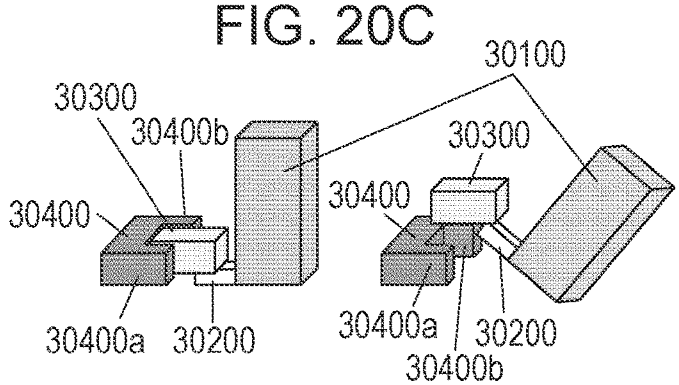

Hereinafter, a method with which the FU tray open/close sensor 117 detects the open/closed state of the FU tray 116 will be described in the present embodiment. FIG. 20A is a perspective view of the image forming apparatus 20 in a state where the FU tray 116 is open. FIG. 20B is a cross-sectional view of the image forming apparatus 20 when viewed in the direction of the arrow shown in FIG. 20A. FIG. 20C is a perspective view of the members of the FU tray open/close sensor 117.

As shown in FIG. 20B and FIG. 20C, the FU tray open/close sensor 117 is made up of a supporting member 30100, a cam member 30200, a flag member 30300, and a photo-interrupter 30400 (these are not shown in FIG. 18). The photo-interrupter 30400 is an example of an optical sensor used as a detecting section and is capable of outputting a different signal depending on whether light is interrupted by the flag member 30300.

The supporting member 30100 is attached to the FU tray 116. The supporting member 30100 pivots together with the FU tray 116 when the FU tray 116 pivots into the open position. The supporting member 30100 supports the cam member 30200.

The cam member 30200 converts the pivot motion of the supporting member 30100 to the up and down motion of the flag member 30300.

The flag member 30300 interrupts sensor light from a light emitting portion 30400*a* of the photo-interrupter 30400 when the FU tray 116 is in the close position. When the FU tray 116 is in the open position, the flag member 30300 is pushed upward by the cam member 30200, and sensor light from the light emitting portion 30400*a* is received by a light receiving portion 30400*b*. Arrangement of the light emitting portion 30400*a* and the light receiving portion 30400*b* may be interchanged.

The photo-interrupter 30400 outputs a different signal by switching between two light receiving states, that is, a state where sensor light from the light emitting portion 30400*a* is received by the light receiving portion 30400*b* and a state where the sensor light is interrupted by the flag member 30300 and is not received. In other words, when the FU tray 116 is closed, the photo-interrupter 30400 is in a state where sensor light from the light emitting portion 30400*a* is interrupted by the flag member 30300 and is not received by the light receiving portion 30400*b*. When the FU tray 116 is open, the photo-interrupter 30400 is in a state where sensor light from the light emitting portion 30400*a* is not interrupted by the flag member 30300 and is received by the light receiving portion 30400*b*.

As described above, when the FU tray 116 is closed, the FU tray open/close sensor 117 outputs a LOW signal to the CPU 601 via the FU tray open/close sensor input circuit 614 and the I/O port 606. The signal is also referred to as first signal. The CPU 601 having received the LOW signal (first signal) detects that the FU tray 116 is in the closed state.

When the FU tray 116 is open, the FU tray open/close sensor 117 outputs a HIGH signal to the CPU 601 via the FU tray open/close sensor input circuit 614 and the I/O port 606. The signal is also referred to as second signal. The CPU 601 having received the HIGH signal (second signal) detects that the FU tray 116 is in the open state.

In this way, the FU tray open/close sensor 117 that outputs the first signal in the closed state of the FU tray 116 and that outputs the second signal in the open state is also referred to as open/close output unit.

Operation in Case where FU Tray 116 is Opened During Printing

Hereinafter, the operation in the case where the FU tray 116 is opened while performing single-sided printing on each of a plurality of sheets will be described. Initially, in the closed state of the FU tray 116, the sheet feeding unit feeds sheets to the image forming unit. The image forming unit forms an image on only one side of each of the plurality of sheets, and the sheets each having an image only on its one side are output to the FD tray 115. When the series of printing operation is performed, if the FU tray 116 is brought into the open state before the last sheet of the plurality of sheets is output to the FD tray 115, all the subsequent pages are output to the FD tray 116. When the order of pages needs to be considered, a user needs to sort the order of sheets output to the FU tray 116 when the user brings a set of output sheets together.

Figure 21A:
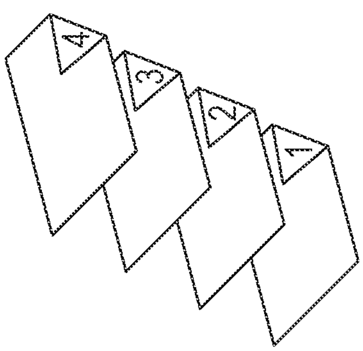
FIG. 21A is the stacking order of sheets output to an FD tray.
Figure 21B:
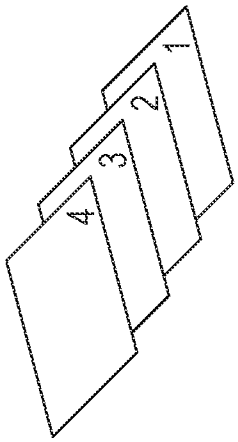
FIG. 21B is the stacking order of sheets output to an FU tray.

Next, the stacking order of sheets will be described. When sheets are output to the FD tray 115, a subsequent sheet is stacked on a previous sheet in a state where the surface of the sheet having an image faces downward, so the stacking order of sheets is as shown in FIG. 21A. In other words, when the printing operation ends and the set of sheets output to the FD tray 115 is turned upside down, pages are arranged in ascending order. However, when sheets are output to the FU tray 116, a subsequent sheet is stacked on a previous sheet in a state where the surface of the sheet having an image faces upward, so the stacking order of sheets is as shown in FIG. 21B. In other words, the set of sheets output to the FU tray 116 when the printing operation ends is in a state where pages are arranged in descending order.

Figure 21C:
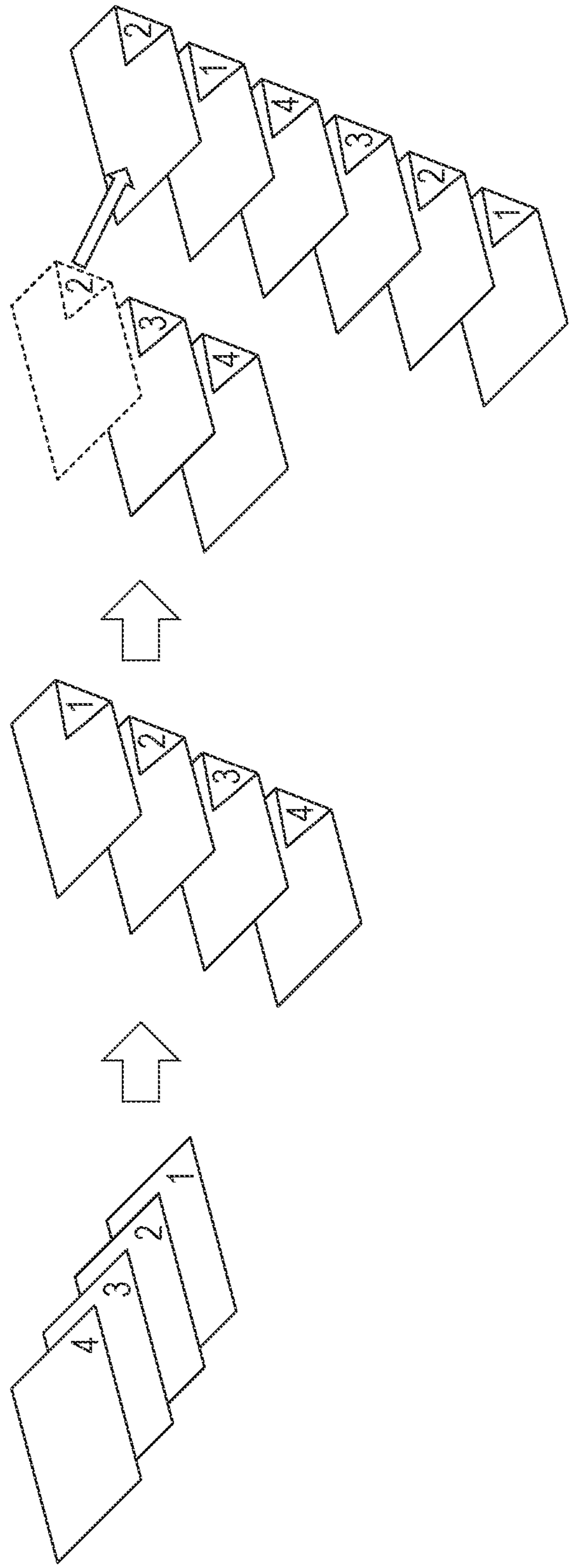
FIG. 21C is a diagram when the stacking order of sheets output to the FU tray is sorted.

When a set of sheets output to the FU tray 116 is brought together into a set of sheets output to the FD tray 115, operation to change the order of sheets shown in FIG. 21C is needed. Initially, the set of sheets output to the FU tray 116 is turned upside down into a state where the surface having an image faces downward. Subsequently, the upside-down set of sheets is stacked onto the set of sheets output to the FD tray 115 one by one in order from the top.

In this way, when the order of pages needs to be considered, the order of sheets output to the FU tray 116 needs to be sorted when a set of sheets output to the FU tray 116 is brought together into a set of sheets output to the FD tray 115.

In the present embodiment, even when the FU tray 116 is brought into the open state before the last sheet of the plurality of sheets is output to the FD tray 115, time and effort to sort the stacking order of sheets is reduced.

Method of Storing Number of Sheets Fed and Number of Sheets Output

Hereinafter, a method of storing the number of sheets fed and the number of sheets output will be described. In the present embodiment, one of sheets stacked in the sheet feeding cassette 100 is picked up by the sheet feeding roller 102 and fed to the pair of conveying rollers 104 one by one by the pair of separation rollers 103. In the present embodiment, the registration sensor 106 detects the leading edge to trailing edge of a sheet conveyed one by one to detect whether the sheet has passed through the registration sensor 106. In the present embodiment, the registration sensor 106 detects a sheet having passed therethrough, and the CPU 601 stores the number of sheets passing through the registration sensor 106 in the RAM 604. Thus, the number of sheets fed is counted.

The FD tray sheet output sensor 125 detects the leading edge to trailing edge of a sheet to detect whether the sheet has been output to the FD tray 115. The CPU 601 stores the number of sheets passing through the FD tray sheet output sensor 125 in the RAM 604. Thus, the number of sheets output to the FU tray 116 is counted.

The CPU 601 calculates the number of sheets output to the FU tray 116 by subtracting the number of sheets output to the FD tray 115, stored in the RAM 604, from the number of sheets fed, stored in the RAM 604.

When, for example, in a state where five sheets are output to the FD tray 115, the FU tray 116 is opened after the sixth sheet is fed, the sixth sheet having an image is output to the FU tray 116. At this time, the registration sensor 106 detects that the six sheets are fed and stores in the RAM 604 that the six sheets are fed, and the FD tray sheet output sensor 125 detects that five sheets are output and stores in the RAM 604 that the five sheets are output. For this reason, the CPU 601 calculates the number of sheets output to the FU tray 116 as one.

When the interval between sheets is narrow, in a state where five sheets are output to the FD tray 115, an image is already formed on the sixth sheet and the seventh sheet may be fed when the FU tray 116 is opened. At this time, after the sixth sheet having an image is output to the FU tray 116, an image is eventually formed on the seventh sheet, and the seventh sheet is output to the FU tray 116. The registration sensor 106 detects that the seven sheets are fed and stores in the RAM 604 that the seven sheets are fed, and the FD tray sheet output sensor 125 detects that five sheets are output and stores in the RAM 604 that the five sheets are output. For this reason, the CPU 601 calculates the number of sheets output to the FU tray 116 as two.

In this way, the CPU 601 calculates the number obtained by subtracting the number of sheets output to the FD tray 115 from the number of sheets fed as the number of sheets output to the FU tray 116.

Method of Detecting Sheet in Conveying Path

Figure 20D:
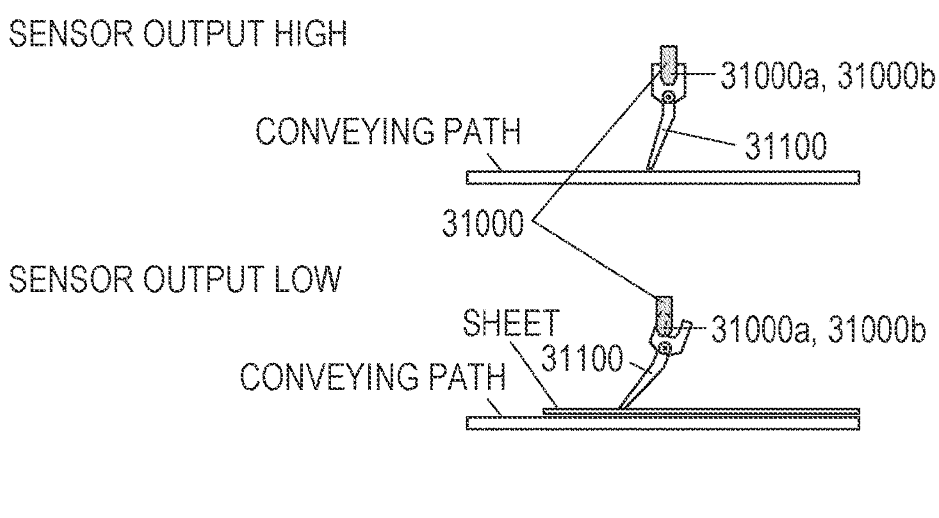
FIG. 20D is a view illustrating a method of detecting a sheet in a conveying path.

Hereinafter, a method of detecting a sheet in a conveying path will be described with the registration sensor 106 as an example. As shown in FIG. 20D, the registration sensor 106 is made up of a photo-interrupter 31000 and a flag member 31100. The flag member 31100 is freely pivotably provided near the photo-interrupter 31000. The photo-interrupter 31000 outputs a different signal by switching between two light receiving states, that is, a state where sensor light from a light emitting portion 31000*a* is received by a light receiving portion 31000*b* and a state where the sensor light is interrupted by the flag member 31100 and is not received.

When no sheet is present in the conveying path, the flag member 31100 is brought into contact with the conveying path by its own weight. At this time, the flag member 31100 is located at a position where the flag member 31100 does not interrupt sensor light from the light emitting portion 31000*a* of the photo-interrupter 31000, and is placed in a state where the sensor light is received by the light receiving portion 31000*b* On the other hand, when a sheet is conveyed to the registration sensor 106, the flag member 31100 is brought into contact with the sheet to pivot and interrupts sensor light from the light emitting portion 31000*a* of the photo-interrupter 31000. Arrangement of the light emitting portion 31000*a* and the light receiving portion 31000*b* may be interchanged.

As described above, when no sheet is present in the conveying path, the registration sensor 106 outputs a HIGH signal to the CPU 601 via the registration sensor input circuit 615 and the I/O port 606. The CPU 601 having received the HIGH signal detects that no sheet is present in the conveying path. When a sheet is conveyed to the registration sensor 106, the registration sensor 106 outputs a LOW signal to the CPU 601 via the registration sensor input circuit 615 and the I/O port 606. The CPU 601 having received the LOW signal detects that the sheet is conveyed to the registration sensor 106. When a sheet is conveyed to the trailing edge, the after-fixing paper presence sensor 110 outputs the HIGH signal to the CPU 601 after the LOW signal via the after-fixing paper presence sensor input circuit 617 and the I/O port 606.

The CPU 601 detects passage of the leading edge of the sheet as a result of the fact that the HIGH signal having been received from the after-fixing paper presence sensor 110 switches to the LOW signal. The CPU 601 detects passage of the trailing edge of the sheet as a result of the fact that the LOW signal having been received from the after-fixing paper presence sensor 110 switches to the HIGH signal.

The FD tray sheet output sensor 125, the after-fixing paper presence sensor 110, the double-sided printing conveying sensor 113, and the MP paper presence sensor 141 have similar configurations to that of the registration sensor 106, so the description is omitted. LOW signals output from these sensors are also referred to as first sheet detection signals, and HIGH signals are also referred to as second sheet detection signals.

The FD tray sheet output sensor 125 is disposed in the conveying path between the pair of FD rollers 112 and the FD tray 115. The FD tray sheet output sensor 125 outputs the first sheet detection signal indicating that a sheet is present or the second sheet detection signal indicating that no sheet is present. When single-sided printing is performed and the FD tray sheet output sensor 125 outputs the first sheet detection signal indicating that a sheet is present and then outputs the second sheet detection signal indicating that no sheet is present, the CPU 601 detects that the sheet is output to the FD tray 115. When double-sided printing is performed and the FD tray sheet output sensor 125 outputs the first sheet detection signal indicating that a sheet is present and then outputs the second sheet detection signal indicating that no sheet is present, the CPU 601 detects that the rotation of the pair of FD rollers 112 is reversed and the sheet is conveyed in the second conveying direction. When the FD tray 115 is full, the FD tray sheet output sensor 125 continues outputting the first sheet detection signal indicating that a sheet is present even after the sheet is output to the FD tray 115. In this case, the CPU 601 detects that the FD tray 115 is full and outputs, for example, a message of the content "Remove sheets stacked on the FD tray 115" to the operation panel 626.

The after-fixing paper presence sensor 110 is disposed in the conveying path between the image forming unit and the FU roller 111*a* and the FU roller 111*b*. The after-fixing paper presence sensor 110 outputs the first sheet detection signal indicating that a sheet is present or the second sheet detection signal indicating that no sheet is present. The after-fixing paper presence sensor 110 is also referred to as first paper presence sensor.

An after-feeding paper presence sensor 118 is disposed in the conveying path between the sheet feeding roller 102 and the pair of conveying rollers 105. The after-feeding paper presence sensor 118 outputs the first sheet detection signal indicating that a sheet is present or the second sheet detection signal indicating that no sheet is present. The after-feeding paper presence sensor 118 is also referred to as second paper presence sensor.

The registration sensor 106 is disposed in the conveying path between the pair of conveying rollers 105 and the image forming unit. The registration sensor 106 outputs the first sheet detection signal indicating that a sheet is present or the second sheet detection signal indicating that no sheet is present. The registration sensor 106 is also referred to as third paper presence sensor.

Process in Case where FU Tray 116 is Opened During Printing

Figure 22:
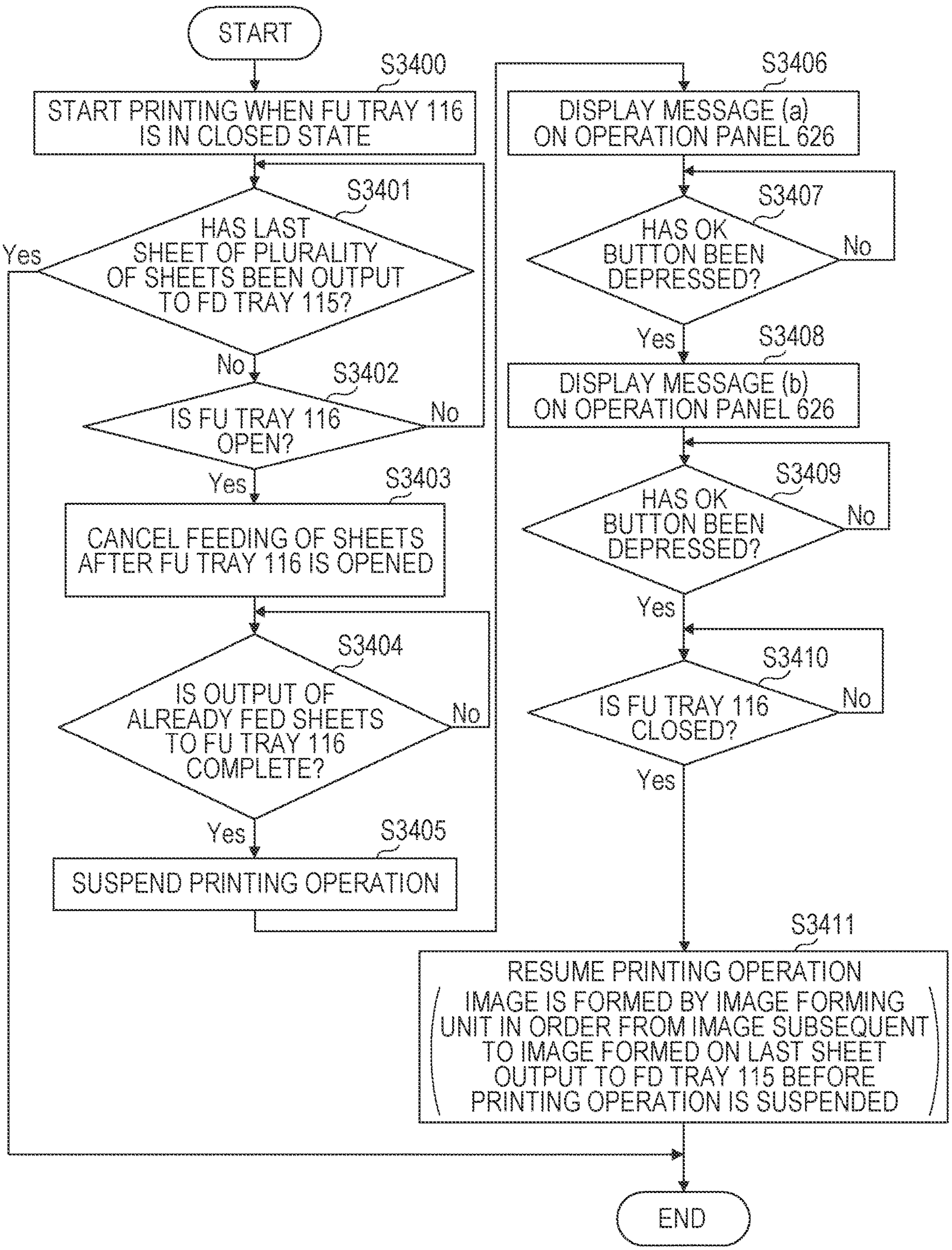
FIG. 22 is a flowchart of a process in the eighth embodiment.

Next, in the present embodiment, a specific process that is executed by the CPU 601 will be described with reference to the flowchart of FIG. 22. In the present embodiment, a series of printing operation in which the sheet feeding unit feeds a plurality of sheets to the image forming unit, the image forming unit forms an image on only one side of each of the sheets, and the sheets each having an image only on its one side are output to the first sheet output section will be described.

When, before the last sheet of a plurality of sheets is output to the FD tray 115, the FU tray open/close sensor 117 detects that the FU tray 116 is in the open state, the CPU 601 cancels feeding of a new sheet and suspends printing operation. Subsequently, the message output unit prompts a user to remove sheets output to the FU tray 116 and switch the FU tray 116 into the close position. When the FU tray open/close sensor 117 detects that the FU tray 116 is in the closed state, the image forming unit forms an image again subsequent to the image formed on the last sheet output to the FD tray 115 before the printing operation is suspended. This printing operation is referred to as reprint.

In S3400, the CPU 601 starts a printing operation to output a sheet to the FD tray 115 in the closed state of the FU tray 116, and the process proceeds to S3401.

In S3401, the next step depends on whether the last sheet of the plurality of sheets is output to the FD tray 115. In S3401, when the last sheet of the plurality of sheets is output to the FD tray 115 (YES), the flowchart ends. In S3401, when the last sheet of the plurality of sheets is not output to the FD tray 115 (NO), the process proceeds to S3402.

In S3402, the FU tray open/close sensor 117 detects the open/closed state of the FU tray 116. The process returns to S3401 until the FU tray open/close sensor 117 detects that the FU tray 116 is open (until the FU tray 116 is opened). In S3402, when the FU tray open/close sensor 117 detects that the FU tray 116 is open before the last sheet of the plurality of sheets is output to the FD tray 115, the process proceeds to S3403.

In S3403, the CPU 601 cancels feeding of a new sheet with the sheet feeding roller 102 when there is a subsequent page after the FU tray open/close sensor 117 detects that the FU tray 116 is in the open state, and the process proceeds to S3404. When there is no subsequent page, the sheet feeding unit has completed feeding all the sheets, so the process proceeds to S3404. The CPU 601 is capable of reducing the number of sheets to be output to the FU tray 116 that is not an intended output destination by cancelling feeding of a new sheet. The CPU 601 is capable of reducing the number of sheets needed to sort the stacking order of sheets when the sheets are brought together into one set by cancelling feeding of a new sheet.

In S3404, the CPU 601 detects whether a sheet is present in the conveying path from when the sheet is fed to when the sheet is output to the FU tray 116. A sheet present in a sheet conveying path from the sheet feeding roller 102 via the pair of conveying rollers 105, the transfer roller 107, and the fixing device 130 to the set of FU rollers 111 is detected by using, for example, the registration sensor 106 or the after-fixing paper presence sensor 110. In S3404, when a sheet is detected by, for example, the registration sensor 106 or the after-fixing paper presence sensor 110, the CPU 601 waits until the detected sheet is output to the FU tray 116. In other words, initially, the FU tray 116 is opened, and the FU tray open/close sensor 117 detects that the FU tray 116 is in the open state. When there is any sheet already fed by the sheet feeding roller 102 and not output to the FD tray 115 before this timing, the CPU 601 causes the image forming unit to form an image and output the sheet to the FU tray 116. At this time, the number of sheets output to the FU tray 116 is calculated by subtracting the number of sheets output to the FD tray 115 from the number of sheets fed.

In S3405, the CPU 601 suspends the printing operation by stopping all the motors concerned with conveyance of sheets and stopping image formation.

Figure 23A:
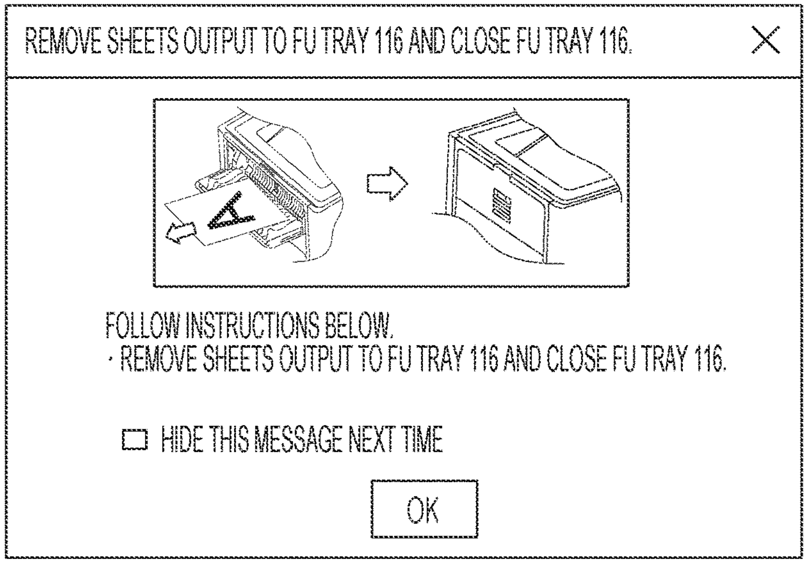
FIG. 23A to FIG. 23E are views illustrating messages in the eighth to tenth embodiments.

In S3406, the CPU 601 displays a message (a) on the operation panel 626. The content of the message displayed on the operation panel 626 at this time is, for example, the message shown in FIG. 23A. The message (a) is a message prompting a user to "remove sheets output to the FU tray 116 and switch the FU tray 116 into the close position". The message (a) also contains OK button.

In S3407, when the CPU 601 has acquired information that OK button has been depressed by the user, the process proceeds to the next step.

Figure 23B:
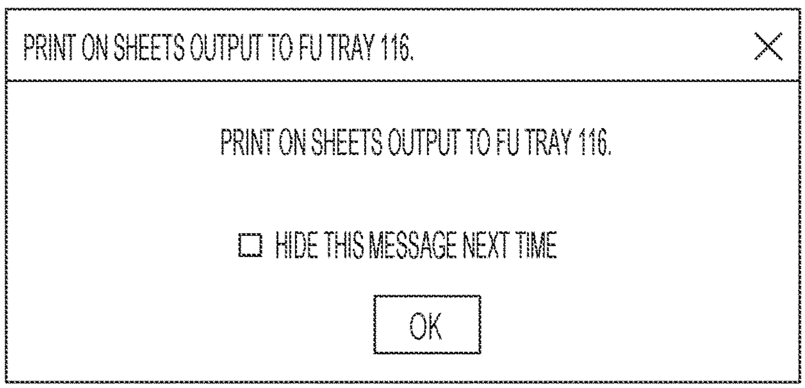

In S3408, the CPU 601 displays a message (b) on the operation panel 626. The content of the message displayed on the operation panel 626 at this time is, for example, the message shown in FIG. 23B. The message (b) is a message informing the user that "the sheet output to the FU tray 116 is subjected to reprinting" at the time of resuming the printing operation. The message (b) also contains OK button.

In S3409, when the CPU 601 has acquired information that OK button has been depressed by the user, the CPU 601 clears the message (b), and the process proceeds to S3410.

In S3410, when the FU tray open/close sensor 117 detects that the FU tray 116 is closed, the process proceeds to S3411.

In S3411, the CPU 601 outputs operation instructions to a sheet conveying mechanism 511, the fixing device 130, and the image forming section 120 and resumes the printing operation by using the FD tray 115 as the sheet output section. At this time, the CPU 601 performs the printing operation to form an image again subsequent to the image formed on the last sheet output to the FD tray 115 before the printing operation is suspended. The number of sheets output to the FD tray 115 is the number of sheets passing through the FD tray sheet output sensor 125.

Through the above-described control, when the printing operation completes, all the sheets involved in the printing operation are stacked on the FD tray 115 in order.

The messages (a), (b) are not necessarily displayed on the operation panel 626. Alternatively, the contents of the messages (a), (b) may be informed to a user by voice by means of, for example, a reading function. Alternatively, the message contents as shown by the messages (a), (b) may be informed to a user by light emitting patterns of an LED lamp.

In the present embodiment, the case where a different image is formed on one side of each of a plurality of sheets and the FU tray 116 switches into the open position while a sheet is output to the FD tray 115 has been described. However, it is not necessarily the case where a different image is formed. Alternatively, it may be the case where the same image is formed on one side of each of a plurality of sheets.

In addition, in the present embodiment, the case where an image is formed on one side of each of a plurality of sheets has been described. Alternatively, it may be the case where an image is formed on both sides of each of a plurality of sheets.

Summary of Eighth Embodiment

As described above, in the present embodiment, the case where the printing operation to, in the closed state of the FU tray 116, form an image only on one side of each of a plurality of sheets and output a sheet to the FD tray 115 has been described. When, before the last sheet of a plurality of sheets is output to the FD tray 115, the FU tray open/close sensor 117 detects that the FU tray 116 is in the open state, the CPU 601 cancels feeding of a new sheet and suspends printing operation. The CPU 601 cancels feeding of a new sheet and suspends the printing operation. Thus, it is possible to suppress continuous output of a sheet to the FU tray 116, and it is possible to reduce the number of sheets to be output to the FU tray 116 that is not an intended output destination. Subsequently, the message output unit prompts a user to remove sheets output to the FU tray 116 and switch the FU tray 116 into the close position. When the FU tray open/close sensor 117 detects that the FU tray 116 is closed, the image forming unit forms an image again subsequent to the image formed on the last sheet output to the FD tray 115 before the printing operation is suspended. In other words, reprint is performed. With this operation, a user does not need to change the stacking order of sheets output to the FU tray 116 and restack the sheets onto the FD tray 115, so a set of sheets on the FD tray 115 can be a set of sheets of which the stacking order is organized.

Ninth Embodiment

In the eighth embodiment, when, before the last sheet of a plurality of sheets is output to the FD tray 115, the FU tray open/close sensor 117 detects that the FU tray 116 is in the open state, the CPU 601 cancels feeding of a new sheet. Then, the printing operation is suspended. Subsequently, the message output unit prompts a user to remove sheets output to the FU tray 116 and switch the FU tray 116 into the close position. When the FU tray open/close sensor 117 detects that the FU tray 116 is in the closed state, the printing operation in which the image forming unit forms an image again subsequent to the image formed on the last sheet output to the FD tray 115 before the printing operation is suspended is performed. In other words, reprint is performed.

In the present embodiment, the case where a user is prompted to stack sheets output to the FU tray 116 onto a set of sheets stacked on the FD tray 115 to be brought together will be described.

In the present embodiment as well, a series of printing operation in which the sheet feeding unit feeds a plurality of sheets to the image forming unit, the image forming unit forms an image on only one side of each of the sheets, and the sheets each having an image only on its one side are output to the first sheet output section will be described.

Figure 24:
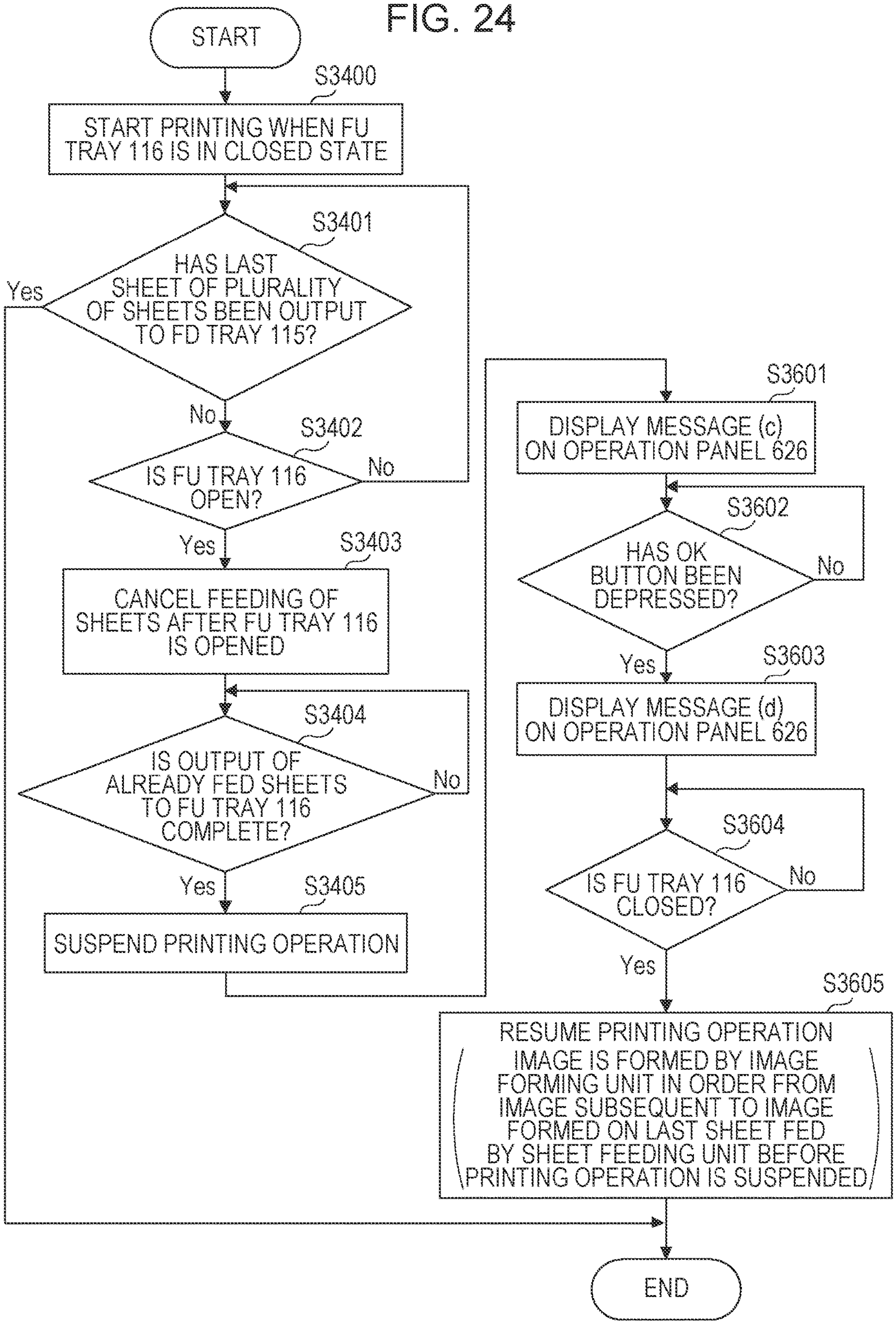
FIG. 24 is a flowchart of a process in the ninth embodiment.

Hereinafter, control in the present embodiment will be described with reference to the flowchart shown in FIG. 24. Like step numbers are assigned to the same steps as those of the above-described embodiments, and the description thereof is omitted. The image forming process and the hardware configuration are also the same as those of the eighth embodiment, so the description thereof is omitted.

S3400 to S3405 are the same as those of the eighth embodiment, so the description thereof is omitted.

Figure 23C:
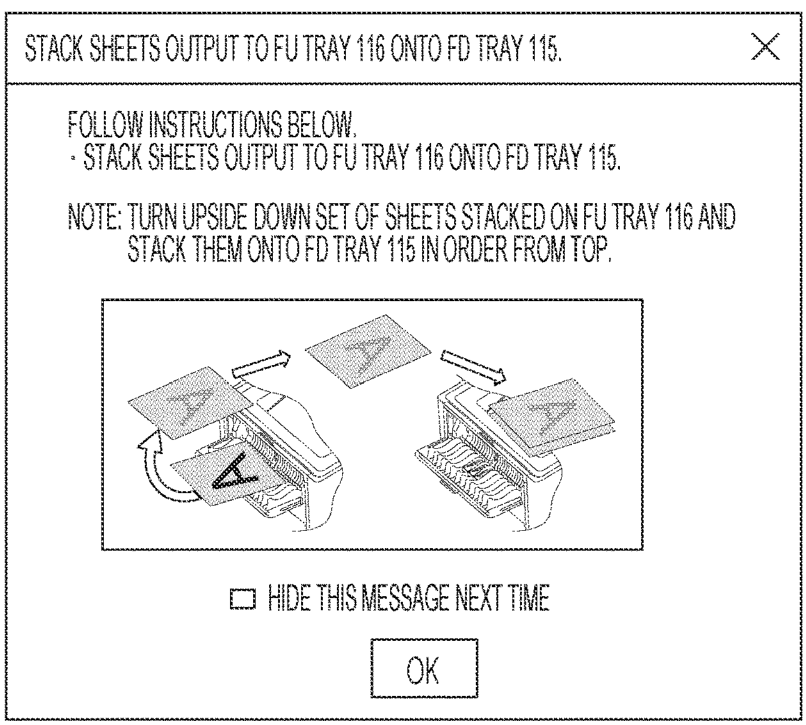

In S3601, the CPU 601 displays a message (c) on the operation panel 626. The content of the message displayed on the operation panel 626 at this time is, for example, the message shown in FIG. 23C. The message (c) is a message prompting a user to "in a state where a set of sheets output to the FU tray 116 is turned upside down, put the top sheet one by one on a set of sheets stacked on the FD tray 115". The message (c) contains OK button.

In S3602, when the CPU 601 has acquired information that OK button has been depressed by the user, the CPU 601 clears the message (c), and the process proceeds to S3603.

The content of the message displayed on the operation panel 626 in S3601 assumes the case where about two or three sheets are output to the FU tray 116. Alternatively, in the present embodiment, it is also applicable that only one sheet is output, and the message may be a message of the content that "turn the sheet output to the FU tray 116 upside down and put the sheet on a set of sheets stacked on the FD tray 115".

The CPU 601 may change the content of a message to be displayed on the operation panel 626 according to whether the number of sheets output to the FU tray 116 is only one. Furthermore, when there is no subsequent page, S3602 and the following steps may be omitted.

Figure 23D:
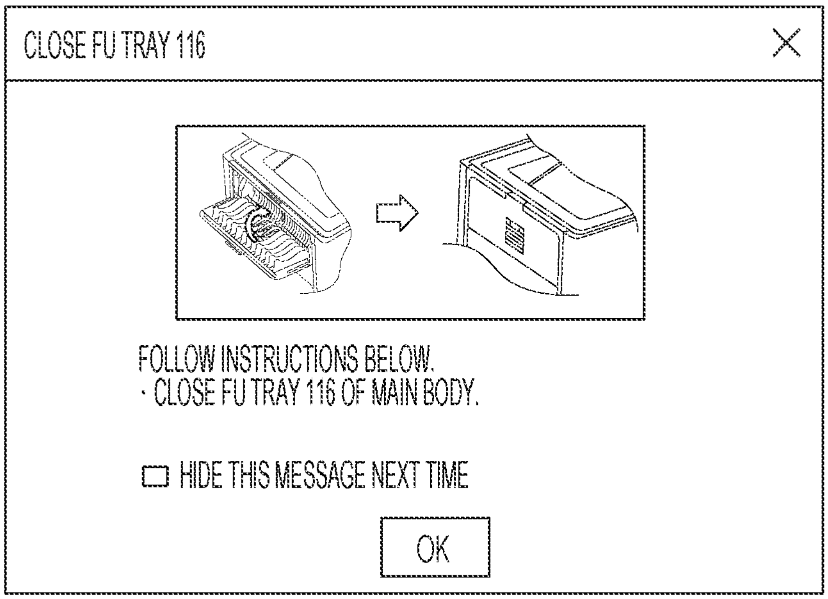

In S3603, the CPU 601 displays a message (d) on the operation panel 626. The content of the message displayed on the operation panel 626 at this time is, for example, the message shown in FIG. 23D. The message (d) is a message prompting a user to "close the FU tray 116". The message (d) also contains OK button. When the CPU 601 has acquired information that OK button has been depressed by the user, the CPU 601 may clear the message (d).

In S3604, when the FU tray open/close sensor 117 detects that the FU tray 116 is closed, the process proceeds to S3605.

In S3605, the CPU 601 outputs operation instructions to the sheet conveying mechanism 511, the fixing device 130, and the image forming section 120 and resumes the printing operation by using the FD tray 115 as the sheet output destination in S3405. At this time, sheets output to the FU tray 116 are also stacked on the FD tray 115. Therefore, the CPU 601 causes the image forming unit to form an image subsequent to an image formed on the sheet fed by the sheet feeding unit before the printing operation is suspended. The number of sheets fed is the number of sheets passing through the registration sensor 106.

Through the above-described control, when the printing operation on all the plurality of sheets completes, all the sheets involved in the printing operation are stacked on the FD tray 115 in order.

The messages (c), (d) are not necessarily displayed on the operation panel 626. Alternatively, the contents of the messages (c), (d) may be informed to a user by voice by means of, for example, a reading function. Alternatively, the message contents as shown by the messages (c), (d) may be informed to a user by light emitting patterns of an LED lamp.

In the present embodiment, the case where a different image is formed on one side of each of a plurality of sheets and the FU tray 116 switches into the open position while a sheet is output to the FD tray 115 has been described. However, it is not necessarily the case where a different image is formed. Alternatively, it may be the case where the same image is formed on one side of each of a plurality of sheets. In this case, in S3601, the message (c) does not need to be provided to prompt the user to correct the stacking order of sheets output to the FU tray 116 and bring the sheets together into a set of sheets stacked on the FD tray 115. The user may be prompted to put a set of sheets output to the FU tray 116 onto a set of sheets stacked on the FD tray 115.

In the present embodiment, the case where a different image is formed on one side of each of a plurality of sheets and the FU tray 116 switches into the open position while a sheet is output to the FD tray 115 has been described. However, it is not necessarily the case where a different image is formed. Alternatively, it may be the case where the same image is formed on one side of each of a plurality of sheets.

In addition, the case where an image is formed on one side of each of a plurality of sheets has been described. Alternatively, it may be the case where an image is formed on both sides of each of a plurality of sheets.

Summary of Ninth Embodiment

As described above, in the present embodiment, the case where the printing operation to, in the closed state of the FU tray 116, form an image only on one side of each of a plurality of sheets and output a sheet to the FD tray 115 has been described. When the FU tray open/close sensor 117 detects that the FU tray 116 is in the open state before the last sheet of a plurality of sheets is output to the FD tray 115, the CPU 601 cancels feeding of a new sheet and suspends printing operation. The CPU 601 cancels feeding of a new sheet and suspends the printing operation. Thus, it is possible to suppress continuous output of a sheet to the FU tray 116, and it is possible to reduce the number of sheets to be output to the FU tray 116 that is not an intended output destination. Subsequently, the message output unit prompts a user to stack and bring together the sheets output to the FU tray 116 onto a set of sheets stacked on the FD tray 115. With this operation, it is possible to bring output sheets together into one set while suppressing wrong stacking order of sheets. Furthermore, it is possible to reduce waste sheets output to the FU tray 116 that is not an intended sheet output tray.

Tenth Embodiment

In the eighth embodiment, when, before the last sheet of a plurality of sheets is output to the FD tray 115, the FU tray open/close sensor 117 detects that the FU tray 116 is in the open state, the CPU 601 cancels feeding of a new sheet. Then, the printing operation is suspended. Subsequently, the message output unit prompts a user to remove sheets output to the FU tray 116 and switch the FU tray 116 into the close position. When the FU tray open/close sensor 117 detects that the FU tray 116 is in the closed state, the printing operation in which the image forming unit forms an image again subsequent to the image formed on the last sheet output to the FD tray 115 before the printing operation is suspended is performed. In other words, reprint is performed. In the ninth embodiment, when the FU tray open/close sensor 117 detects that the FU tray 116 is in the open state before the last sheet of a plurality of sheets is output to the FD tray 115, the CPU 601 cancels feeding of a new sheet. Then, the printing operation is suspended. Subsequently, a user is prompted to stack and bring together the sheets output to the FU tray 116 onto a set of sheets stacked on the FD tray 115.

As in the case of the eighth embodiment, when the CPU 601 reprints on sheets output to the FU tray 116, a user does not need to perform burdensome operation that needs to consider the orientation of sheets and stacking order. As in the case of the ninth embodiment, when sheets are brought together into one set through user's operation, it is advantageous that sheets output to the FU tray 116 are not wasted. Which is better, the case of the eighth embodiment or the case of the ninth embodiment, depends on user convenience. Accordingly, in the present embodiment, it is possible to allow a user to select whether to reprint as in the case of the eighth embodiment or to prompt the user to bring together output sheets into one set without reprinting as in the case of the ninth embodiment.

Figure 25:
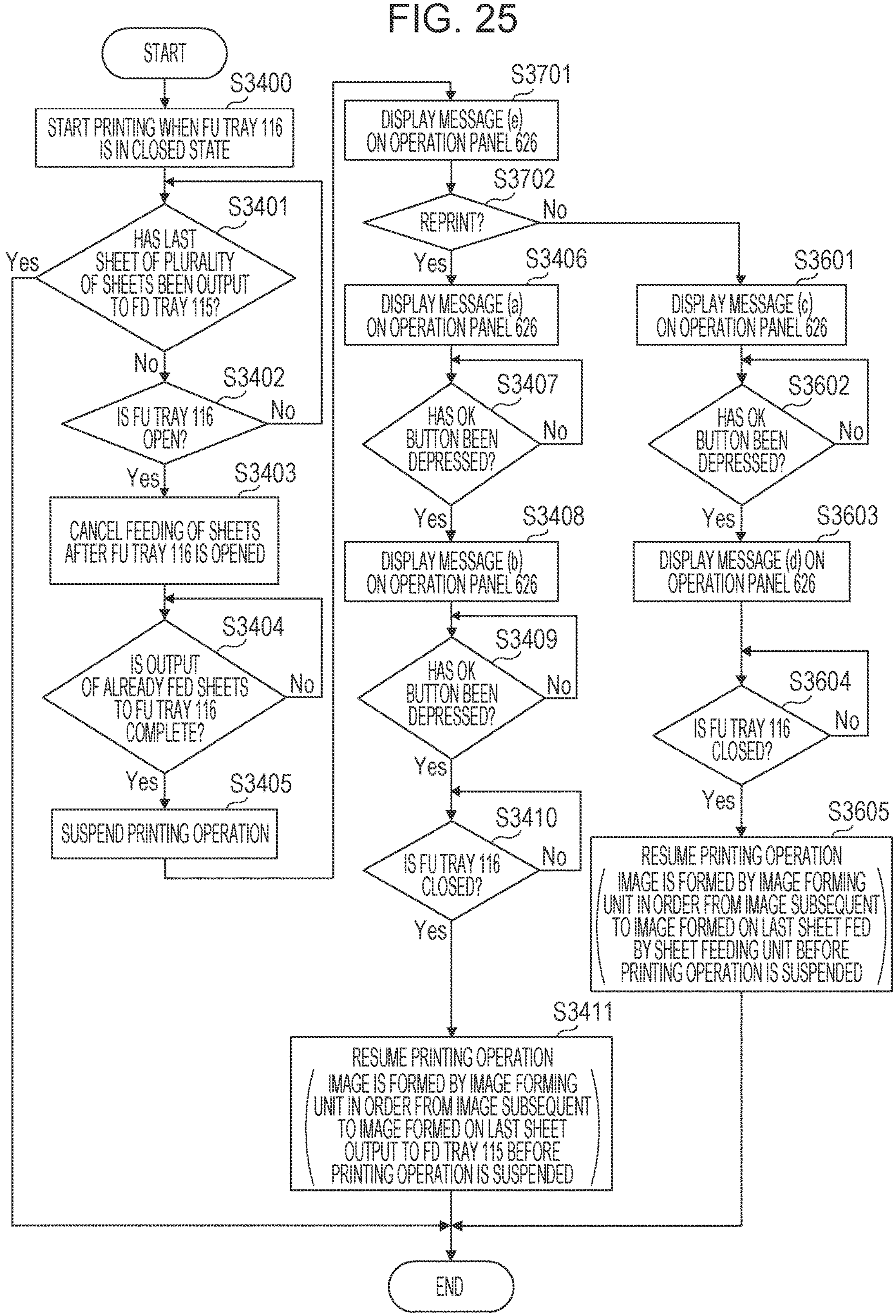
FIG. 25 is a flowchart of a process in the tenth embodiment.

In the tenth embodiment as well, a series of printing operation in which the sheet feeding unit feeds a plurality of sheets to the image forming unit, the image forming unit forms an image only on one side of each of the sheets, and the sheets are output to the FD tray 115 is performed. Hereinafter, control in the present embodiment will be described with reference to the flowchart shown in FIG. 25. Like step numbers are assigned to the same steps as those of the above-described embodiments, and the description thereof is omitted. The image forming process and the hardware configuration are also the same as those of the eighth and ninth embodiments, so the description thereof is omitted.

Figure 23E:
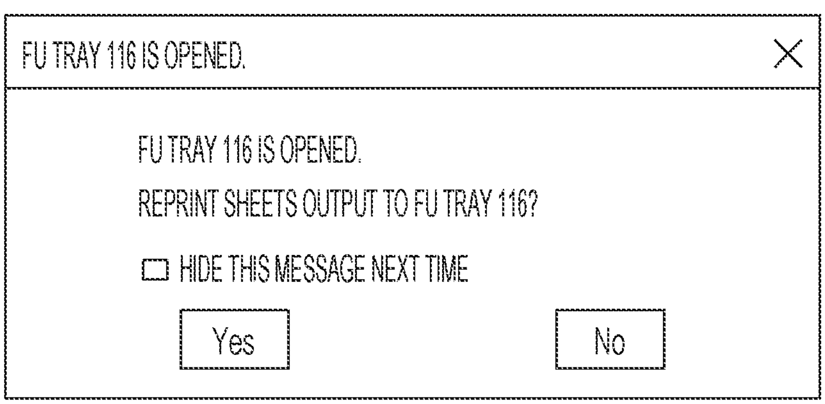

S3400 to S3405 are the same as those of the eighth and ninth embodiments, so the description thereof is omitted. In S3701, the CPU 601 displays a message (e) on the operation panel 626. The content of the message displayed on the operation panel 626 at this time is, for example, the message shown in FIG. 23E. The message (e) is a message making a user recognize that the FU tray 116 is opened and prompting the user to select whether to reprint on sheets output to the FU tray 116.

In S3702, when the CPU 601 has acquired information that YES is selected by the user (when the user selects to reprint), the process proceeds in order of S3406 to S3411. S3406 to S3411 are the same as those of the eighth embodiment, so the description thereof is omitted. In S3702, when the CPU 601 has acquired information that NO is selected by the user (when the user selects not to reprint), the process proceeds in order of S3601 to S3605. S3601 to S3605 are the same as those of the ninth embodiment, so the description thereof is omitted.

Summary of Tenth Embodiment

As described above, in the present embodiment, the case where the printing operation to, in the closed state of the FU tray 116, form an image only on one side of each of a plurality of sheets and output sheets to the FD tray 115 has been described. When the FU tray 116 is opened and the FU tray open/close sensor 117 detects that the FU tray 116 is in the open state, the CPU 601 cancels feeding of a new sheet and suspends printing operation. The CPU 601 cancels feeding of a new sheet and suspends the printing operation. Thus, it is possible to suppress continuous output of a sheet to the FU tray 116, and it is possible to reduce the number of sheets to be output to the FU tray 116 that is not an intended output destination. In addition, it is possible to allow a user to select whether to reprint as in the case of the eighth embodiment or to prompt the user to bring together output sheets into one set without reprinting as in the case of the ninth embodiment. With this function, it is possible to handle both the case where a user wants to increase convenience by reprinting and the case where the user does not want to waste sheets output to the FU tray 116, so the usability is improved.

Eleventh Embodiment

In the image forming apparatus as described in Japanese Patent Laid-Open No. 2000-238959, double-sided printing can be performed when the FU tray is in the closed state. However, when the FU tray is in the open state, a sheet cannot be conveyed to the double-sided printing conveying path, so the image forming apparatus is not able to continue double-sided printing. In other words, when double-sided printing is started and then the FU tray is switched into the open state, double-sided printing cannot be continued, so this may lead to a decrease in usability. Even when double-sided printing is started and then the FU tray is switched into the open state, double-sided printing is enabled to continue.

Automatic Double-Sided Printing Mode and Manual Double-Sided Printing Mode

When the image forming apparatus 20 of the present embodiment performs printing operation to form an image on both sides of a sheet, the image forming apparatus 20 has an automatic double-sided printing mode and a manual double-sided printing mode. The automatic double-sided printing mode is also referred to as first double-sided printing method, and the manual double-sided printing mode is also referred to as second double-sided printing method. Hereinafter, each of the modes will be described with reference to FIG. 26A to FIG. 26H.

Automatic Double-Sided Printing Mode

Figure 26A:
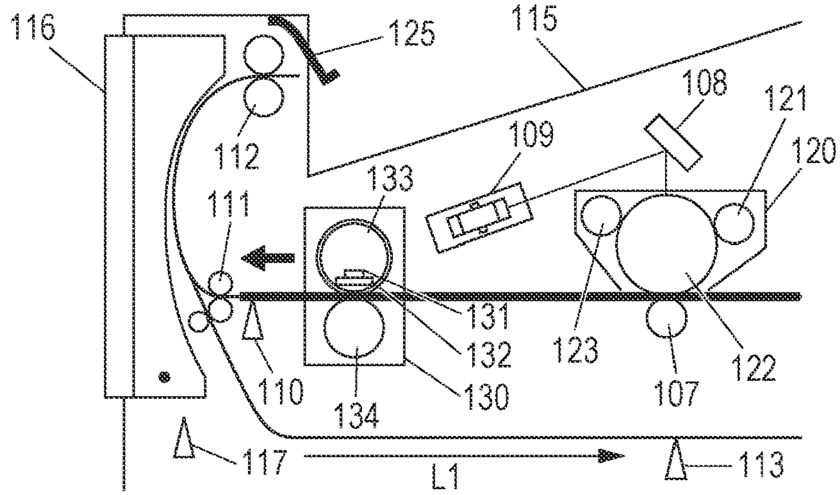
FIG. 26A and FIG. 26B are diagrams for a sheet conveying position.

When double-sided printing is performed in the automatic double-sided printing mode, the leading edge of a sheet having an image only on its one side passes through the after-fixing paper presence sensor 110 in the closed state of the FU tray 116 as shown in, for example, FIG. 26A. As shown in, for example, FIG. 26B, after a lapse of a predetermined time from when the trailing edge of the sheet passes through the after-fixing paper presence sensor 110, the CPU 601 reverses the rotation of the stepping motor 623. The predetermined time is a time calculated by the CPU 601 from the conveying speed of a sheet and a distance from the after-fixing paper presence sensor 110 to the pair of FD rollers 112. Alternatively, the CPU 601 may start the reverse rotation of the stepping motor 623 after a lapse of a time calculated from the conveying speed of a sheet and the length of the sheet from when the FD tray sheet output sensor 125 detects the leading edge of the sheet.

Figure 26B:
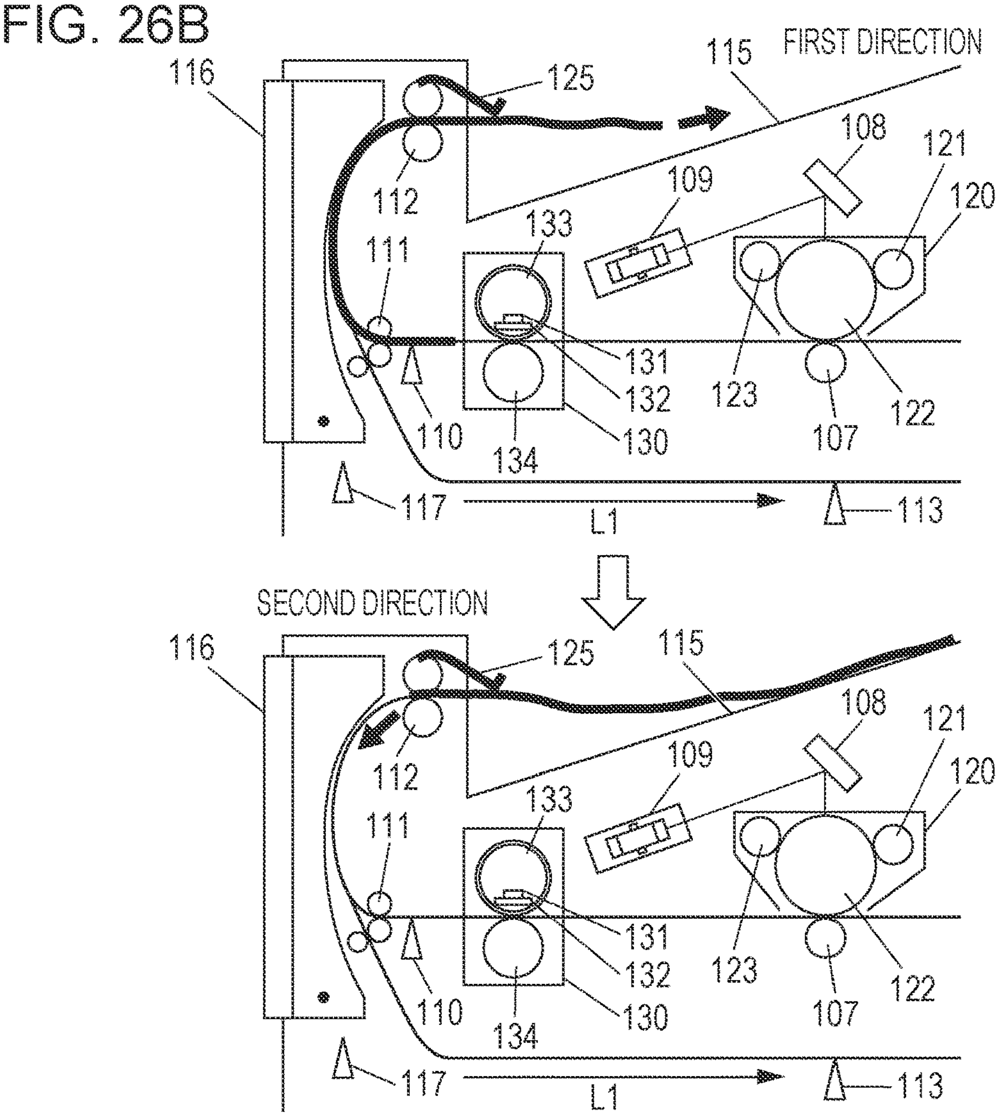

When the rotation of the stepping motor 623 is reversed, the rotation of the pair of FD rollers 112 is also reversed as shown in FIG. 26B. When the rotation of the pair of FD rollers 112 is reversed, the conveying direction of the sheet is also reversed. The sheet of which the conveying direction is reversed is conveyed from the pair of FD rollers 112 to the set of FU rollers 111. When the sheet of which the conveying direction is reversed is conveyed to the set of FU rollers 111, the sheet is conveyed to the double-sided printing conveying path L1. As shown in FIG. 26B, the conveying direction when a sheet is output to the FD tray 115 is also referred to as first direction, and the conveying direction when the rotation of the pair of FD rollers 112 is reversed is also referred to as second direction.

The pair of FD rollers 112 rotates in the first direction to convey a sheet to the FD tray 115 and conveys the sheet in the first direction. The pair of FD rollers 112 rotates in the second direction to convey a sheet to the image forming unit again and conveys the sheet in the second direction. In this way, the pair of FD rollers 112 is capable of choosing whether to rotate in the first direction to convey a sheet in the first direction or to rotate in the second direction to convey a sheet in the second direction. In the present embodiment, the pair of FD rollers 112 is also referred to as first sheet output conveying unit.

In addition, after a sheet is conveyed in the second direction by the pair of FD rollers 112, the set of FU rollers 111 conveys the sheet subsequently to the pair of FD rollers 112 in the conveying path downstream in the second direction from the FU tray 116 serving as a guiding portion. When the sheet reaches the set of FU rollers 111, the set of FU rollers 111 conveys the sheet to the double-sided printing conveying path L1 even when the FU tray 116 is in the open state. In the present embodiment, the set of FU rollers 111 is also referred to as second sheet output conveying unit.

The sheet conveyed to the double-sided printing conveying path L1 passes through the double-sided printing conveying sensor 113 and is conveyed to the pair of conveying rollers 105 by the pair of double-sided printing conveying rollers 114. When the sheet is conveyed from the pair of double-sided printing conveying rollers 114 to the pair of conveying rollers 105, the upper surface and lower surface of the sheet are turned upside down, and the sheet is conveyed again to the image forming unit in a state where the surface having an image faces downward. For the sheet conveyed again to the image forming unit, an image is formed on the surface having no image and fixed, and the sheet is output to the FD tray 115. An image formed on a front surface is also referred to as first image, and an image formed on a surface having no image (also referred to as back surface) is also referred to as second image.

As described above, in the automatic double-sided printing mode, the CPU 601 causes the pair of FD rollers 112 to switch the conveying direction of a sheet having a first image only on its one side to the second direction in a state where the FU tray 116 is closed. The CPU 601 causes the sheet having the first image only on its one side to be conveyed in the second direction to the image forming unit again to form a second image on the sheet having the first image only on its one side.

In other words, the automatic double-sided printing mode is a printing operation in which the CPU 601 causes the image forming unit to alternately form an image on the front surface of a sheet and an image on the back surface of the sheet.

Manual Double-Sided Printing Mode

In the case where double-sided printing is performed in the manual double-sided printing mode, when a sheet having an image only on its one side is output to the FD tray 115 in a state where the FU tray 116 is closed, the CPU 601 suspends the printing operation. In a state where the FU tray 116 is open, when a sheet having an image on its one side is output to the FU tray 116, the CPU 601 suspends the printing operation.

Figure 29A:
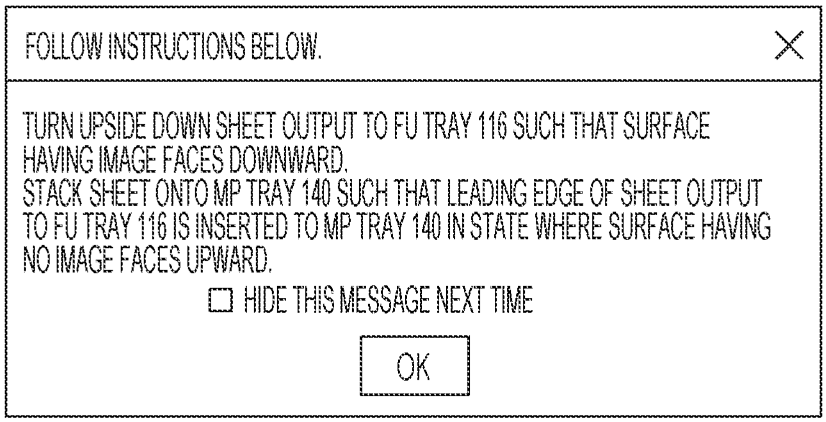
FIG. 29A to FIG. 29D are views illustrating messages in the eleventh to fourteenth embodiments.
Figure 29B:
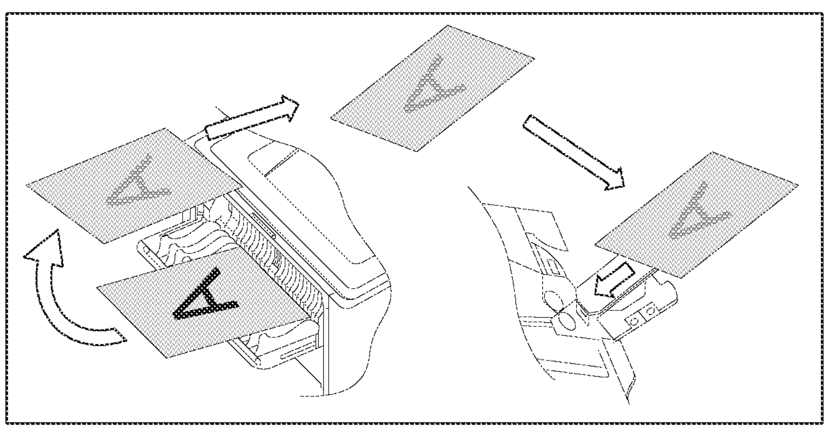
Figure 29C:
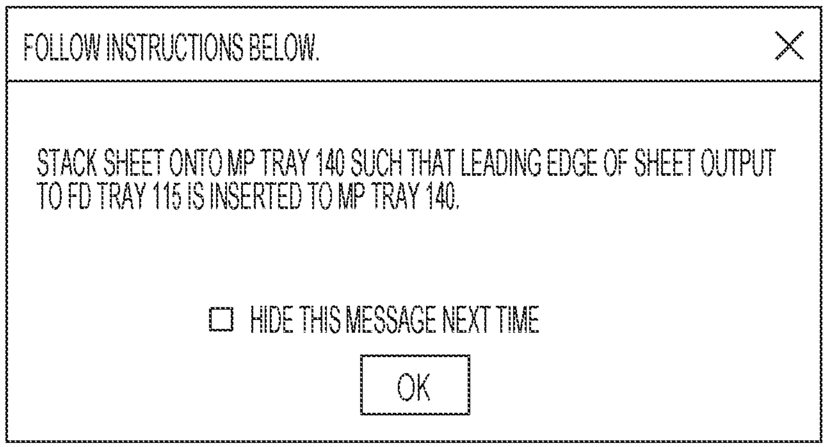
Figure 29D:
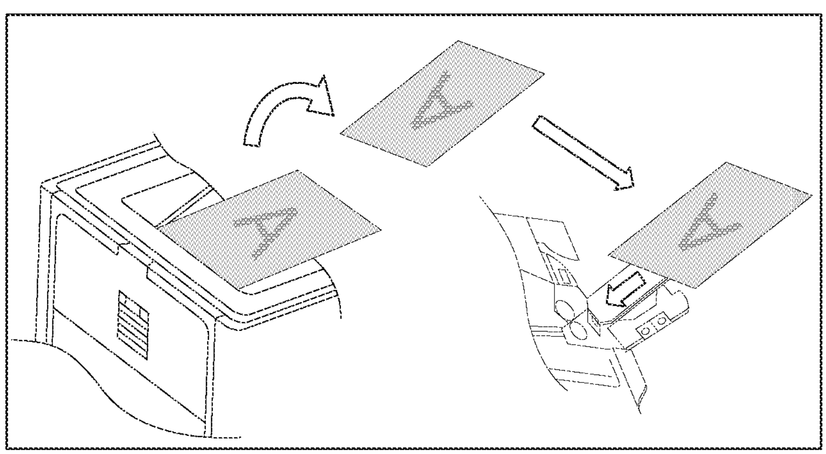

Subsequently, a user needs to perform operation as will be described below. In the present embodiment, a message as shown in FIG. 29A or FIG. 29B or a message as shown in FIG. 29C or FIG. 29D may be output by the message output unit.

Initially, a user stacks a sheet on the MP tray 140 such that the image surface of a sheet having an image on its one side and output to the FD tray 115 or the FU tray 116 faces downward. When the sheet having an image on its one side is stacked on the MP tray 140 by the user, the CPU 601 resumes the suspended printing operation. The sheet stacked on the MP tray 140 by the user is conveyed again to the image forming unit by the MP sheet feeding roller 142. For the sheet conveyed again to the image forming unit, a toner image is formed on the surface having no image and fixed, and then the sheet is output to the FD tray 115 or the FU tray 116.

As described above, in the manual double-sided printing mode, the CPU 601 causes the sheet having an image only on its one side to be output to the FD tray 115 or the FU tray 116. As a result of the fact that the sheet output to the FU tray 116 is stacked on the sheet feeding unit, the CPU 601 conveys the sheet again to the image forming unit and forms a second image on the sheet having a first image only on its one side.

In other words, in the manual double-sided printing mode, the printing operation is such that the CPU 601 causes the image forming unit to form an image on the front surface of each of a plurality of sheets on which an image is to be formed and then to form an image on the back surface of each of the plurality of sheets on which an image is to be formed. In the manual double-sided printing mode, the printing operation in which the CPU 601 causes the image forming unit to form an image on the front surface of each of a plurality of sheets and then to form an image on the back surface of each of the plurality of sheets may be performed in multiple steps. In this case, the CPU 601 may cause the operation panel 626 to output a message making a user provide information about how many sheets output to the FD tray 115 or the FU tray 116 are stacked on the MP tray 140.

In the present embodiment, the manual double-sided printing mode does not need to be provided.

Figure 26C:
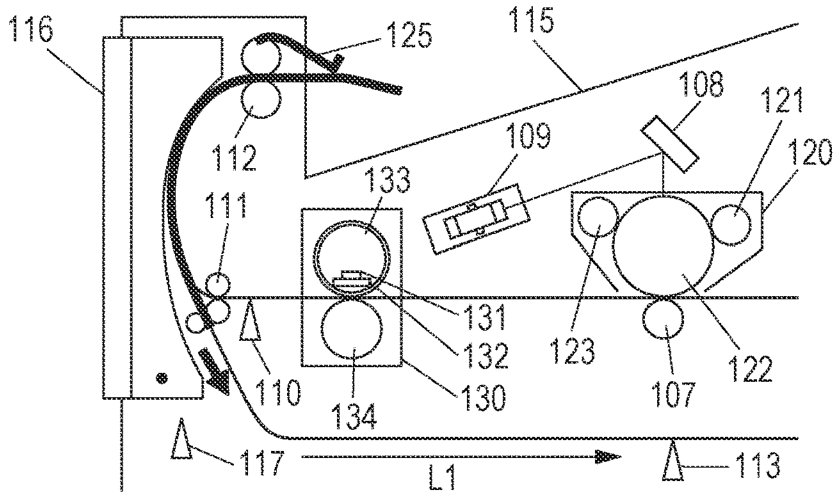
FIG. 26C and FIG. 26D are diagrams for a sheet conveying position.

When FU Tray 116 is Opened During Double-Sided Printing in Automatic Double-Sided Printing Mode Hereinafter, the case where the FU tray 116 is opened during double-sided printing in the automatic double-sided printing mode will be described with reference to FIG. 26A to FIG. 26H. When double-sided printing is performed in the automatic double-sided printing mode, a sheet having an image only on its one side is conveyed in the second direction. FIG. 26C shows a state where the sheet approaches the set of FU rollers 111. When the FU tray 116 is opened by a user before the sheet approaches the set of FU rollers 111, the sheet is output to the FD tray 115 or the FU tray 116. In this case, whether the sheet is output to the FD tray 115 or the FU tray 116 varies depending on an abnormality detection method used at the time when the CPU 601 detects an abnormality and suspends the printing operation. In the present embodiment, the CPU 601 detects an abnormality with a first abnormality detection method and suspends the printing operation.

First Abnormality Detection Method

The first abnormality detection method with which the CPU 601 suspends the printing operation is such that a sheet is not detected by the double-sided printing conveying sensor 113 after a lapse of a certain time from when the pair of FD rollers 112 starts reverse rotation. In this case, even when a certain time has elapsed from when the pair of FD rollers 112 starts reverse rotation, the double-sided printing conveying sensor 113 does not transmit a LOW signal and continues outputting a HIGH signal. Until the double-sided printing conveying sensor 113 transmits a LOW signal, the CPU 601 performs printing operation as normal. A method of transmitting a signal with the double-sided printing conveying sensor 113 is similar to the above-described method of detecting a sheet with the after-fixing paper presence sensor 110, so the detailed description is omitted here.

Figure 26D:
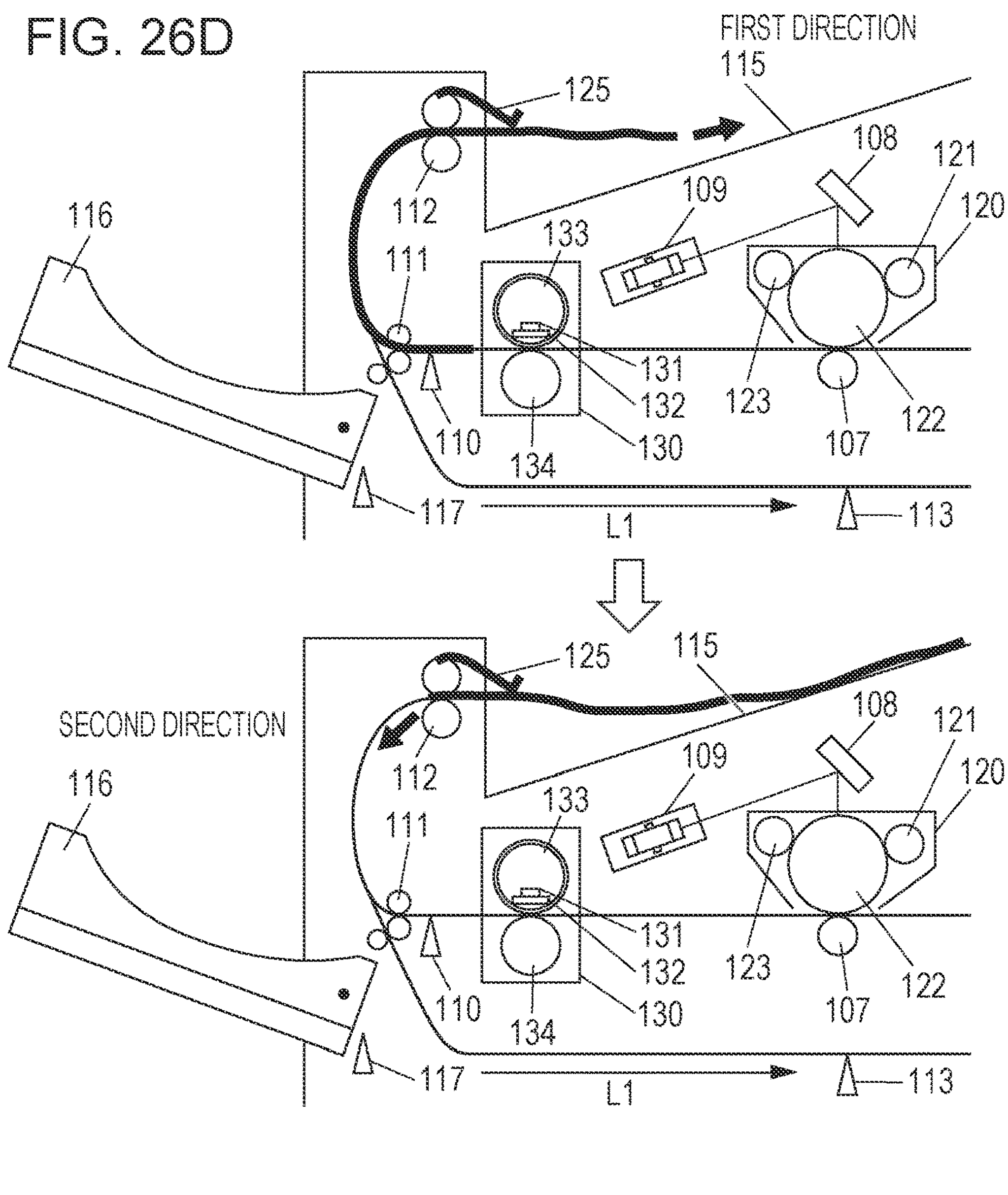

For example, after a sheet having a first image only on its one side approaches the pair of FD rollers 112 as shown in FIG. 26B, the pair of FD rollers 112 starts reverse rotation, and the FU tray 116 is opened as shown in FIG. 26D before the sheet is conveyed in the second direction. In this case, the double-sided printing conveying sensor 113 does not transmit a LOW signal, and the CPU 601 does not detect an abnormality, so the pair of FD rollers 112 starts reverse rotation as normal and conveys the sheet in the second direction. Therefore, the sheet conveyed in the second direction is output to the FU tray 116 as shown in FIG. 26F. When the sheet is output to the FU tray 116, the double-sided printing conveying sensor 113 continues transmitting a HIGH signal to the CPU 601 even after a lapse of a certain time from when the pair of FD rollers 112 starts reverse rotation. Therefore, the CPU 601 detects an abnormality and suspends the printing operation.

Figure 26E:
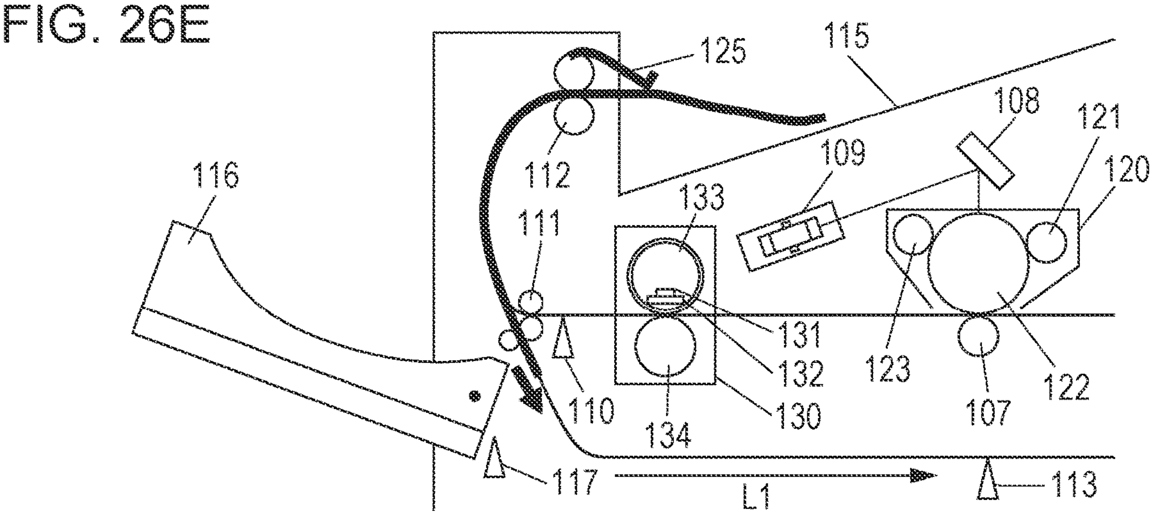
FIG. 26E and FIG. 26F are diagrams for a sheet conveying position.
Figure 26F:
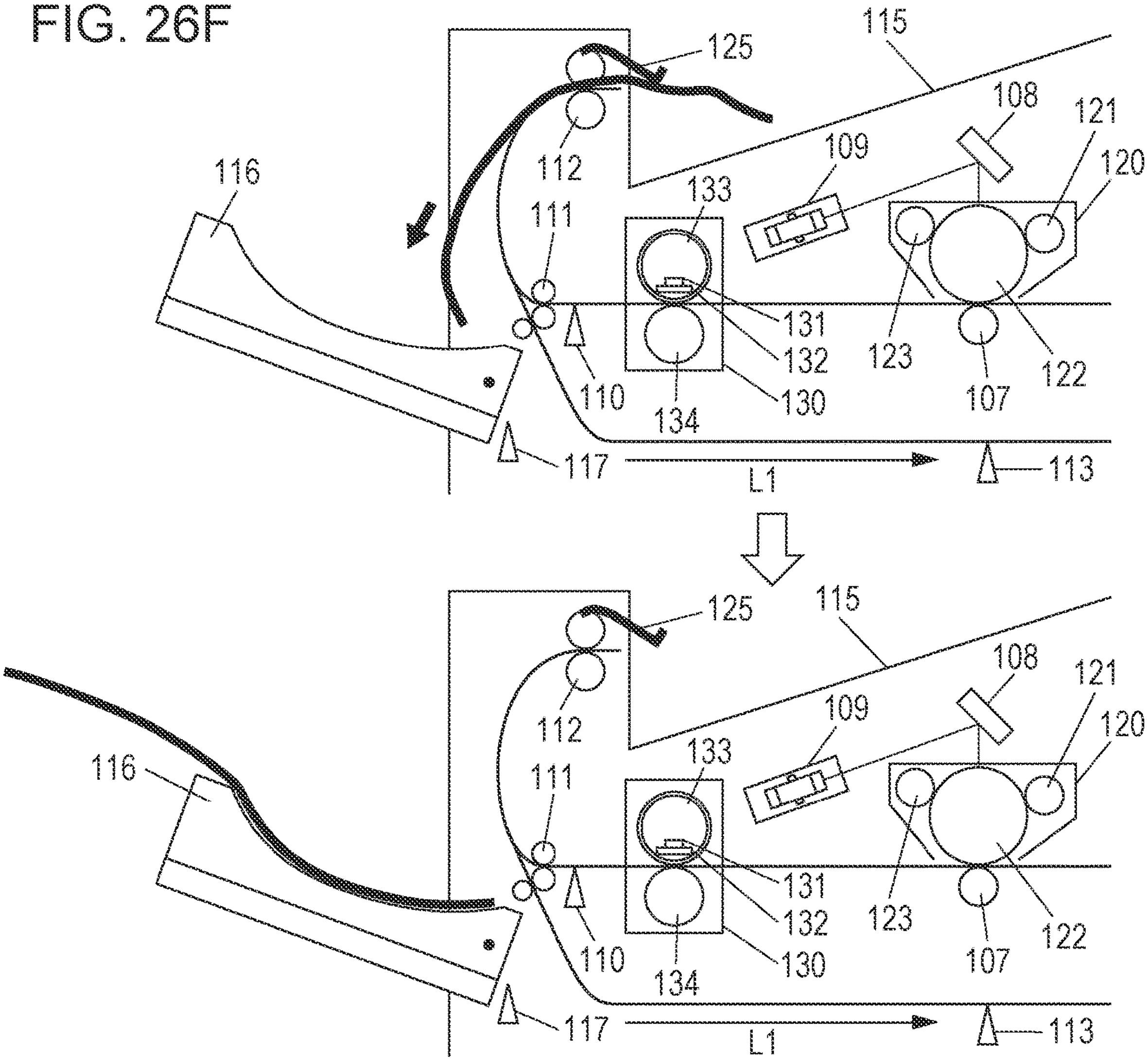

When the sheet approaches the set of FU rollers 111 and then the FU tray 116 is opened as shown in FIG. 26E, the sheet is conveyed to the double-sided printing conveying path L1, so a second image is formed on the sheet by the image forming unit.

Process in Case where FU Tray 116 is Opened During Double-Sided Printing

Figure 27A:
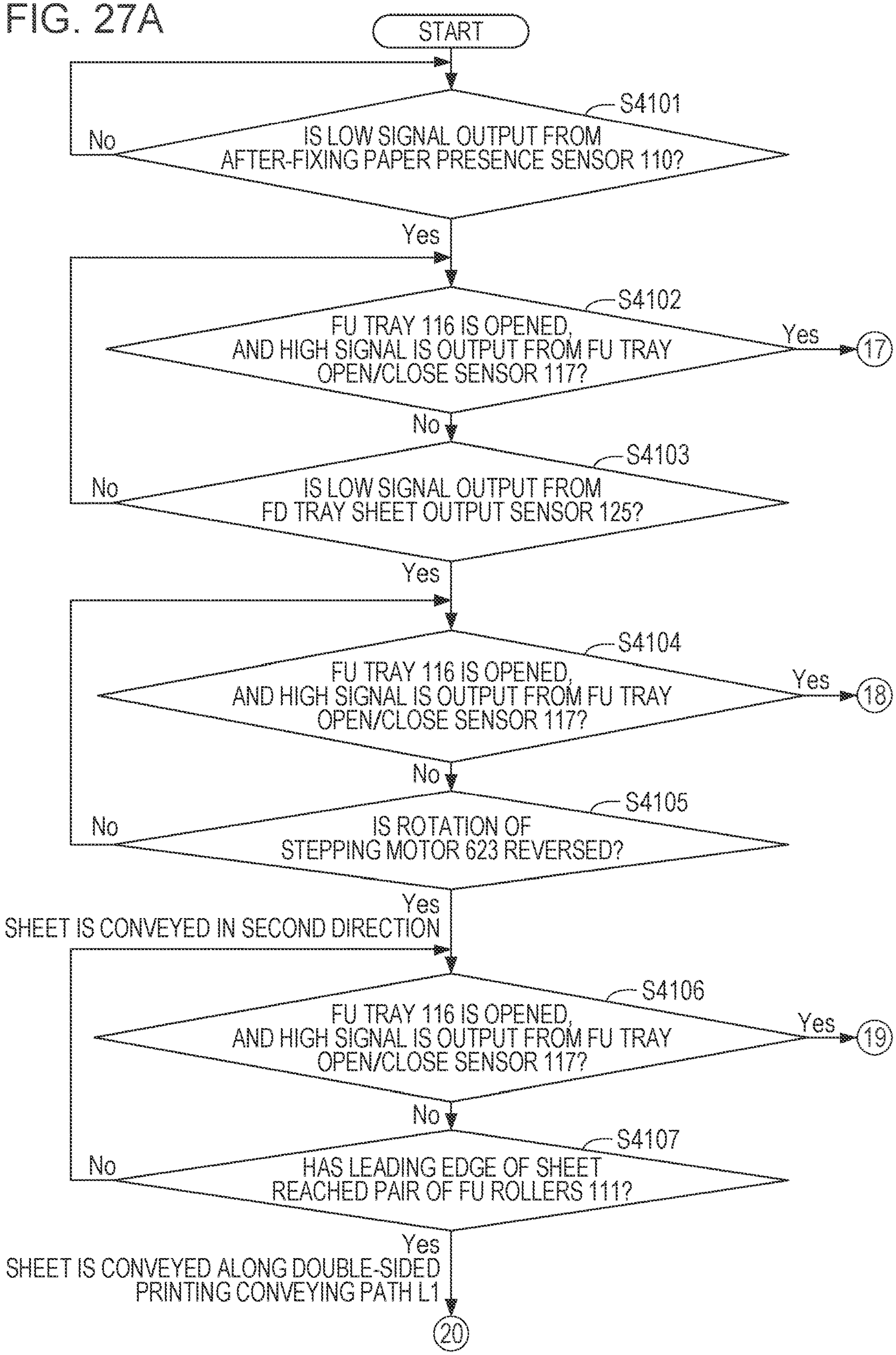
FIG. 27A and FIG. 27B are flowcharts of a process in an eleventh embodiment.
Figure 27B:
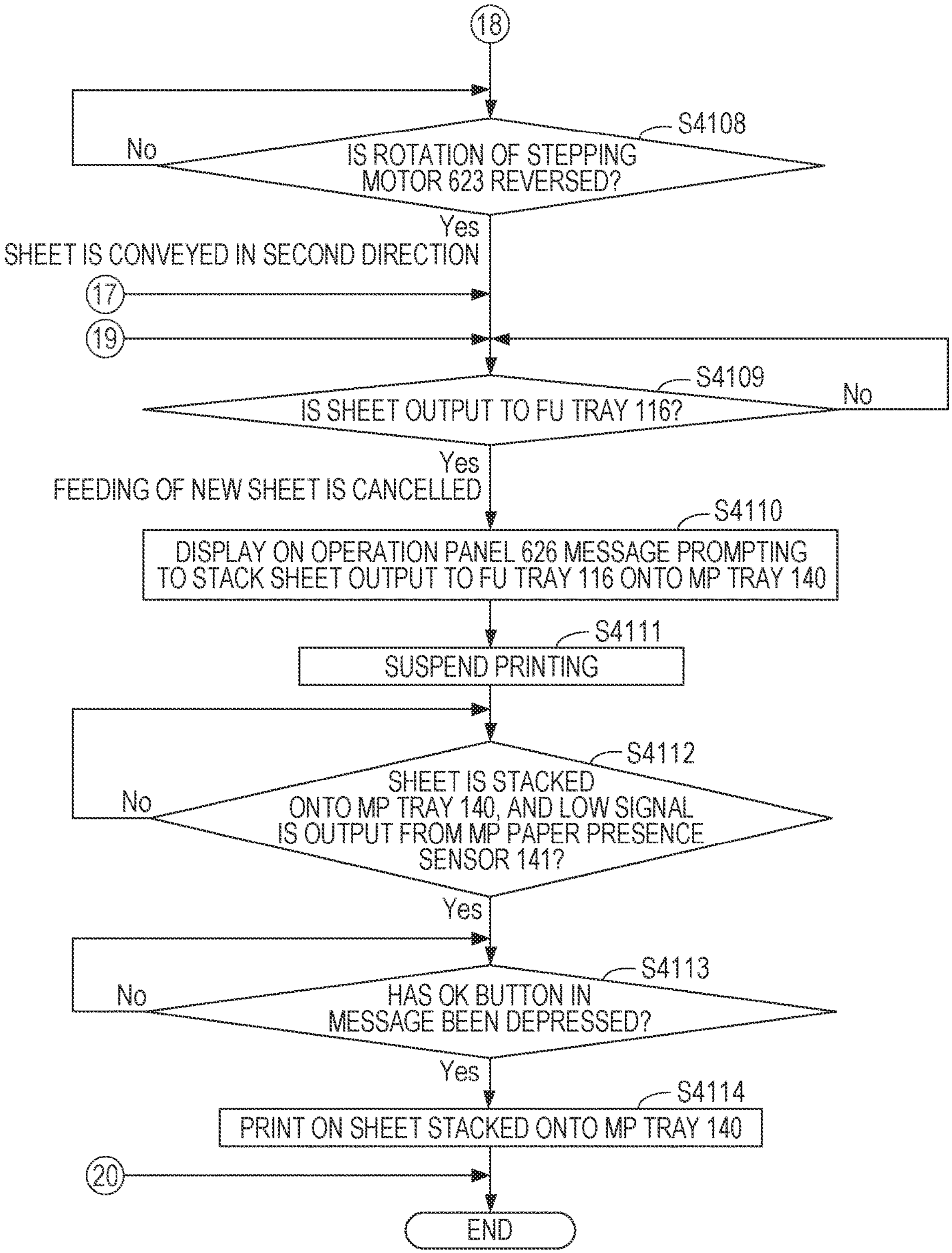

Next, a specific process in the present embodiment will be described with reference to the flowcharts of FIG. 27A and FIG. 27B. In the present embodiment, the case where the CPU 601 performs double-sided printing in the automatic double-sided printing mode in a state where the FU tray 116 is closed and suspends the printing operation with the first abnormality detection method will be described. The first abnormality detection method is as described above. In the present embodiment, the case where one sheet is subjected to double-sided printing will be described. S4101 may be started from a state where no sheet has been output to the FU tray 116, or S4101 may be started from a state where one or more sheets have been output to the FU tray 116.

In S4101, when the leading edge of a sheet having an image on its one side reaches the after-fixing paper presence sensor 110 as shown in FIG. 26A and the CPU 601 receives a LOW signal output from the after-fixing paper presence sensor 110, the process proceeds to S4102. Detection of a sheet has been described in the method of detecting a sheet with the after-fixing paper presence sensor 110, so the detailed description is omitted here.

In S4102, when the FU tray 116 is opened by user's operation and the CPU 601 receives a HIGH signal output from the FU tray open/close sensor 117, the process proceeds to S4109. When the CPU 601 does not receive a HIGH signal output from the FU tray open/close sensor 117, the process proceeds to S4103.

In S4103, when the leading edge of a sheet having an image on its one side reaches the FD tray sheet output sensor 125 and the CPU 601 receives a LOW signal output from the FD tray sheet output sensor 125, the process proceeds to S4108. When the CPU 601 does not receive a LOW signal output from the FD tray sheet output sensor 125, the process returns to S4102.

In S4104, when the FU tray 116 is opened by user's operation and the CPU 601 receives a HIGH signal output from the FU tray open/close sensor 117, the process proceeds to S4108. When the CPU 601 does not receive a HIGH signal output from the FU tray open/close sensor 117, the process proceeds to S4105.

In S4105, when the CPU 601 acquires information that the rotation of the stepping motor 623 is reversed, the process proceeds to S4106. When the rotation of the stepping motor 623 is reversed, the sheet is conveyed in the second direction as shown in FIG. 26D. When the CPU 601 does not acquire information that the rotation of the stepping motor 623 is reversed, the process returns to S4104.

In S4106, when the FU tray 116 is opened by user's operation and the CPU 601 receives a HIGH signal output from the FU tray open/close sensor 117, the process proceeds to S4109. When the CPU 601 does not receive a HIGH signal output from the FU tray open/close sensor 117, the process proceeds to S4107.

In S4107, when the leading edge of the sheet having an image on its one side reaches the set of FU rollers 111 as shown in FIG. 26E, the sheet having an image on its one side is conveyed to the double-sided printing conveying path L1. For the sheet having an image on its one side and conveyed to the double-sided printing conveying path L1, a second image is formed on a surface having no image, the sheet is output to the FD tray 115, and then the process ends. When the leading edge of the sheet having an image on its one side has not reached the set of FU rollers 111, the process returns to S4106.

In S4108, when the CPU 601 acquires information that the rotation of the stepping motor 623 is reversed, the process proceeds to S4109. When the rotation of the stepping motor 623 is reversed, a sheet is conveyed in the second direction as shown in FIG. 26D.

In S4109, the sheet having an image on its one side is output to the FU tray 116. When the sheet is output to the FU tray 116, the CPU 601 does not receive a LOW signal output from the double-sided printing conveying sensor 113 even after a lapse of a certain time from when the pair of FD rollers 112 starts reverse rotation. Therefore, the CPU 601 detects that an abnormality has occurred and causes the sheet feeding unit to cancel feeding of a new sheet, and the process proceeds to S4110. S4104, S4105, S4106, S4108, and S4109 are steps corresponding to the above-described first abnormality detection method.

Whether a sheet is output to the FU tray 116 is determined in accordance with whether the trailing edge of the sheet passes through the FD tray sheet output sensor 125 before a lapse of a predetermined time from when the trailing edge of the sheet passes through the after-fixing paper presence sensor 110. When the CPU 601 does not receive a LOW signal output from the FD tray sheet output sensor 125, the CPU 601 detects that the sheet is output to the FU tray 116. Here, the predetermined time is a time calculated by using the conveying speed of a sheet and a distance from the after-fixing paper presence sensor 110 to the FD tray sheet output sensor 125.

In S4110, the CPU 601 causes the operation panel 626 to output a message prompting the user to perform operation described below, and the process proceeds to S4111.

The operation that the CPU 601 prompts the user to perform in the message output to the operation panel 626 in S4110 will be described. Initially, a sheet output to the FU tray 116 is turned upside down into a state where the surface having an image faces downward. In a state where the surface having no image faces upward, the sheet is stacked onto the MP tray 140 such that the leading edge of the sheet output to the FU tray 116 is inserted to the MP tray 140. A message to be displayed at this time may be, for example, the sentence shown in FIG. 29A or may be, for example, the picture shown in FIG. 29B. Alternatively, in order for a user to easily understand necessary operation, for example, the picture shown in FIG. 29B may be animated and displayed on the operation panel 626.

The CPU 601 is able to continue double-sided printing by causing the message output unit to output such a message and prompting a user to perform operation, so the usability is improved. The message displayed in S4110 may contain OK button. OK button is a button to be depressed at the time when the user has completed operation according to the message. When OK button is depressed, the CPU 601 acquires a signal indicating that the operation is complete. OK button may be a button that indicates completion of operation, such as "COMPLETE" button.

In S4111, the CPU 601 suspends the printing operation, and the process proceeds to S4112. The order of the processes of S4110 and S4111 may be interchanged.

In S4112, when the sheet is stacked on the MP tray 140 by the user and the CPU 601 acquires a LOW signal output from the MP paper presence sensor 141, the process proceeds to S4113. Information indicating whether a sheet is stacked on the MP tray 140 is not necessarily output from the MP paper presence sensor 141. Alternatively, a user may make an input through the keypad of the operation panel 626 to output information that a sheet is stacked on the MP tray 140.

In S4113, when the CPU 601 has acquired information that OK button contained in the message displayed on the operation panel 626 has been depressed by the user, the process proceeds to S4114.

In S4114, the CPU 601 resumes the printing operation. Specifically, the CPU 601 resumes feeding of a sheet stacked on the MP tray 140, forms a second image on the surface having no image, outputs the sheet to the FU tray 116, and then the process ends.

In the present embodiment, the case where a sheet is conveyed in short edge feeding and double-sided printing is performed in long side binding has been described. Therefore, when a user is prompted to stack a sheet on the MP tray 140, the user is prompted to "stack a sheet onto the MP tray 140 such that the leading edge of the output sheet is inserted to the MP tray 140". Alternatively, the case where a sheet is conveyed in short edge feeding and double-sided printing is performed in short side binding is applicable. When double-sided printing is performed in short side binding, a user is prompted to "stack a sheet onto the MP tray 140 such that the trailing edge of the output sheet is inserted to the MP tray 140".

Summary of Eleventh Embodiment

As described above, in the present embodiment, the case where double-sided printing is performed on a sheet and the FU tray 116 is switched into the open state after double-sided printing is started has been described. In addition, the case where the CPU 601 suspends printing operation with the first abnormality detection method has been described.

In the present embodiment, before a sheet having a first image only on its one side approaches the set of FU rollers 111, the FU tray 116 is opened by a user, and the sheet is output to the FU tray 116. The CPU 601 causes the message output unit to output a message prompting the user to manually stack the output sheet onto the MP tray 140. In response to the fact that the output sheet is stacked on the MP tray 140 by the user, the CPU 601 resumes sheet feeding with the sheet feeding unit and causes the image forming unit to form a second image. With this function, even when the FU tray 116 is switched into the open state after double-sided printing is started, it is possible to continue double-sided printing. It is possible to perform double-sided printing desired by a user by not wasting an output sheet having an image only on its one side and forming an image on the surface having no image.

Twelfth Embodiment

In the eleventh embodiment, the case where, when double-sided printing is performed on a sheet, double-sided printing can be continued even when the FU tray 116 is opened during double-sided printing in the automatic double-sided printing mode has been described. In the present embodiment, the case where double-sided printing is performed on a plurality of sheets will be described.

In the present embodiment, as in the case of the eleventh embodiment, the CPU 601 suspends printing operation with the first abnormality detection method. The first abnormality detection method is as described above. When a sheet output to the FU tray 116 is stacked on the MP tray 140 by a user, a second image is formed on the surface having no image, and double-sided printing for one sheet completes. In the present embodiment, the case where, after double-sided printing for one sheet is complete, a user is able to select whether to maintain the automatic double-sided printing mode until printing of subsequent images (also referred to as pages) ends or to switch to the printing operation in the manual double-sided printing mode will be described.

Figure 28A:
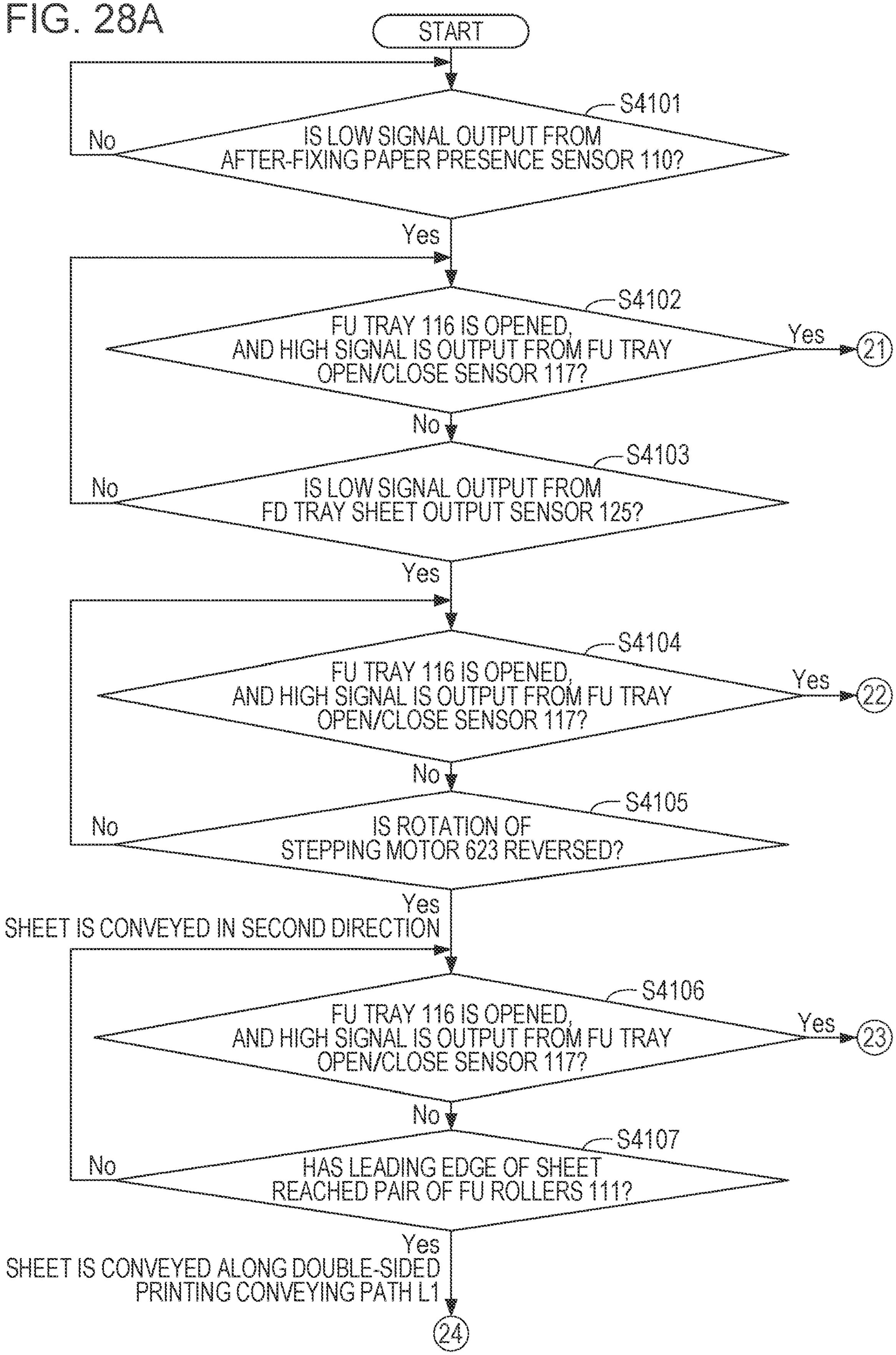
FIG. 28A and FIG. 28B are flowcharts of a process in a twelfth embodiment.
Figure 28B:
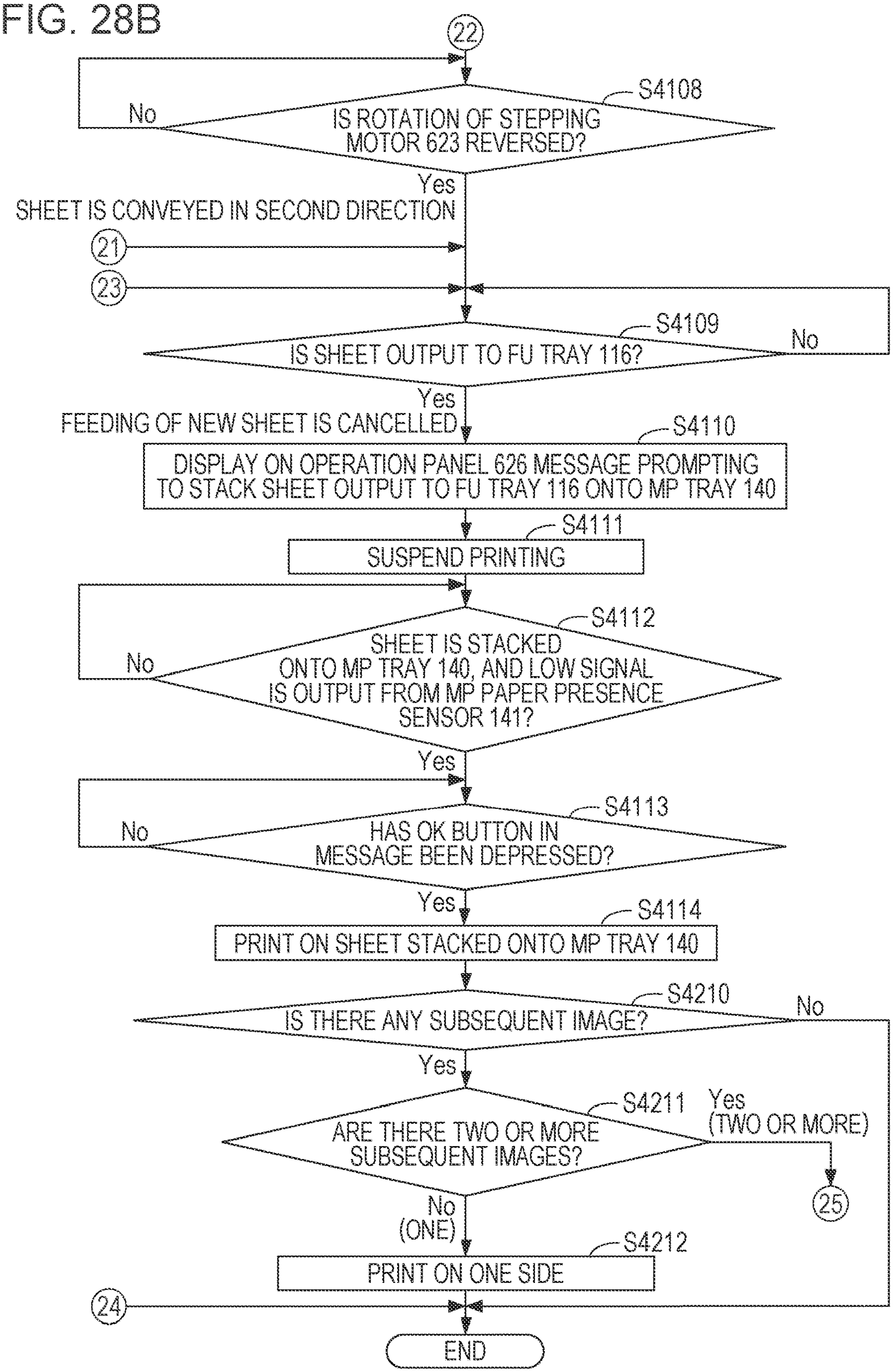
Figure 28C:
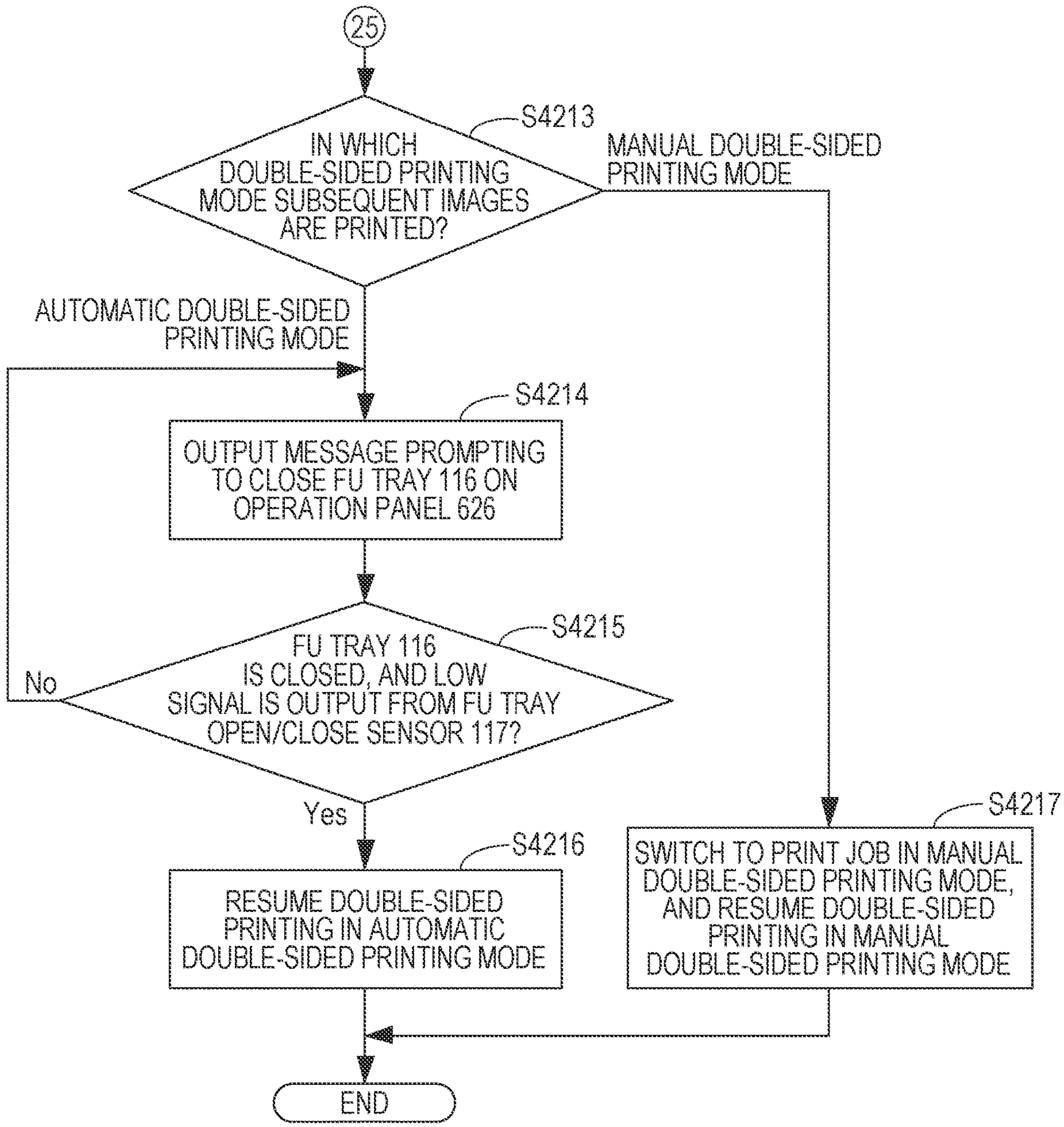
FIG. 28C is a flowchart of the process in the twelfth embodiment.

Hereinafter, control in the present embodiment will be described with reference to the flowcharts shown in FIG. 28A to FIG. 28C. Like step numbers are assigned to the same steps as those of the above-described embodiments, and the description thereof is omitted. The image forming process and the hardware configuration are also the same as those of the eleventh embodiment, so the description thereof is omitted. S4101 to S4114 in the flowcharts of FIG. 28A to FIG. 28C are the same as those of the eleventh embodiment.

In S4210, when the CPU 601 receives information on subsequent images from the printer controller 213, the process proceeds to S4211. When the CPU 601 does not receive information on subsequent images from the printer controller 213, the process ends.

In S4211, when the information on subsequent images, received by the CPU 601, contains only one subsequent image, the process proceeds to S4212, the CPU 601 causes the image forming unit to form an image on one side of the sheet, and the process ends. When the information on subsequent images, received by the CPU 601, contains two or more subsequent images, the process of the flowchart shown from [1] is executed.

Figure 30A:
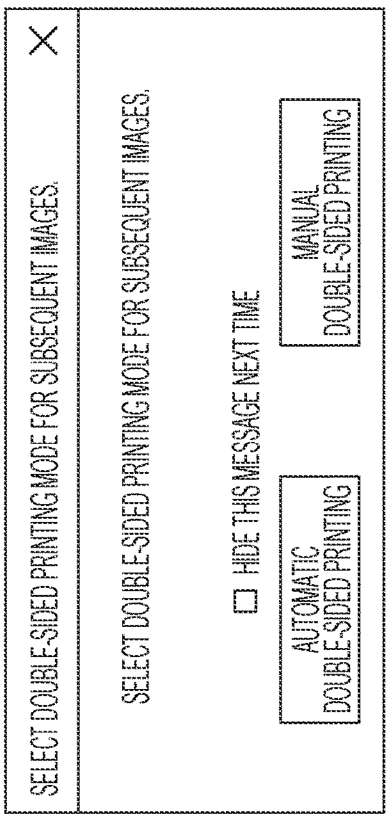

In S4213, the CPU 601 causes the operation panel 626 to output a message as will be described below. The message is a message prompting a user to select whether to maintain the automatic double-sided printing mode until printing of subsequent images ends or to switch to the manual double-sided printing mode. At this time, for example, the message shown in FIG. 30A is displayed on the operation panel 626. The user selects one in response to the message and operates the operation panel 626. The operation panel 626 outputs information about the double-sided printing mode, selected by user's operation, and the process proceeds to the next step.

When the CPU 601 causes the message output unit to output such a message, double-sided printing can be maintained by using a double-sided printing mode desired by the user, and the usability is improved.

In S4213, when the CPU 601 has acquired information indicating that a process to "perform double-sided printing for subsequent images in the automatic double-sided printing mode" is selected by the user, the process proceeds to S4214.

In S4214, the CPU 601 causes the message output unit to output a message prompting the user to close the FU tray 116 on the operation panel 626, and the process proceeds to S4215. At this time, for example, the message shown in FIG. 30F is displayed on the operation panel 626.

In S4215, when the FU tray 116 is opened by the user and the CPU 601 receives a LOW signal output from the FU tray open/close sensor 117, the process proceeds to S4216. Before the CPU 601 receives a LOW signal output from the FU tray open/close sensor 117, the process returns to S4214, and the CPU 601 causes the message output unit to output the above-described message on the operation panel 626.

In S4216, the CPU 601 resumes double-sided printing in the automatic double-sided printing mode, and ends printing. The automatic double-sided printing mode has been described in Automatic Double-Sided Printing Mode, so the detailed description is omitted here.

In S4213, when the CPU 601 has acquired information indicating that a process to "perform double-sided printing for subsequent images in the manual double-sided printing mode" is selected by the user, the process proceeds to S4217.

In S4217, the printer controller 213 cancels the printing operation in the automatic double-sided printing mode for subsequent images generated at the start of printing, and switches the printing operation into the printing operation in the manual double-sided printing mode.

Method of Switching from Printing Operation in Automatic Double-Sided Printing Mode to Printing Operation in Manual Double-Sided Printing Mode Hereinafter, a method with which the printer controller 213 switches from the printing operation in the automatic double-sided printing mode to the printing operation in the manual double-sided printing mode will be described.

Figure 30B:
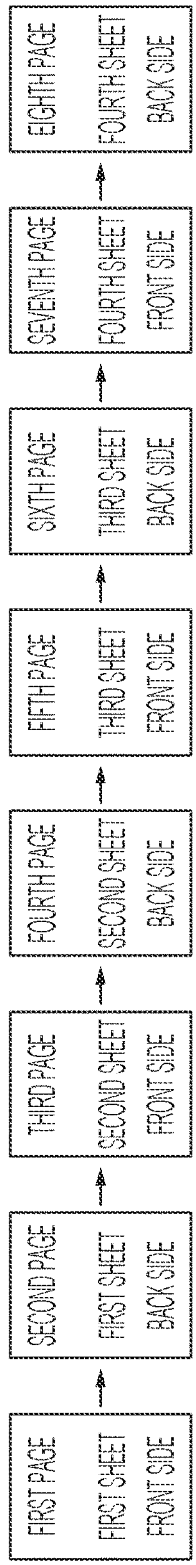
FIG. 30B is a view illustrating the sequence of image signals output in automatic double-sided printing mode.

Initially, the printing operation in the automatic double-sided printing mode and the printing operation in the manual double-sided printing mode will be described. When, for example, images of consecutive eight pages are printed on both sides of four sheets, the CPU 214 of the printer controller 213 outputs image signals that are pieces of second image information in the order shown in FIG. 30B to the printing section 221 in the automatic double-sided printing mode. In accordance with the image signals output by the CPU 214, the CPU 601 causes the image forming unit to alternately form an image on the front surface and an image on the back surface.

Figure 30C:
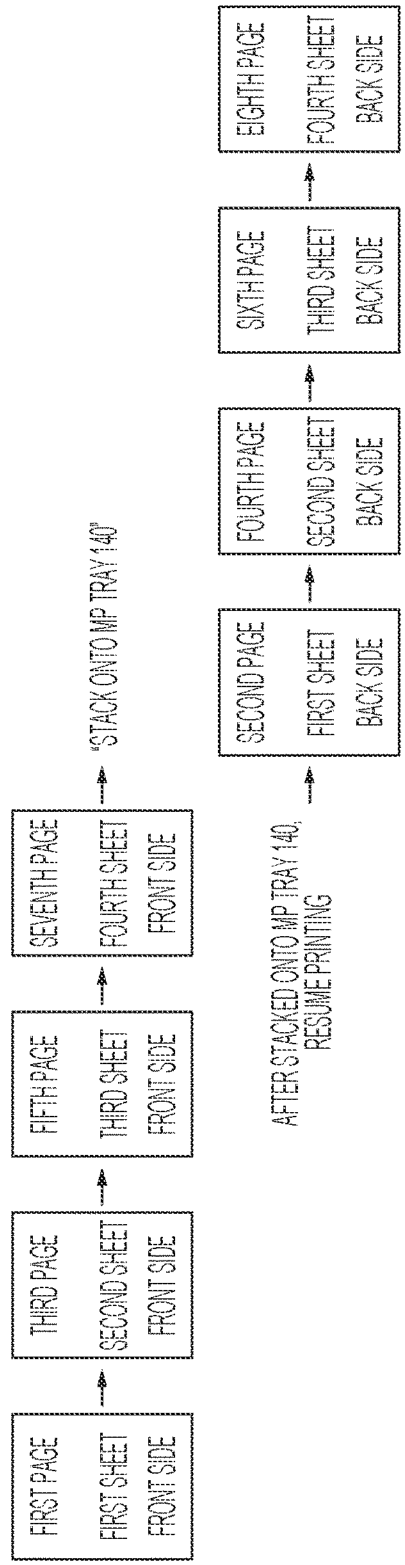
FIG. 30C is a view illustrating the sequence of image signals output in manual double-sided printing mode.

In the manual double-sided printing mode, the CPU 214 of the printer controller 213 outputs image signals that are pieces of second image information in the order shown in FIG. 30C to the printing section 221. In accordance with the image signals output by the CPU 214, the CPU 601 causes the image forming unit to form an image on all the front surfaces of the sheets on which an image is to be formed and then to form an image on all the back surfaces of the sheets on which an image is to be formed. The CPU 601 may execute in multiple steps the printing operation in which the image forming unit forms an image on the front surfaces of a plurality of sheets on which an image is to be formed and then forms an image on the back surfaces of the plurality of sheets on which an image is to be formed.

In the case of the manual double-sided printing mode, initially, in accordance with the image signals output by the CPU 214, the CPU 601 causes the image forming unit to form an image on the front surfaces of four sheets and then output the sheets to the FU tray 116. When the four sheets each having an image only on its front surface are output to the FU tray 116, the CPU 601 causes the operation panel 626 to output a message prompting the user to stack the sheets onto the MP tray 140. A message to be displayed at this time may be, for example, the sentence shown in FIG. 30D or may be, for example, the picture shown in FIG. 30E. Alternatively, in order for a user to easily understand necessary operation, for example, the picture shown in FIG. 30E may be animated and displayed on the operation panel 626. When the user stacks a set of sheets onto the MP tray 140 in response to the message and the CPU 601 acquires information that OK button has been depressed, the CPU 601 causes the sheet feeding unit to resume paper feeding and causes the image forming unit to form an image on the surface, having no image, of each sheet.

In this way, between the automatic double-sided printing mode and the manual double-sided printing mode, the order in which the CPU 214 of the printer controller 213 outputs image signals that are pieces of second image information to the printing section 221 is different.

S4217 will be further described. When, for example, the CPU 601 completes double-sided printing up to the fourth page out of 10-page printing operation and then the process proceeds to S4217, the printer controller 213 cancels the printing operation for double-sided printing of the fifth to tenth pages generated at the start of printing. Subsequently, since the leading page of the remaining fifth to tenth pages is an odd-number page, the image signals for the odd-number pages are sorted in ascending order and are output to the printing section 221. In other words, the printer controller 213 outputs the image signals for fifth, seventh, and ninth pages to the printing section 221. The CPU 601 causes the image forming unit to form images of the fifth, seventh, and ninth pages and outputs three sheets each having an image only on its one side to the FU tray 116. When printing of the odd-number pages ends, the CPU 601 causes the operation panel 626 to display a message prompting the user to stack the set of sheets onto the MP tray 140. When the user stacks the set of sheets onto the MP tray 140 in response to the message and the CPU 601 acquires information that OK button has been depressed, the printer controller 213 sorts image signals for the even-number pages in ascending order and outputs the image signals to the printing section 221. The CPU 601 causes the image forming unit to form images of the sixth, eighth, and tenth pages, outputs the three sheets each having an image on each side to the FU tray 116, and ends printing.

Summary of Twelfth Embodiment

As described above, in the present embodiment, the case where double-sided printing is performed on a plurality of sheets and the FU tray 116 is switched into the open state after double-sided printing is started has been described. In addition, the case where the CPU 601 suspends printing operation with the first abnormality detection method has been described.

In the present embodiment, before a sheet having a first image only on its one side approaches the set of FU rollers 111, the FU tray 116 is opened by a user, and the sheet is output to the FU tray 116. The CPU 601 causes the message output unit to output a message prompting the user to manually stack the output sheet onto the MP tray 140. In response to the fact that the output sheet is stacked onto the MP tray 140 by the user, the CPU 601 resumes paper feeding with the sheet feeding unit and causes the image forming unit to form a second image. With this function, even when the FU tray 116 is switched into the open state after double-sided printing is started, it is possible to continue double-sided printing. It is possible to perform double-sided printing desired by a user by not wasting an output sheet having an image only on its one side and forming an image on the surface having no image.

In addition, at the time of printing subsequent images, it is possible to make a user close the FU tray 116 and resume printing in the automatic double-sided printing mode without changing the printing mode. Alternatively, at the time of printing subsequent images, it is possible to switch the printing operation into the manual double-sided printing mode by the printer controller 213 while the FU tray 116 remains open and resume printing in the manual double-sided printing mode. With this function, even when a user erroneously opens the FU tray 116 after the start of printing, double-sided printing can be continued by using a double-sided printing mode desired by the user, so the usability is improved.

Thirteenth Embodiment

In the eleventh and twelfth embodiments, the case where the CPU 601 suspends printing operation with the first abnormality detection method has been described. In the present embodiment, the case where the printing operation is suspended with a second abnormality detection method will be described. The second abnormality detection method will be described later.

In the present embodiment, as in the case of the eleventh and twelfth embodiments, the case where double-sided printing is performed in the automatic double-sided printing mode in a state where the FU tray 116 is closed will be described. As in the case of the eleventh embodiment, the case where double-sided printing is performed on a sheet and the FU tray 116 is switched into the open state after double-sided printing is started will be described.

Second Abnormality Detection Method

The second abnormality detection method with which the CPU 601 suspends the printing operation is such that the FU tray 116 is opened by a user and a second signal is output from the FU tray open/close sensor 117.

Figure 26G:
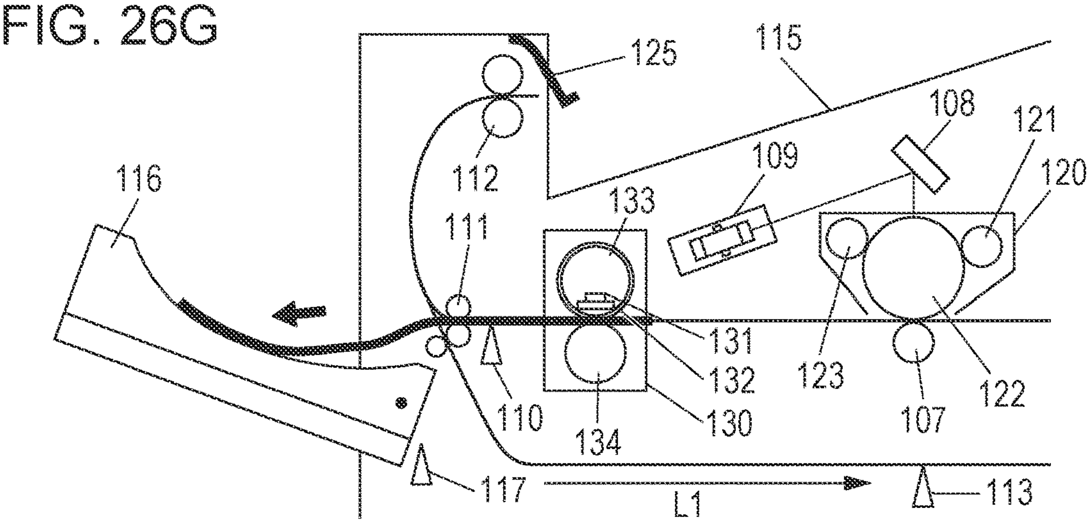
FIG. 26G and FIG. 26H are diagrams for a sheet conveying position.
Figure 26H:
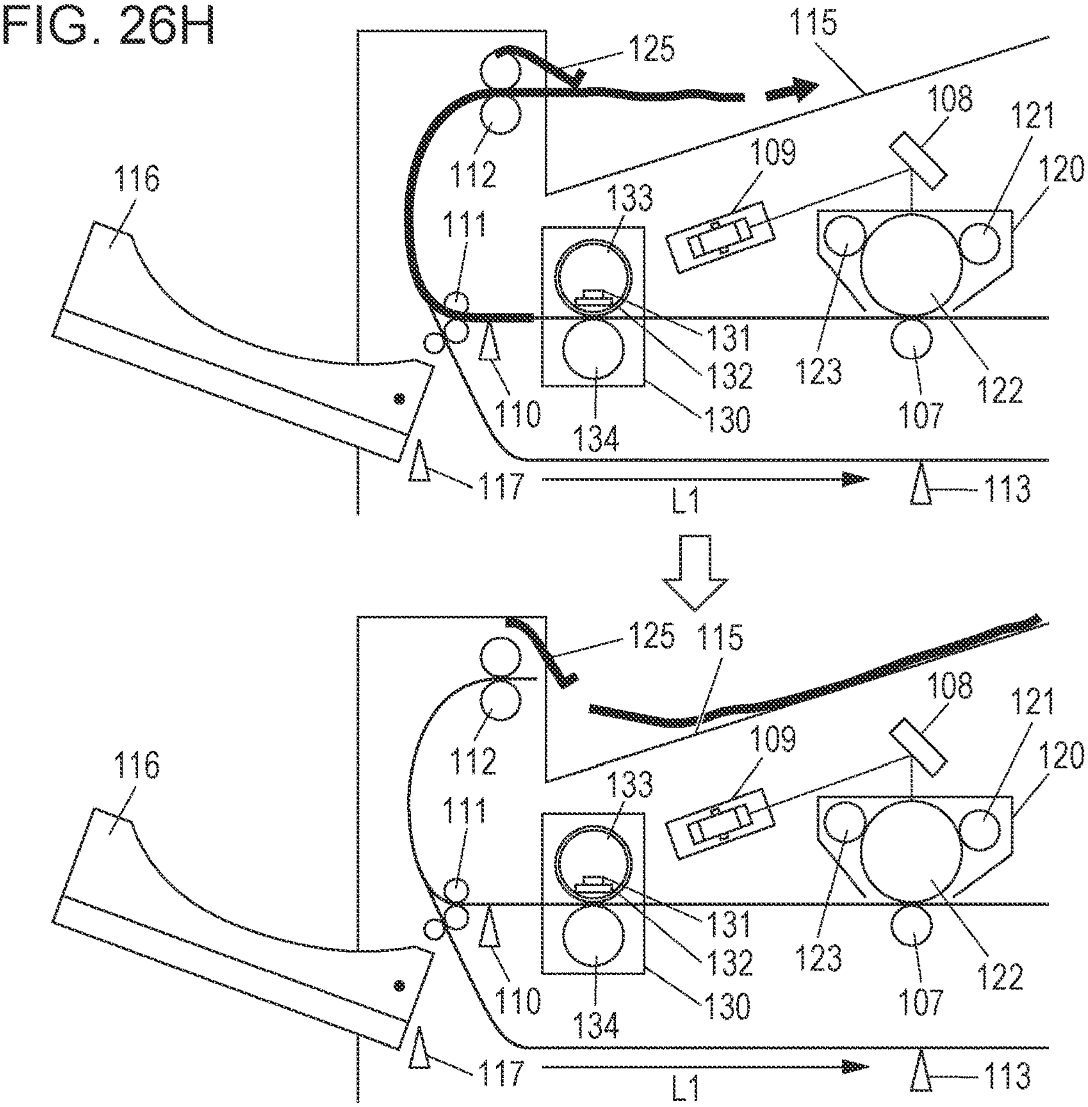

When, for example, the FU tray 116 is opened before a sheet having a first image only on its one side approaches the pair of FD rollers 112, the sheet having the first image only on its one side is output to the FU tray 116 as shown in FIG. 26G. When a sheet having a first image only on its one side approaches the pair of FD rollers 112 and then the FU tray 116 is opened before the pair of FD rollers 112 starts reverse rotation, the CPU 601 suspends printing operation. Therefore, the sheet having the first image only on its one side is output to the FD tray 115 as shown in FIG. 26H. In addition, when the FU tray 116 is opened before the pair of FD rollers 112 starts reverse rotation and the sheet of which the conveying direction is reversed is conveyed to the set of FU rollers 111, the sheet having a first image only on its one side is output to the FU roller 116 as shown in FIG. 26F.

Figure 31A:
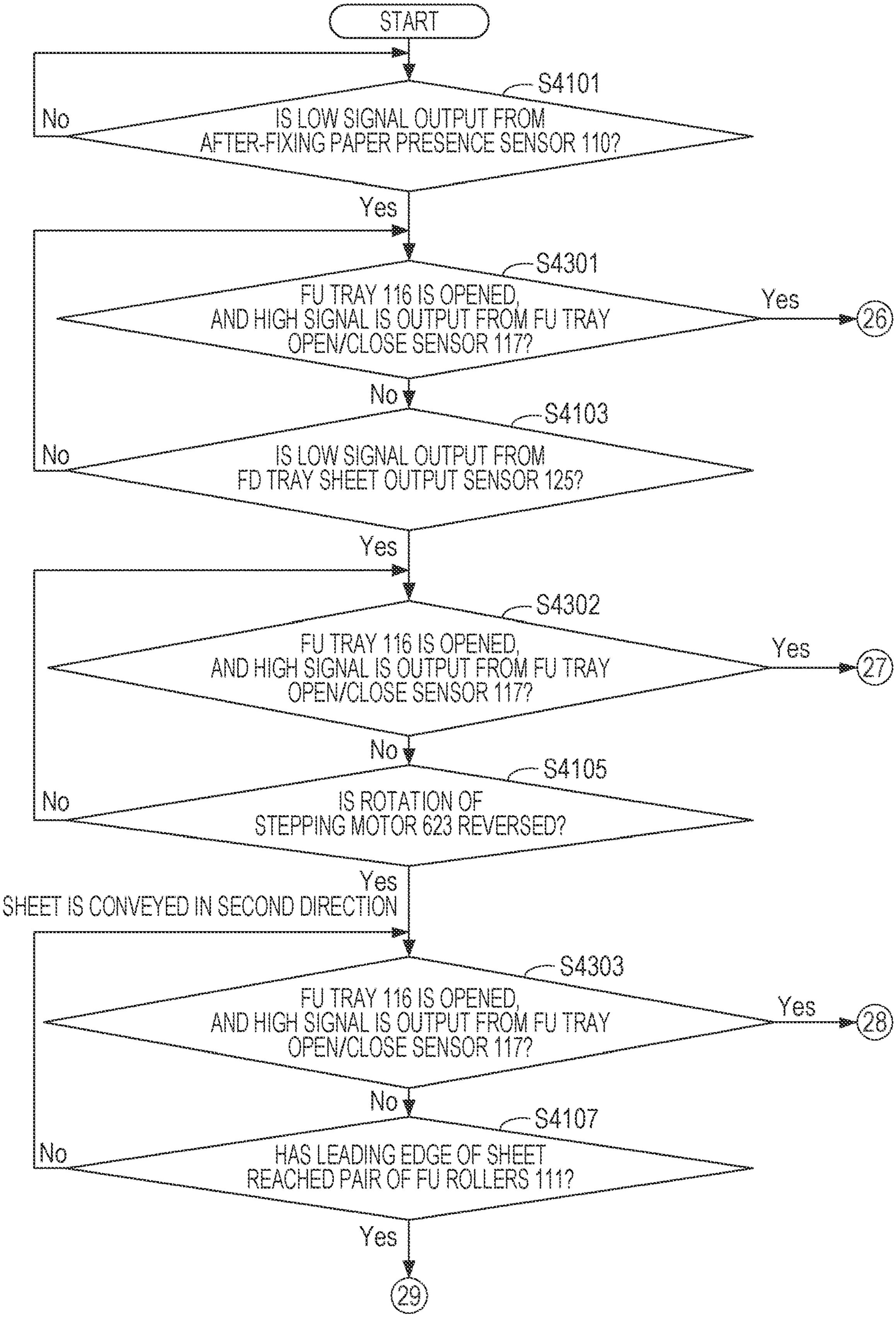
FIG. 31A and FIG. 31B are flowcharts of a process in the thirteenth embodiment.
Figure 31B:
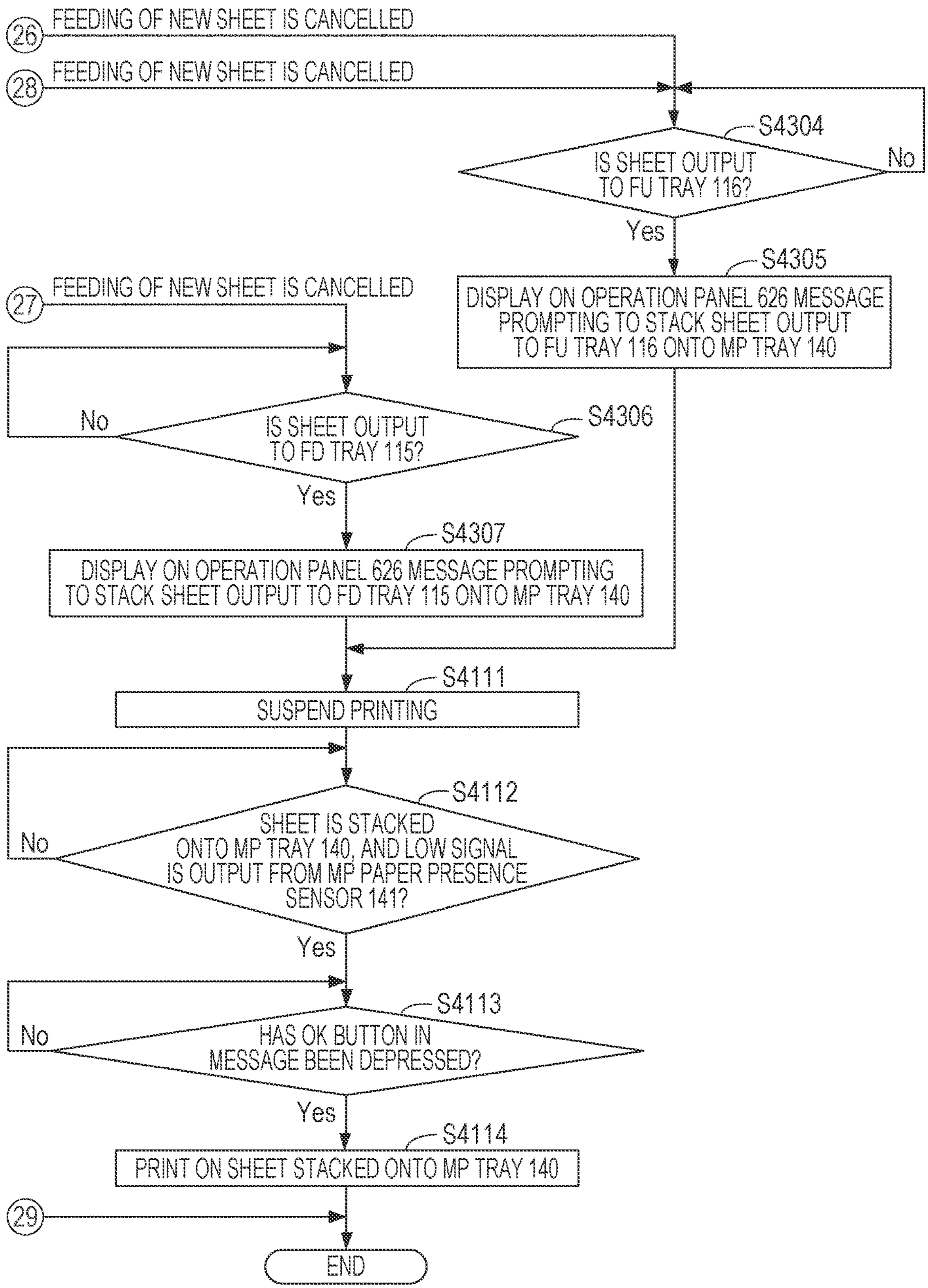

Hereinafter, control in the present embodiment will be described with reference to the flowcharts shown in FIG. 31A and FIG. 31B. Like step numbers are assigned to the same configuration as those of the above-described embodiments, and the description thereof is omitted. The image forming process and the hardware configuration are also the same as those of the eleventh and twelfth embodiment, so the description thereof is omitted. S4101 may be started from a state where no sheet has been output to the FU tray 116 or the FD tray 115, or S4101 may be started from a state where one or more sheets have been output to the FU tray 116 or the FD tray 115.

In S4301, when the FU tray 116 is opened by user's operation and the CPU 601 receives a HIGH signal output from the FU tray open/close sensor 117, the CPU 601 detects that an abnormality has occurred. When the CPU 601 detects that an abnormality has occurred, the CPU 601 causes the sheet feeding unit to cancel feeding of a new sheet, and the process proceeds to S4304. When the CPU 601 does not receive a second signal output from the FU tray open/close sensor 117, the process proceeds to S4103. The description of S4103 is omitted.

In S4302, when the FU tray 116 is opened by user's operation and the CPU 601 receives a HIGH signal output from the FU tray open/close sensor 117, the CPU 601 detects that an abnormality has occurred. When the CPU 601 detects that an abnormality has occurred, the CPU 601 causes the sheet feeding unit to cancel feeding of a new sheet, and the process proceeds to S4306. When the CPU 601 does not receive a HIGH signal output from the FU tray open/close sensor 117, the process proceeds to S4105. The description of S4105 is omitted.

In S4303, when the FU tray 116 is opened by user's operation and the CPU 601 receives a HIGH signal output from the FU tray open/close sensor 117, the CPU 601 detects that an abnormality has occurred. When the CPU 601 detects that an abnormality has occurred, the CPU 601 causes the sheet feeding unit to cancel feeding of a new sheet, and the process proceeds to S4304. When the CPU 601 does not receive a HIGH signal output from the FU tray open/close sensor 117, the process proceeds to S4107. The description of S4107 is omitted.

In S4304, the sheet having an image on its one side is output to the FU tray 116, and the process proceeds to S4305.

The operation that the CPU 601 prompts the user to perform in the message output to the operation panel 626 in S4305 will be described. Initially, a sheet output to the FU tray 116 is turned upside down into a state where the surface having an image faces downward. In a state where the surface having no image faces upward, the sheet is stacked onto the MP tray 140 such that the leading edge of the sheet output to the FU tray 116 is inserted to the MP tray 140. A message to be displayed at this time may be, for example, the sentence shown in FIG. 29A or may be, for example, the picture shown in FIG. 29B. Alternatively, in order for a user to easily understand necessary operation, for example, the picture shown in FIG. 29B may be animated and displayed on the operation panel 626.

The CPU 601 is able to continue double-sided printing by causing the message output unit to output such a message and prompting a user to perform operation, so the usability is improved.

In S4306, the sheet having an image on its one side is output to the FD tray 115, and the process proceeds to S4307. S4103, S4105, S4107, S4301, S4302, S4303, S4304, and S4306 are steps corresponding to the above-described second abnormality detection method.

In S4307, the CPU 601 causes the operation panel 626 to output a message prompting the user to perform operation described below, and the process proceeds to S4111.

The operation that the CPU 601 prompts the user to perform in the message output to the operation panel 626 in S4307 will be described. While the upper surface and lower surface of the sheet output to the FD tray 115 remain unchanged, and the sheet is stacked onto the MP tray 140 such that the leading edge of the sheet output to the FD tray 115 is inserted to the MP tray 140. A message to be displayed at this time may be, for example, the sentence shown in FIG. 29C or may be, for example, the picture shown in FIG. 29D. Alternatively, in order for a user to easily understand necessary operation, for example, the picture shown in FIG. 29D may be animated and displayed on the operation panel 626.

The CPU 601 is able to continue double-sided printing by causing the message output unit to output such a message and prompting a user to perform operation, so the usability is improved.

The messages displayed in S4305 and S4307 may contain OK button. OK button is a button to be depressed at the time when the user has completed operation according to the message. When OK button is depressed, the CPU 601 acquires a signal indicating that the operation is complete. OK button may be a button that indicates completion of operation, such as “COMPLETE” button.

In S4111, the CPU 601 suspends the printing operation, and the process proceeds to S4112. The order of the processes of S4305 and S4111 and the order of the processes of S4307 and S4111 may be interchanged.

S4112 to S4114 are the same as those of the eleventh and twelfth embodiments, so the description thereof is omitted.

Summary of Thirteenth Embodiment

As described above, in the present embodiment, the case where double-sided printing is performed on a sheet and the FU tray 116 is switched into the open state after double-sided printing is started has been described. In addition, the case where the CPU 601 suspends printing operation with the second abnormality detection method has been described.

In the present embodiment, before a sheet having a first image only on its one side approaches the set of FU rollers 111, the sheet is output to the FU tray 116 or the FD tray 115 according to the timing when the FU tray 116 is opened by a user. The message output unit is caused to output a message prompting the user to manually stack the output sheet onto the MP tray 140. In response to the fact that the sheet output to the FU tray 116 or the FD tray 115 is stacked onto the MP tray 140 by the user, the sheet feeding unit is caused to resume paper feeding and the image forming unit is caused to form a second image. With this function, even when the FU tray 116 is switched into the open state after double-sided printing is started, it is possible to continue double-sided printing. It is possible to perform double-sided printing desired by a user by not wasting an output sheet having an image only on its one side and forming an image on the surface having no image.

Fourteenth Embodiment

In the eleventh and thirteenth embodiments, the case where, when double-sided printing is performed on one sheet, double-sided printing can be continued even when the FU tray 116 is opened during double-sided printing in the automatic double-sided printing mode has been described. In the present embodiment, the case where double-sided printing is performed on a plurality of sheets will be described.

In the present embodiment, as in the case of the thirteenth embodiment, the printing operation is suspended with the second abnormality detection method. The second abnormality detection method is as described above. When a sheet output to the FU tray 116 or the FD tray 115 is stacked on the MP tray 140 by user's operation, a second image is formed on the surface having no image, and double-sided printing for one sheet completes. In the present embodiment, the case where, after double-sided printing for one sheet is complete, a user is able to select whether to maintain the automatic double-sided printing mode until printing of subsequent images ends or to switch to the printing operation in the manual double-sided printing mode will be described.

Figure 32A:
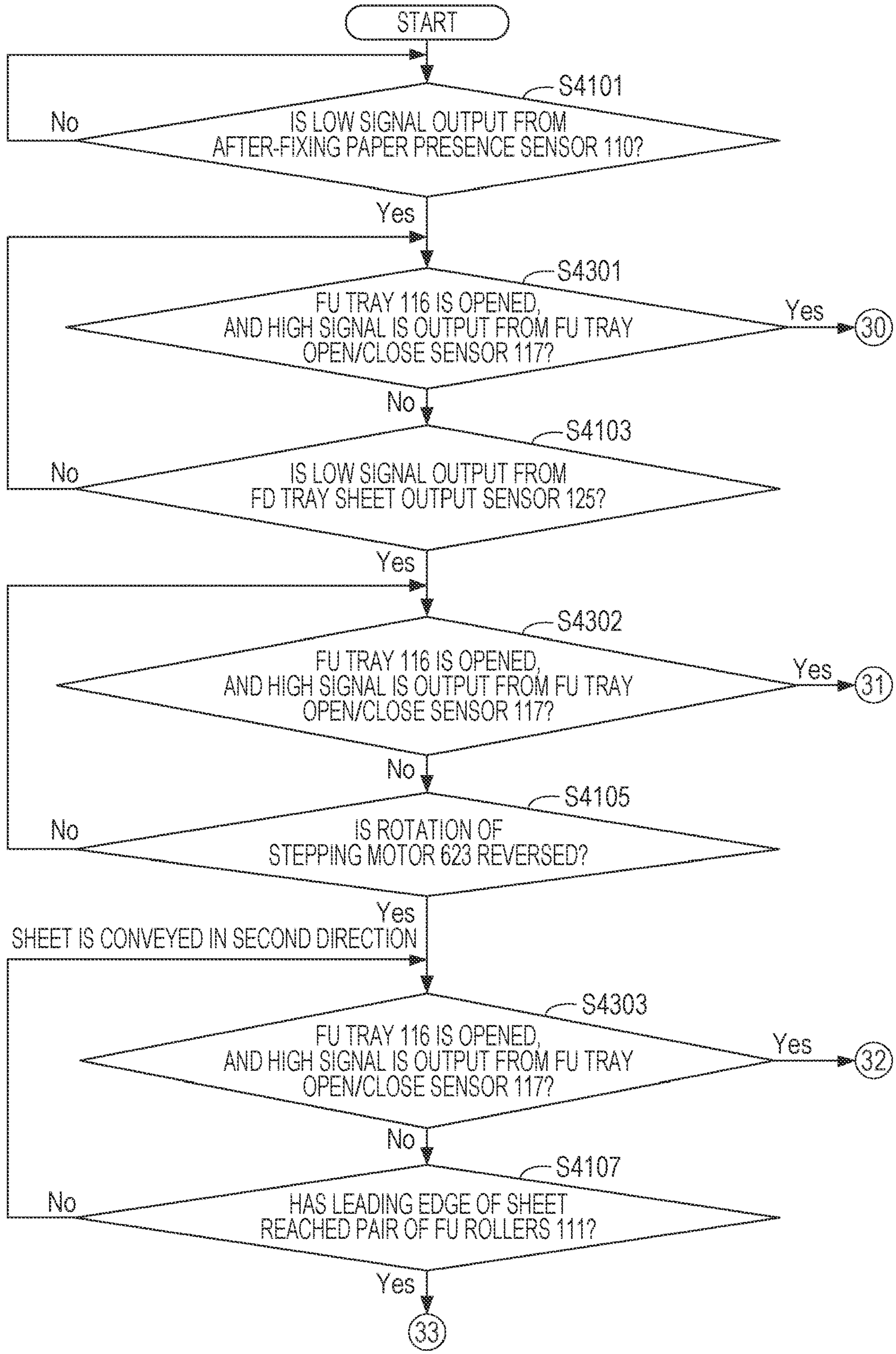
FIG. 32A and FIG. 32B are flowcharts of a process in the fourteenth embodiment.
Figure 32B:
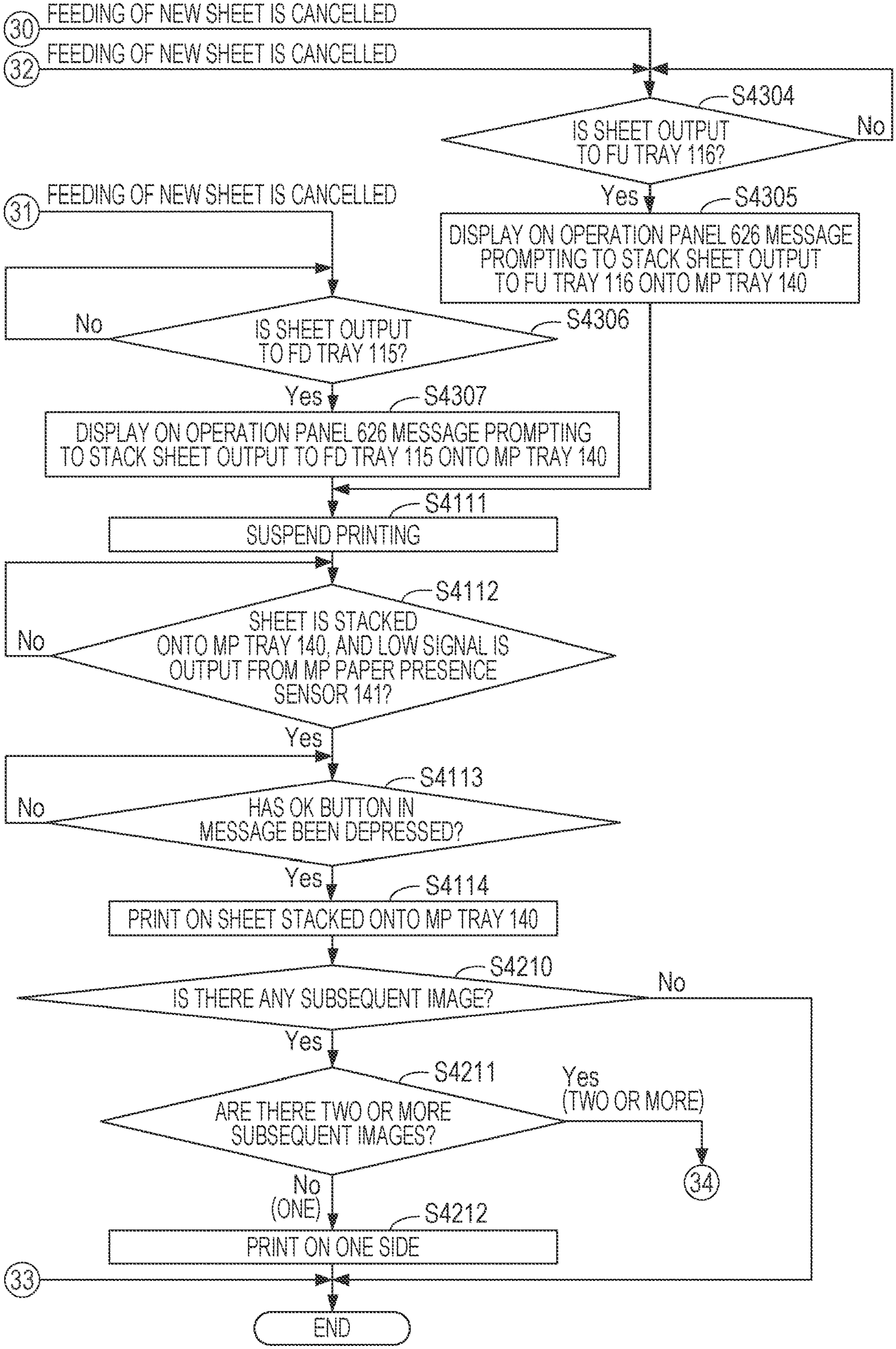
Figure 32C:
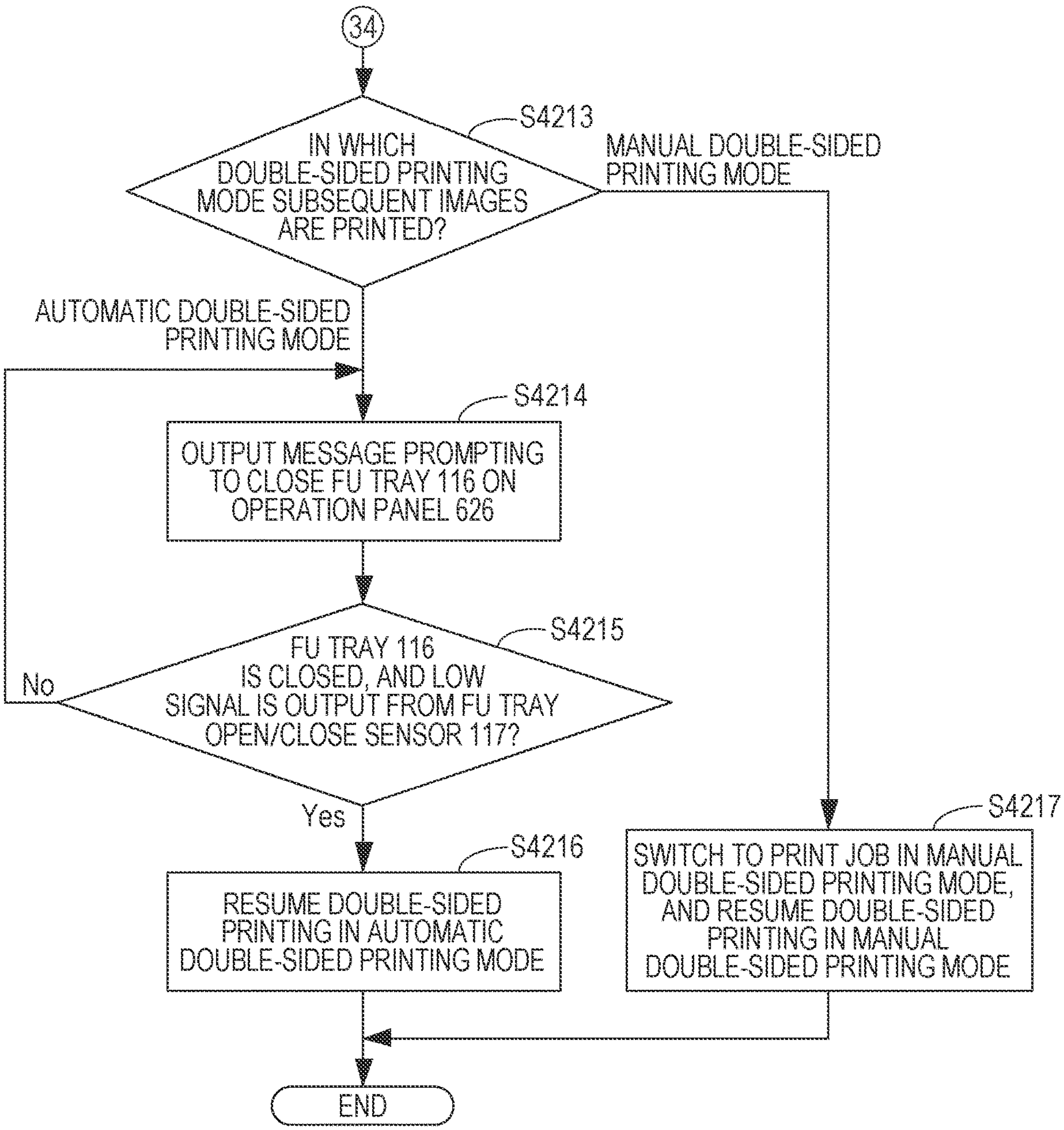
FIG. 32C is a flowchart of the process in the fourteenth embodiment.

Hereinafter, control in the present embodiment will be described with reference to the flowchart shown in FIG. 32A to FIG. 32C. Like step numbers are assigned to the same configuration as those of the above-described embodiments, and the description thereof is omitted. The image forming process and the hardware configuration are also the same as those of the eleventh to thirteenth embodiments, so the description thereof is omitted. S4101 to S4114 and S4301 to S4307 in the flowchart of FIG. 32A to FIG. 32C are the same as those of the thirteenth embodiment, so the description thereof is omitted.

In S4210, when the CPU 601 receives information on subsequent images from the printer controller 213, the process proceeds to S4211. When the CPU 601 does not receive information on subsequent images from the printer controller 213, the process ends.

In S4211, when the information on subsequent images, received by the CPU 601, contains only one subsequent image, the process proceeds to S4212, the CPU 601 causes the image forming unit to form an image on one side of the sheet, and the process ends. When the information on subsequent images, received by the CPU 601, contains two or more subsequent images, the process of the flowchart shown from [2] is executed.

In S4213, the CPU 601 causes the operation panel 626 to output a message as will be described below. The message is a message prompting a user to select whether to maintain the automatic double-sided printing mode until printing of subsequent images ends or to switch to the manual double-sided printing mode. At this time, for example, the message shown in FIG. 30A is displayed on the operation panel 626. The user selects one in response to the message and operates the operation panel 626. The operation panel 626 outputs information about the double-sided printing mode, selected by user's operation, and the process proceeds to the next step.

When the CPU 601 causes the message output unit to output such a message, double-sided printing can be maintained by using a double-sided printing mode desired by the user, and the usability is improved.

In S4213, when the CPU 601 has acquired information indicating that a process to "perform double-sided printing for subsequent images in the automatic double-sided printing mode" is selected by the user, the process proceeds to S4214.

In S4214, the CPU 601 causes the message output unit to output a message prompting the user to close the FU tray 116 on the operation panel 626, and the process proceeds to S4215. At this time, for example, the message shown in FIG. 30F is displayed on the operation panel 626.

In S4215, when the FU tray 116 is opened by the user and the CPU 601 receives a LOW signal output from the FU tray open/close sensor 117, the process proceeds to S4216. Before the CPU 601 receives a LOW signal output from the FU tray open/close sensor 117, the process returns to S4214, and the CPU 601 causes the message output unit to output the above-described message on the operation panel 626.

In S4216, the CPU 601 resumes double-sided printing in the automatic double-sided printing mode, and ends printing. The automatic double-sided printing mode has been described in Automatic Double-Sided Printing Mode, so the detailed description is omitted here.

In S4213, when the CPU 601 has acquired information indicating that a process to "perform double-sided printing for subsequent images in the manual double-sided printing mode" is selected by the user, the process proceeds to S4217.

In S4217, the printer controller 213 cancels the printing operation in the automatic double-sided printing mode for subsequent images generated at the start of printing. The printer controller 213 switches the printing operation in the automatic double-sided printing mode to the printing operation in the manual double-sided printing mode, performs double-sided printing by using the manual double-sided printing mode, and ends printing.

Summary of Fourteenth Embodiment

As described above, in the present embodiment, the case where double-sided printing is performed on a plurality of sheets and the FU tray 116 is switched into the open state after double-sided printing is started has been described. In addition, the case where the CPU 601 suspends printing operation with the second abnormality detection method has been described.

In the present embodiment, before a sheet having a first image only on its one side approaches the set of FU rollers 111, the sheet is output to the FU tray 116 or the FD tray 115 according to the timing when the FU tray 116 is opened by a user. The message output unit is caused to output a message prompting the user to manually stack the output sheet onto the MP tray 140. In response to the fact that the sheet output to the FU tray 116 or the FD tray 115 is stacked onto the MP tray 140 by the user, the sheet feeding unit is caused to resume paper feeding and the image forming unit is caused to form a second image. With this function, even when the FU tray 116 is switched into the open state after double-sided printing is started, it is possible to continue double-sided printing. It is possible to perform double-sided printing desired by a user by not wasting a sheet having an image only on its one side and forming an image on the other side.

In addition, at the time of printing subsequent images, it is possible to make a user close the FU tray 116 and resume printing in the automatic double-sided printing mode without changing the printing mode. Alternatively, at the time of printing subsequent images, it is possible to switch the printing operation into the manual double-sided printing mode by the printer controller 213 while the FU tray 116 remains open and resume printing in the manual double-sided printing mode. With this function, after the start of printing, even when a user erroneously opens the FU tray 116 after the start of printing, double-sided printing can be continued by using a double-sided printing mode desired by the user, so the usability is improved.

Fifteenth Embodiment

Japanese Patent Laid-Open No. 2006-168887 describes a configuration that includes a plurality of conveying paths and that conveys a sheet by using one of the plurality of conveying paths. There is, for example, a sheet feeding cassette that is a sheet feeding unit that feeds a sheet by using a sheet feed conveying path to convey the sheet to an image forming unit in a state where the upper surface of the sheet stacked faces downward. On the other hand, there is a multi-purpose tray (hereinafter, also referred to as MP tray) that is a sheet feeding unit on which a sheet can be stacked by hand and that feeds a sheet by using a sheet feed conveying path to convey the sheet to the image forming unit while the upper surface of the sheet stacked faces upward. A user is able to switch a sheet feeding section according to usage.

In addition, there is a double-sided printing method that, for example, when double-sided printing is performed, uses a double-sided printing conveying path that switches the conveying direction before conveying and outputting a sheet having an image on its first surface to an FD tray and then conveys the sheet to the image forming unit again. On the other hand, there is a double-sided printing method that feeds a sheet from the MP tray, that makes a user stack the sheet having an image on its first surface and output to an FU tray, and that forms an image on the second surface without using the double-sided printing conveying path. A user is able to switch the double-sided printing method according to usage.

However, in an image forming apparatus that conveys a sheet by using one of a plurality of conveying paths, the possibility of a conveyance malfunction may relatively vary among the conveying paths used. If a conveyance malfunction occurs, a user needs to deal with a sheet causing the conveyance malfunction, and this may lead to a decrease in usability. In such a situation, to reduce a conveyance malfunction, it is desired to provide a message prompting to switch the conveying path. Depending on the status of occurrence of a conveyance malfunction, a message prompting to switch the conveying path is output.

Configuration of Image Forming Apparatus

The image forming apparatus 20 shown in FIG. 18 executes a job that is a series of printing operation according to a printing instruction. Like reference numbers are assigned to the same components as those of the above-described embodiments, and the description thereof is omitted.

Sheet Feeding Unit

The sheet feeding unit will be described. Sheets stacked in the sheet feeding cassette 100 are picked up by the sheet feeding roller 102 and are conveyed to the pair of conveying rollers 104 one by one by the pair of separation rollers 103. At this time, the presence or absence of sheets in the sheet feeding cassette 100 is detected by the sheet detecting sensor 101. Whether a sheet is conveyed to the pair of conveying rollers 104 is detected by the after-feeding paper presence sensor 118. The sheet fed to the pair of conveying rollers 104 is conveyed to the pair of conveying rollers 105.

At this time, one of sheets stacked in the sheet feeding cassette 100 is conveyed to the pair of conveying rollers 105 such that the upper surface in a stacked state faces downward, and an image is formed by the image forming unit on the lower surface in a stacked state. The sheet feed conveying path at this time is also referred to as first sheet feed conveying path. The sheet feeding cassette 100 is also referred to as first sheet feeding section, and the sheet feeding roller 102 is also referred to as first sheet feed conveying unit.

Subsequently, the case where a sheet is fed from a multi-purpose tray (MP tray) 140 for feeding a sheet manually as another sheet feeding unit will be described. The MP tray 140 is an opening/closing member capable of being switched between an open position and a close position. When the MP tray 140 is in the open position, the MP tray 140 serves as a sheet feeding port for feeding a sheet. When the MP tray 140 is in the close position, the MP tray 140 does not serve as a sheet feeding port for feeding a sheet. When sheets are fed from the MP tray 140, the MP tray 140 is switched into the open position, and sheets are stacked. The MP tray 140 is also referred to as second sheet feeding section.

When sheets are fed from the MP tray 140, the sheets stacked on the MP tray 140 are picked up by the MP sheet feeding roller 142, and are conveyed to the pair of conveying rollers 105 one by one by the pair of MP separation rollers 143.

The presence or absence of sheets stacked on the MP tray 140 is detected by the MP paper presence sensor 141. Sheets stacked on the MP tray 140 are conveyed to the pair of conveying rollers 105 such that the upper surface in a stacked state faces upward, and an image is formed by the image forming unit on the upper surface in a stacked state. The sheet feed conveying path at the time when a sheet is fed from the MP tray 140 is also referred to as second sheet feed conveying path. The MP tray 140 is also referred to as second sheet feeding section, and the MP sheet feeding roller 142 is also referred to as second sheet feed conveying unit. Furthermore, the pair of conveying rollers 105 disposed in the conveying path into which the first sheet feed conveying path and the second sheet feed conveying path merges and that conveys a sheet to the image forming unit is also referred to as third sheet feed conveying unit.

When sheets are fed from the optional sheet feeding cassette 2000 as well, the optional sheet feeding roller 2020 picks up and feeds sheets to the pair of optional conveying rollers 2040 one by one by means of the pair of optional separation rollers 2030. When sheets are fed from the optional sheet feeding cassette 3000 as well, the optional sheet feeding roller 3020 picks up and feeds sheets to the pair of optional conveying rollers 3040 one by one by means of the pair of optional separation rollers 3030. At this time, as in the case of the sheet feeding cassette 100 and the MP tray 140, the presence or absence of sheets stacked in the optional sheet feeding cassette 2000 is detected by the sheet detecting sensor 2010, and the presence or absence of sheets stacked in the optional sheet feeding cassette 3000 is detected by the sheet detecting sensor 3010. Whether a sheet is conveyed to the pair of optional conveying rollers 2040 is detected by an after-feeding paper presence sensor 2180. Whether a sheet is conveyed to the pair of optional conveying rollers 3040 is detected by an after-feeding paper presence sensor 3180. The sheet fed to the pair of optional conveying rollers 2040 is conveyed to the pair of conveying rollers 105. The sheet fed to the pair of optional conveying rollers 3040 is also conveyed to the pair of conveying rollers 105.

As described above, components concerned with feeding of a sheet to the image forming unit are referred to as sheet feeding unit.

Radii of Curvature of First Sheet Feed Conveying Path and Second Sheet Feed Conveying Path The first sheet feed conveying path and the second sheet feed conveying path have different radii of curvature. The radius of curvature of each of the sheet feed conveying paths will be described by using the schematic cross-sectional view of the image forming apparatus of FIG. 19A and examples of specific numeric values. FIG. 2A shows that the MP tray 140 is in the open state. When sheets are fed from the sheet feeding cassette 100, a sheet is conveyed along a conveying path that passes through the pair of separation rollers 103 and then passes through the pair of conveying rollers 104. The radius of curvature of the conveying path is, for example, R80 (80 mm). On the other hand, when sheets are fed from the MP tray 140, a sheet is conveyed along a conveying path that passes through the pair of MP separation rollers 143 and then passes through the pair of conveying rollers 105. The radius of curvature of the conveying path is, for example, R800 (800 mm). Here, the conveying path from the sheet feeding cassette 100 and the conveying path from the MP tray 140 are compared with each other by using examples of numeric values of the radii of curvature. It is assumed that a minimum value of the radius of curvature of the conveying path in the case where a sheet is fed from the sheet feeding cassette 100 is less than a minimum value of the radius of curvature of the conveying path in the case where a sheet is fed from the MP tray 140.

For this reason, when, for example, a sheet of stiff paper, such as thick paper and envelope, is fed from the sheet feeding cassette 100, a sheet passes along the conveying path with a small radius of curvature, so the conveyance resistance is large and, as a result, a conveyance malfunction or a paper jam may occur. Accordingly, when such a sheet is fed from the MP tray 140, the sheet is not conveyed along the conveying path with a small radius of curvature, so a conveyance malfunction or a paper jam is reduced.

Sheet Output Section

Subsequently, sheet output sections will be described.

The image forming apparatus 20 includes the FD tray 115 to which a sheet is output face down (hereinafter, also referred to as FD output) and the FU tray 116 to which a sheet is output face up (hereinafter, also referred to as FU output). The sheet output conveying path to the FD tray 115 and the sheet output conveying path to the FU tray 116 are different.

The sheet output conveying path to the FD tray 115 is a conveying path along which a sheet is conveyed by the FU roller 111$a$ and the FU roller 111$b$, passes through the pair of FD rollers 112 and is then output to the FD tray 115. The sheet output conveying path to the FD tray 115 is also referred to as sheet output conveying path. When a sheet having an image on its upper surface is conveyed along the sheet output conveying path, the sheet is stacked on the FD tray 115 such that the surface having an image faces downward (face down) (FD). The FD tray sheet output sensor 125 detects that a sheet is output to the FD tray 115. The FD tray sheet output sensor 125 will be described later. The FD tray 115 is also referred to as first sheet output section. The FU roller 111$a$ and the FU roller 111$b$ are also referred to as second sheet output conveying unit, and the pair of FD rollers 112 is also referred to as first sheet output conveying unit.

The FU tray 116 is an opening/closing member capable of being switched between an open position and a close position. When the FU tray 116 is in the close position, a sheet having an image formed by the image forming unit is conveyed along the sheet output conveying path along which the sheet is conveyed by the FU roller 111$a$ and the FU roller 111$b$ and the pair of FD rollers 112 and is output to the FD tray 115. In other words, the FU tray 116 serves as a guiding portion that guides a sheet to the FD tray 115. When the FU tray 116 is in the open position, a sheet having an image formed by the image forming unit is conveyed along the sheet output conveying path along which the sheet is conveyed by the FU roller 111$a$ and the FU roller 111$b$ and then output to the FU tray 116 without being conveyed to the pair of FD rollers 112. In other words, the FU tray 116 serves as not a guiding portion that guides a sheet to the FD tray 115 but a sheet output tray capable of carrying sheets.

The sheet output conveying path to the FU tray 116 is a conveying path along which a sheet is conveyed by the FU roller 111$a$ and the FU roller 111$b$ and then output to the FU tray 116. The sheet output conveying path to the FU tray 116 is also referred to as second sheet output conveying path. When a sheet having an image on its upper surface is conveyed along the second sheet output conveying path, the sheet is stacked on the FU tray 116 such that the surface having an image faces upward (face up) (FU). The FU tray 116 is also referred to as second sheet output section.

The FU tray open/close sensor 117 outputs a first signal when the FU tray 116 is in the close position, and outputs a second signal when the FU tray 116 is in the open position. The FU tray open/close sensor 117 is also referred to as open/close signal output unit. The CPU 601 detects the open/closed state of the FU tray 116 in accordance with the first signal or second signal output from the FU tray open/close sensor 117. The detailed function of the FU tray open/close sensor 117 will be described later.

Radii of Curvature of Sheet Output Conveying Path and Second Sheet Output Conveying Path The sheet output conveying path and the second sheet output conveying path have different radii of curvature. The radius of curvature of each of the sheet output conveying paths will be described by using the schematic cross-sectional view of the image forming apparatus of FIG. 2B and examples of specific numeric values. In FIG. 2B, the open state of the FU tray 116 is represented by the dashed line. When the FU tray 116 is in the closed state, a sheet is conveyed along the conveying path along which the sheet is conveyed by the FU roller 111a and the FU roller 111b and the pair of FD rollers 112, and is then output to the FD tray 115, as indicated by the continuous line in FIG. 2B. The radius of curvature of the conveying path is, for example, R75 (75 mm). On the other hand, when the FU tray 116 is in the open state, a sheet passes through the set of FU rollers 111, then conveyed along a conveying path represented by the dashed line in FIG. 2B, and output to the FU tray 116. The radius of curvature of the conveying path is, for example, R400 (400 mm). Here, the conveying path to the FD tray 115 and the conveying path to the FU tray 116 are compared with each other by using examples of numeric values of the radii of curvature. It is assumed that a minimum value of the radius of curvature of the sheet conveying path formed in the case where the FU tray 116 is in the closed state is less than a minimum value of the radius of curvature of the sheet conveying path formed in the case where the FU tray 116 is in the open state.

For this reason, when, for example, a sheet of stiff paper, such as thick paper and envelope, is FD output, a sheet passes along the conveying path with a small radius of curvature in a state where heat received from the heater 132 remains in the sheet, so the sheet may be curled. In addition, when the radius of curvature of a conveying path is small, the conveyance resistance is large and, as a result, a conveyance malfunction may occur. Accordingly, when the FU tray 116 is switched into the open state, a sheet is not conveyed along the conveying path with a small radius of curvature, so a sheet conveyance malfunction is reduced.

Double-Sided Printing

Next, the case where double-sided printing is performed in the present embodiment will be described. When the image forming apparatus 20 performs printing operation to form an image on both sides of a sheet, the image forming apparatus 20 has an automatic double-sided printing mode and a manual double-sided printing mode. The automatic double-sided printing mode is also referred to as first double-sided printing method, and the manual double-sided printing mode is also referred to as second double-sided printing method.

Automatic Double-Sided Printing Mode

When double-sided printing is performed in the automatic double-sided printing mode, the CPU 601 reverses the rotation of the stepping motor 623 after a lapse of a predetermined time from when the trailing edge of the sheet having an image only on its one side passes through the after-fixing paper presence sensor 110 in a state where the FU tray 116 is closed. The predetermined time is a time calculated by the CPU 601 from the conveying speed of a sheet and a distance from the after-fixing paper presence sensor 110 to the pair of FD rollers 112. Alternatively, the CPU 601 may start the reverse rotation of the stepping motor 623 after a lapse of a time calculated from the conveying speed of a sheet and the length of the sheet from when the FD tray sheet output sensor 125 detects the leading edge of the sheet.

Figure 33A:
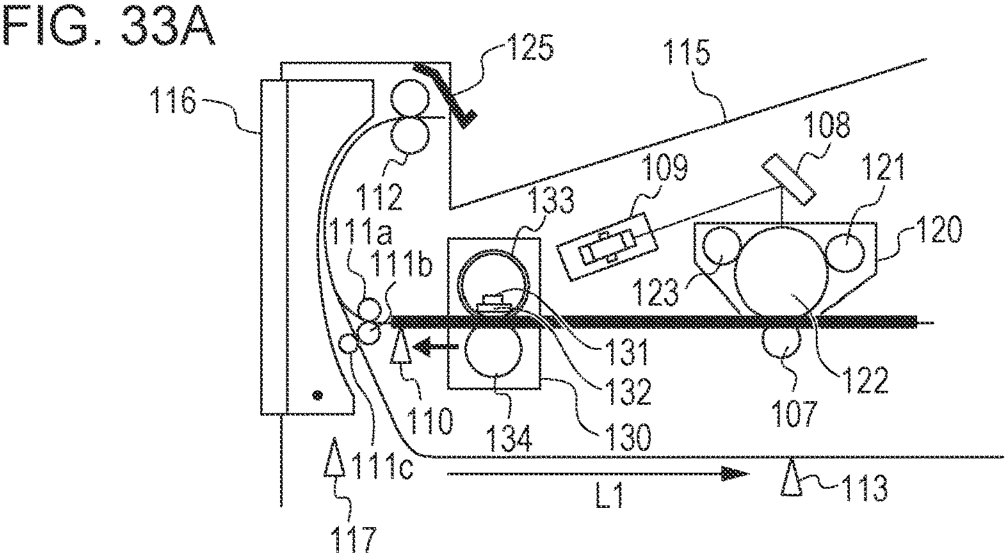
FIG. 33A to FIG. 33C are views illustrating movement of a sheet in a fifteenth embodiment.

When the rotation of the stepping motor 623 is reversed, the rotation of the pair of FD rollers 112 is also reversed. When the rotation of the pair of FD rollers 112 is reversed, the conveying direction of the sheet is also reversed as shown in FIG. 33J. The sheet of which the conveying direction is reversed is conveyed from the pair of FD rollers 112 to the FU roller 111b and an FU roller 111c. When the sheet of which the conveying direction is reversed is conveyed to the FU roller 111b and the FU roller 111c as shown in FIG. 33K, the sheet is conveyed to the double-sided printing conveying path L1. In the present embodiment, the FU roller 111b also has the function of the second sheet output conveying unit; however, the second sheet output conveying unit may be made up of a component different from the FU roller 111b, and the drive of the FU roller 111b and the different component may be controlled separately.

Figure 33B:
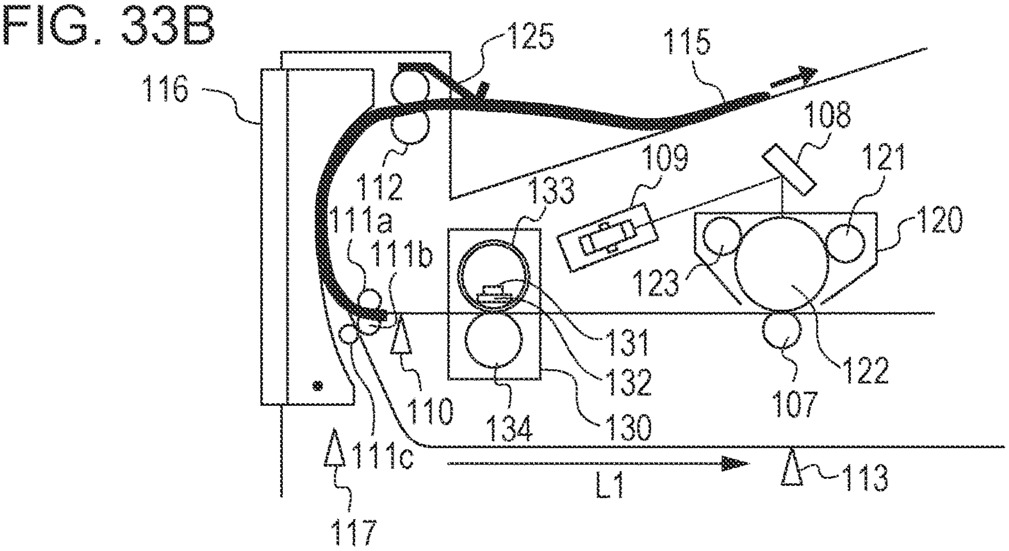
Figure 33C:
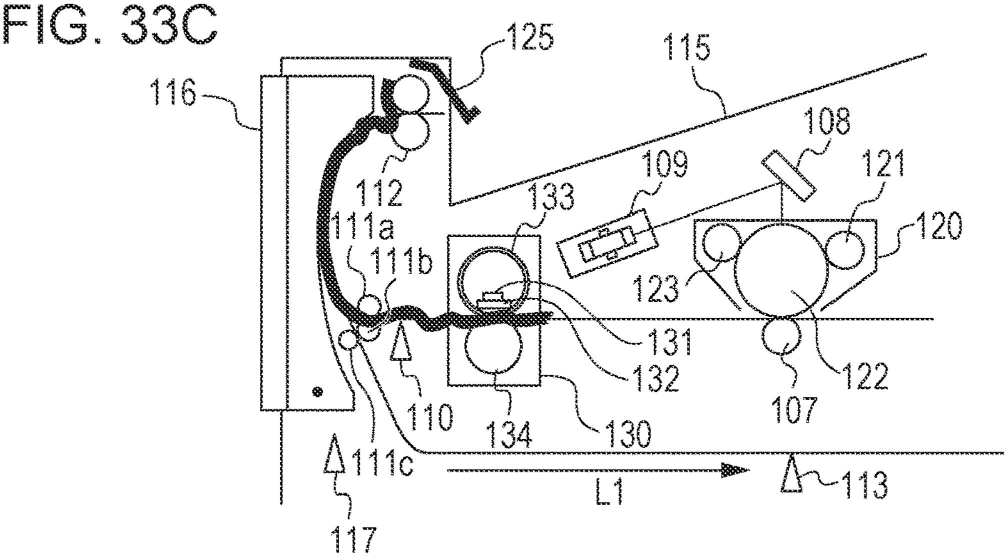
Figure 33D:
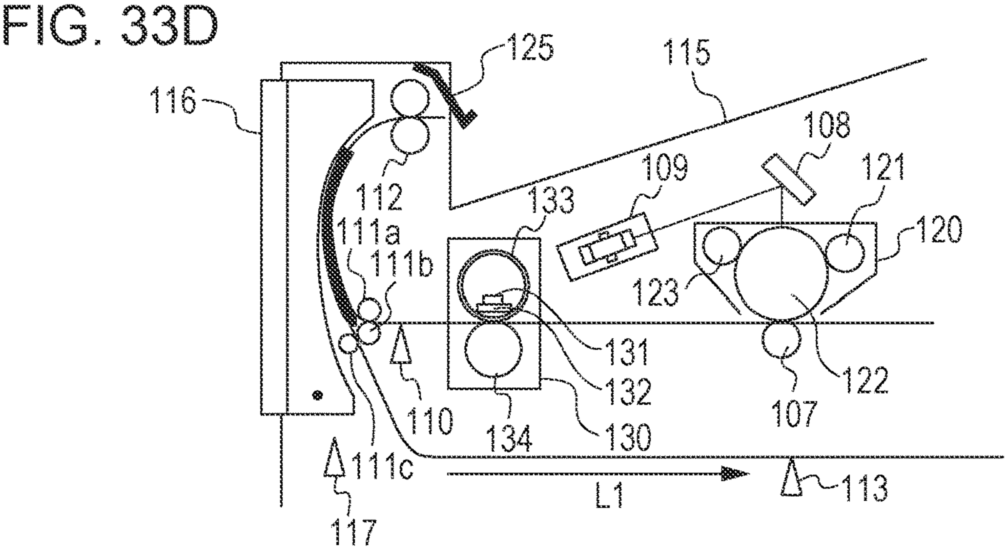
FIG. 33D to FIG. 33F are views illustrating movement of a sheet in the fifteenth embodiment.
Figure 33E:
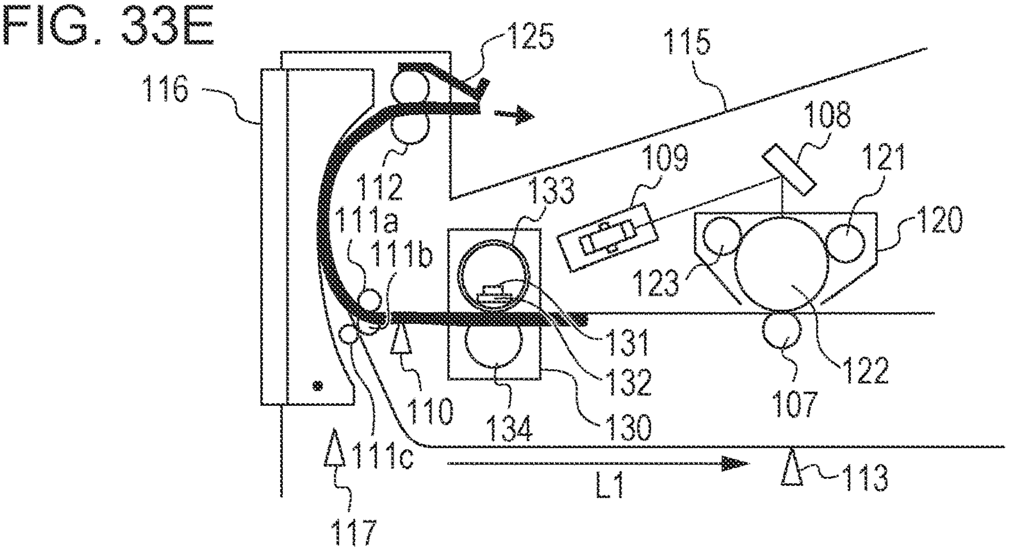
Figure 33F:
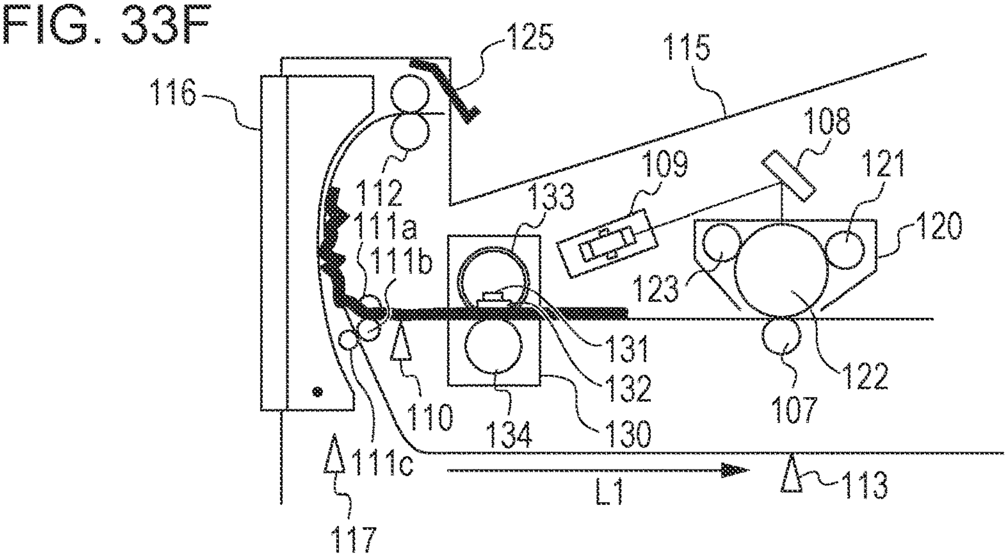
Figure 33G:
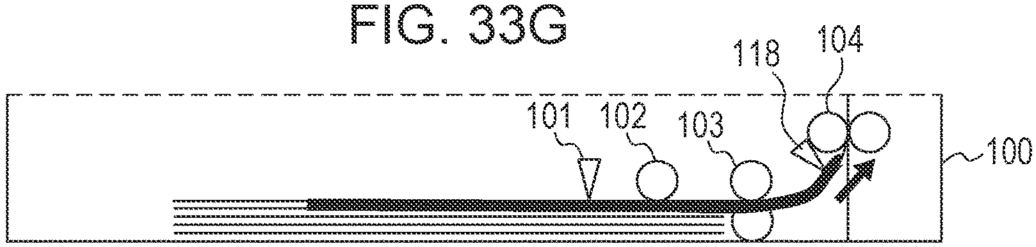
FIG. 33G to FIG. 33I are views illustrating movement of a sheet in the fifteenth embodiment.
Figure 33H:
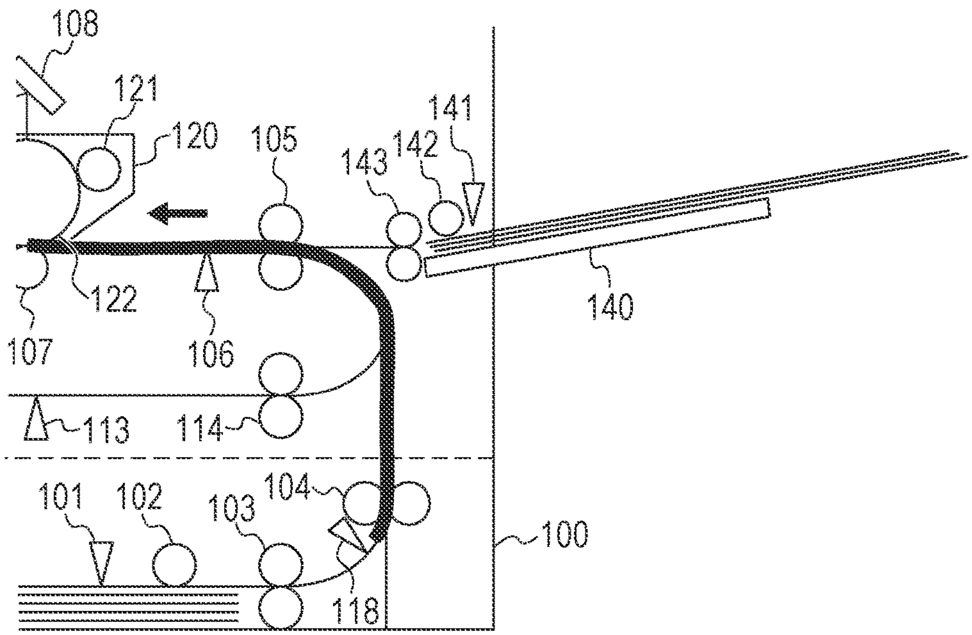
Figure 33I:
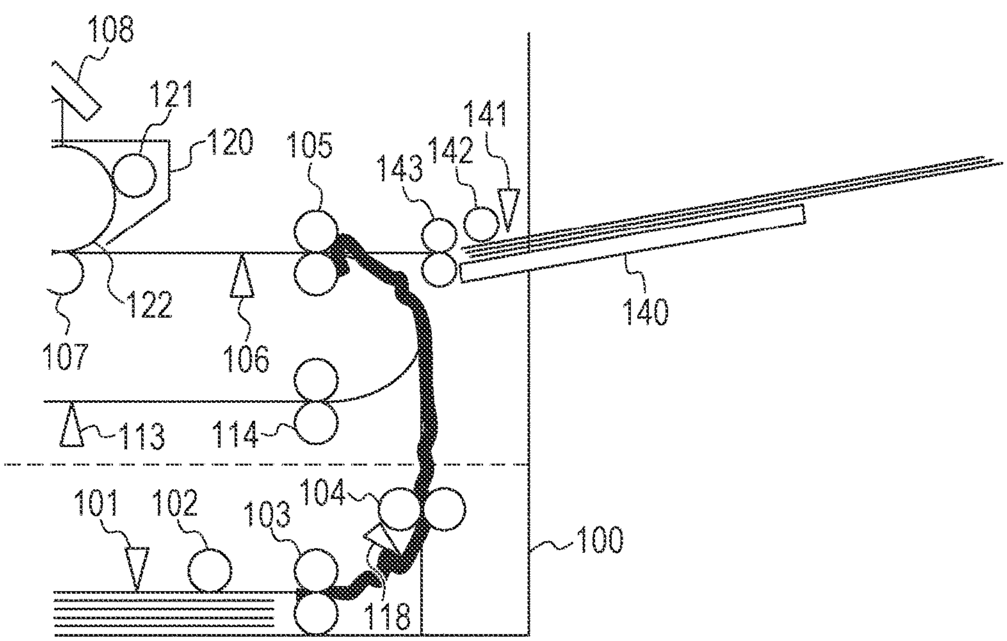
Figure 33J:
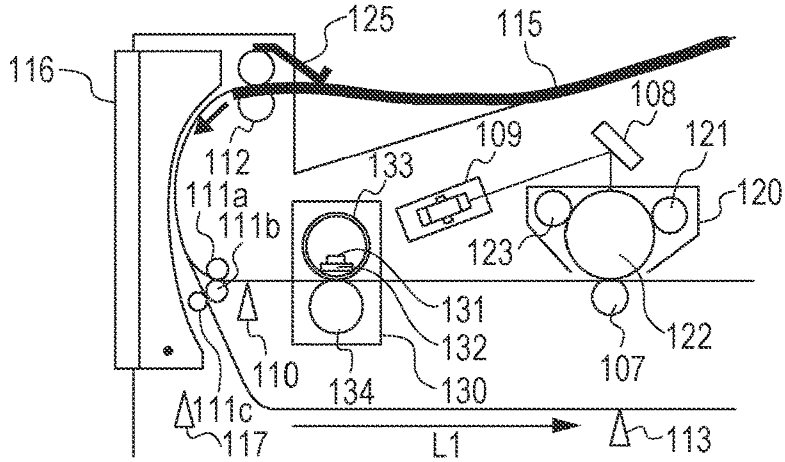
FIG. 33J to FIG. 33M are views illustrating movement of a sheet in the fifteenth embodiment.
Figure 33K:
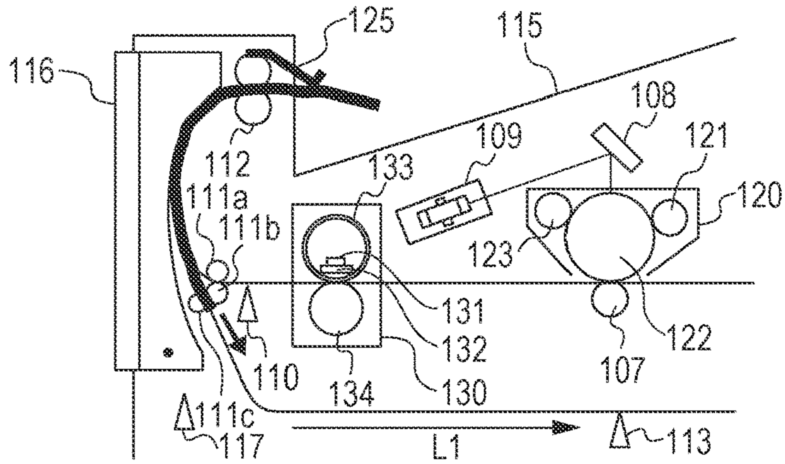

As shown in FIG. 33B, the conveying direction when a sheet is output to the FD tray 115 is also referred to as first conveying direction, and the conveying direction when the rotation of the pair of FD rollers 112 is reversed and a sheet is turned around as shown in FIG. 33J is also referred to as second conveying direction. In the present embodiment, the first sheet output conveying unit rotates in a first rotational direction and conveys a sheet in the first conveying direction in order to convey the sheet to the FD tray 115. The first sheet output conveying unit rotates in a second rotational direction and conveys a sheet in the second conveying direction in order to convey the sheet to the image forming unit again. In this way, the first sheet output conveying unit is capable of choosing whether to convey a sheet in the first conveying direction by rotating in the first rotational direction or to convey a sheet in the second conveying direction by rotating in the second rotational direction.

The sheet conveyed to the double-sided printing conveying path L1 passes through the double-sided printing conveying sensor 113 and is conveyed to the pair of conveying rollers 105 by the pair of double-sided printing conveying rollers 114. When the sheet is conveyed from the pair of double-sided printing conveying rollers 114 to the pair of conveying rollers 105, the upper surface and lower surface of the sheet are turned upside down, and the sheet is conveyed again to the image forming unit in a state where the surface having an image faces downward. For the sheet conveyed again to the image forming unit, an image is formed on the surface having no image, and the sheet is output to the FD tray 115. An image formed on a front surface is also referred to as first image, and an image formed on a surface having no image (also referred to as back surface) is also referred to as second image.

As described above, in the first double-sided printing method, the CPU 601 causes the first sheet output conveying unit to change the conveying direction of a sheet having a first image only on its one side to the second conveying direction in a state where the FU tray 116 is closed. When the sheet having the first image only on its one side is conveyed in the second conveying direction, the sheet is conveyed to the image forming unit again, and a second image is formed on the sheet having the first image only on its one side.

In this way, when double-sided printing is performed with the first double-sided printing method, the CPU 601 feeds a sheet from the sheet feeding cassette 100 and outputs the sheet to the FD tray 115. In other words, a sheet is conveyed along the first sheet feed conveying path with a smaller radius of curvature than the second sheet feed conveying path, and the sheet output conveying path with a smaller radius of curvature than the second sheet output conveying path. For this reason, when, for example, a sheet of stiff paper, such as thick paper and envelope, is FD output, a sheet passes along the conveying path with a small radius of curvature in a state where heat received from the heater 132 remains in the sheet, so the sheet may be curled. In addition, when the radius of curvature of a conveying path is small, the conveyance resistance is large and, as a result, a conveyance malfunction may occur. Accordingly, when the sheet feeding section is switched from the sheet feeding cassette 100 to the MP tray 140 and the FU tray 116 is switched into the open state, a sheet conveyance malfunction is reduced rather than a sheet is conveyed along the conveying path with a small radius of curvature. This double-sided printing method is also referred to as manual double-sided printing mode.

Manual Double-Sided Printing Mode

When double-sided printing is performed in the manual double-sided printing mode, the sheet feeding section is switched to the MP tray 140. When printing is started in a state where the FU tray 116 is open, a sheet having a first image on its one side is output to the FU tray 116.

Figure 37A:
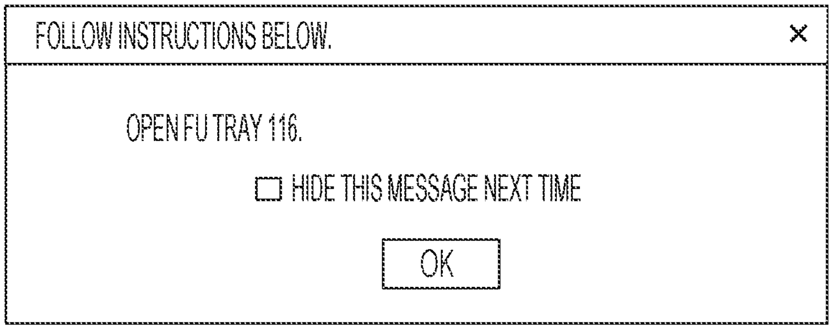
FIG. 37A to FIG. 37D are views illustrating messages output by a message output unit in the fifteenth embodiment.
Figure 37B:
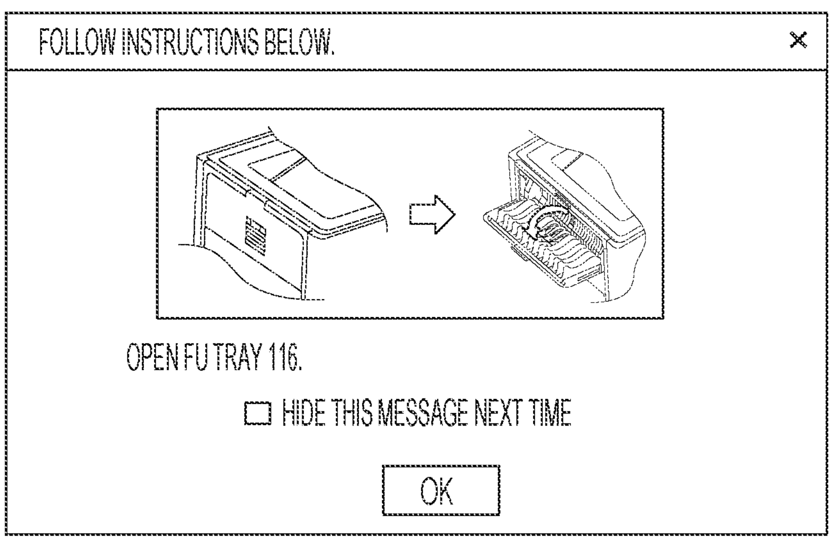
Figure 37C:
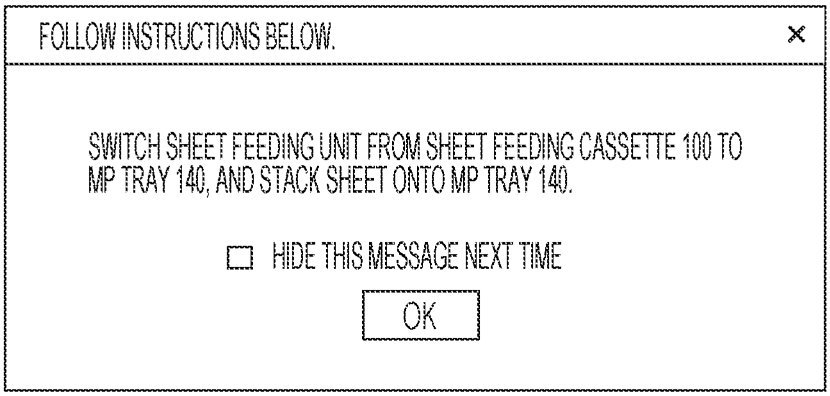
Figure 37D:
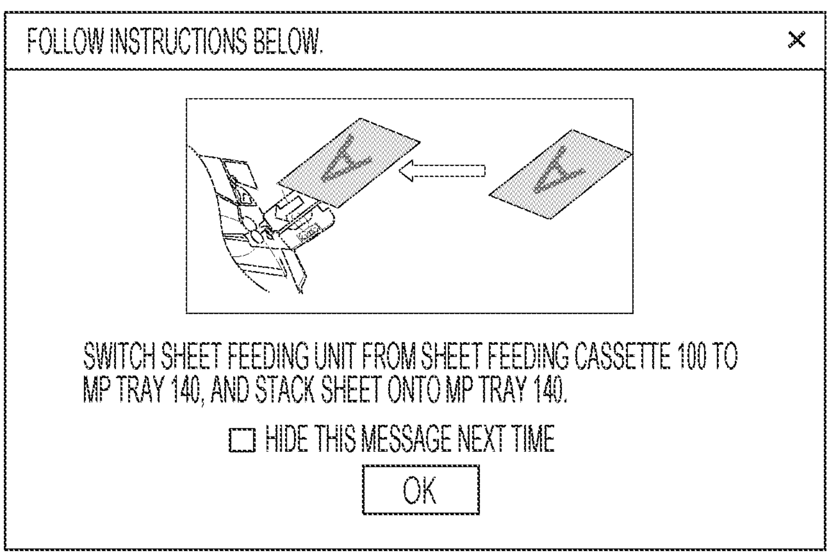
Figures 37E, 37F, 37G:
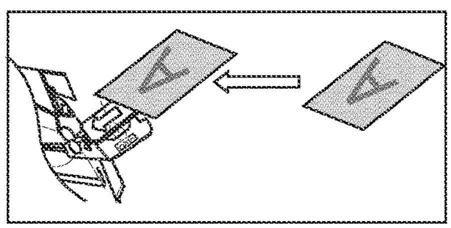
FIG. 37E to FIG. 37I are views illustrating messages output by the message output unit in the fifteenth embodiment.
Figure 37H:
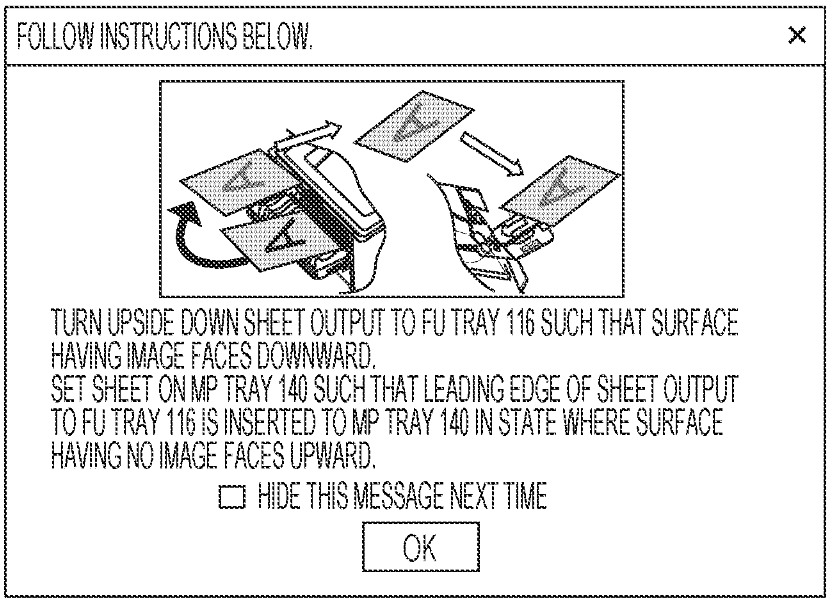

Subsequently, a user needs to perform operation as will be described below. In the present embodiment, the message shown in FIG. 37H may be output by the message output unit.

Initially, a user sets a sheet on the MP tray 140 such that the surface, having an image, of a sheet having an image on its one side and output to the FU tray 116 faces downward. When the sheet having an image on its one side is set on the MP tray 140 by the user, the CPU 601 resumes the suspended printing operation. The sheet set on the MP tray 140 by the user is conveyed again to the image forming unit by the MP sheet feeding roller 142. For the sheet conveyed again to the image forming unit, a toner image is formed on the surface having no image and fixed, and then the sheet is output to the FU tray 116.

As described above, in the second double-sided printing method, the CPU 601 causes the sheet having a first image only on its one side to be output to the second sheet output section. When the sheet output to the second sheet output section is stacked on the sheet feeding unit, the CPU 601 causes the sheet feeding unit to convey the sheet to the image forming unit again and causes the image forming unit to form a second image on the sheet having the first image only on its one side.

In the present embodiment, a double-sided printing method that is capable of eventually forming an image on both sides of a sheet without using the double-sided printing conveying path L1 is referred to as manual double-sided printing mode.

Message Output Unit

The operation panel 626 is provided at the top of the image forming apparatus 20. The operation panel 626 is made up of a liquid crystal panel and a keypad. The liquid crystal panel provides information, such as instruction details to a user, by displaying an image and/or text. The keypad receives instructions from the user. In the present embodiment, the operation panel 626 is also referred to as message output unit that outputs information for providing a message to a user.

Configuration of Printer Control System

FIG. 19A is a block diagram that illustrates the configuration of a whole printer control system of the present embodiment. Like reference numerals are assigned to the same components described with reference to FIG. 3A, and the description thereof is omitted.

FIG. 19B is a block diagram showing the configuration of hardware concerned with sheet conveyance control as a software function implemented by the printing section 221 of the present embodiment. Like reference numerals are assigned to the same components described with reference to FIG. 3B, and the description thereof is omitted.

The CPU 601 communicates with the ROM 603, the RAM 604, an NVRAM 608, the I/O port 606, and the serial communication port 607 via the communication bus 605. The CPU 601 controls the printing section 221 by executing a computer program stored in the ROM 603, the RAM 604, and the NVRAM 608. The CPU 601 executes a program stored in the ROM 603, acquires a calculated result during execution, and saves the calculated result in the RAM 604. Alternatively, the CPU 601 and an MPU (not shown) including a plurality of processors, such as multi-cores, may control the printing section 221 with the plurality of processors.

One or more memories such as the ROM 603 and the RAM 604 store various pieces of information including a computer program for performing various operations (described later), communication parameters for wireless communication, and the like. The one or more memories such as the ROM 603 and the RAM 604 may be, for example, a storage medium, such as a flexible disk, a hard disk drive, an optical disk, a magneto-optical disk, a CD-ROM, a CD-R, a magnetic tape, a nonvolatile memory card, and a DVD.

The NVRAM 608 is a non-volatile random access memory and is capable of storing information detected by the CPU 601. Hereinafter, the CPU 601 is also referred to as control unit, and the NVRAM 608 is also referred to as storage unit.

Method with which CPU 601 Detects Conveyance Malfunction

Next, in the present embodiment, how the CPU 601 acquires information about a conveyance malfunction when a conveyance malfunction has occurred will be described. The image forming apparatus 20 in the present embodiment is capable of detecting a conveyance malfunction at various locations in the conveying path. Among the various locations, three cases will be described.

Sheet Output Conveyance Malfunction (First Detection Method)

Hereinafter, a detection method with which the CPU 601 detects that a sheet output conveyance malfunction has occurred in the sheet output conveying path will be described.

Initially, the case where the FU tray 116 is in the close position and a sheet is conveyed normally will be described. When a sheet is conveyed normally, after a lapse of a predetermined time from when the leading edge of the sheet is detected by the after-fixing paper presence sensor 110 as shown in FIG. 33A, the sheet is not detected by the after-fixing paper presence sensor 110 as shown in FIG. 33B.

The predetermined time in this case is a time calculated by using the length of a sheet fed by the sheet feeding unit and the conveying speed of the sheet. The length of a sheet here may be defined according to a type of sheet selected by a user at the host computer 200 or may be set to the length of a longest sheet that can be printed by the image forming apparatus 20. Alternatively, the length of a sheet here may be set to the length of a sheet measured by the CPU 601 using the registration sensor 106 at the time when the sheet passes through the registration sensor 106.

When the FU tray 116 is in the close position and a conveyance malfunction occurs, the state is as shown in FIG. 33C. In other words, even after a lapse of a predetermined time from when the leading edge of a sheet is detected by the after-fixing paper presence sensor 110, the sheet is continuously detected by the after-fixing paper presence sensor 110. At this time, the CPU 601 initially receives a LOW signal output from the FU tray open/close sensor 117. In addition, the CPU 601 receives a LOW signal output from the after-fixing paper presence sensor 110 after a lapse of a predetermined time from when the LOW signal output from the after-fixing paper presence sensor 110 is received. When the CPU 601 has received these signals, the CPU 601 detects that a sheet output conveyance malfunction has occurred. In the present embodiment, the method of detecting a sheet output conveyance malfunction is also referred to as first detection method.

When the FU tray 116 is in the close position, a small-size sheet, such as an A5 sheet and an A6 sheet, is conveyed by the FU roller 111*a* and the FU roller 111*b* and then placed in a state where the sheet is not detected by any paper presence sensor as shown in FIG. 33D. In this case, the CPU 601 initially receives a LOW signal output from the FU tray open/close sensor 117. In addition, the CPU 601 receives a HIGH signal output from the after-fixing paper presence sensor 110 after a lapse of a predetermined time from when a LOW signal output from the after-fixing paper presence sensor 110 is received. When the CPU 601 has received these signals, the CPU 601 detects that a paper jam has occurred.

Sheet Output Conveyance Malfunction (Second Detection Method)

The CPU 601 may detect a sheet output conveyance malfunction with a method different from the above. Initially, the case where the FU tray 116 is in the close position and a sheet is conveyed normally will be described. When a sheet is conveyed normally, after a lapse of a predetermined time from when the leading edge of the sheet is detected by the after-fixing paper presence sensor 110 as shown in FIG. 33A, the leading edge of the sheet is detected by the FD tray sheet output sensor 125 as shown in FIG. 33E. The predetermined time in this case is a time calculated by using the length of the conveying path from the after-fixing paper presence sensor 110 to the FD tray sheet output sensor 125 and the conveying speed of the sheet.

When the FU tray 116 is in the close position and a conveyance malfunction occurs, the state is as shown in FIG. 33F. In other words, even after a lapse of a predetermined time from when the leading edge of a sheet is detected by the after-fixing paper presence sensor 110, the sheet is not detected by the FD tray sheet output sensor 125. At this time, the CPU 601 initially receives a LOW signal output from the FU tray open/close sensor 117. In addition, the CPU 601 receives a HIGH signal output from the FD tray sheet output sensor 125 after a lapse of a predetermined time from when the LOW signal output from the after-fixing paper presence sensor 110 is received. When the CPU 601 has received these signals, the CPU 601 may detect that a sheet output conveyance malfunction has occurred. In the present embodiment, the method of detecting a sheet output conveyance malfunction is also referred to as second detection method.

Sheet Feed Conveyance Malfunction

Hereinafter, a detection method with which the CPU 601 detects that a sheet feed conveyance malfunction has occurred in the sheet feed conveying path will be described.

Initially, the sheet feeding roller 102 starts feeding a sheet. When a sheet is conveyed normally, the sheet is not detected by the after-feeding paper presence sensor 118 as shown in FIG. 33H after a lapse of a predetermined time from when the leading edge of the sheet is detected by the after-feeding paper presence sensor 118 as shown in FIG. 33G.

The predetermined time in this case is a time calculated by using the length of a sheet and the conveying speed of the sheet. The length of a sheet here may be defined according to a type of sheet selected by a user at the host computer 200 or may be set to the length of a longest sheet that can be printed by the image forming apparatus 20. Alternatively, the length of a sheet here may be set to the length of a sheet measured by the CPU 601 using the after-feeding paper presence sensor 118 at the time when the sheet passes through the after-feeding paper presence sensor 118.

When a conveyance malfunction occurs, the state is as shown in FIG. 33I. In other words, even after a lapse of a predetermined time from when the leading edge of a sheet is detected by the after-feeding paper presence sensor 118, the sheet is continuously detected by the after-feeding paper presence sensor 118. At this time, when the CPU 601 receives a LOW signal output from the after-feeding paper presence sensor 118 after a lapse of a predetermined time from when the LOW signal output from the after-feeding paper presence sensor 118 is received, the CPU 601 detects that a sheet feed conveyance malfunction has occurred. A LOW signal and a HIGH signal output from the after-feeding paper presence sensor 118 are also respectively referred to as third signal and fourth signal.

Double-Sided Printing Conveyance Malfunction

Hereinafter, a detection method with which the CPU 601 detects that a double-sided printing conveyance malfunction has occurred in the double-sided printing conveying path will be described.

This is the case where, after a sheet having a first image is conveyed by the pair of FD rollers 112, a conveyance malfunction occurs before the sheet is conveyed to the image forming unit again.

Figure 33L:
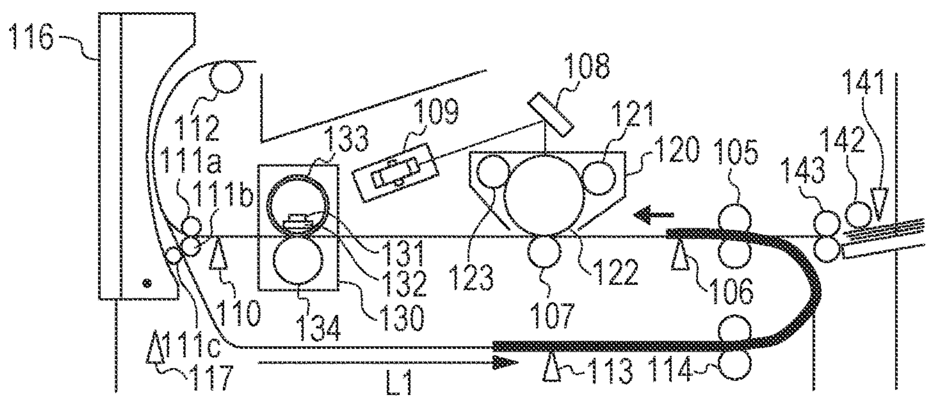

Initially, when the FU tray 116 is in the close position and a sheet is conveyed normally, the pair of FD rollers 112 starts reverse rotation by changing the rotational direction from the first rotational direction to the second rotational direction as shown in FIG. 33J, and the sheet is conveyed in the second conveying direction changed from the first conveying direction. Subsequently, as shown in FIG. 33K, the sheet is conveyed to the double-sided printing conveying path L1. After the pair of FD rollers 112 starts reverse rotation in the second rotational direction, when a predetermined time has elapsed from when the sheet begins to be conveyed in the second conveying direction, the leading edge of the sheet is detected by the registration sensor 106 as shown in FIG. 33L. The predetermined time in this case is a time calculated by using the length of the conveying path from the pair of FD rollers 112 to the registration sensor 106 via the FU roller 111*b* and the FU roller 111*c*, and the conveying speed of a sheet.

Figure 33M:
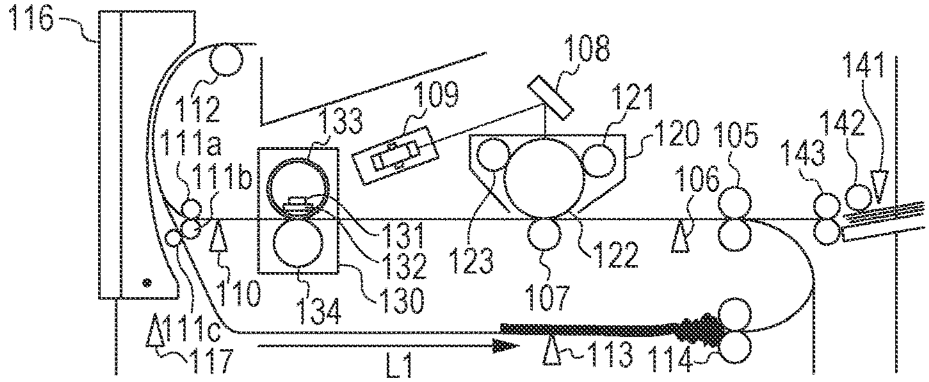

However, if a conveyance malfunction occurs, the state is as shown in FIG. 33M, and, even when a predetermined time elapses from when the pair of FD rollers 112 starts reverse rotation and the sheet begins to be conveyed in the second conveying direction, the leading edge of the sheet is not detected by the registration sensor 106. In other words, even after a lapse of a predetermined time from when the stepping motor 623 starts reverse rotation, a HIGH signal is continuously output from the registration sensor 106. At this time, the CPU 601 initially receives a LOW signal output from the FU tray open/close sensor 117. In addition, after a lapse of a predetermined time from when the stepping motor 623 starts reverse rotation, the CPU 601 receives a HIGH signal output from the registration sensor 106. When the CPU 601 has received these signals, the CPU 601 detects that a double-sided printing conveyance malfunction has occurred. A LOW signal and a HIGH signal output from the registration sensor 106 are also respectively referred to as fifth signal and sixth signal.

Method of Storing Information about Conveyance Malfunction

When the CPU 601 detects the above-described conveyance malfunctions during execution of a job, the CPU 601 causes the NVRAM 608 to store information about the conveyance malfunctions. At this time, the CPU 601 causes the NVRAM 608 to store information about a conveyance malfunction by using, for example, a flag of "0" or The CPU 601 may cause the NVRAM 608 to store information for outputting a message as follows on the operation panel 626 when the CPU 601 detects a conveyance malfunction during execution of a job. The message in this case is a message prompting to switch the conveying path to reduce a conveyance malfunction or a message informing a user that there is a possibility that a conveyance malfunction occurs or there is a history that a conveyance malfunction has occurred. The CPU 601 is capable of prompting a user to perform operation for avoiding a conveyance malfunction by outputting the message on the operation panel 626, so it is possible to reduce occurrence of a conveyance malfunction again.

Since the NVRAM 608 is a non-volatile memory, even when the power of the image forming apparatus 20 is turned off after a lapse of a predetermined time from when a job causing a conveyance malfunction completes, a state where information about the conveyance malfunction is stored in the NVRAM 608 is maintained. Therefore, even when a first job for a first printing instruction completes and then a second job for a second printing instruction is executed after a lapse of a predetermined time, the CPU 601 outputs the message as described above on the operation panel 626. By outputting the message as described above, it is possible to reduce occurrence of a conveyance malfunction again. The message as described above is output before a sheet on which the last image in the second job is to be formed is fed or before the last image in the second job is formed.

In addition, the CPU 601 may cause the NVRAM 608 to store the number of times a conveyance malfunction has occurred and, when a conveyance malfunction has occurred a predetermined number of times, cause the NVRAM 608 to store information about occurrence of a conveyance malfunction. The predetermined number of times here is the number of times at or above which the possibility of occurrence of a conveyance malfunction relatively increases and is, for example, the case where a conveyance malfunction has occurred five times or more out of recent 10 times of sheet feeding. A user may be allowed to change the setting of the predetermined number of times with the operation panel 626.

In addition, the CPU 601 may delete information about detection of a sheet output conveyance malfunction from the NVRAM 608 when a sheet output conveyance malfunction has not occurred in a predetermined consecutive number of sheets and a printing operation has been completed normally. The predetermined number of sheets here is, for example, 10 sheets and, when 10 sheets are consecutively normally conveyed, it is determined that the possibility of occurrence of a conveyance malfunction has decreased. A user may be allowed to change the setting of the predetermined number of sheets with the operation panel 626.

Hereinafter, a specific process for reducing occurrence of each of three conveyance malfunctions will be described.

Process for Reducing Sheet Output Conveyance Malfunction

In the present embodiment, when a sheet output conveyance malfunction has occurred, there is a possibility that the same conveyance malfunction occurs again. In this case, by prompting a user to switch the FU tray 116 into the open position, occurrence of the same conveyance malfunction again is reduced. A sheet output conveyance malfunction is as described in Sheet Output Conveyance Malfunction (First Detection Method).

Figure 34A:
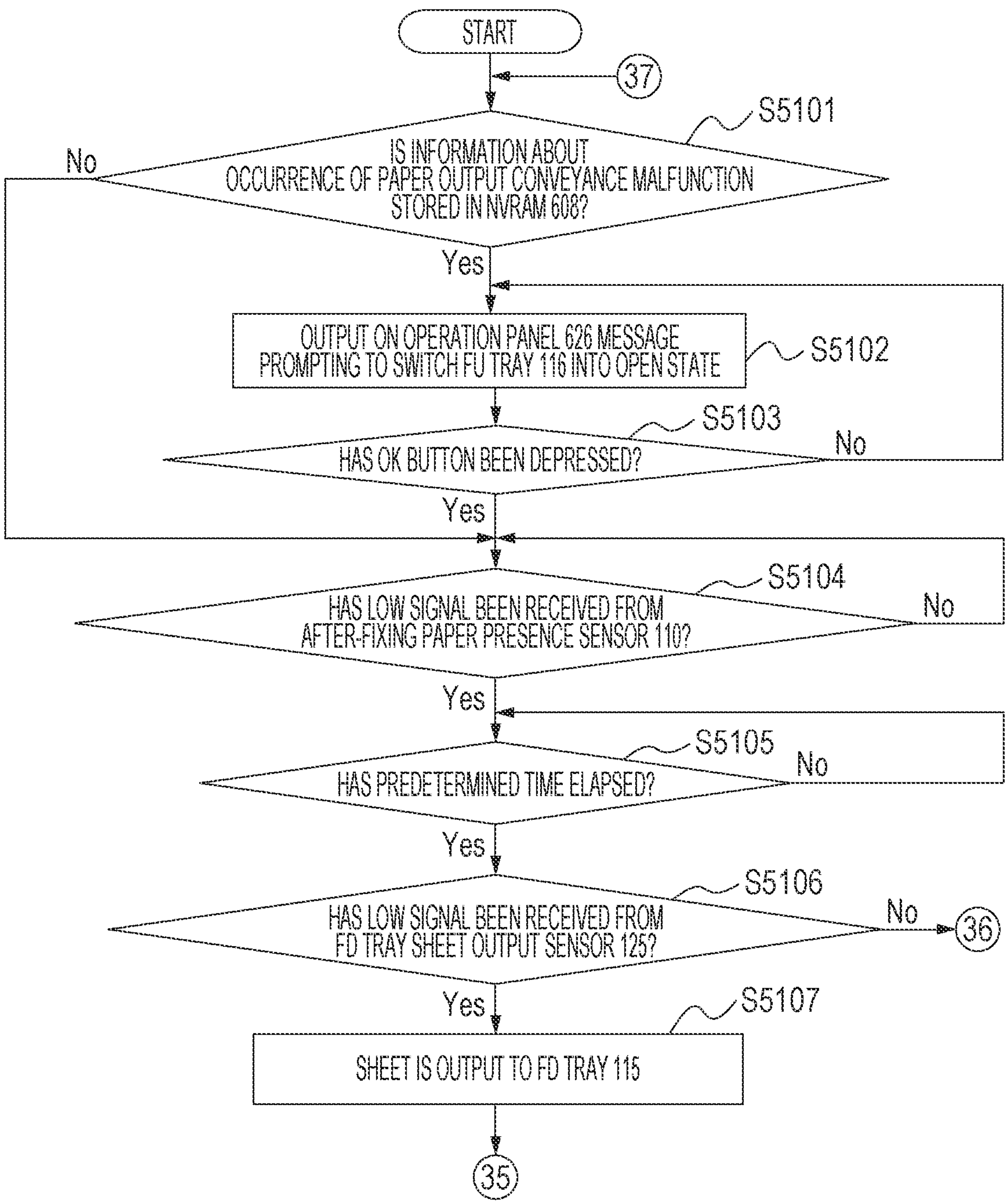
FIG. 34A and FIG. 34B are flowcharts of a process for a sheet output conveyance malfunction.
Figure 34B:
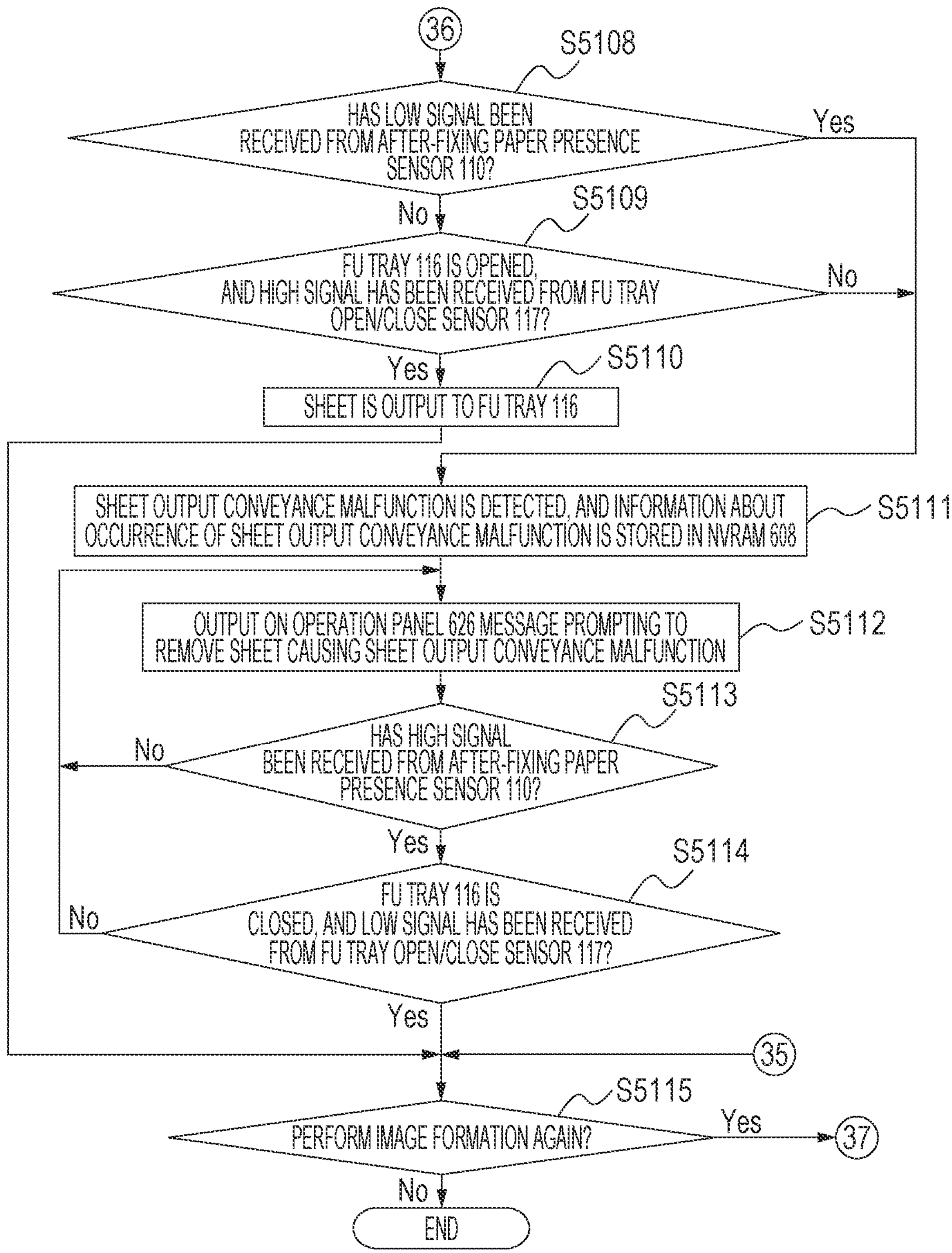
Figure 34C:
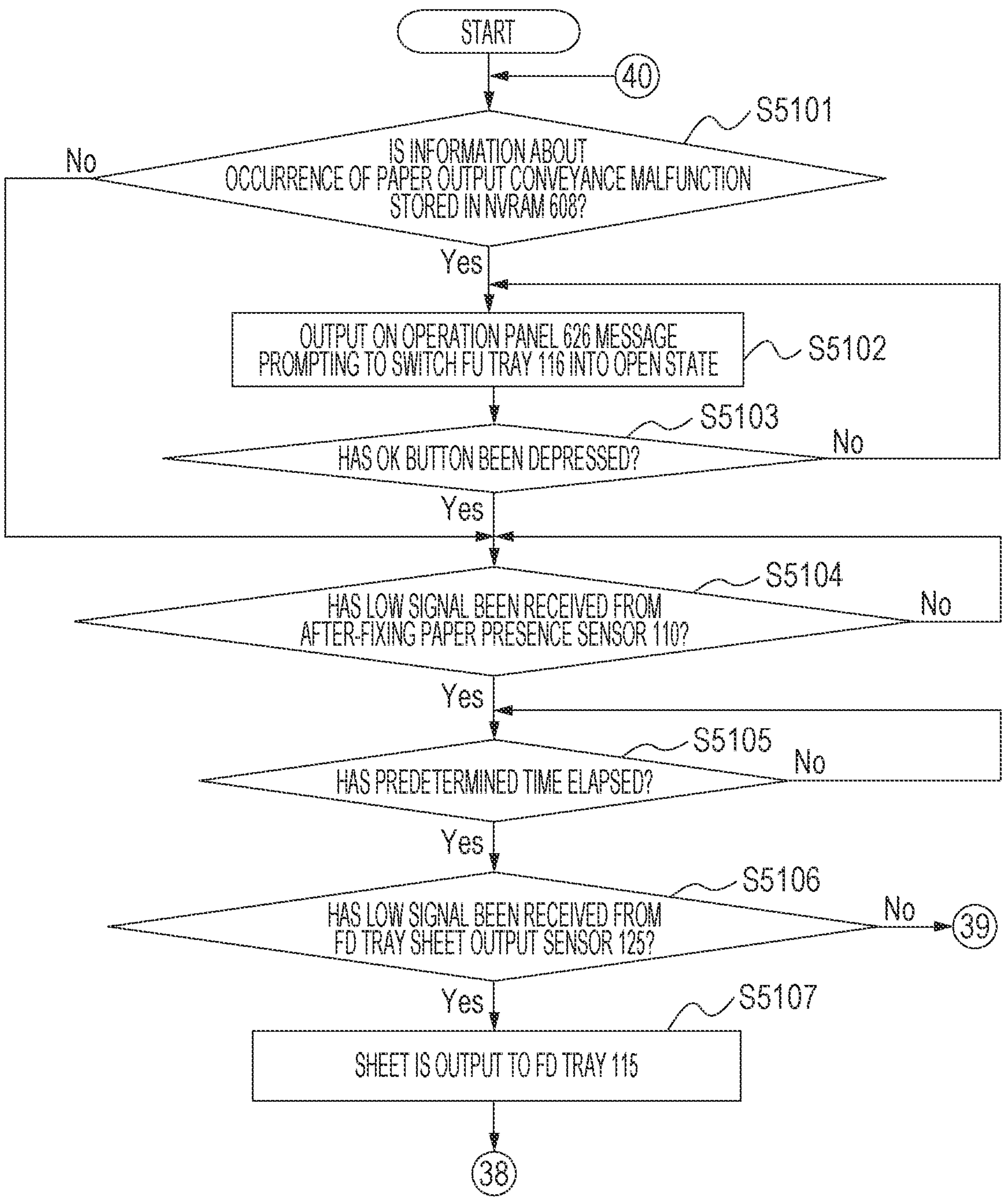
FIG. 34C and FIG. 34D are flowcharts of a process for a sheet output conveyance malfunction.
Figure 34D:
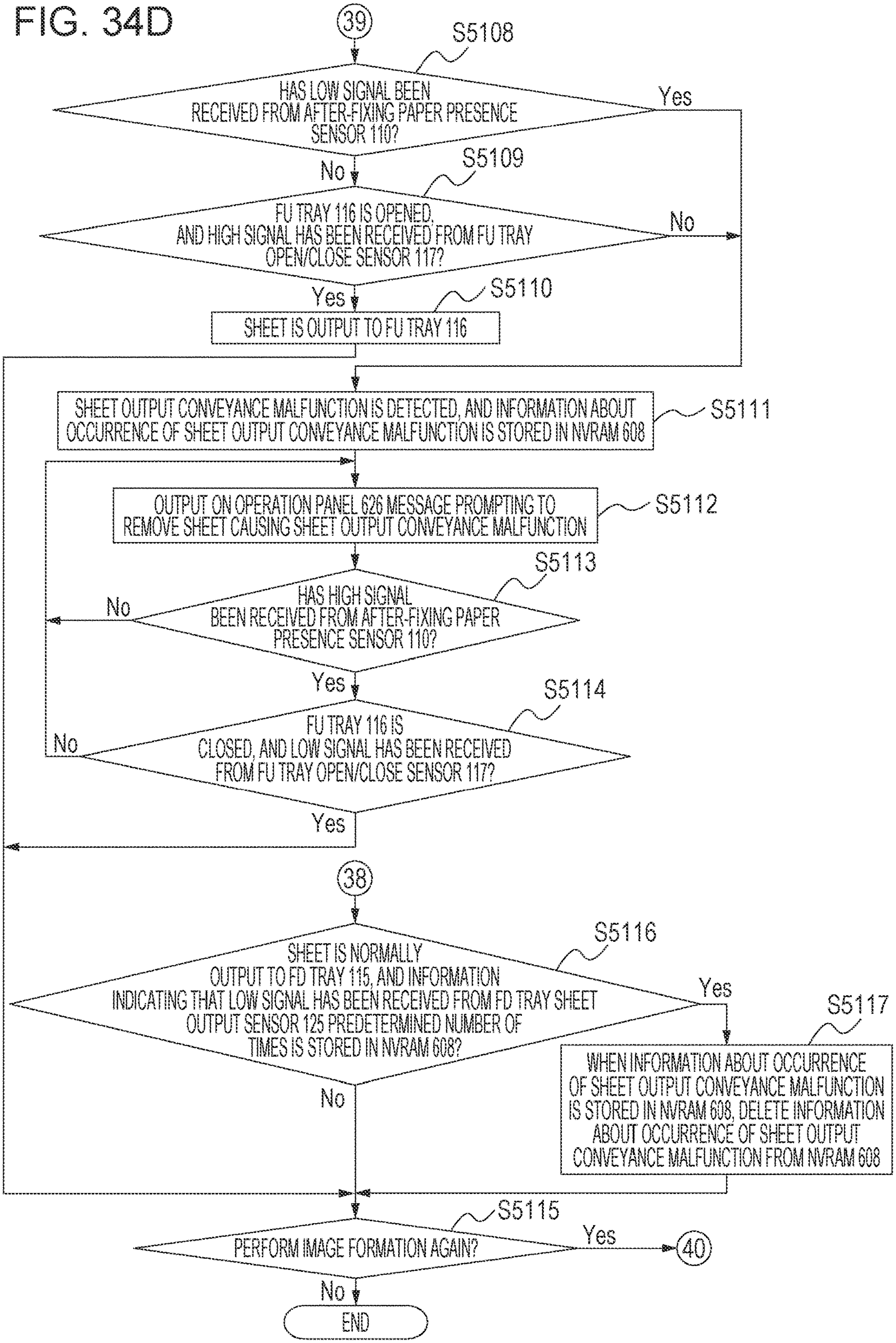

A specific process in the case where there is a possibility that a sheet output conveyance malfunction occurs and in the case where a sheet output conveyance malfunction has occurred will be described with reference to the flowcharts of FIG. 34A and FIG. 34B. The flowcharts of FIG. 34C and FIG. 34D are a modification of FIG. 34A and FIG. 34B. Like step numbers are assigned to the same steps, and the description thereof is omitted.

Initially, the CPU 601 receives, from the printer controller 213, a printing instruction including information about a series of printing operation to cause the sheet feeding unit to feed a sheet and cause the image forming unit to form an image on the sheet and output the sheet. The CPU 601 starts a job in accordance with the printing instruction.

In S5101, when information about occurrence of a sheet output conveyance malfunction is stored in the NVRAM 608, the CPU 601 advances the process to S5102. In S5101, when information about occurrence of a sheet output conveyance malfunction is not stored in the NVRAM 608, the CPU 601 starts the printing operation in a state where the FU tray 116 is closed, and the process proceeds to S5104.

In S5102, the CPU 601 outputs, to the operation panel 626, a message prompting to switch into the position in which the FU tray 116 is open. A message to be output at this time may be, for example, the sentence shown in FIG. 37A or may be, for example, the picture shown in FIG. 37B. Alternatively, in order for a user to easily understand necessary operation, for example, the picture shown in FIG. 37B may be animated and displayed on the operation panel 626.

The message output to the operation panel 626 in S5102 may be a message informing a user that there is a possibility of occurrence of a conveyance malfunction or there is a history that a conveyance malfunction has occurred. By outputting this message, a user switches the FU tray 116 into the open position in response to the message output to the operation panel 626. By prompting this operation, it is possible to reduce occurrence of a conveyance malfunction, and this leads to improvement in usability.

In S5103, OK button contained in the message prompting to switch the FU tray 116 into the open position is depressed by the user. When the CPU 601 acquires information indicating that OK button contained in the message prompting to switch the FU tray 116 into the open position has been depressed, the process proceeds to S5104.

In S5104, the leading edge of a sheet having an image formed by the image forming unit passes through the after-fixing paper presence sensor 110 as shown in FIG. 33A, and a HIGH signal to be output to the CPU 601 by the after-fixing paper presence sensor 110 switches to a LOW signal. When the CPU 601 receives a LOW signal output from the after-fixing paper presence sensor 110, the process proceeds to S5105.

In S5105, the CPU 601 determines whether a predetermined time has elapsed. The predetermined time in this case is a time calculated by using the length of a sheet fed by the sheet feeding unit and the conveying speed of the sheet. As the predetermined time elapses, the CPU 601 advances the process to S5106. The process in S5106 and the following steps vary depending on whether a conveyance malfunction has occurred.

When a sheet is conveyed normally, the state is shown in FIG. 33B. In other words, in S5106, a sheet is detected by the FD tray sheet output sensor 125, the CPU 601 receives a LOW signal output by the FD tray sheet output sensor 125, and then the process proceeds to S5107. In S5107, when a sheet is output to the FD tray 115, the process proceeds to S5115.

When the FU tray 116 is in the open position and a sheet is conveyed normally, the sheet is not detected by the FD tray sheet output sensor 125 in S5106. For this reason, the CPU 601 receives a HIGH signal output from the FD tray sheet output sensor 125, and the process proceeds to S5108. In S5108, a sheet is not detected by the after-fixing paper presence sensor 110, and the CPU 601 receives a HIGH signal output from the after-fixing paper presence sensor 110, and the process proceeds to S5109. In S5109, when the FU tray 116 is in the open position and the CPU 601 receives a HIGH signal output from the FU tray open/close sensor 117, the process proceeds to S5110. In S5110, when a sheet is output to the FU tray 116, the process proceeds to S5115.

When a conveyance malfunction has occurred, the state is shown in FIG. 33C. In other words, in S5106, the sheet is not detected by the FD tray sheet output sensor 125, the CPU 601 receives a HIGH signal output from the FD tray sheet output sensor 125, and the process proceeds to S5108. In S5108, the sheet is continuously detected by the after-fixing paper presence sensor 110, and the CPU 601 receives a LOW signal output from the after-fixing paper presence sensor 110, and the process proceeds to S5111.

When a sheet having a size, such as A5 size and A6 size, is conveyed, it becomes like a state where a paper jam has occurred, and the state is shown in FIG. 33D. In other words, in S5106, the sheet is not detected by the FD tray sheet output sensor 125, the CPU 601 receives a HIGH signal output from the FD tray sheet output sensor 125, and the process proceeds to S5108. In S5108, the sheet is not detected by the after-fixing paper presence sensor 110, the CPU 601 receives a HIGH signal output from the after-fixing paper presence sensor 110, the process proceeds to S5109. In S5109, when the FU tray 116 is in the close position and the CPU 601 receives a LOW signal output from the FU tray open/close sensor 117, the process proceeds to S5111.

In S5111, the CPU 601 detects that a sheet output conveyance malfunction has occurred and causes the NVRAM 608 to store information about occurrence of a sheet output conveyance malfunction, and the process proceeds to S5112.

Figure 37I:
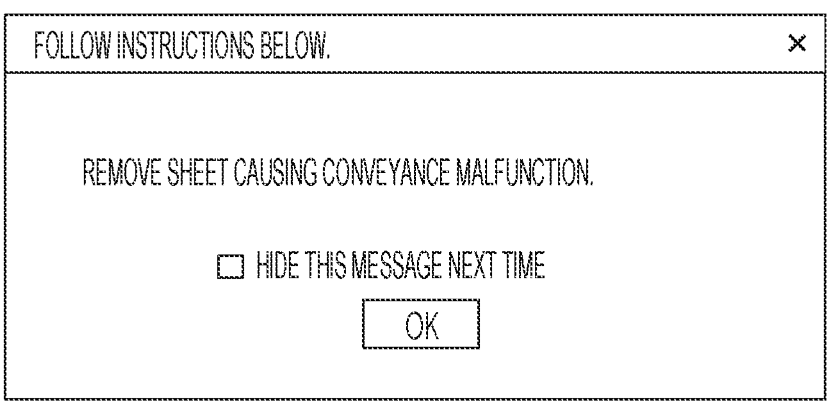

In S5112, the CPU 601 outputs, to the operation panel 626, a message prompting to remove the sheet in a conveyance malfunction. A message to be output at this time may be, for example, the sentence shown in FIG. 37I or may be a picture. Alternatively, in order for a user to easily understand necessary operation, an animation may be displayed on the operation panel 626. A sheet in a sheet output conveyance malfunction is also referred to as first sheet.

In S5113, when the sheet in a conveyance malfunction is removed by the user, the CPU 601 receives a HIGH signal output from the after-fixing paper presence sensor 110, and the process proceeds to S5114.

In S5114, when the FU tray 116 is switched into the close position by the user, the CPU 601 receives a LOW signal output from the FU tray open/close sensor 117, and the process proceeds to S5115.

In the present embodiment, when the CPU 601 completes the processes of S5113 and S5114, the CPU 601 detects that jam recovery is complete. When the CPU 601 detects that jam recovery is complete, the CPU 601 starts a process of reforming the image formed on the sheet in a conveyance malfunction onto a new sheet. This process is referred to as reprint. A new sheet is also referred to as second sheet.

In S5115, when reprint is performed, the CPU 601 returns the process to S5101 and starts a process of reforming the image formed on the sheet in a conveyance malfunction onto a new sheet.

In S5115, when the sheet is normally output up to the process of S5107 or S5110 but the job is not complete, and the CPU 601 has received information to perform image formation again from the printer controller 213, the process returns to S5101. When the job is complete and the image is not formed again, the CPU 601 ends the process.

In the present embodiment, the CPU 601 may advance the process to S5116 after S5107 as shown in FIG. 34C and FIG. 34D.

In S5116, when a sheet is normally output to the FD tray 115 and information about the fact that a LOW signal output from the FD tray sheet output sensor 125 is detected a predetermined number of times is stored in the NVRAM 608, the CPU 601 advances the process to S5117.

In S5117, when information about the fact that a sheet output conveyance malfunction is detected is stored in the NVRAM 608, the CPU 601 deletes, from the NVRAM 608, information about the fact that a sheet output conveyance malfunction has occurred, and the process proceeds to S5115.

By executing the processes of S5116 and S5117, it is possible to output a message to the user in S5102 only just after occurrence of a conveyance malfunction and there is a high possibility that a conveyance malfunction occurs again, and this leads to improvement in usability.

In this flowchart, the case where a sheet output conveyance malfunction is detected with the first detection method has been described. Alternatively, a sheet output conveyance malfunction may be detected with the second detection method.

As described above, the CPU 601 is capable of reducing occurrence of a sheet output conveyance malfunction again by outputting a message prompting to switch the FU tray 116 into the open position.

Process for Reducing Sheet Feed Conveyance Malfunction

In the present embodiment, when a sheet feed conveyance malfunction occurs, there is a possibility that the same conveyance malfunction occurs again. In this case, by prompting a user to switch the sheet feeding unit from the sheet feeding cassette 100 to the MP tray 140, occurrence of the same conveyance malfunction again is reduced. A sheet feed conveyance malfunction is as described in Sheet Feed Conveyance Malfunction.

Figure 35A:
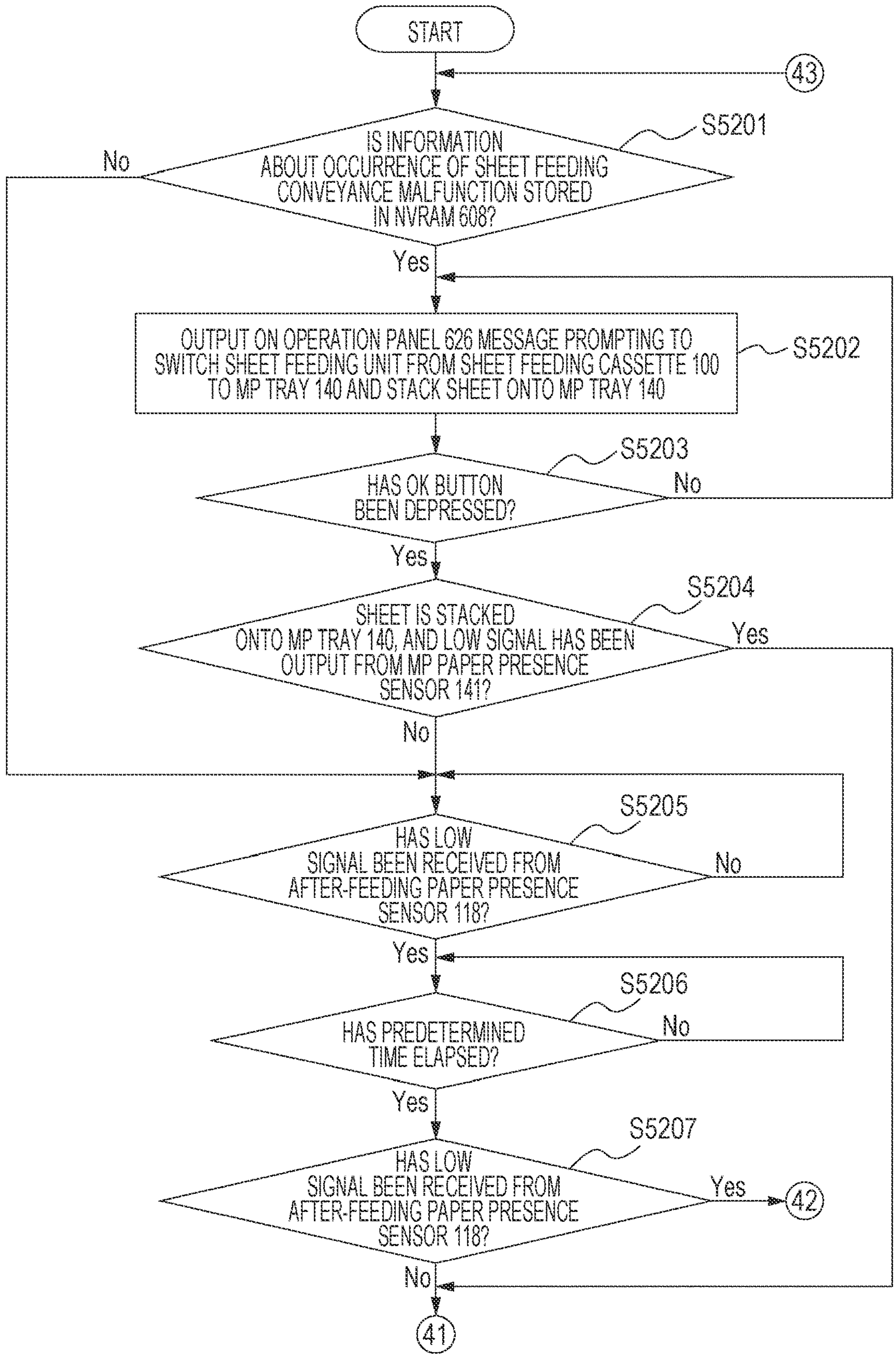
FIG. 35A and FIG. 35B are flowcharts of a process for a sheet feed conveyance malfunction.
Figure 35B:
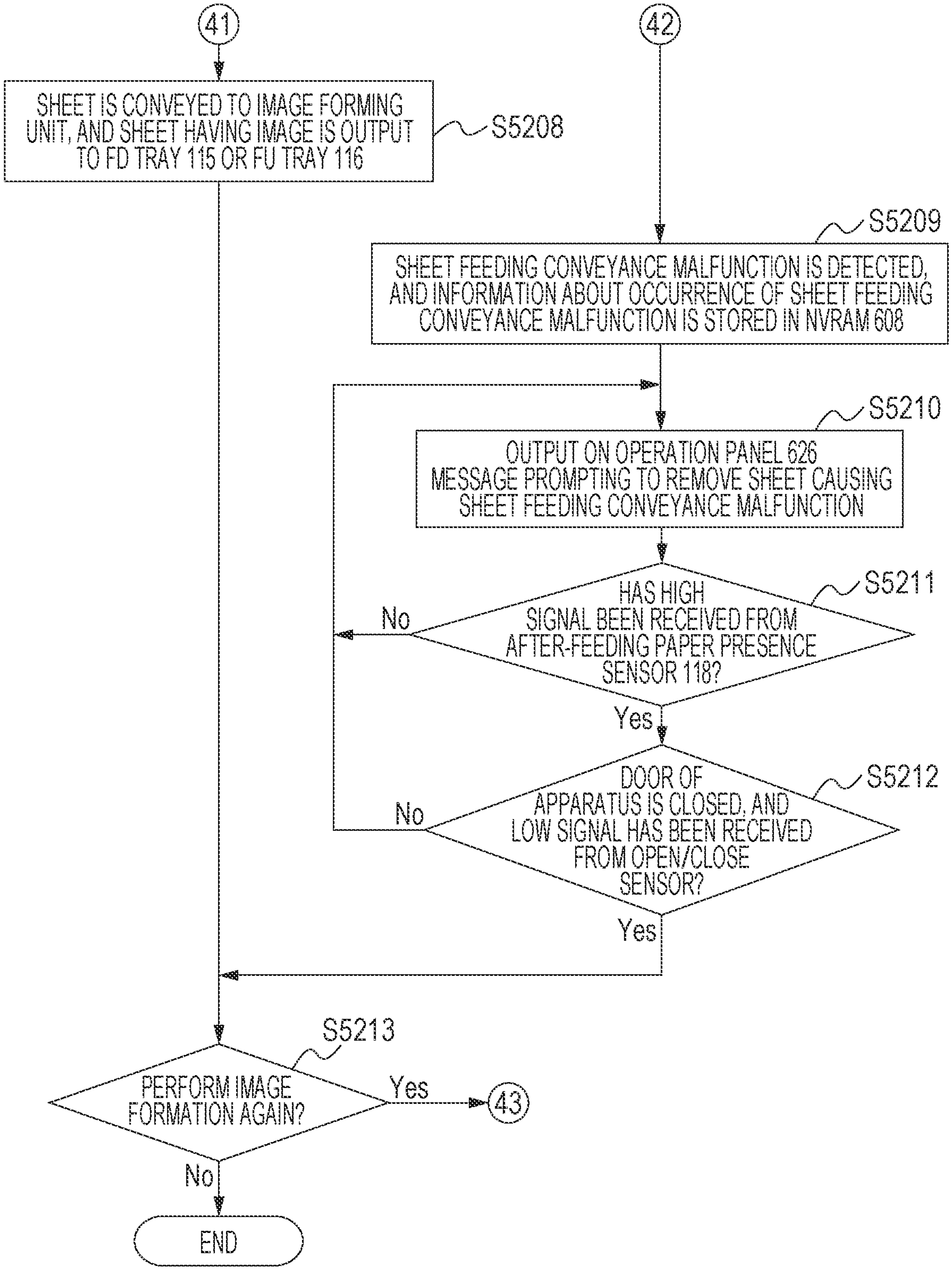
Figure 35C:
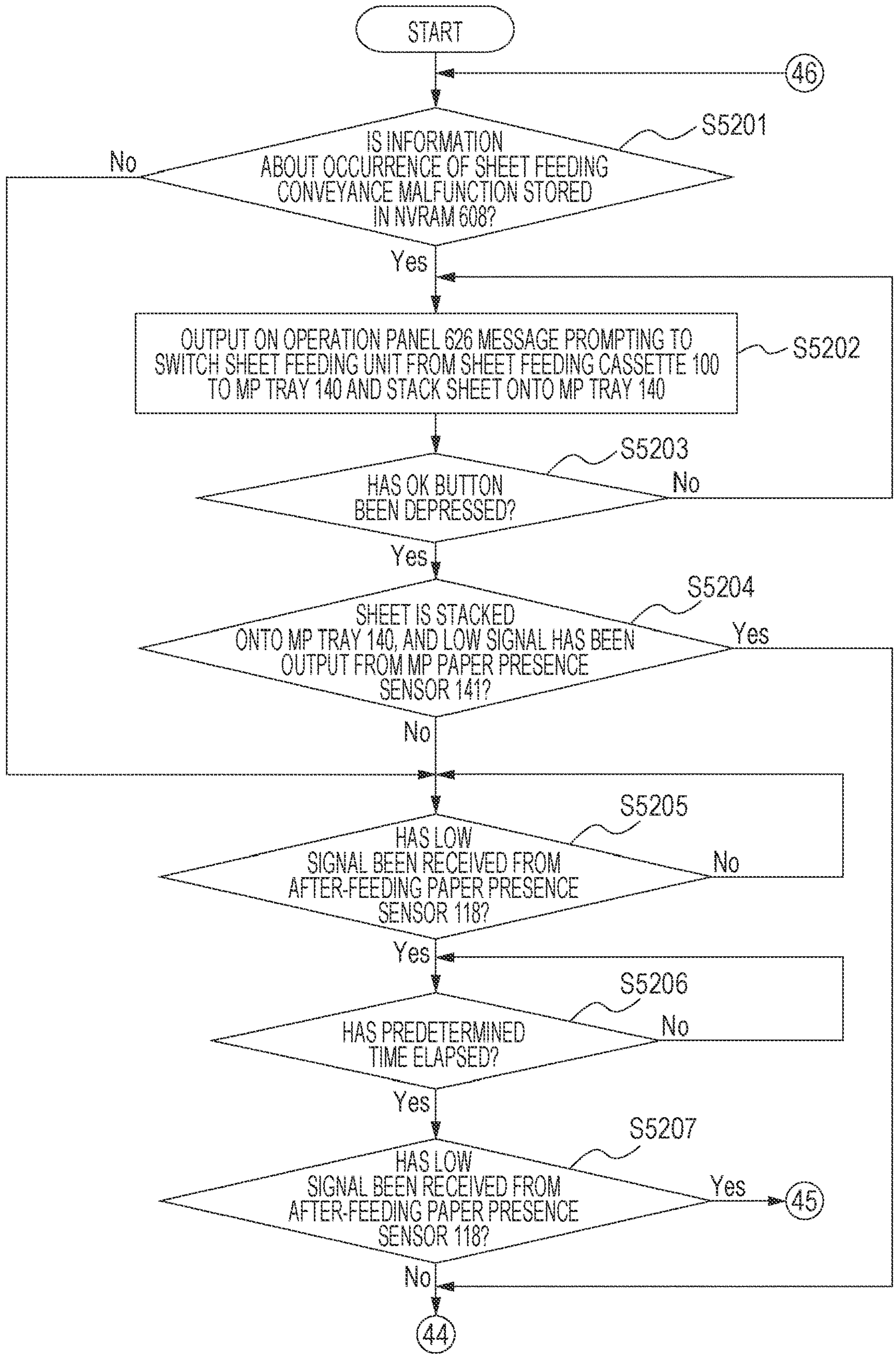
FIG. 35C and FIG. 35D are flowcharts of a process for a sheet feed conveyance malfunction.
Figure 35D:
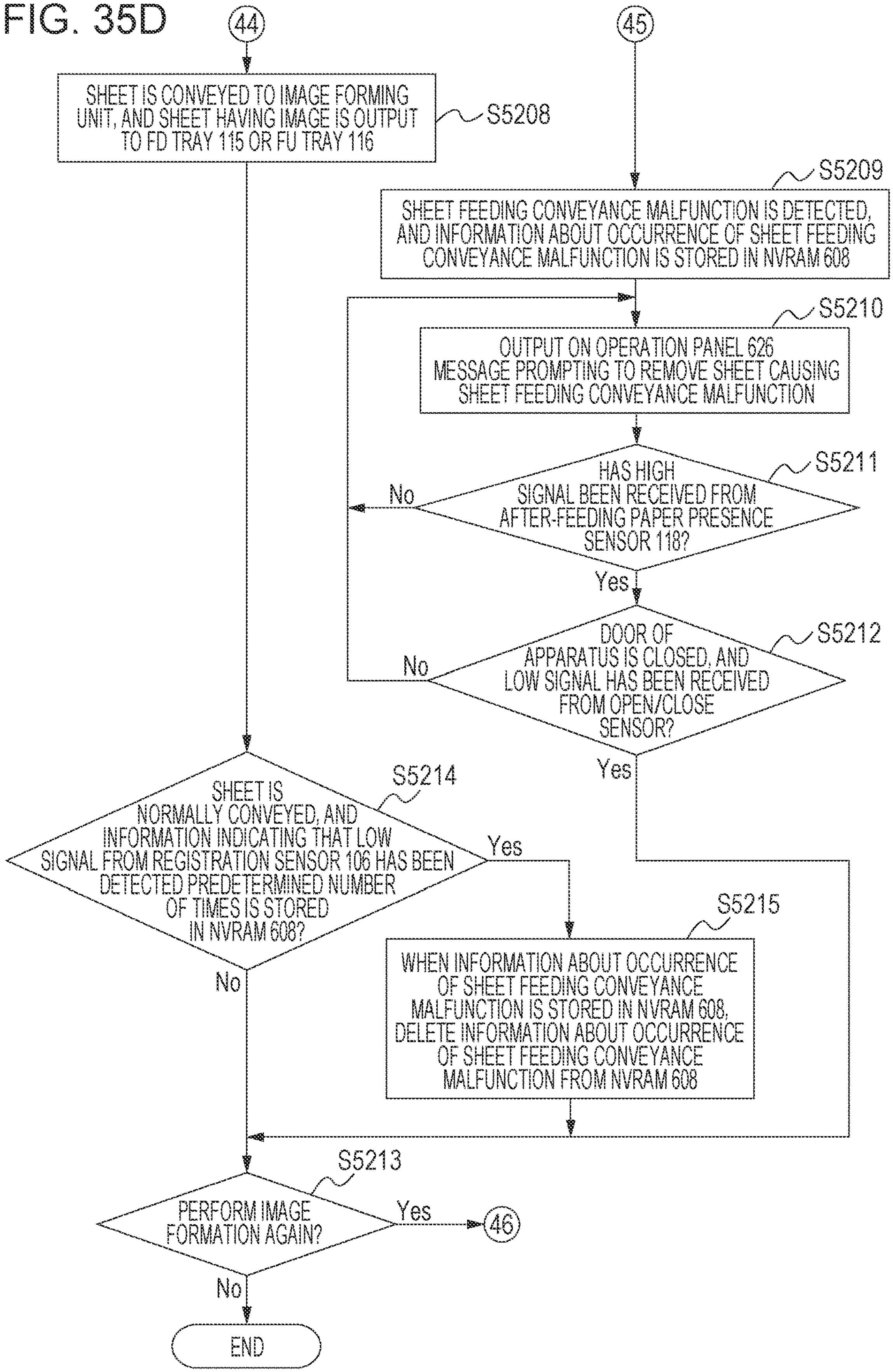

A specific process in the case where there is a possibility that a sheet feed conveyance malfunction occurs and in the case where a sheet feed conveyance malfunction has occurred will be described with reference to the flowcharts of FIG. 35A and FIG. 35B. The flowcharts of FIG. 35C and FIG. 35D are a modification of FIG. 35A and FIG. 35B. Like step numbers are assigned to the same steps, and the description thereof is omitted.

Initially, the CPU 601 receives, from the printer controller 213, a printing instruction including information about a series of printing operation to cause the sheet feeding unit to feed a sheet and cause the image forming unit to form an image on the sheet and output the sheet. The CPU 601 starts a job in accordance with the printing instruction.

In S5201, when information about occurrence of a sheet feed conveyance malfunction is stored in the NVRAM 608, the CPU 601 advances the process to S5202. When information about the fact that occurrence of a sheet feed conveyance malfunction is detected is not stored in the NVRAM 608, the process proceeds to S5205.

In S5202, the CPU 601 switches the sheet feeding unit from the sheet feeding cassette 100 to the MP tray 140 and outputs, to the operation panel 626, a message prompting to stack a sheet on the MP tray 140. A message to be output at this time may be, for example, the sentence shown in FIG. 37C or may be, for example, the picture shown in FIG. 37D. Alternatively, in order for a user to easily understand necessary operation, for example, the picture shown in FIG. 37D may be animated and displayed on the operation panel 626.

The message output to the operation panel 626 in S5202 may be a message informing a user that there is a possibility of occurrence of a conveyance malfunction or there is a history that a conveyance malfunction has occurred. By outputting this message, the user switches the sheet feeding unit from the sheet feeding cassette 100 to the MP tray 140 and stack a sheet on the MP tray 140 in response to the message output to the operation panel 626. By prompting this operation, it is possible to reduce occurrence of a conveyance malfunction, and this leads to improvement in usability.

In S5203, OK button contained in the message prompting to stack a sheet on the MP tray 140 is depressed by the user. When the CPU 601 acquires information indicating that OK button contained in the message prompting to stack a sheet on the MP tray 140 has been depressed, the process proceeds to S5204.

In S5204, when a sheet is stacked on the MP tray 140 and the CPU 601 receives a LOW signal output from the MP paper presence sensor 141, the process proceeds to S5208. When a sheet is not stacked on the MP tray 140 and the CPU 601 receives a HIGH signal output from the MP paper presence sensor 141, the process proceeds to S5205.

In S5205, the sheet feeding cassette solenoid 625 that drives the sheet feeding roller 102 begins to drive the sheet feeding roller 102, and a sheet is fed as shown in FIG. 33D. When the CPU 601 acquires information indicating that the sheet feeding cassette solenoid 625 begins to drive, the process proceeds to S5206.

In S5206, the CPU 601 determines whether a predetermined time has elapsed. The predetermined time in this case is a time calculated by using the length of a sheet fed by the sheet feeding unit and the conveying speed of the sheet. As the predetermined time elapses, the CPU 601 advances the process to S5207. The process in S5207 and the following steps vary depending on whether a conveyance malfunction has occurred.

When a sheet is conveyed normally, the state is shown in FIG. 33H. In other words, in S5207, a sheet is not detected by the after-feeding paper presence sensor 118, the CPU 601 receives a HIGH signal output from the after-feeding paper presence sensor 118, and the process proceeds to S5208. In S5208, the sheet is conveyed to the image forming unit, the sheet having an image is output to the FD tray 115 or the FU tray 116, and the process proceeds to S5213.

When a conveyance malfunction has occurred, the state is shown in FIG. 33I. In other words, in S5207, a sheet is continuously detected by the after-feeding paper presence sensor 118, the CPU 601 receives a LOW signal output from the after-feeding paper presence sensor 118, and the process proceeds to S5209.

In S5209, the CPU 601 detects that a sheet feed conveyance malfunction has occurred, and causes the NVRAM 608 to store information about occurrence of a sheet feed conveyance malfunction, and then the process proceeds to S5210.

In S5210, the CPU 601 outputs, to the operation panel 626, a message prompting to remove the sheet in a conveyance malfunction. A message to be output at this time may be, for example, the sentence shown in FIG. 37I or may be a picture. Alternatively, in order for a user to easily understand necessary operation, an animation may be displayed on the operation panel 626. A sheet placed in a sheet feed conveyance malfunction is also referred to as third sheet.

In S5211, when the sheet in a conveyance malfunction is removed by the user, the CPU 601 receives a HIGH signal output from the after-feeding paper presence sensor 118, and the process proceeds to S5212.

In S5212, a door (not shown) of the image forming apparatus 20, opened by the user to remove the sheet in a conveyance malfunction, is switched into the close position. When the door (not shown) of the image forming apparatus 20 is switched into the close position, the CPU 601 receives a LOW signal output from an open/close sensor for the door (not shown), and the process proceeds to S5213.

In the present embodiment, when the CPU 601 completes the processes of S5211 and S5212, the CPU 601 detects that jam recovery is complete. When the CPU 601 detects that jam recovery is complete, the CPU 601 starts a process of reforming the image formed on the sheet in a conveyance malfunction onto a new sheet. This process is referred to as reprint. A new sheet is also referred to as second sheet.

In S5213, when reprint is performed, the CPU 601 returns the process to S5201 and starts a process of reforming the image formed on the sheet in a conveyance malfunction onto a new sheet. At this time, a sheet in a conveyance malfunction is also referred to as third sheet, and a new sheet is also referred to as fourth sheet.

In S5213, when a sheet is normally conveyed during the process of S5208 but the job is not complete, and the CPU 601 has received information to perform image formation again from the printer controller 213, the process returns to S5201. When the job is complete and the image is not formed again, the CPU 601 ends the process.

A printing instruction in a job in the case where a sheet feed conveyance malfunction has occurred is also referred to as third printing instruction, and a job in the case where a sheet feed conveyance malfunction has occurred is also referred to as third job. A printing instruction that the CPU 601 newly receives from the printer controller 213 after a sheet feed conveyance malfunction is resolved is also referred to as fourth printing instruction, and a job that the CPU 601 executes in accordance with a printing instruction newly received from the printer controller 213 is also referred to as fourth job.

In the present embodiment, the CPU 601 may advance the process to S5214 after S5208 as shown in FIG. 35C and FIG. 35D.

In S5214, when a sheet is normally conveyed to the image forming unit and information about the fact that a LOW signal output from the registration sensor 106 is detected a predetermined number of times is stored in the NVRAM 608, the CPU 601 advances the process to S5215.

In S5215, when information about the fact that a sheet feed conveyance malfunction is detected is stored in the NVRAM 608, the CPU 601 deletes, from the NVRAM 608, information about the fact that a sheet feed conveyance malfunction has occurred, and the process proceeds to S5213.

By executing the processes of S5214 and S5215, it is possible to output a message to the user in S5202 only just after occurrence of a conveyance malfunction and there is a high possibility that a conveyance malfunction occurs, and this leads to improvement in usability.

As described above, the CPU 601 switches the sheet feeding unit from the sheet feeding cassette 100 to the MP tray 140 and outputs a message prompting to stack a sheet on the MP tray 140. By outputting the message, it is possible to reduce occurrence of a sheet feed conveyance malfunction again.

Process for Reducing Double-Sided Printing Conveyance Malfunction

In the present embodiment, when a double-sided printing conveyance malfunction has occurred, there is a possibility that the same conveyance malfunction occurs again. In this case, by prompting to switch the FU tray 116 into the open position and to switch the sheet feeding unit from the sheet feeding cassette 100 to the MP tray 140, occurrence of the same conveyance malfunction again is reduced. A double-sided printing conveyance malfunction is as described in Double-Sided Printing Conveyance Malfunction.

Figure 36A:
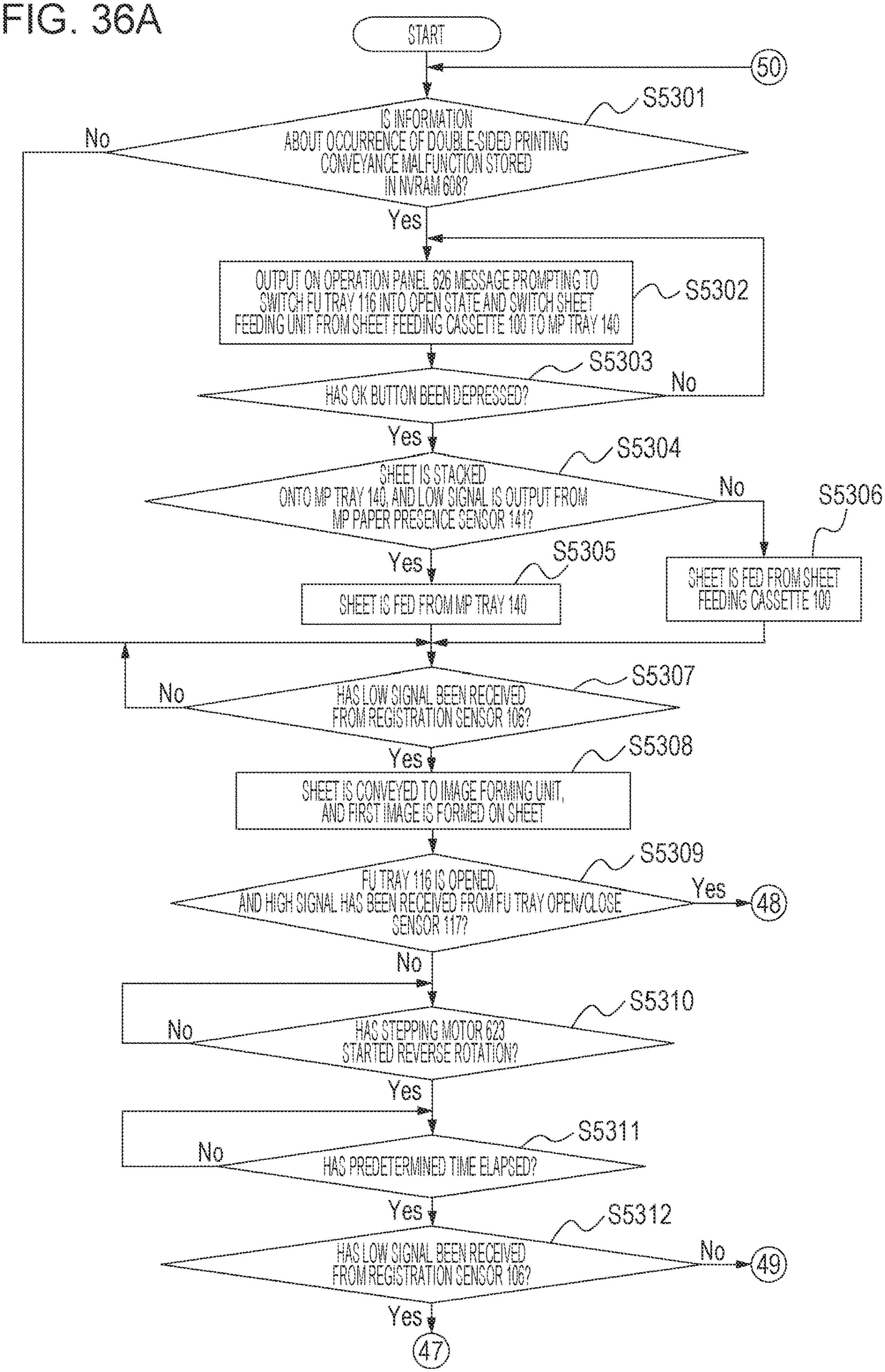
FIG. 36A and FIG. 36B are flowcharts of a process for a double-sided printing conveyance malfunction.
Figure 36B:
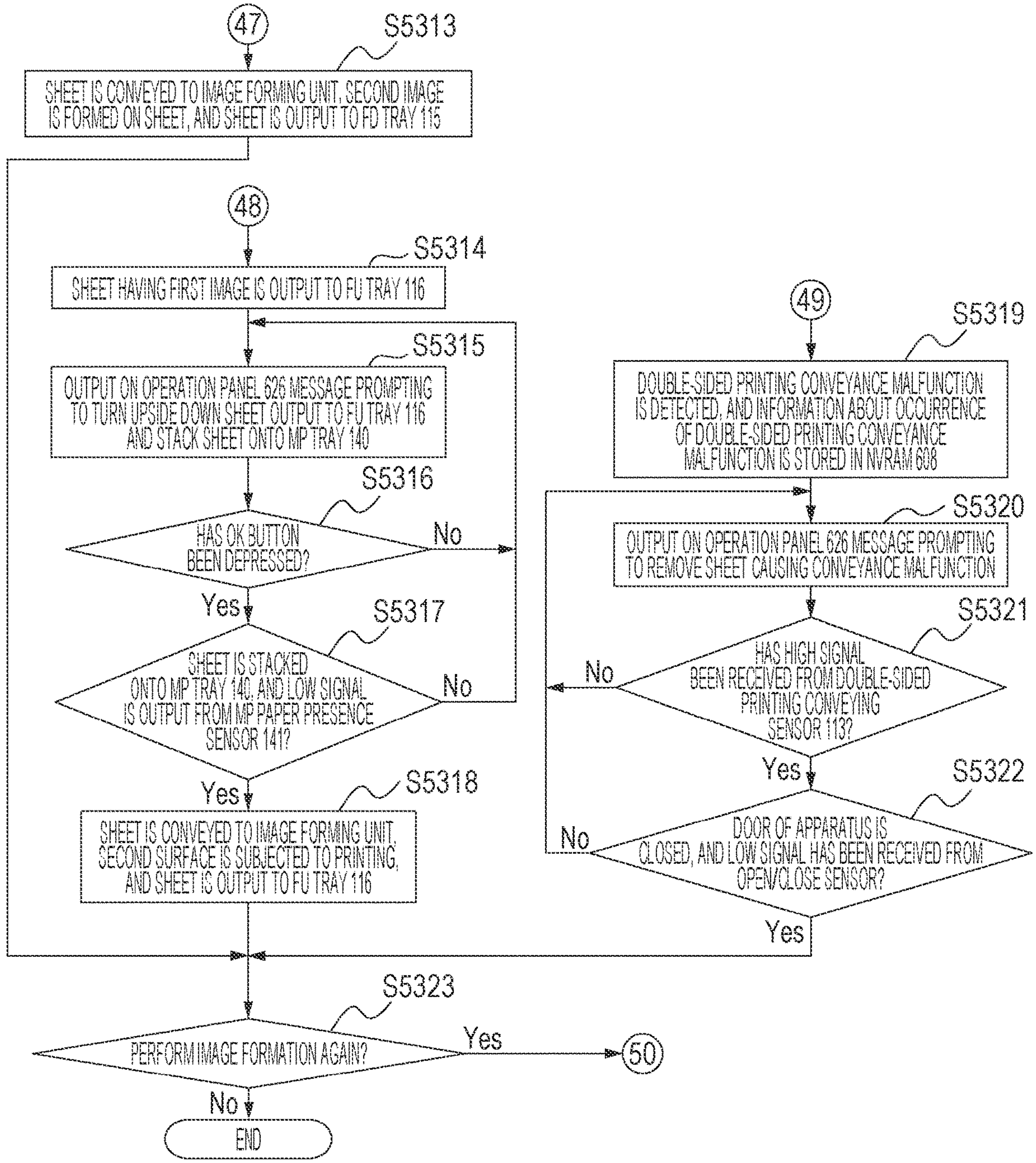
Figure 36C:
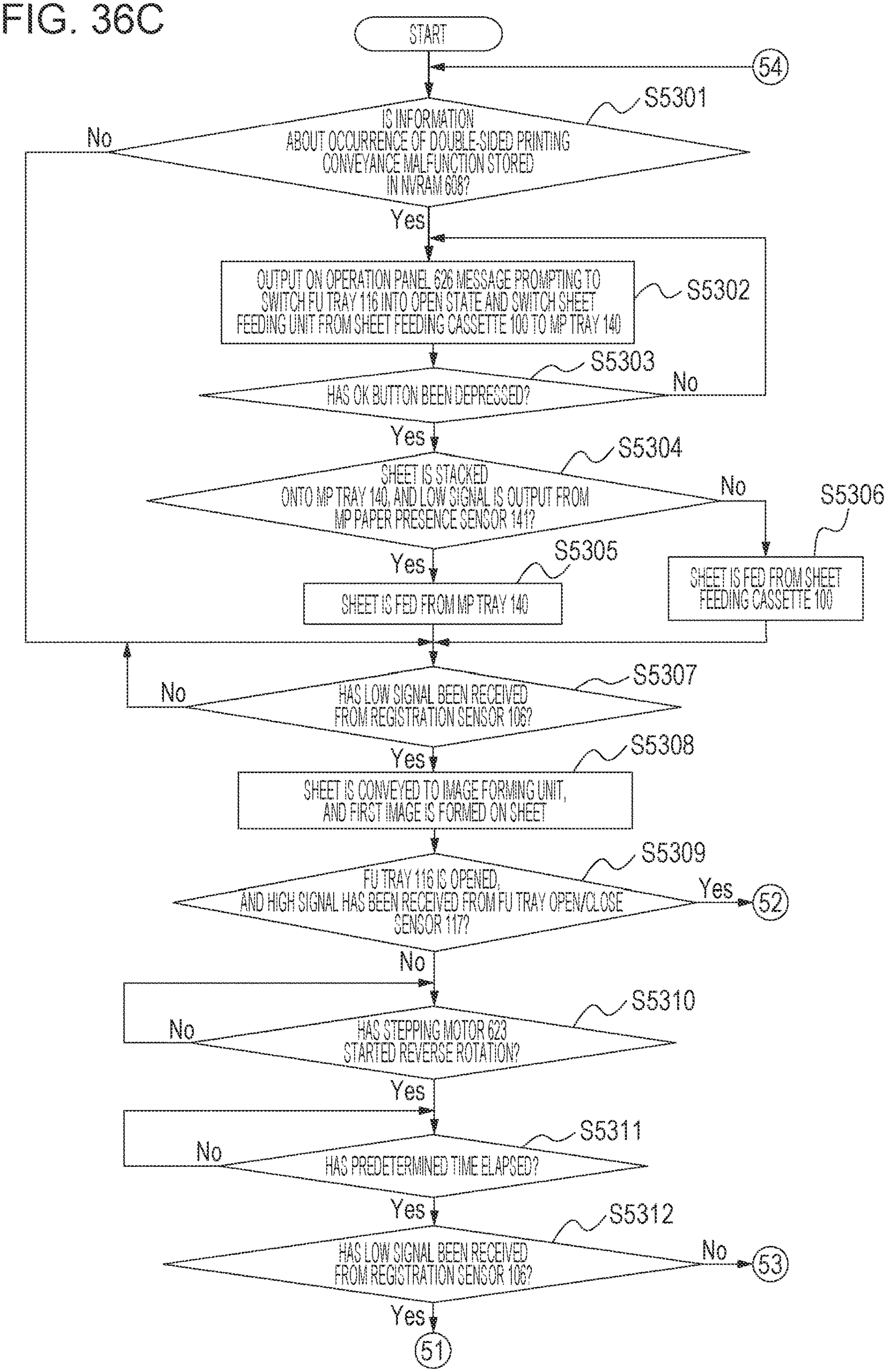
FIG. 36C and FIG. 36D are flowcharts of a process for a double-sided printing conveyance malfunction.
Figure 36D:
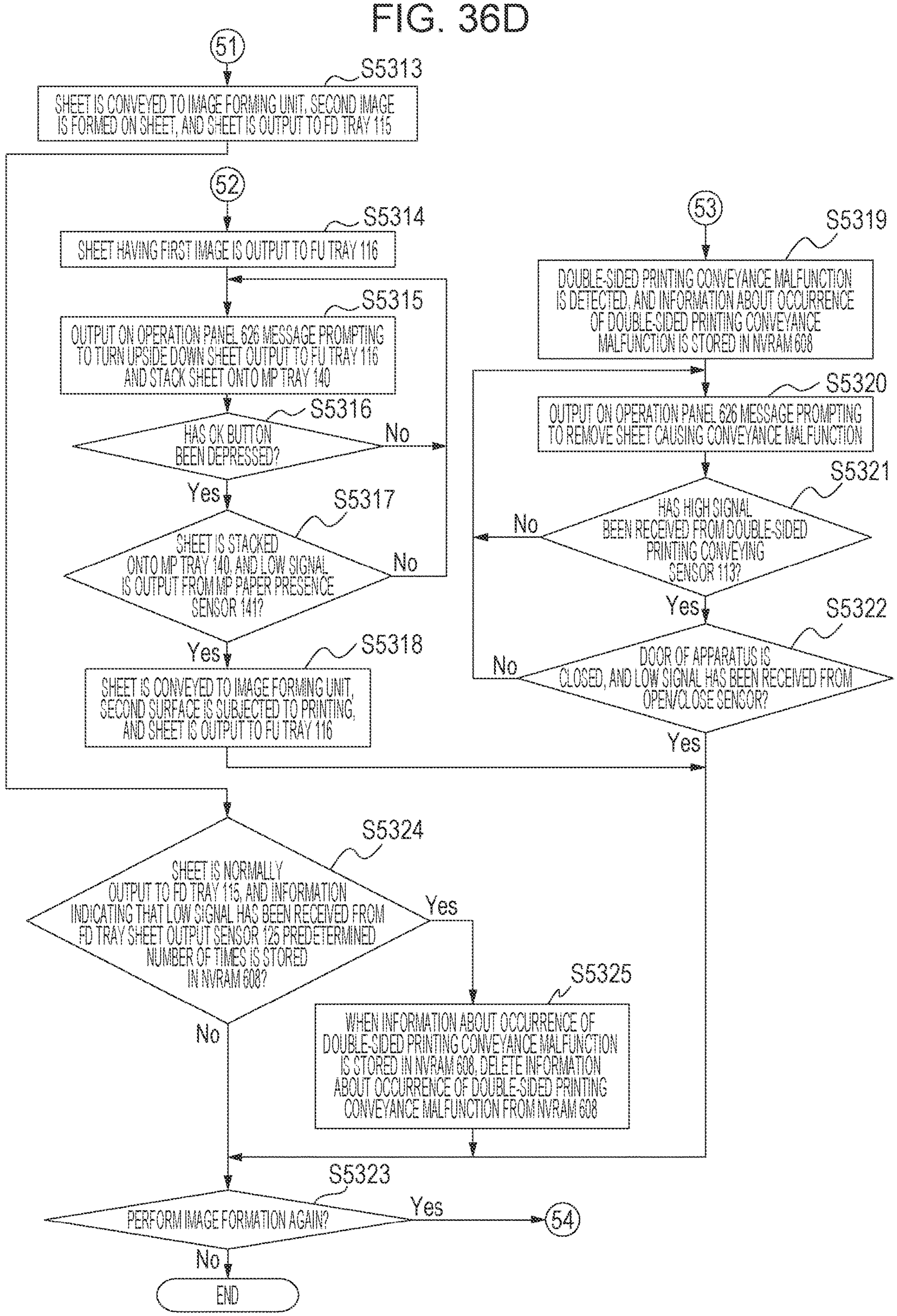

A specific process in the case where there is a possibility that a double-sided printing conveyance malfunction occurs and in the case where a double-sided printing conveyance malfunction has occurred will be described with reference to the flowcharts of FIG. 36A and FIG. 36B. The flowcharts of FIG. 36C and FIG. 36D are a modification of FIG. 36A and FIG. 36B. Like step numbers are assigned to the same steps, and the description thereof is omitted.

As an example of double-sided printing operation, the case where a series of operation in which, after the conveying direction of a sheet having a first image only on its one side is switched by the pair of FD rollers 112 to the second conveying direction, the sheet is conveyed again to the image forming unit and then the image forming unit is caused to form a second image on the sheet will be described.

Initially, the CPU 601 receives, from the printer controller 213, a printing instruction including information on a series of double-sided printing operation. The CPU 601 starts a job in accordance with the printing instruction.

In S5301, when information about occurrence of a double-sided printing conveyance malfunction is stored in the NVRAM 608, the CPU 601 advances the process to S5302. In S5301, when information about occurrence of a double-sided printing conveyance malfunction is not stored in the NVRAM 608, the CPU 601 starts the printing operation in a state where the FU tray 116 is closed, and the process proceeds to S5307.

In S5302, the CPU 601 switches the FU tray 116 into the open position and outputs, to the operation panel 626, a message prompting to switch the sheet feeding unit from the sheet feeding cassette 100 to the MP tray 140. A message to be output at this time may be, for example, the sentence shown in FIG. 37G or may be, for example, the picture shown in FIG. 37B or FIG. 37F. Alternatively, in order for a user to easily understand necessary operation, for example, the picture shown in FIG. 37B or FIG. 37F may be animated and displayed on the operation panel 626.

The message output to the operation panel 626 in S5302 may be a message informing a user that there is a possibility of occurrence of a conveyance malfunction or there is a history that a conveyance malfunction has occurred. By outputting this message, the user switches the FU tray 116 into the open position and switches the sheet feeding unit from the sheet feeding cassette 100 to the MP tray 140 in response to the message output to the operation panel 626. By prompting this operation, it is possible to reduce occurrence of a conveyance malfunction, and this leads to improvement in usability.

In S5303, OK button contained in the message prompting the user to switch the FU tray 116 into the open position and to switch the sheet feeding unit from the sheet feeding cassette 100 to the MP tray 140 is depressed. When the CPU 601 acquires information indicating that OK button contained in the message prompting to switch the FU tray 116 into the open position and to switch the sheet feeding unit from the sheet feeding cassette 100 to the MP tray 140 has been depressed, the process proceeds to S5304.

In S5304, when the sheet is stacked on the MP tray 140 and the CPU 601 receives a LOW signal output from the MP paper presence sensor 141, the process proceeds to S5305. When a sheet is not stacked on the MP tray 140 and the CPU 601 has not received a LOW signal output from the MP paper presence sensor 141, the process proceeds to S5306.

In S5305, the sheet is fed from the MP tray 140, and the process proceeds to S5307.

In S5306, the sheet is fed from the sheet feeding cassette 100, and the process proceeds to S5307.

In S5307, when the leading edge of the sheet passes through the registration sensor 106, the registration sensor 106 outputs a LOW signal to the CPU 601. When the CPU 601 receives a LOW signal output from the registration sensor 106, the process proceeds to S5308.

In S5308, the sheet is conveyed to the image forming unit, a first image is formed by the image forming unit, and the process proceeds to S5309.

In S5309, when the FU tray 116 is in the open position and the CPU 601 receives a HIGH signal output from the FU tray open/close sensor 117, the process proceeds to S5314. When the FU tray 116 is in the close position and the CPU 601 receives a LOW signal output from the FU tray open/close sensor 117, the process proceeds to S5310. First, the process in S5314 and the following steps will be described.

In S5314, when the sheet on which the first image is formed by the image forming unit is output to the FU tray 116, the process proceeds to S5315.

In S5315, the CPU 601 outputs, to the operation panel 626, a message prompting to stack the sheet having the first image only on its one side onto the MP tray 140, and the process proceeds to S5316. The message output at this time may be, for example, the message shown in FIG. 37H. Alternatively, in order for a user to easily understand necessary operation, for example, the picture in the message shown in FIG. 37H may be animated and displayed on the operation panel 626.

In S5316, when OK button contained in the message output in S5315 is depressed by the user and the CPU 601 acquires information indicating that OK button has been depressed, the process proceeds to S5317.

In S5317, when the sheet is stacked on the MP tray 140 and the CPU 601 receives a LOW signal output from the MP paper presence sensor 141, the process proceeds to S5318. When the sheet is not stacked on the MP tray 140 and the CPU 601 has not received a LOW signal output from the MP paper presence sensor 141, the process returns to S5315.

In S5318, when the sheet having the first image only on its one side is conveyed to the image forming unit, a second image is formed on the sheet by the image forming unit, and the sheet is output to the FU tray 116, the process proceeds to S5323.

Subsequently, the process in S5310 and the following steps will be described. In S5310, the stepping motor 623 starts reverse rotation, the pair of FD rollers 112 rotates in the reverse direction, and the sheet begins to be conveyed in the second conveying direction. When the CPU 601 receives information indicating that the stepping motor 623 begins to rotate in the reverse direction, the process proceeds to S5311.

In S5311, the CPU 601 determines whether a predetermined time has elapsed. The predetermined time in this case is s time calculated by using the conveying speed of a sheet and a distance from the pair of FD rollers 112 to the registration sensor 106. As the predetermined time elapses, the CPU 601 advances the process to S5312. The process in S5312 and the following steps vary depending on whether a conveyance malfunction has occurred.

When a sheet is conveyed normally, the state is shown in FIG. 33L. In other words, in S5312, the sheet is detected by the registration sensor 106, the CPU 601 receives a LOW signal output from the registration sensor 106, and the process proceeds to S5313. In S5313, when the sheet is output to the FD tray 115, the process proceeds to S5323.

When a conveyance malfunction has occurred, the state is shown in FIG. 33M. In other words, in S5312, the sheet is not detected by the registration sensor 106, the CPU 601 receives a HIGH signal output from the registration sensor 106, and the process proceeds to S5319.

In S5319, the CPU 601 detects that a double-sided printing conveyance malfunction has occurred and causes the NVRAM 608 to store information about occurrence of a double-sided printing conveyance malfunction, and the process proceeds to S5320.

In S5320, the CPU 601 outputs, to the operation panel 626, a message prompting to remove the sheet in a double-sided printing conveyance malfunction. A message to be output at this time may be, for example, the sentence shown in FIG. 37I or may be a picture. Alternatively, in order for a user to easily understand necessary operation, an animation may be displayed on the operation panel 626. A sheet in a conveyance malfunction is also referred to as first sheet.

In S5321, when the sheet in a conveyance malfunction is removed by the user, the CPU 601 receives a HIGH signal output from the double-sided printing conveying sensor 113, and the process proceeds to S5322.

In S5322, the door (not shown) of the image forming apparatus 20, opened by the user to remove the sheet in a conveyance malfunction, is switched into the close position. When the door (not shown) of the image forming apparatus 20 is switched into the close position, the CPU 601 receives a LOW signal output from the open/close sensor for the door (not shown), and the process proceeds to S5323.

In the present embodiment, when the CPU 601 completes the processes of S5321 and S5322, the CPU 601 detects that jam recovery is complete. When the CPU 601 detects that jam recovery is complete, the CPU 601 starts a process of reforming the image formed on the sheet in a conveyance malfunction onto a new sheet. This process is referred to as reprint. A new sheet is also referred to as second sheet.

In S5323, when reprint is performed, the CPU 601 returns the process to S5301 and starts a process of reforming the image formed on the sheet in a conveyance malfunction onto a new sheet. At this time, a sheet in a conveyance malfunction is also referred to as fifth sheet, and a new sheet is also referred to as sixth sheet.

In S5323, when a sheet is normally output during the process of S5313 but the job is not complete, and the CPU 601 has received information to perform image formation again from the printer controller 213, the process returns to S5301. When the job is complete and an image is not formed again, the CPU 601 ends the process.

A printing instruction in a job in the case where a double-sided printing conveyance malfunction has occurred is also referred to as fifth printing instruction, and a job in the case where a double-sided printing conveyance malfunction has occurred is also referred to as fifth job. A printing instruction that the CPU 601 newly receives from the printer controller 213 after a double-sided printing conveyance malfunction is resolved is also referred to as sixth printing instruction, and a job that the CPU 601 executes in accordance with a printing instruction newly received from the printer controller 213 is also referred to as sixth job.

In the present embodiment, the CPU 601 may advance the process to S5324 after S5313 as shown in FIG. 36C and FIG. 36D.

In S5324, when a sheet is normally conveyed to the image forming unit and information about the fact that a LOW signal output from the FD tray sheet output sensor 125 is detected a predetermined number of times is stored in the NVRAM 608, the CPU 601 advances the process to S5325.

In S5325, when information about the fact that a double-sided printing conveyance malfunction is detected is stored in the NVRAM 608, the CPU 601 deletes, from the NVRAM 608, information about the fact that a sheet feed conveyance malfunction has occurred, and the process proceeds to S5323.

By executing the processes of S5324 and S5325, it is possible to output a message to the user in S5302 only just after occurrence of a conveyance malfunction and there is a high possibility that a conveyance malfunction occurs, and this leads to improvement in usability.

As described above, the CPU 601 switches the FU tray 116 into the open position and outputs a message prompting to switch the sheet feeding unit from the sheet feeding cassette 100 to the MP tray 140. By outputting the message, it is possible to reduce occurrence of a double-sided printing conveyance malfunction again.

Alternatively, the CPU 601 and an MPU (not shown) including a plurality of processors, such as multi-cores, may implement the function of the CPU 601 with the plurality of processors.

Summary of Fifteenth Embodiment

As described above, in the present embodiment, control for the CPU 601 to detect a conveyance malfunction and reduce occurrence of the same conveyance malfunction again for three cases where a conveyance malfunction occurs has been described.

In the present embodiment, the CPU 601 detects whether a sheet output conveyance malfunction has occurred in accordance with a signal output from the after-fixing paper presence sensor 110. The CPU 601 causes the NVRAM 608 to store information about occurrence of a sheet output conveyance malfunction. When information about occurrence of a sheet output conveyance malfunction is stored in the NVRAM 608, the operation panel 626 is caused to output a message prompting to switch the FU tray 116 into the open position.

In the present embodiment, the CPU 601 detects whether a sheet feed conveyance malfunction has occurred in accordance with a signal output from the after-feeding paper presence sensor 118. The CPU 601 causes the NVRAM 608 to store information about occurrence of a sheet feed conveyance malfunction. When information about occurrence of a sheet feed conveyance malfunction is stored in the NVRAM 608, the operation panel 626 is caused to output a message prompting to switch the sheet feeding section into the open position.

In addition, in the present embodiment, the CPU 601 causes the pair of FD rollers 112 to convey a sheet having a first image in the second conveying direction and then detects whether a double-sided printing conveyance malfunction has occurred in accordance with a signal output from the registration sensor 106. The CPU 601 causes the NVRAM 608 to store information about occurrence of a double-sided printing conveyance malfunction. When information about occurrence of a double-sided printing conveyance malfunction is stored in the NVRAM 608, the operation panel 626 is caused to output a message prompting to switch the sheet feeding section and to switch the FU tray 116 into the open position.

With the above-described function, depending on the status of occurrence of a conveyance malfunction, a message prompting to switch the conveying path is output, so occurrence of a conveyance malfunction is reduced.

Sixteenth Embodiment

In the fifteenth embodiment, the case where the FU tray 116 is manually opened or closed by a user has been described. In the present embodiment, the FU tray 116 may be automatically opened or closed. When the FU tray 116 does not need to be opened or closed, a locking mechanism capable of locking such that the FU tray 116 is not switched into the open state may be provided.

In the present embodiment, control for the CPU 601 to detect a sheet output conveyance malfunction and reduce occurrence of the same conveyance malfunction again will be described.

Figure 38A:
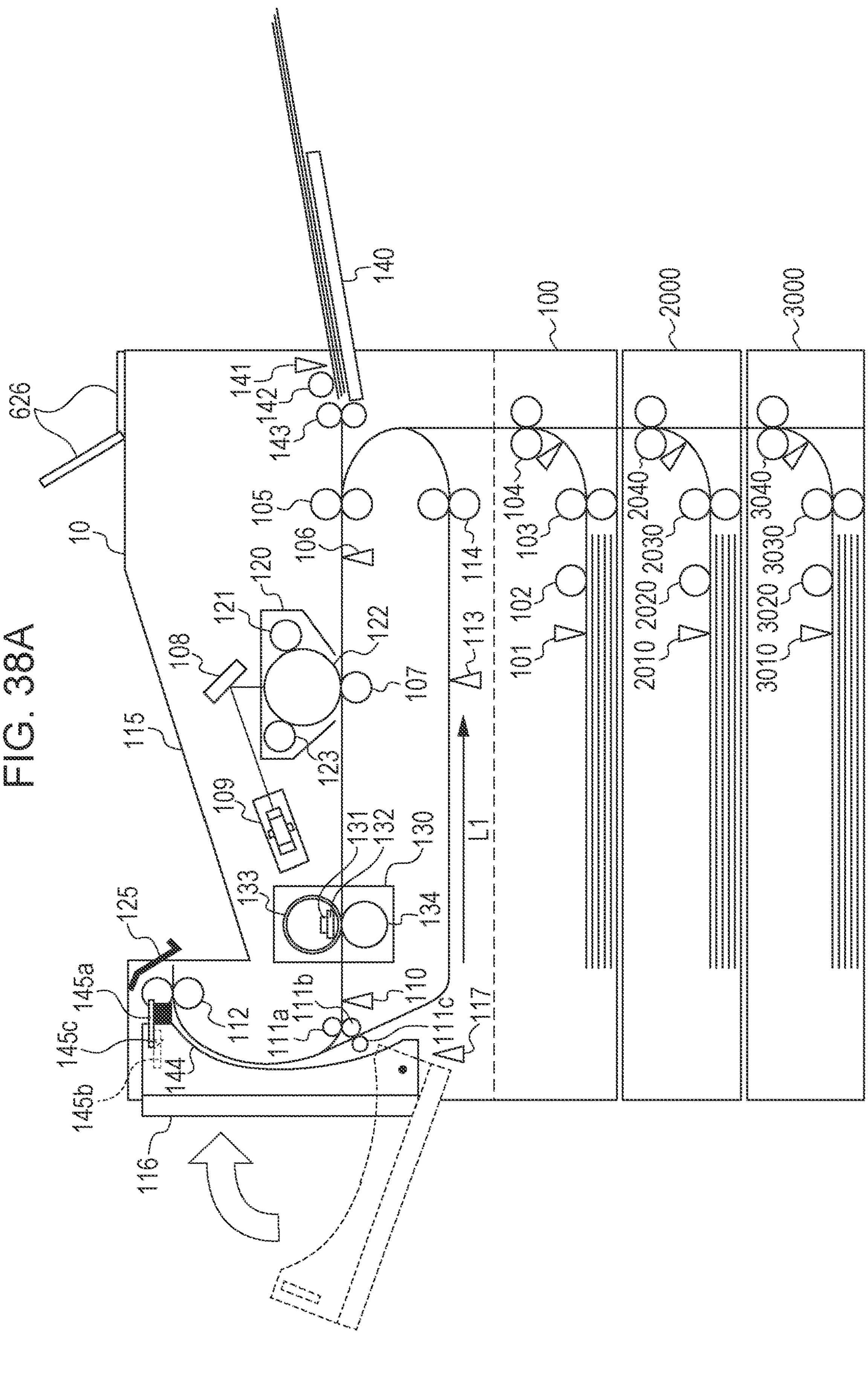
FIG. 38A is a schematic diagram of an image forming apparatus in a sixteenth embodiment.

FIG. 38A is a schematic configuration diagram of the image forming apparatus 20 of the present embodiment. The image forming apparatus 20 includes the FU tray solenoid 144, and a lock unit that restricts the opening of the FU tray 116. The FU tray 116 includes a mechanism to automatically switch into the open state. The image forming apparatus 20 is the same as the above-described image forming apparatus 20 shown in FIG. 18 other than the FU tray solenoid 144 and the lock unit, so the description thereof is omitted.

Figure 38B:
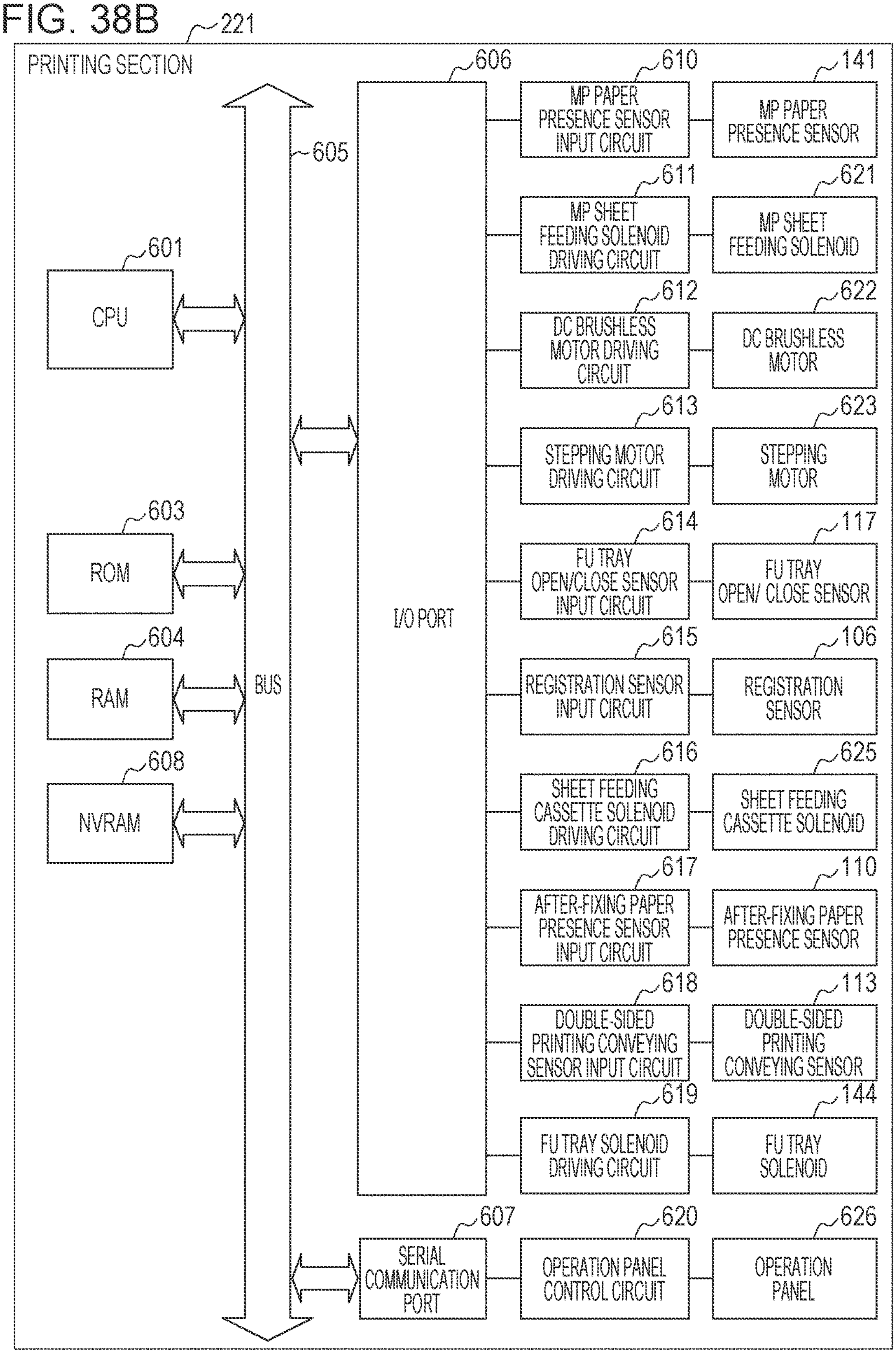
FIG. 38B is a control block diagram of hardware concerned with sheet conveyance control in the sixteenth embodiment.

FIG. 38B is a block diagram showing the configuration of hardware concerned with sheet conveyance control as a software function implemented by the printing section 221 of the present embodiment. The components are the same as those of the block diagram of FIG. 19B other than the FU tray solenoid 144 and the FU tray solenoid driving circuit 619, so the description thereof is omitted. As shown in FIG. 38B, the drive of the FU tray solenoid 144 is controlled by the CPU 601 via the FU tray solenoid driving circuit 619 and the I/O port 606.

Lock Unit for FU Tray 116 and Mechanism for Automatically Switching into Open State Hereinafter, the lock unit and the automatic opening/closing mechanism of the image forming apparatus 20 in the present embodiment will be described with reference to FIG. 38C.

The image forming apparatus 20 includes the FU tray solenoid 144, a locking member 145_a_ that is a mechanical member interlocking with the FU tray solenoid 144, and a locking member 146 with which a pawl 145_b_ of the locking member 145_a_ provided for the FU tray 116 interferes, as the lock unit. The drive of the FU tray solenoid 144 is controlled by the CPU 601 via the FU tray solenoid driving circuit 619.

Figure 38D:
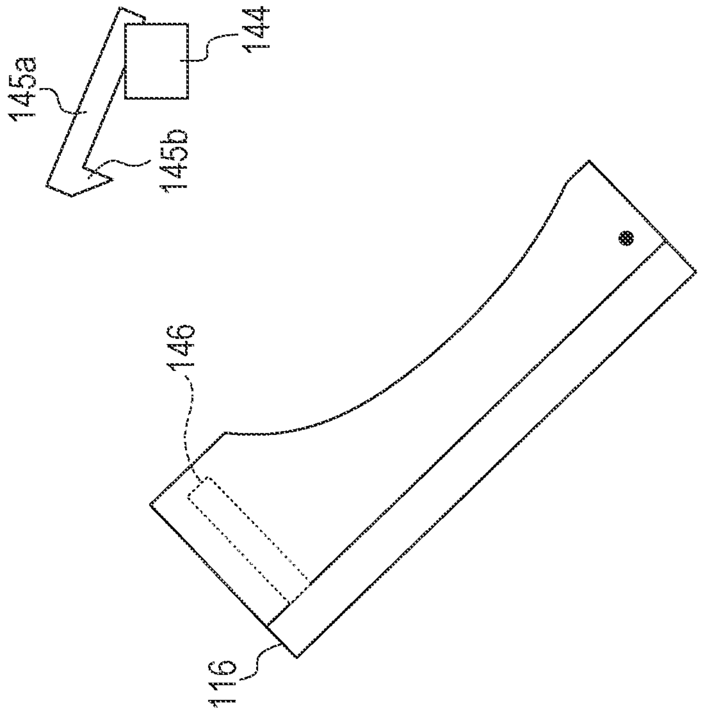
FIG. 38C to FIG. 38F are diagrams for a lock unit and an FU tray.
Figure 38C:
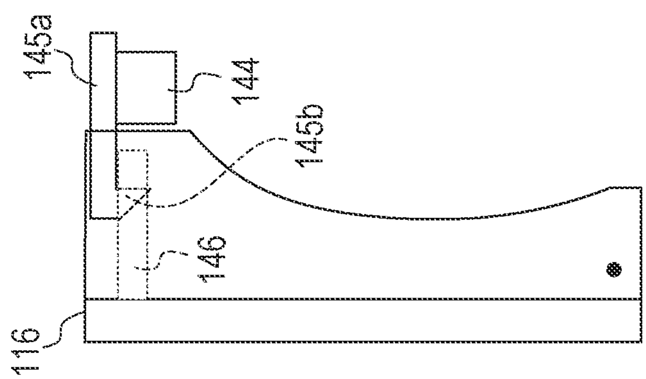
Figure 38E:
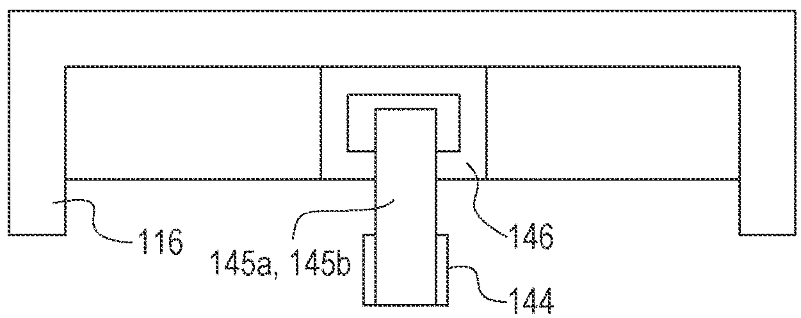

When the FU tray solenoid driving circuit 619 is in an off state and the FU tray solenoid 144 is in an off state, the locking member 145_a_ is in a locked state such that the FU tray 116 is not switched into the open position as shown in FIG. 38C. At this time, the pawl 145_b_ of the locking member 145_a_ interferes with the locking member 146 to prevent the FU tray 116 from opening as shown in FIG. 38E. FIG. 38E is a view showing the main body of the image forming apparatus 20 in the state shown in FIG. 38C when viewed from vertically above. This state is defined as steady state.

When the power of the image forming apparatus 20 is turned off, the FU tray solenoid 144 is a self-hold solenoid in the present embodiment in order to prevent the FU tray 116 from opening. With the self-hold solenoid, the FU tray solenoid 144 is capable of holding a locked state such that the FU tray 116 is not switched into the open position even in a state where no power is supplied.

When the CPU 601 sets the FU tray solenoid driving circuit 619 in the on state to set the FU tray solenoid 144 in the on state, the locking member 145_a_ pivots, and the pawl 145_b_ does not interfere with the locking member 146. Therefore, as shown in FIG. 38D, the FU tray 116 switches into the open position by its own weight. When the FU tray 116 switches into the open position by its own weight, the FU tray solenoid driving circuit 619 is set to the off state to set the FU tray solenoid 144 to the off state, with the result that the locking member 145_a_ returns to the position in the steady state as shown in FIG. 38A.

Figure 38F:
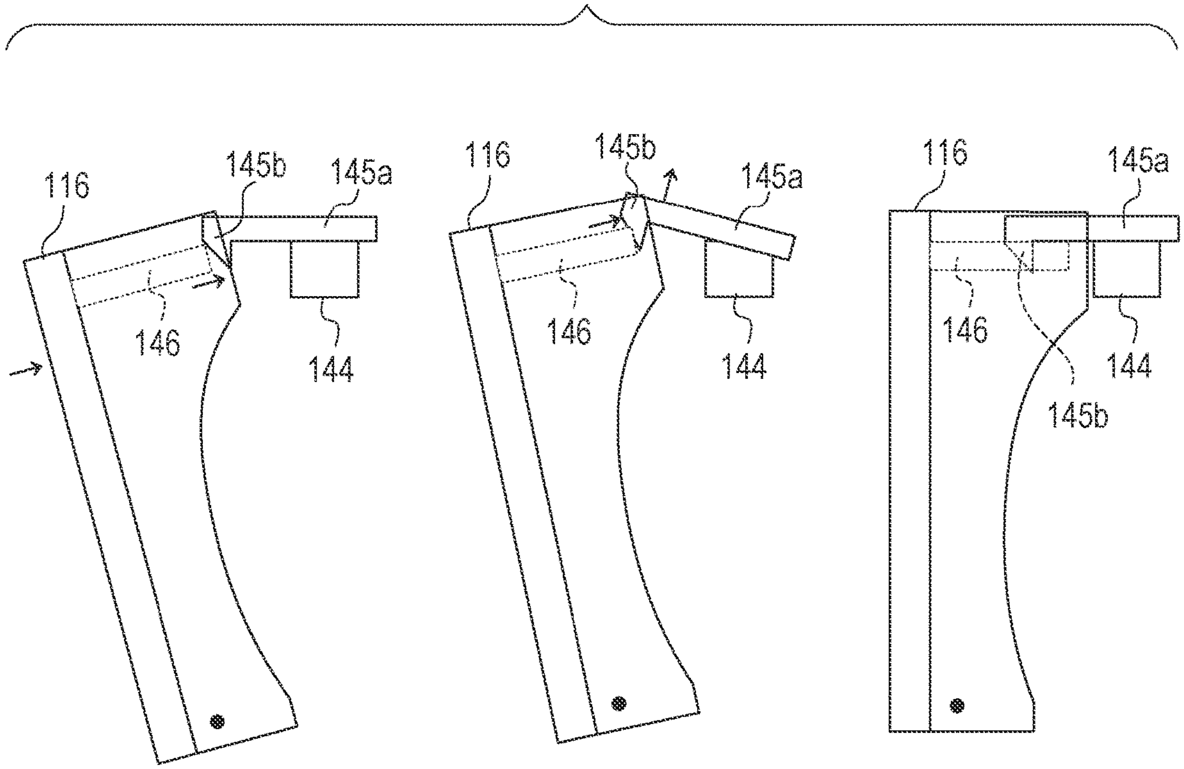

When the FU tray 116 is switched into the close position, a force in the direction of the arrow as shown in FIG. 38F is applied to the FU tray 116 by user's operation. When the locking member 146 contacts with the inclined surface of the pawl 145_b_, the locking member 145_a_ is pushed up by the force applied by the user, and the locking member 145_a_ eventually returns to the steady state, with the result that the FU tray 116 returns to the locked state again.

When the FU tray 116 switches into the open state and the CPU 601 detects a HIGH signal output from the FU tray open/close sensor 117, the FU tray solenoid driving circuit 619 may be switched into the off state. With this configuration, the FU tray solenoid 144 may be switched into the off state by switching the FU tray solenoid driving circuit 619 into the off state, thus returning the locking member 145_a_ to the position in the steady state as shown in FIG. 38A.

Process for Reducing Sheet Output Conveyance Malfunction

In the present embodiment, when a sheet output conveyance malfunction has occurred, there is a possibility that the same conveyance malfunction occurs again. In this case, the CPU 601 releases the locking mechanism to switch the FU tray 116 into the open position, so it is possible to reduce occurrence of the same conveyance malfunction again. A sheet output conveyance malfunction is as described in Sheet Output Conveyance Malfunction.

Figure 39A:
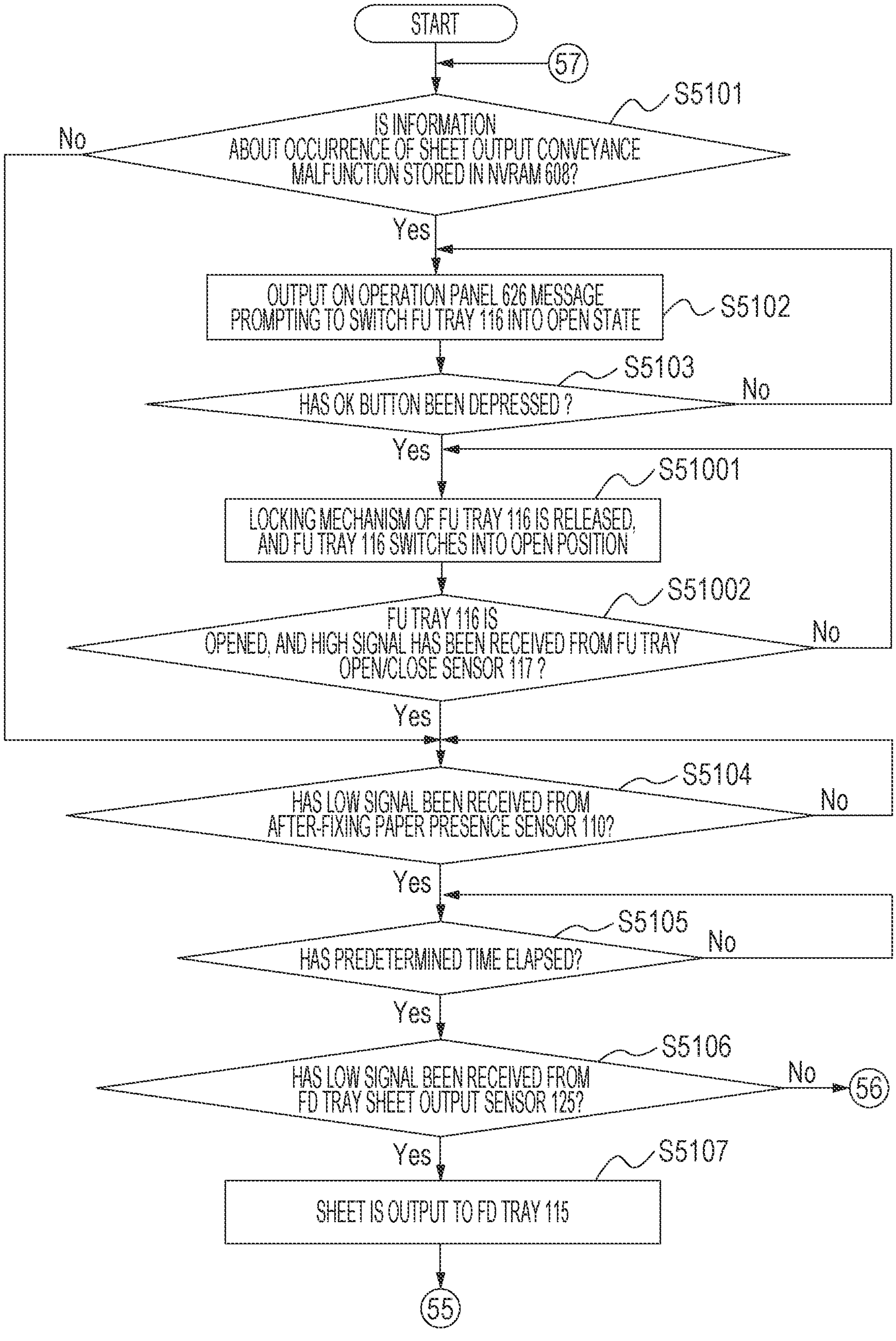
FIG. 39A and FIG. 39B are flowcharts of a process in the sixteenth embodiment.
Figure 39B:
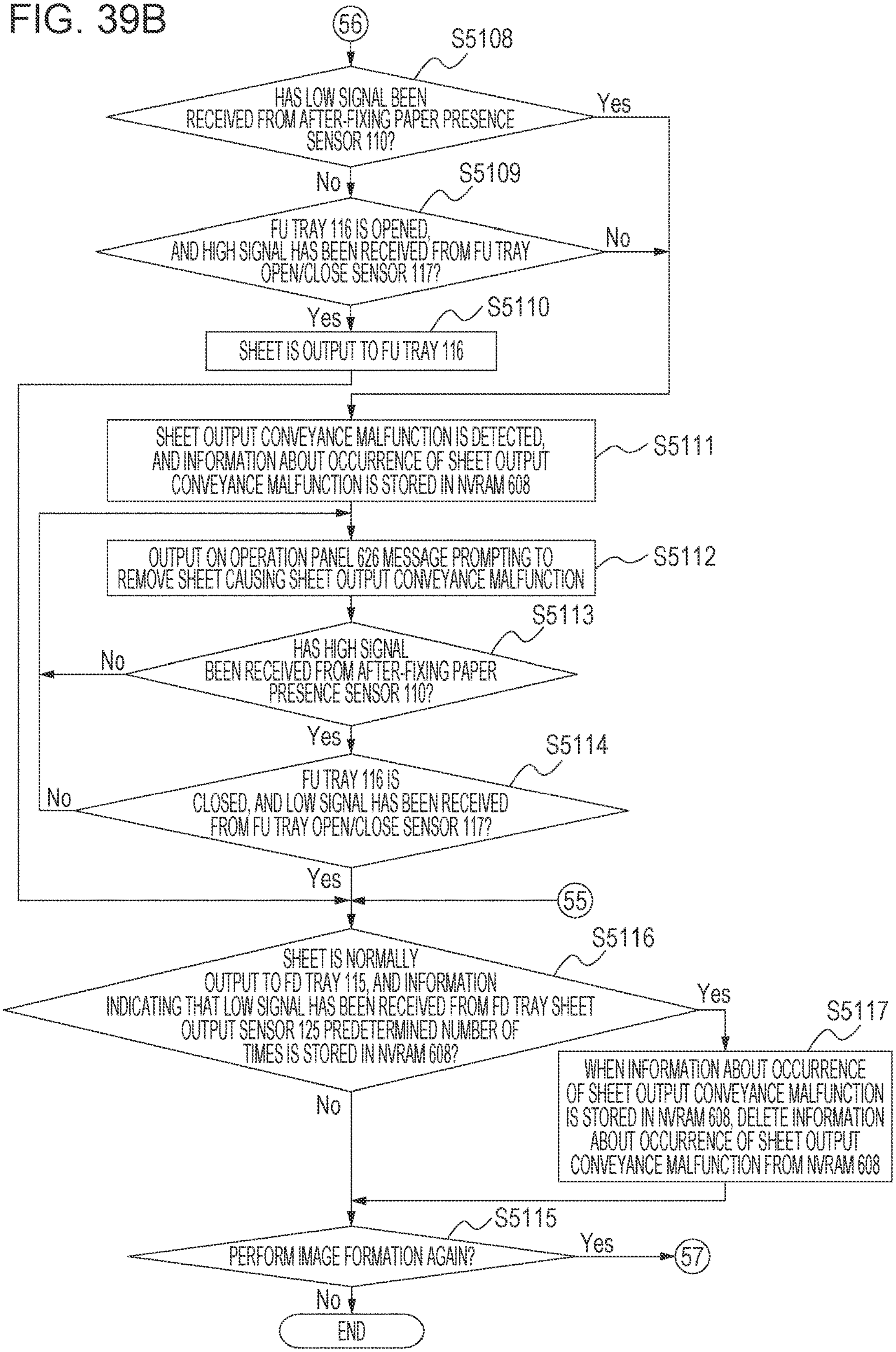

A specific process in the case where there is a possibility that a sheet output conveyance malfunction occurs and in the case where a sheet output conveyance malfunction has occurred will be described with reference to the flowcharts of FIG. 39A and FIG. 39B. The flowcharts of FIG. 39A and FIG. 39B are a modification of FIG. 34C and FIG. 34D, and only S51001 and S51002 are different.

Initially, the CPU 601 receives, from the printer controller 213, a printing instruction including information about a series of printing operation to cause the sheet feeding unit to feed a sheet and cause the image forming unit to form an image on the sheet and output the sheet. The CPU 601 starts a job in accordance with the printing instruction.

In S5101, when information about occurrence of a sheet output conveyance malfunction is stored in the NVRAM 608, the CPU 601 advances the process to S5102. In S5101, when information about occurrence of a sheet output conveyance malfunction is not stored in the NVRAM 608, the CPU 601 starts the printing operation in a state where the FU tray 116 is closed, and the process proceeds to S51001.

In S51001, the CPU 601 releases the lock unit that locks such that the FU tray 116 is not switched into the open state. The CPU 601 sets the FU tray solenoid driving circuit 619 to the on state to set the FU tray solenoid 144 to the on state, with the result that the locking member 145*a* is pivoted to switch the FU tray 116 into the open position, and then the process proceeds to S51002. With this function, it is possible to reduce occurrence of a conveyance malfunction due to the fact that the FU tray 116 is in the close position, and this leads to improvement in usability.

The CPU 601 may output, to the operation panel 626, a message prompting to switch the FU tray 116 into the open position before releasing the lock unit.

In addition, when the CPU 601 causes the NVRAM 608 to store information about occurrence of a sheet output conveyance malfunction, the CPU 601 may cause the NVRAM 608 to store information for releasing the lock unit that locks such that the FU tray 116 is not switched into the open state.

In S51002, when the FU tray 116 opens and the CPU 601 receives a HIGH signal output from the FU tray open/close sensor 117, the process proceeds to S5104.

Summary of Sixteenth Embodiment

As described above, in the present embodiment, control for the CPU 601 to detect a conveyance malfunction and reduce occurrence of a sheet output conveyance malfunction again for three cases where a sheet output conveyance malfunction occurs has been described.

In the present embodiment, the CPU 601 detects whether a sheet output conveyance malfunction has occurred in accordance with a signal output from the after-fixing paper presence sensor 110. The CPU 601 causes the NVRAM 608 to store information about occurrence of a sheet output conveyance malfunction. When information about occurrence of a sheet output conveyance malfunction is stored in the NVRAM 608, the FU tray 116 is switched into the open position by releasing the lock unit that locks such that the FU tray 116 is not switched into the open state.

With the above-described function, according to the status of occurrence of a sheet output conveyance malfunction, even when the FU tray 116 is not operated by a user, the FU tray 116 can be switched into the open position, so it is possible to reduce occurrence of a conveyance malfunction.

As described above, according to the embodiments of the present disclosure, it is possible to prompt to switch the open/closed state of the FU tray in accordance with an input type of sheet before transmitting image information to the image forming apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-045742, filed Mar. 16, 2020, Japanese Patent Application No. 2020-056557, filed Mar. 26, 2020, Japanese Patent Application No. 2020-087708, filed May 19, 2020, Japanese Patent Application No. 2020-101025, filed Jun. 10, 2020, and Japanese Patent Application No. 2020-123116, filed Jul. 17, 2020, which are hereby incorporated by reference herein in their entirety.

What is claimed is:

1. An information processing method for an information processing apparatus, wherein the information processing apparatus is to communicate with an image forming apparatus having an image forming unit arranged to form an image on a sheet, and having first and second sheet output sections, each configured to receive output of the sheet having the image formed on the sheet, wherein, when conveyed along a first sheet output conveying path, the sheet is output to the first sheet output section so that the image faces downward and, when conveyed along a second sheet output conveying path, the sheet is output to the second sheet output section so that the image faces upward, and wherein the second sheet output section is capable of being switched between a close position to serve as a guiding portion arranged to guide the sheet to the first sheet output section, and an open position to serve as a sheet output section arranged not to guide the sheet to the first sheet output section but to be capable of stacking the sheet, the information processing method comprising:

inputting a type of sheet;

acquiring information indicating whether the second sheet output section is in an open state or in a closed state;

transmitting image information to the image forming apparatus; and outputting a message, wherein, when the input type of sheet is a sheet recommended to be output to the second sheet output section and the acquired information indicates that the second sheet output section is in the closed state, outputting includes outputting a message to prompt to switch the second sheet output section into the open position before the image information is transmitted to the image forming apparatus.

2. The information processing method according to claim 1, further comprising detecting whether the second sheet output section is in the open state or in the closed state.

3. The information processing method according to claim 1, wherein inputting further includes inputting single-sided printing or double-sided printing.

4. The information processing method according to claim 1, wherein, when the input type of sheet is a sheet recommended to be output to the second sheet output section and double-sided printing is input, outputting includes outputting a message informing that the input type of sheet is not recommended for double-sided printing and that double-sided printing is changed to single-sided printing.

5. The information processing method according to claim 1, wherein, when the type of sheet is input, acquiring includes acquiring information indicating whether the second sheet output section is in the open state or in the closed state and, in accordance with the acquired information indicating whether the second sheet output section is in the open state or in the closed state, outputting includes outputting a message to prompt to switch the second sheet output section into the open position.

6. The information processing method according to claim 5, wherein, when the type of sheet is input, outputting includes, after acquiring information indicating whether the second sheet output section is in the open state or in the closed state, outputting a message to prompt to switch the second sheet output section into the open position.

7. The information processing method according to claim 1, wherein, after inputting the type of sheet and before transmitting the image information, acquiring includes acquiring information indicating whether the second sheet output section is in the open state or in the closed state and, in accordance with the acquired information indicating whether the second sheet output section is in the open state or in the closed state, outputting includes outputting a message to prompt to switch the second sheet output section into the open position.

8. The information processing method according to claim 1, wherein the information processing apparatus is arranged such the image information is not transmitted to the image forming apparatus during when the message is output.

9. The information processing method according to claim 1, wherein outputting the message includes outputting the message so that the message covers part of a screen to which the type of sheet is input such that, when the message covering part of the screen is closed, the screen also is closed.

10. The information processing method according to claim 1, wherein, after the message to prompt to switch the second sheet output section into the open state is output, the message is continuously output until acquiring includes acquiring information indicating that the second sheet output section is in the open state.

11. The information processing method according to claim 1, wherein, when the input type of sheet is a sheet recommended to be output to the second sheet output section and information indicating that the second sheet output section is in the closed state is acquired, transmitting, to the image forming apparatus, includes transmitting an instruction to automatically place the second sheet output section in the open state, and wherein, when the input type of sheet is not a sheet recommended to be output to the second sheet output section and information indicating that the second sheet output section is in the open state is acquired, transmitting, to the image forming apparatus, includes transmitting an instruction to automatically switch the second sheet output section into the closed state.

12. The information processing method according to claim 1, wherein the image forming apparatus further includes a first sheet feeding section and a second sheet feeding section, wherein the first sheet feeding section is arranged to convey a sheet, stacked on the first sheet feeding section, to the image forming unit along a first sheet feed conveying path such that an upper surface of the sheet in a stacked state on the first sheet feeding section faces downward, wherein the second sheet feeding section is arranged to convey a sheet, stacked on the second sheet feeding section, to the image forming unit along a second sheet feed conveying path such that an upper surface of the sheet in a stacked state on the second sheet feeding section faces upward, and wherein, when the input type of sheet is a sheet recommended to be output to the second sheet output section, outputting includes outputting a message to prompt to select the second sheet feeding section as a sheet feeding section and to stack a sheet on the second sheet feeding section.

13. A non-transitory computer-readable storage medium storing a program to cause a computer to perform an information processing method for an information processing apparatus, wherein the information processing apparatus is to communicate with an image forming apparatus having an image forming unit arranged to form an image on a sheet, and having first and second sheet output sections, each configured to receive output of the sheet having the image formed on the sheet, wherein, when conveyed along a first sheet output conveying path, the sheet is output to the first sheet output section so that the image faces downward and, when conveyed along a second sheet output conveying path, the sheet is output to the second sheet output section so that the image faces upward, and wherein the second sheet output section is capable of being switched between a close position to serve as a guiding portion arranged to guide the sheet to the first sheet output section, and an open position to serve as a sheet output section arranged not to guide the sheet to the first sheet output section but to be capable of stacking the sheet, the information processing method comprising:

inputting a type of sheet;

acquiring information indicating whether the second sheet output section is in an open state or in a closed state;

transmitting image information to the image forming apparatus; and outputting a message, wherein, when the input type of sheet is a sheet recommended to be output to the second sheet output section and the acquired information indicates that the second sheet output section is in the closed state, outputting includes outputting a message to prompt to switch the second sheet output section into the open position before the image information is transmitted to the image forming apparatus.

14. An information processing apparatus to communicate with an image forming apparatus having an image forming unit arranged to form an image on a sheet, and having first and second sheet output sections, each configured to receive output of the sheet having the image formed on the sheet, wherein, when conveyed along a first sheet output conveying path, the sheet is output to the first sheet output section so that the image faces downward and, when conveyed along a second sheet output conveying path, the sheet is output to the second sheet output section so that the image faces upward, and wherein the second sheet output section is capable of being switched between a close position to serve as a guiding portion arranged to guide the sheet to the first sheet output section, and an open position to serve as a sheet output section arranged not to guide the sheet to the first sheet output section but to be capable of stacking the sheet, the information processing apparatus comprising:

an input unit configured to input a type of sheet;

an acquisition unit configured to acquire information indicating whether the second sheet output section is in an open state or in a closed state;

a transmission unit configured to transmit image information to the image forming apparatus; and an output unit configured to output a message, wherein, when the input type of sheet is a sheet recommended to be output to the second sheet output section and the acquired information indicates that the second sheet output section is in the closed state, the output unit outputs a message to prompt to switch the second sheet output section into the open position before the image information is transmitted to the image forming apparatus.

15. The information processing apparatus according to claim 14, wherein the input unit further inputs single-sided printing or double-sided printing.

16. The information processing apparatus according to claim 14, wherein, when the input type of sheet is a sheet recommended to be output to the second sheet output section and double-sided printing is input, the output unit outputs a message informing that the input type of sheet is not recommended for double-sided printing and that double-sided printing is changed to single-sided printing.

17. The information processing apparatus according to claim 14, wherein, when the type of sheet is input, the acquisition unit acquires information indicating whether the second sheet output section is in the open state or in the closed state and, in accordance with the acquired information indicating whether the second sheet output section is in the open state or in the closed state, the output unit outputs a message to prompt to switch the second sheet output section into the open position.

18. The information processing apparatus according to claim 17, wherein, when the type of sheet is input, after the acquisition unit acquires information indicating whether the second sheet output section is in the open state or in the closed state, the output unit outputs a message to prompt to switch the second sheet output section into the open position.

19. The information processing apparatus according to claim 14, wherein, after inputting the type of sheet and before transmitting the image information, the acquisition unit acquires information indicating whether the second sheet output section is in the open state or in the closed state and, in accordance with the acquired information indicating whether the second sheet output section is in the open state or in the closed state, the output unit outputs a message to prompt to switch the second sheet output section into the open position.

20. The information processing apparatus according to claim 14, wherein the information processing apparatus is arranged such the image information is not transmitted to the image forming apparatus during when the message is output.

21. The information processing apparatus according to claim 14, wherein the output unit outputs the message so that the message covers part of a screen to which the type of sheet is input such that, when the message covering part of the screen is closed, the screen also is closed.

22. The information processing apparatus according to claim 14, wherein, after the message to prompt to switch the second sheet output section into the open state is output, the output unit continuously outputs the message until the acquisition unit acquires information indicating that the second sheet output section is in the open state.

23. The information processing apparatus according to claim 14, wherein the image forming apparatus further includes a first sheet feeding section and a second sheet feeding section, wherein the first sheet feeding section is arranged to convey a sheet, stacked on the first sheet feeding section, to the image forming unit along a first sheet feed conveying path such that an upper surface of the sheet in a stacked state on the first sheet feeding section faces downward, wherein the second sheet feeding section is arranged to convey a sheet, stacked on the second sheet feeding section, to the image forming unit along a second sheet feed conveying path such that an upper surface of the sheet in a stacked state on the second sheet feeding section faces upward, and wherein, when the input type of sheet is a sheet recommended to be output to the second sheet output section, the output unit outputs a message to prompt to select the second sheet feeding section as a sheet feeding section and to stack a sheet on the second sheet feeding section.

24. An image forming apparatus to communicate with an information processing apparatus including a reception unit arranged to receive image information containing a type of sheet, the image forming apparatus comprising:

an image forming unit arranged to form an image on a sheet;

first and second sheet output sections, each configured to receive output of the sheet having the image formed on the sheet, wherein, when conveyed along a first sheet output conveying path, the sheet is output to the first sheet output section so that the image faces downward and, when conveyed along a second sheet output conveying path, the sheet is output to the second sheet output section so that the image faces upward, and wherein the second sheet output section is capable of being switched between a close position to serve as a guiding portion arranged to guide the sheet to the first sheet output section, and an open position to serve as a sheet output section arranged not to guide the sheet to the first sheet output section but to be capable of stacking the sheet;

a detection unit configured to detect whether the second sheet output section is in an open state or in a closed state; and an output unit configured to output a message, wherein, when the type of sheet received by the reception unit is a sheet recommended to be output to the second sheet output section and the detection unit detects that the second sheet output section is in the closed state, the output unit outputs a message to prompt to switch the second sheet output section into the open position.

25. The image forming apparatus according to claim 24, wherein the output unit is configured to continuously output a message to prompt to switch the second sheet output section into the open state until the detection unit detects information indicating that the second sheet output section is in the open state.

26. The image forming apparatus according to claim 24, wherein, when the received type of sheet is a sheet recommended to be output to the second sheet output section and the detection unit detects that the second sheet output section is in the closed state, the second sheet output section is automatically switched into the open state, and wherein, when the received type of sheet is not a sheet recommended to be output to the second sheet output section and the detection unit detects that the second sheet output section is in the open state, the second sheet output section is automatically switched into the closed state.

27. The image forming apparatus according to claim 24, wherein conveyance of the sheet is started only after the reception unit receives the image information.

* * * * *